US009274595B2

(12) United States Patent
Reitan

(10) Patent No.: US 9,274,595 B2
(45) Date of Patent: Mar. 1, 2016

(54) COHERENT PRESENTATION OF MULTIPLE REALITY AND INTERACTION MODELS

(75) Inventor: Dan Reitan, Mountain View, CA (US)

(73) Assignee: REINCLOUD Corporation, Mountain View, CA (US)

( * ) Notice: Subject to any disclaimer, the term of this patent is extended or adjusted under 35 U.S.C. 154(b) by 0 days.

(21) Appl. No.: 13/594,477

(22) Filed: Aug. 24, 2012

(65) Prior Publication Data
US 2013/0050260 A1 Feb. 28, 2013

Related U.S. Application Data

(60) Provisional application No. 61/575,790, filed on Aug. 26, 2011, provisional application No. 61/575,791, filed on Aug. 26, 2011, provisional application No. 61/575,789, filed on Aug. 26, 2011.

(51) Int. Cl.
G09G 5/00 (2006.01)
G06F 3/01 (2006.01)
G06F 9/44 (2006.01)
G09G 5/377 (2006.01)
G06T 19/00 (2011.01)
G06T 13/40 (2011.01)

(52) U.S. Cl.
CPC .............. *G06F 3/011* (2013.01); *G06F 8/315* (2013.01); *G06T 13/40* (2013.01); *G06T 19/006* (2013.01); *G09G 5/377* (2013.01)

(58) Field of Classification Search
None
See application file for complete search history.

(56) References Cited

U.S. PATENT DOCUMENTS

| 5,321,613 | A | 6/1994 | Porter et al. |
|---|---|---|---|
| 5,495,576 | A | 2/1996 | Ritchey |
| 5,745,126 | A | 4/1998 | Jain et al. |
| 5,751,289 | A | 5/1998 | Myers |
| 6,054,991 | A | 4/2000 | Crane et al. |
| 6,084,590 | A | 7/2000 | Robotham et al. |
| 6,396,491 | B2 | 5/2002 | Watanabe et al. |
| 6,601,172 | B1 | 7/2003 | Epstein |
| 6,765,569 | B2 | 7/2004 | Neumann et al. |
| 6,974,373 | B2 | 12/2005 | Kriesel |
| 7,043,558 | B2 | 5/2006 | Yoshida et al. |
| 7,274,380 | B2 | 9/2007 | Navab et al. |
| 7,301,547 | B2 | 11/2007 | Martins et al. |
| 7,313,461 | B2 | 12/2007 | Sharma et al. |

(Continued)

OTHER PUBLICATIONS

Maniezzo, "Genetic evolution of the topology and weight distribution of neural networks.", Neural Networks, IEEE Transactions on 5.1, 1994, 39-53.

(Continued)

*Primary Examiner* — Stephen R Koziol
*Assistant Examiner* — Khoa Vu
(74) *Attorney, Agent, or Firm* — Tran & Associates; Bao Tran

(57) ABSTRACT

A method for navigating concurrently and from point-to-point through multiple reality models is described. The method includes: generating, at a processor, a first navigatable virtual view of a first location of interest, wherein the first location of interest is one of a first virtual location and a first non-virtual location; and concurrently with the generating the first navigatable virtual view of the first location of interest, generating, at the processor, a second navigatable virtual view corresponding to a current physical position of an object, such that real-time sight at the current physical position is enabled within the second navigatable virtual view.

10 Claims, 42 Drawing Sheets

(56) References Cited

U.S. PATENT DOCUMENTS

| | | | |
|---|---|---|---|
| 7,583,275 B2 | 9/2009 | Neumann et al. |
| 7,599,847 B2 | 10/2009 | Block et al. |
| 7,614,001 B2 | 11/2009 | Abbott et al. |
| 7,724,250 B2 | 5/2010 | Ishii et al. |
| 7,831,086 B2 | 11/2010 | Kondo et al. |
| 7,893,935 B1 | 2/2011 | Neely, III et al. |
| 7,986,825 B2 | 7/2011 | Kochi et al. |
| 7,987,232 B2 | 7/2011 | Thornton et al. |
| 7,990,394 B2 | 8/2011 | Vincent et al. |
| 8,144,055 B2 | 3/2012 | Tysowski et al. |
| 8,144,232 B2 | 3/2012 | Larson et al. |
| 8,164,599 B1 | 4/2012 | Kadous et al. |
| 8,175,297 B1 | 5/2012 | Ho et al. |
| 8,200,712 B2 | 6/2012 | Koch et al. |
| 8,255,346 B2 | 8/2012 | Abe et al. |
| 8,255,389 B2 | 8/2012 | Peyton et al. |
| 8,280,827 B2 | 10/2012 | Muller et al. |
| 8,291,049 B2 | 10/2012 | Roos |
| 8,294,766 B2 | 10/2012 | Tsai et al. |
| 8,311,384 B2 | 11/2012 | Raghoebardajal et al. |
| 8,400,471 B2 | 3/2013 | Leung |
| 8,402,050 B2 | 3/2013 | Kim |
| 8,406,992 B2 | 3/2013 | Laumeyer et al. |
| 8,447,792 B2 | 5/2013 | Koch et al. |
| 8,463,296 B2 | 6/2013 | Huber et al. |
| 8,533,187 B2 | 9/2013 | Brewington et al. |
| 8,533,615 B1 | 9/2013 | Sams |
| 8,542,911 B1 | 9/2013 | Korobkin |
| 8,559,702 B2 | 10/2013 | Kochi et al. |
| 8,566,325 B1 | 10/2013 | Brewington |
| 8,570,320 B2 | 10/2013 | Izadi et al. |
| 8,570,373 B2 | 10/2013 | Variyath et al. |
| 8,587,583 B2 | 11/2013 | Newcombe et al. |
| 8,665,321 B2 | 3/2014 | Choi et al. |
| 8,743,244 B2 | 6/2014 | Vartanian et al. |
| 8,769,437 B2 | 7/2014 | Myllylä |
| 8,774,793 B2 | 7/2014 | Fishel |
| 8,819,591 B2 | 8/2014 | Wang et al. |
| 2001/0005425 A1 | 6/2001 | Watanabe et al. |
| 2002/0057340 A1 | 5/2002 | Fernandez et al. |
| 2002/0191862 A1 | 12/2002 | Neumann et al. |
| 2003/0055689 A1 | 3/2003 | Block et al. |
| 2003/0080978 A1 | 5/2003 | Navab et al. |
| 2003/0093488 A1 | 5/2003 | Yoshida et al. |
| 2003/0179218 A1 | 9/2003 | Martins et al. |
| 2003/0218638 A1 | 11/2003 | Goose et al. |
| 2004/0023612 A1 | 2/2004 | Kriesel |
| 2004/0113887 A1 | 6/2004 | Pair et al. |
| 2004/0128701 A1 | 7/2004 | Kaneko et al. |
| 2005/0012745 A1 | 1/2005 | Kondo et al. |
| 2005/0113978 A1 | 5/2005 | Sharma et al. |
| 2006/0075053 A1 | 4/2006 | Xu et al. |
| 2006/0229058 A1 | 10/2006 | Rosenberg |
| 2006/0256007 A1 | 11/2006 | Rosenberg |
| 2007/0022384 A1 | 1/2007 | Abbott et al. |
| 2007/0070218 A1 | 3/2007 | Meijer et al. |
| 2007/0149282 A1 | 6/2007 | Lu et al. |
| 2007/0211143 A1 | 9/2007 | Brodie et al. |
| 2007/0288410 A1 | 12/2007 | Tomkins et al. |
| 2008/0129825 A1 | 6/2008 | DeAngelis et al. |
| 2008/0303901 A1 | 12/2008 | Variyath et al. |
| 2009/0007122 A1 | 1/2009 | Peyton et al. |
| 2009/0015585 A1 | 1/2009 | Klusza |
| 2009/0063995 A1 | 3/2009 | Baron et al. |
| 2009/0132441 A1 | 5/2009 | Muller et al. |
| 2009/0158186 A1 | 6/2009 | Bonev et al. |
| 2009/0237564 A1 | 9/2009 | Kikinis et al. |
| 2009/0265426 A1 | 10/2009 | Svendsen et al. |
| 2009/0312009 A1 | 12/2009 | Fishel |
| 2009/0313553 A1 | 12/2009 | Thornton et al. |
| 2010/0002122 A1 | 1/2010 | Larson et al. |
| 2010/0017733 A1 | 1/2010 | Barros et al. |
| 2010/0130125 A1 | 5/2010 | Nurmi |
| 2010/0171758 A1 | 7/2010 | Maassel et al. |
| 2010/0184564 A1 | 7/2010 | Molyneux et al. |
| 2010/0223295 A1 | 9/2010 | Stanley et al. |
| 2010/0325307 A1 | 12/2010 | Roos |
| 2011/0025842 A1 | 2/2011 | King et al. |
| 2011/0040692 A1 | 2/2011 | Ahroon |
| 2011/0064375 A1 | 3/2011 | Raghoebardajal et al. |
| 2011/0093350 A1 | 4/2011 | Laumeyer et al. |
| 2011/0096174 A1 | 4/2011 | King et al. |
| 2011/0107270 A1 | 5/2011 | Wang et al. |
| 2011/0112998 A1 | 5/2011 | Abe et al. |
| 2011/0141141 A1* | 6/2011 | Kankainen .......... G01C 21/3647 345/632 |
| 2011/0196897 A1 | 8/2011 | Koch et al. |
| 2011/0216088 A1 | 9/2011 | Leung |
| 2011/0231757 A1 | 9/2011 | Haddick et al. |
| 2011/0283223 A1* | 11/2011 | Vaittinen et al. ............... 715/781 |
| 2011/0314427 A1 | 12/2011 | Sundararajan et al. |
| 2012/0001938 A1 | 1/2012 | Sandberg |
| 2012/0002024 A1 | 1/2012 | Choi et al. |
| 2012/0025945 A1 | 2/2012 | Yazadi et al. |
| 2012/0030018 A1 | 2/2012 | Passmore et al. |
| 2012/0033032 A1 | 2/2012 | Kankainen |
| 2012/0054281 A1 | 3/2012 | Westmoreland et al. |
| 2012/0079018 A1 | 3/2012 | Rottler et al. |
| 2012/0105474 A1 | 5/2012 | Cudalbu et al. |
| 2012/0218296 A1* | 8/2012 | Belimpasakis et al. ....... 345/633 |
| 2012/0221502 A1 | 8/2012 | Jerram et al. |
| 2012/0242865 A1 | 9/2012 | Vartanian et al. |
| 2012/0249416 A1 | 10/2012 | Maciocci et al. |
| 2012/0249741 A1 | 10/2012 | Maciocci et al. |
| 2012/0266191 A1 | 10/2012 | Abrahamsson et al. |
| 2012/0289246 A1 | 11/2012 | Huber et al. |
| 2012/0299817 A1 | 11/2012 | Atkins et al. |
| 2012/0330956 A1 | 12/2012 | Koch et al. |
| 2013/0016123 A1 | 1/2013 | Skarulis |
| 2013/0039531 A1 | 2/2013 | Basso et al. |
| 2013/0044129 A1 | 2/2013 | Latta et al. |
| 2013/0046704 A1 | 2/2013 | Patwa et al. |
| 2013/0073377 A1 | 3/2013 | Heath et al. |
| 2013/0110565 A1 | 5/2013 | Means et al. |
| 2013/0135315 A1 | 5/2013 | Bares et al. |
| 2013/0152002 A1 | 6/2013 | Menczel et al. |
| 2013/0159073 A1 | 6/2013 | Shah et al. |
| 2013/0159081 A1 | 6/2013 | Shastry et al. |
| 2013/0194304 A1 | 8/2013 | Latta et al. |
| 2013/0194394 A1 | 8/2013 | Shintani |
| 2013/0202197 A1 | 8/2013 | Reeler et al. |
| 2013/0229340 A1 | 9/2013 | Yu et al. |
| 2013/0278631 A1 | 10/2013 | Border et al. |
| 2014/0005934 A1 | 1/2014 | Chia et al. |
| 2014/0033322 A1 | 1/2014 | Nair et al. |
| 2014/0160165 A1 | 6/2014 | Kim et al. |

OTHER PUBLICATIONS

Stanley, et al., "Efficient evolution of neural network topologies.", Evolutionary Computation, 2002. CEC'02. Proceedings of the 2002 Congress on. vol. 2. IEEE, 2002, 1757-1762.

ISA/KR, International Search Report and Written Opinion for International Application No. PCT/US2012/052401, Feb. 13, 2013, 8 Pages.

"High-Quality Point-Based Rendering on Modern GPUs by Mario Botsch", Proceedings of the 11th Pacific Conference on Computer Graphics and Applications (PG'03), 2003, 1-9.

* cited by examiner

195

```
┌─────────────────────────────────────────────────────────────┐
│ MAPPING AN IMAGE FROM AT LEAST ONE INPUT MEDIA STREAM TO A  │
│              VIRTUAL DISPLAY SURFACE                         │
│                        196                                   │
└─────────────────────────────────────────────────────────────┘
                              │
                              ▼
┌─────────────────────────────────────────────────────────────┐
│ RECEIVING AN INDICATION OF A VIRTUAL VIEWPORT ORIENTATION OF│
│                  A PLAYBACK DEVICE                           │
│                        197                                   │
└─────────────────────────────────────────────────────────────┘
                              │
                              ▼
┌─────────────────────────────────────────────────────────────┐
│ USING THE INDICATION OF THE VIRTUAL VIEWPORT ORIENTATION TO │
│      SELECT A PORTION OF THE IMAGE FOR DISPLAYING           │
│                        198                                   │
└─────────────────────────────────────────────────────────────┘
                              │
                              ▼
┌─────────────────────────────────────────────────────────────┐
│ OUTPUTTING THE PORTION OF CONTENT WHICH HAS BEEN MAPPED     │
│            TO THE VIRTUAL DISPLAY SURFACE                    │
│                        199                                   │
└─────────────────────────────────────────────────────────────┘
```

PROVIDE AT LEAST ONE AUGMENTED REALITY ENVIRONMENT
341

COMBINE, AT A PROCESSOR, THE AUGMENTED REALITY
ENVIRONMENT WITH REAL OBJECTS
342

RECEIVE DATA FROM A FIRST USER AND A SECOND USER
343

CREATE A VIEWPORT
344

ACCESS, BY A PROCESSOR, AT LEAST ONE TRAINED AGGREGATION OF ELEMENTS THAT IS COUPLED WITH AN ENVIRONMENT, WHEREIN EACH TRAINED AGGREGATION OF ELEMENTS OF THE AT LEAST ONE TRAINED AGGREGATION OF ELEMENTS COMPRISES A SET OF TRAINED ELEMENTS AND IS STABILIZED WITHIN A SET OF OBJECTIVES
442

SELECT, BY THE PROCESSOR, AT LEAST ONE OF THE AT LEAST ONE TRAINED AGGREGATION OF ELEMENTS THAT MEETS A FIRST PERFORMANCE THRESHOLD
444

CONVERT, BY THE PROCESSOR, SELECTED AT LEAST ONE TRAINED AGGREGATION OF ELEMENTS TO AN ELEMENT STATUS TO ACHIEVE A CONVERTED AT LEAST ONE TRAINED AGGREGATION OF ELEMENTS, SUCH THAT EACH OF THE CONVERTED AT LEAST ONE TRAINED AGGREGATION OF ELEMENTS BECOMES A FIRST RESULTANT ELEMENT THAT COMPETES WITH OTHER FIRST RESULTANT ELEMENTS.
446

ACCESS, BY THE PROCESSOR, AT LEAST ONE TRAINED FIRST RESULTANT ELEMENT THAT IS COUPLED WITH THE ENVIRONMENT, WHEREIN EACH TRAINED FIRST RESULTANT ELEMENT OF THE AT LEAST ONE TRAINED FIRST RESULTANT ELEMENT INCLUDES A SET OF TRAINED AGGREGATION OF ELEMENTS AND IS STABILIZED WITHIN A SECOND SET OF OBJECTIVES; SELECT, BY THE PROCESSOR, AT LEAST ONE OF THE AT LEAST ONE TRAINED FIRST RESULTANT ELEMENTS THAT MEET A SECOND PERFORMANCE THRESHOLD; AND CONVERT, BY THE PROCESSOR, SELECTED AT LEAST ONE TRAINED FIRST RESULTANT ELEMENTS TO A SECOND ELEMENT STATUS TO ACHIEVE A CONVERTED ONE OR MORE TRAINED FIRST RESULTANT ELEMENT, SUCH THAT THE CONVERTED AT LEAST ONE TRAINED FIRST RESULTANT ELEMENT BECOMES A SECOND RESULTANT ELEMENT THAT COMPETES WITH OTHER SECOND RESULTANT ELEMENTS.
448

ACCESS, BY THE PROCESSOR, AT LEAST ONE TRAINED SECOND RESULTANT ELEMENT THAT IS COUPLED WITH THE ENVIRONMENT, WHEREIN EACH TRAINED SECOND RESULTANT ELEMENT OF THE AT LEAST ONE TRAINED SECOND RESULTANT ELEMENT INCLUDES A SET OF TRAINED RESULTANT ELEMENTS AND IS STABILIZED WITHIN A THIRD SET OF OBJECTIVES; SELECT, BY THE PROCESSOR, AT LEAST ONE OF THE AT LEAST ONE TRAINED SECOND RESULTANT ELEMENTS THAT MEET A THIRD PERFORMANCE THRESHOLD; AND CONVERT, BY THE PROCESSOR, SELECTED AT LEAST ONE TRAINED SECOND RESULTANT ELEMENTS TO A THIRD ELEMENT STATUS TO ACHIEVE A CONVERTED ONE OR MORE TRAINED SECOND RESULTANT ELEMENT, SUCH THAT THE CONVERTED AT LEAST ONE TRAINED SECOND RESULTANT ELEMENT BECOMES A THIRD RESULTANT ELEMENT THAT COMPETES WITH OTHER THIRD RESULTANT ELEMENTS.
450

RECEIVE, AT A PROCESSOR, A SENSORY PERCEPTION ENHANCEMENT REQUEST
ASSOCIATED WITH A LOCATION OF INTEREST
597

IN RESPONSE TO THE RECEIVING, RENDERING, BY THE PROCESSOR, A THREE
DIMENSIONAL GRAPHICAL IMAGE, WHEREIN THE RENDERING COMPRISES:
GENERATING AT LEAST ONE OF A FIRST VIRTUAL OBJECT IN A
FOREFRONT OF THE FIELD OF VIEW AND A SECOND VIRTUAL OBJECT BEHIND THE FIELD
OF VIEW,
WHEREIN THE FIRST VIRTUAL OBJECT AND THE SECOND VIRTUAL OBJECT ARE
DISPLAYED WITHIN A PERCEIVED DEPTH OF NORMAL VISION
598

GENERATING, AT THE PROCESSOR, A FIRST NAVIGATABLE VIRTUAL VIEW OF THE
FIRST LOCATION OF INTEREST, WHEREIN THE FIRST LOCATION OF INTEREST IS ONE OF A
VIRTUAL LOCATION AND A NON-VIRTUAL LOCATION; AND
CONCURRENTLY WITH THE GENERATING THE FIRST NAVIGATABLE VIRTUAL VIEW OF THE
FIRST LOCATION OF INTEREST, GENERATING, AT THE PROCESSOR, A SECOND
NAVIGATABLE VIRTUAL VIEW CORRESPONDING TO A CURRENT PHYSICAL POSITION OF
AN OBJECT, SUCH THAT REAL-TIME SIGHT AT THE CURRENT PHYSICAL POSITION IS
ENABLED WITHIN THE SECOND NAVIGATABLE VIRTUAL VIEW.
599

ACCESSING, BY A PROCESSOR, A DIALOGUE BETWEEN THE PLURALITY OF AGENTS
652

ACCESSING, BY THE PROCESSOR, INPUT ASSOCIATED WITH A BEHAVIOR OF THE PLURALITY OF AGENTS AND AN INTERACTION BETWEEN THE PLURALITY OF AGENTS
654

COMPARING, BY THE PROCESSOR, RECEIVED INPUT TO A SCRIPT TYPE
656

BASED ON THE COMPARING, DETERMINING, BY THE PROCESSOR, A MEANING OF THE DIALOGUE
658

BASED ON THE DETERMINING SAID MEANING, GENERATING, AT THE PROCESSOR, A RESPONSE INSTRUCTION
660

```
GENERATE, AT A PROCESSOR, A FIRST NAVIGATABLE VIRTUAL VIEW OF A FIRST LOCATION OF
INTEREST, WHEREIN THE FIRST LOCATION OF INTEREST IS ONE OF A FIRST VIRTUAL LOCATION
AND A FIRST NON-VIRTUAL LOCATION
704
```
↓
```
CONCURRENTLY WITH THE GENERATING THE FIRST NAVIGATABLE VIRTUAL VIEW OF THE FIRST
LOCATION OF INTEREST, GENERATE, AT THE PROCESSOR, A SECOND NAVIGATABLE VIRTUAL
VIEW CORRESPONDING TO A CURRENT PHYSICAL POSITION OF AN OBJECT, SUCH THAT REAL-
TIME SIGHT AT THE CURRENT PHYSICAL POSITION IS ENABLED WITHIN THE SECOND
NAVIGATABLE VIRTUAL VIEW
706
```
↓
```
ACCESSING, BY THE PROCESSOR, A DIALOGUE BETWEEN THE PLURALITY OF AGENTS
708
```
↓
```
CONCURRENTLY WITH THE GENERATING THE FIRST NAVIGATABLE VIRTUAL VIEW OF THE FIRST
LOCATION OF INTEREST, A SECOND NAVIGATABLE VIRTUAL VIEW CORRESPONDING TO A
CURRENT PHYSICAL POSITION OF AN OBJECT IS GENERATED, SUCH THAT REAL-TIME SIGHT AT
THE CURRENT PHYSICAL POSITION IS ENABLED WITHIN THE SECOND NAVIGATABLE VIRTUAL
VIEW
710
```
↓
```
ACCESSING, BY THE PROCESSOR, INPUT ASSOCIATED WITH A BEHAVIOR OF A PLURALITY OF
AGENTS AND AN INTERACTION BETWEEN THE PLURALITY OF AGENTS, WHEREIN THE PLURALITY
OF AGENTS COMPRISES AT LEAST ONE OF ONE OR MORE AUTOMATONS AND ONE OR MORE
HUMANS
712
```
↓
```
COMPARE, BY THE PROCESSOR, RECEIVED INPUT TO A SCRIPT TYPE
714
```
↓
```
BASED ON THE COMPARING, DETERMINE, BY THE PROCESSOR, A MEANING OF THE DIALOGUE
716
```
↓
```
CONCURRENTLY WITH THE GENERATING, BY THE PROCESSOR, THE FIRST NAVIGATABLE
VIRTUAL VIEW OF THE FIRST LOCATION OF INTEREST, GENERATE, BY THE PROCESSOR, A THIRD
NAVIGATABLE VIRTUAL VIEW OF A SECOND LOCATION OF INTEREST, WHEREIN THE SECOND
LOCATION OF INTEREST IS ONE OF A SECOND VIRTUAL LOCATION AND A SECOND NON-VIRTUAL
LOCATION
718
```
↓
```
RECEIVE, AT THE PROCESSOR, A FIRST VIRTUAL POSITION INFORMATION REQUEST
ASSOCIATED WITH THE FIRST LOCATION OF INTEREST; COMPARE THE FIRST VIRTUAL
POSITION INFORMATION REQUEST WITH A STORE OF LOCATION POSITION INFORMATION; AND
BASED ON THE COMPARING, GENERATE A RESPONSE TO THE FIRST VIRTUAL POSITION
INFORMATION REQUEST
720
```
↓
```
CONTINUED ON FIGURE 7C AT 722
```

```
CONTINUED FROM FIGURE 7B AT 720
```

RECEIVE, AT THE PROCESSOR, AT LEAST ONE OF: AN ADVANCEMENT INSTRUCTION TO VIRTUALLY ADVANCE TOWARDS THE FIRST LOCATION OF INTEREST UNTIL VIRTUAL POSITION INFORMATION OF THE FIRST VIRTUAL POSITION INFORMATION REQUEST MATCHES THE FIRST LOCATION OF INTEREST; AND ADVANCEMENT INFORMATION SIGNIFYING THAT A PHYSICAL ADVANCEMENT TOWARDS THE FIRST LOCATION OF INTEREST HAS OCCURRED, WHEREIN THE VIRTUAL POSITION INFORMATION MATCHES THE FIRST LOCATION OF INTEREST AND THE ADVANCEMENT INFORMATION INCLUDES A VIRTUAL VIEWING POSITION OF THE FIRST LOCATION OF INTEREST; AND IN RESPONSE TO A RECEIVED ADVANCEMENT INSTRUCTION, ADVANCE TOWARDS THE FIRST LOCATION OF INTEREST, THEREBY ACHIEVING THE VIRTUAL VIEWING POSITION
722

USE, BY THE PROCESSOR, NON-REAL-TIME STORED IMAGING ASSOCIATED WITH THE CURRENT PHYSICAL POSITION
724

RECEIVE, AT THE PROCESSOR, A SECOND VIRTUAL POSITION INFORMATION REQUEST ASSOCIATED WITH THE SECOND NAVIGATABLE VIRTUAL VIEW; COMPARE, BY THE PROCESSOR, THE SECOND VIRTUAL POSITION INFORMATION REQUEST WITH A STORE OF LOCATION POSITION INFORMATION; AND BASED ON THE COMPARING, GENERATE, BY THE PROCESSOR, A RESPONSE TO THE SECOND VIRTUAL POSITION INFORMATION REQUEST
726

GENERATE, AT THE PROCESSOR, A SECOND NAVIGATABLE VIEW OF A SECOND VIRTUAL SET OF DOCUMENTS AT THE SECOND LOCATION OF INTEREST
728

LOCATE, BY THE PROCESSOR, A SEARCH REQUEST OBJECT WITHIN THE FIRST VIRTUAL SET OF DOCUMENTS
730

GENERATE THE FIRST NAVIGATABLE VIRTUAL VIEW OF A VIDEO
732

BASED ON THE DETERMINING THE MEANING, GENERATE, AT THE PROCESSOR, A RESPONSE INSTRUCTION
732

Collects a plurality of social media data snippets.
930

Stores the plurality of social media data snippets in a media data repository.
932

Aggregates at least two of the plurality of social media data snippets into a cohesive social media data stream.
934

Formats the social media data stream into a coherent social media data stream.
936

Provides the coherent social media data stream in a user accessible format.
938

Collect real-time media data and geospatial data from a media recording device.
1241

↓

Collect real-time geospatial data from a previously tagged subject.
1242

↓

Capture precise time information for frames shot and all geospatial data.
1243

↓

Key the data with a timestamp.
1244

↓

Periodically recalibrate data sources.
1245

↓

Utilize a user-operated Director-assist system for coordination of real-time integration of augmenting additions to the media data.
1246

Extract the characteristics of a previously recorded media stream.
1251

Map the characteristics to a reality model.
1252

Edit the characteristics interactively.
1253

Coordinate real-time integration of an augmenting addition to the media stream.
1254

DETERMININE, AT A PROCESSOR, AVAILABLE LOCATIONS AND TIMES
WITHIN THE PIECE OF CONTENT TO PLACE THE OBJECT
1321

DETERMINE, AT THE PROCESSOR, WHETHER TO PLACE THE OBJECT AT AT
LEAST ONE OF THE AVAILABLE LOCATIONS
1322

PLACE THE OBJECT IN THE PIECE OF CONTENT PROVIDED A
DETERMINATION HAS BEEN MADE TO PLACE THE OBJECT
1323

DETERMINE A CANDIDATE OBJECT TO USE AS THE OBJECT
1324

RECEIVE USER INTERACTION WITH THE OBJECT
1325

```
DETERMINE AVAILABLE LOCATIONS WITHIN THE PIECE OF ORIGINAL
CONTENT TO PLACE THE OBJECT
1331
            │
            ▼
DETERMINE WHETHER TO PLACE THE OBJECT AT AT LEAST ONE OF THE
AVAILABLE LOCATIONS
1332
            │
            ▼
PLACE THE OBJECT IN THE PIECE OF ORIGINAL CONTENT PROVIDED A
DETERMINATION HAS BEEN MADE TO PLACE THE OBJECT
1333
```

FIG. 13C

COHERENT PRESENTATION OF MULTIPLE REALITY AND INTERACTION MODELS

CROSS REFERENCE TO RELATED APPLICATIONS

This application claims priority to and benefit of co-pending U.S. provisional patent application Ser. No. 61/575,790, entitled "AUGMENTING REALITY 3D STEROSCOPIC STEROPHONIC SOCIAL MEDIA PORTAL," by Dan Reitan, filed Aug. 26, 2011, which is herein incorporated by reference in its entirety; claims priority to and benefit of co-pending U.S. provisional patent application Ser. No. 61/575,791, entitled "ENABLING AUTOMATION OF BEHAVIORAL MODELING," by Dan Reitan, filed Aug. 26, 2011, which is herein incorporated by reference in its entirety; claims priority to and benefit of co-pending U.S. provisional patent application Ser. No. 61/575,789, entitled "BEHAVIORAL MODELING," by Dan Reitan, filed Aug. 26, 2011, which is herein incorporated by reference in its entirety.

DESCRIPTION OF THE DRAWINGS

FIG. 1H is a flowchart of an example method for delivering immersive media in accordance with an embodiment.

FIG. 3D is an example flowchart of a method implemented by a system for creating an augmented reality environment, according to an embodiment.

FIG. 4B is an example flowchart of a method for providing recursive modularity in adaptive network processing, according to an embodiment.

FIG. 5D is an example flowchart of a method for enhancing a sensory perception in a field of view of a real-time source within a display screen through augmented reality, according to an embodiment.

FIGS. 6B is an example flowchart of a method for interpreting a meaning of a dialogue between a plurality of agents, wherein the plurality of agents includes at least one of one or more automatons and one or more humans, according to an embodiment.

FIGS. 7B and 7C are an example flowchart of a method for modeling group dynamics using augmented reality simulation to facilitate multimedia communications and service to a distributed group of users, according to an embodiment.

FIG. 9C is a flowchart of a method for delivering aggregated social media in a user accessible format, according to one embodiment.

FIG. 12C is a flowchart of a method for producing media having extractable metadata, in accordance with an embodiment.

FIG. 12D is a flowchart of a method for post-production extraction of media metadata, in accordance with an embodiment.

FIG. 13B is an example flowchart of a method for virtually placing an object in a piece of content, in accordance with an embodiment.

FIG. 13C is an example flowchart of a method implemented by a system for performing a method for virtually placing an object in a piece of original content, in accordance with an embodiment.

Figure 1A:
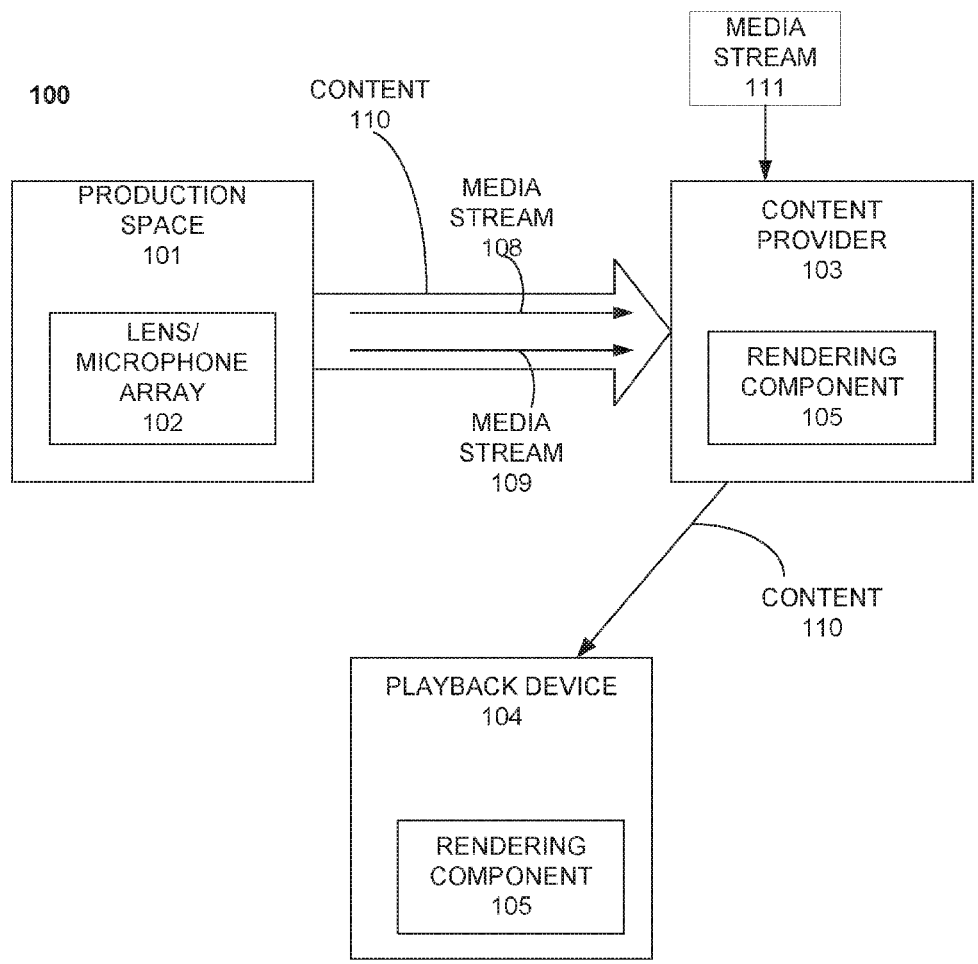
FIG. 1A is a diagram of an example network for producing and delivering 360 degree immersive ultra high resolution media for smart devices in accordance with one embodiment.

The drawings referred to in this description should not be understood as being drawn to scale unless specifically noted.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope. Furthermore, in the following description, numerous specific details are set forth in order to provide a thorough understanding of the subject matter. However, some embodiments may be practiced without these specific details. In other instances, well-known structures and components have not been described in detail as not to unnecessarily obscure aspects of the subject matter.

Overview of Discussion

Herein, various embodiments of a system and method for coherent presentation of multiple reality and interaction models are described. The description begins with a general discussion of embodiments. This general discussion provides a framework of understanding for more particularized descriptions of features and concepts of operation associated with one or more of the described embodiments that follows.

Embodiments provide an enterprise system for enabling user interaction with various media modes, wherein the media mode may be displayed on different devices. Different media modes may present varying mixtures of different versions of reality (reality models) that may be discretely blended together and displayed on different devices to a device user such that the user may interact with the elements within the device's display, according to one or more interaction models. Some examples of reality models are: real-time image capture; geospatial models (as those used by locating tools and navigation equipment); produced television and movie content; produced video advertising; atmospheric and weather models; multi-sensor arrays; and virtual reality models. Some examples of interaction models are: passive viewing of video programming content (e.g., movies, television, documentaries); advertisements; programming applications (e.g., enterprise applications for businesses); interactive television; custom branded interactivity (aka "gamefied" advertising); games (e.g., augmented reality games); and computer applications (e.g., accounting application).

Essentially, embodiments correlate multiple versions of reality such that the multiple versions of reality may be displayed to the user as a single three-dimensional version of reality within which the user may interact. Thus, different forms of reality models may be combined into a single common view, and then displayed on a plurality of different devices and enable user interaction with the elements within the display.

In this manner, for example, advertisements may be enveloped into games, of which the user may interact with both the advertisements and the game elements. In another example, applications may be enveloped into a video format, of which the user may interact with both the applications and other elements displayed in the video.

Thus, in one embodiment, the present technology allows television and movie viewers to step into the action, moving freely about landscapes, choosing which aspects of recorded events to view based on viewer's interest and preferences, while interacting with characters and objects within the content, including the advertisers' products. Viewers can explore the Grand Canyon while watching a travel documentary, engage in a battle reenactment during a movie about the American Civil War, or walk down the yellow brick road with the scarecrow and the tin man.

Other embodiments enable a family that is travelling together with friends in Rome to host an augmented reality party at the Coliseum, sharing their discovery and wonder in real time with friends and family on the other side of the world. Also, the event may be recorded in such a way that even participants who were unable to attend remotely can later attend and interact with real-time attendees who have already left through their avatar proxies. A final in depth recording can deliver a rich multimedia vacation record to the tourists, while selected highlights are automatically spliced into the nightly news feed as broadcast to extended friends, family and other viewers of interest, airing with other news about other friends, family, colleagues and persons and organizations of interest, as well as the usual national, international, and local news stories.

While enabling user interaction and in determining a response to be provided to a user, embodiments analyze workflow characteristics (e.g., how groups of individuals interact and the rules that guide this interaction), data within a data repository, and the user's behavior within and/or external to a virtual reality world (e.g., within the reality of television program, a movie, or a game). For example, with regard to user behavior within a virtual reality world, the user may direct one or more agents to perform various tasks or answer questions, wherein the agents serve or even represent the user within the virtual world, and by interface extension, the physical world. With regard to user behavior external to a virtual reality world, embodiments may analyze the user's dialogue and behavior (e.g., gestures) external of the device to which embodiments are attached.

Overall, embodiments utilize sophisticated systems and methods of analyzing a user's real-time and/or virtual behavior (e.g., an automaton behaving within a media mode) in order to facilitate satisfactory user interaction within that particular media mode.

These sophisticated systems and methods involve the mapping of the workflow characteristics, the data repository, and the user's behavior to each other and to a set of event triggers. Once mapped, an event (e.g., response to the user) is triggered to occur. Workflow refers at least to two different levels of interactions: 1) high level: the determination of a group of people's interaction (including data flow between them); and 2) low level: the determination of the logic that guides the standard behaviors of the group of people. The data repository and an engine attached thereto receive unstructured data from a variety of sources and the engine arranges the unstructured data into an intelligent format for use within and by embodiments. The user behavior includes the content and method of the user's communication (e.g., verbal, audio, visual, simulated physical interaction) with others, and social interaction between groups of people.

Additionally, while arranging the unstructured data into the intelligent format, the basis for such arrangement may change due to an adaptive learning component of embodiments. Embodiments learn from observing the user's behavior, and change its analysis of future behavior based on, in part, observed past behavior. While embodiments have a pre-programmed set of rules and guidelines for assisting in arriving at a response acceptable to the user, upon observing the user's behavior, these rules and guidelines change and evolve along with a user's involvement with embodiments as well as with the environment. Ultimately, embodiments, over time, are able to self-customize to a user's preferences based on observations of the user's behavior and the user's environment.

For example, in yet another embodiment, a pair of glasses containing aspects of embodiments described herein enable a user, Jack, to look through the glasses and at a building across the street, and see images beyond that building. Thus, embodiments have the effect of allowing Jack to look through solid objects. Additionally, embodiments answer any of Jack's questions regarding what he is viewing through the glasses, and display to Jack directions to various destinations. In this example, suppose Jack only took streets to his requested destinations that are paved. Embodiments will follow the user's requests and movements and ultimately tailor its directions and answers, without any further instructions from the user. In this case, and without any prompting from Jack, the view through the glasses begins displaying only paved routes to Jack's requested destination.

Further, embodiments allow for a very short compilation time period for the development of applications (e.g., games) that enable the user to interact with a single virtual reality model that was derived from multiple reality models. This is due to the highly sophisticated code structures and data libraries that are provided by embodiments and that allow for the rich anticipation of needs during development.

Various embodiments for developing and displaying multiple reality models as a single reality model, as well as providing capabilities for interaction with the single reality model are described herein in the following fourteen sections: (1) System For Producing And Delivering 360 Degree Immersive Ultra High Resolution Media For Smart Devices; (2) Rapid Application Development Platform For Augmented Reality Based Transmedia; (3) Communication Using Augmented Reality; (4) Self-Architecting Adaptive Network Solution; (5) Navigation Through Augmented Reality; (6) Enhanced Sensory Perception; (7) Dialogue And Behavior Modeling; (8) Customizable Group—Centric Transmedia Communications; and Customizable Augmented Reality Based Social Transmedia Combat Simulator; (9) Delivering Aggregated Social Media; (10) Aggregated Social Media Formatter; (11) A Multiple Reality Mapping Correlator; (12) Interactive User Interface; (13) Media Metadata Extractor; and (14) Product Placement Paired With Interactive Advertising.

Further, within each of the preceding listed fourteen sections are described subsets of each embodiment, as well as further related concepts.

Section One: System for Producing and Delivering 360 Degree Immersive Ultra High Resolution Media for Smart Devices Various embodiments are directed to the rendering and display of immersive, and optionally interactive, 3-dimensional environments for devices such as, but not limited to, smart TVs, smart phones, tablet computing devices, laptops, and desktop computers. In at least one embodiment, an orientation of a virtual viewport of a playback device is received by a rendering component. Based upon this orientation, a portion of content from an input media stream is selected. The portion of content is then mapped, by virtual projection, to a virtual display surface and output to a display of a playback device. In one or more embodiments, the virtual display surface is polygonal (e.g., concave, spherical, semi-spherical, etc.) and may comprise more than one polygonal surface. Alternatively, a planar virtual display surface may be used to which the selected portion of content is mapped prior to displaying the content. Video frames are streamed as successive still images to the destination virtual display surface based on the virtual viewport orientation, either to an internally generated texture mapped virtual surface in the case of a polygonal virtual display surface, or by re-mapping pixels from the video frames to the planar virtual display surface. In at least one embodiment, the rendering component is disposed upon the playback device itself. As a user changes the virtual viewport orientation, different portions of content are selected and mapped to the virtual display surface. The selected portions of content can include audio content as well as video content.

FIG. 1A is a diagram of an example network for producing and delivering 360 degree immersive ultra high resolution media for smart devices in accordance with one embodiment. It is noted that the components and configuration shown in FIG. 1A are for the purposes of discussion only and that various other configurations are possible in accordance with various embodiments. In FIG. 1A, a production space 101 is equipped with a lens/microphone array 102. As will be discussed in greater detail below, lens/microphone array 102 is used to capture video and audio signals which can be used to recreate an immersive video and audio experience for a user. In various embodiments, this includes stereophonic and stereoscopic 3-D playback of media being streamed to a playback device.

In FIG. 1A, lens/microphone array 102 captures a plurality of audio and video streams (e.g., media streams 108 and 09) which are time synchronized and sent as content 110 to a content provider 103. In accordance with various embodiments, content provider 103 can be a television station, website, or other source which in turn provides content 110 to a playback device 104. It is noted that content 110 comprises a plurality of respective video and audio media streams which are captured by separate components comprising lens/microphone array 102 as will be discussed in greater detail below.

In various embodiments, playback device 104 comprises a smart TV, smart phone, laptop computer, desktop computer, or tablet computer, although other media playback devices such as smart glasses, heads up displays, etc. can be used as well. In one embodiment, a rendering component 105 disposed upon playback device 104 creates a virtual display surface upon which is mapped content 110. In response to determining an orientation of a virtual viewport of playback device 104, a portion of the content 110 which has been mapped onto the virtual display surface is selected and sent to the display of playback device 104.

Figure 1B:
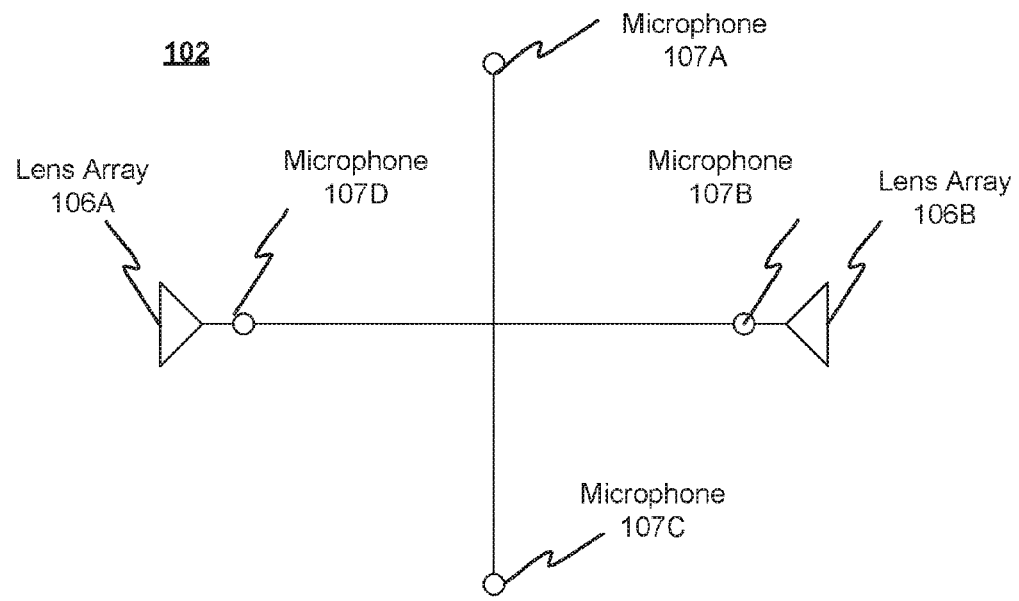
FIGS. 1B, 1C, and 1D show example lens/microphone arrays used in accordance with various embodiments.
Figure 1C:
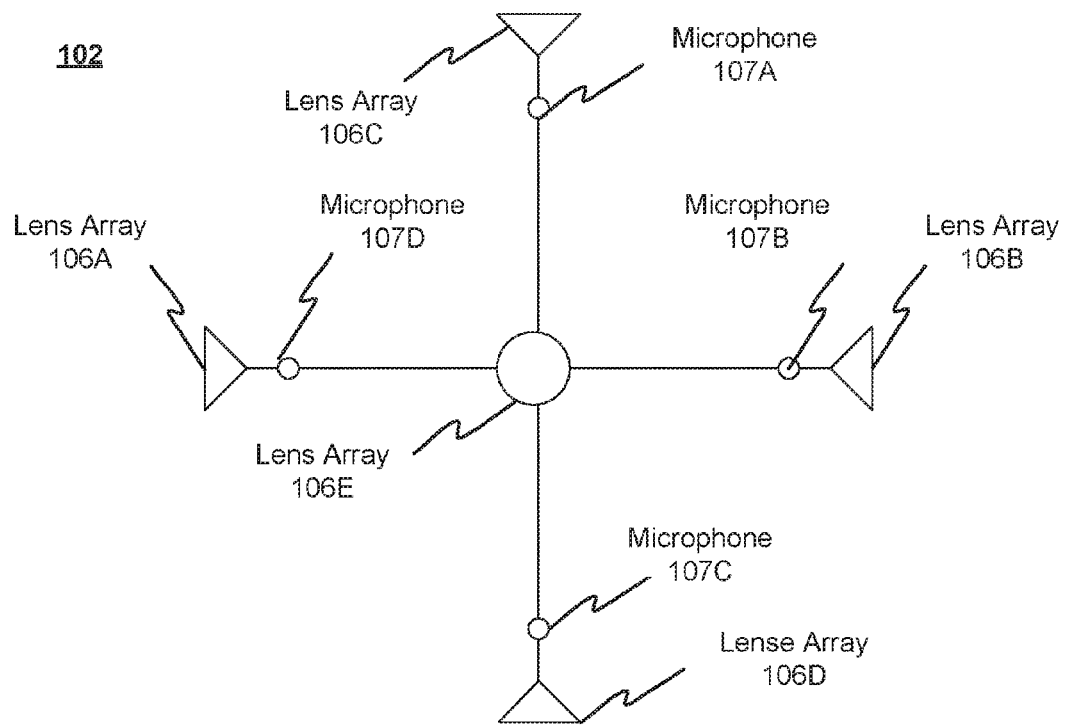
Figure 1D:
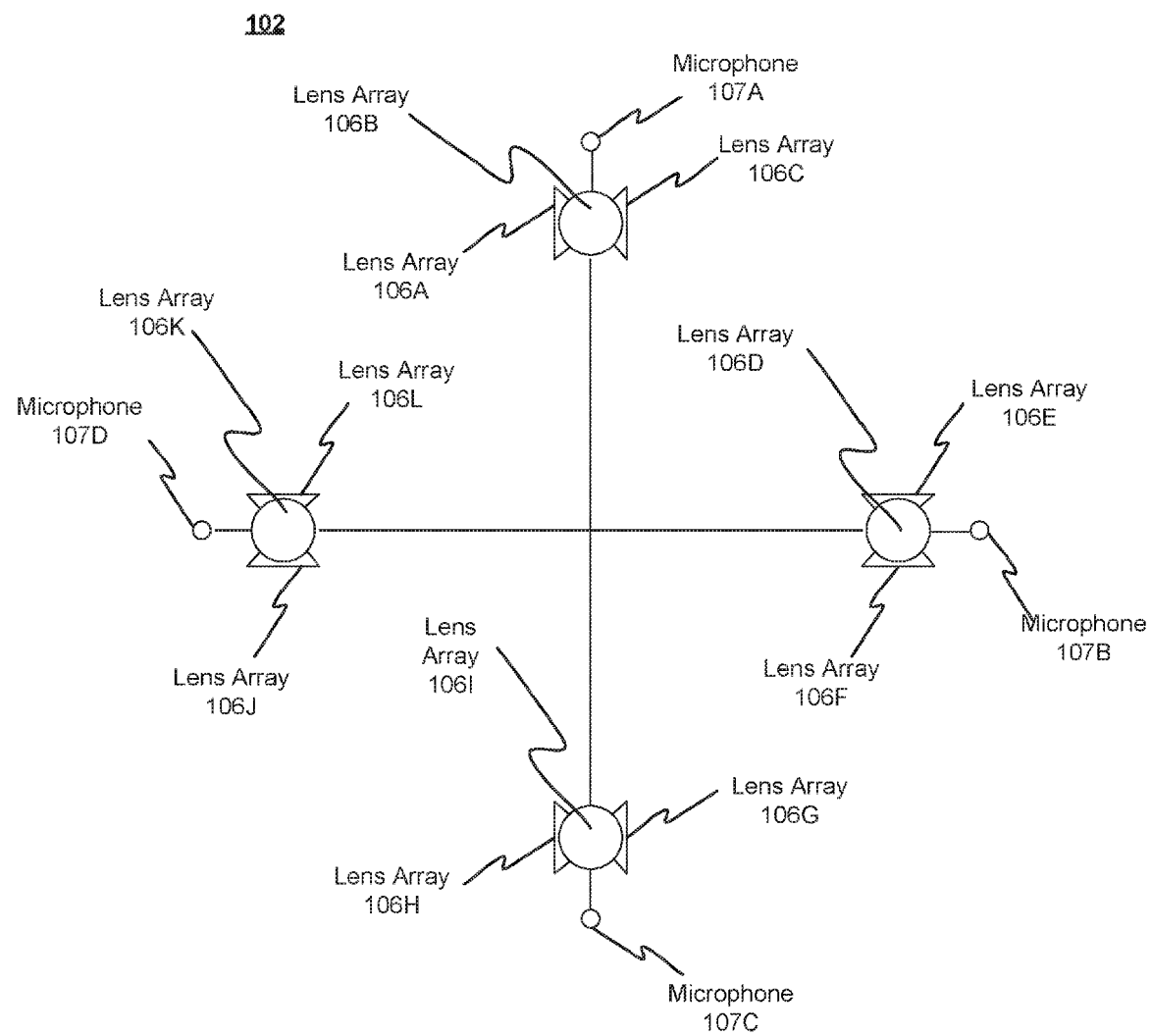

FIGS. 1B, 1C, and 1D show example lens/microphone arrays 102 used in accordance with various embodiments. In the embodiment of FIG. 1B, lens/microphone array 102 comprises a plurality of microphones 107A, 107B, 107C, and 107D and a plurality of lens arrays 106A and 106B. In various embodiments, lens arrays 106A and 106B are configured to capture all events which occur in production space 101. Lens arrays 106A and 106B may comprise 180 degree fish-eye lenses, multiple lens arrays, steerable lenses, etc. Each of lens arrays 106A and 106B is coupled with a respective high definition (HD) video cameras. In the embodiment shown in FIG. 1B, the content 110 output from lens/microphone array 102 comprises four audio media streams from microphones 107A, 107B, 107C, and 107D and two video media streams from lens arrays 106A and 106 B. In at least one embodiment, the lens/microphone array 102 shown in FIG. 1B is used to capture medium resolution monoscopic video within production space 101. It is further noted that, while the field of view of lens arrays 106A and 106B do not overlap, they still are sufficient to monitor the entirety of production space 101. For example, if lens arrays 106A and 106B comprise 180 degree fish-eye lenses, each respective lens array is sufficient to monitor one half of production space 101.

In the embodiment of FIG. 1C, lens/microphone array 102 is generally configured as described above with reference to FIG. 1B with the addition of four additional lens arrays 106C, 106D, 106E, and another lens array (not shown) which underlies lens array 106E on an additional arm. Furthermore, lens/microphone array 102 comprises two additional microphones (not shown) which underlie lens array 106E, one on the arm which supports lens array 106E and one on an additional arm opposite to the arm supporting lens array 106E. It is understood that lens arrays 106C, 106D, 106E and the lens array underlying lens array 106E are also configured as described above with reference to lens arrays 106A and 106B of FIG. 1B as being coupled with respective HD video cameras. In an embodiment, the lens/microphone array 102 shown in FIG. 1C is used to capture high resolution monoscopic video within production space 101. In the embodiment of FIG. 1C, the content 110 output from lens/microphone array 102 comprises six separate audio media streams and six separate video media streams. It is further noted that in the embodiment of FIG. 1C, the field of view of lens arrays 106A, 106B, 106C, 106D, and 106E (as well as the lens array underlying lens array 1E) overlap to some degree. For example, if the lens arrays shown in FIG. 1C each comprise 180 degree fish-eye lenses, an object at a forty five degree angle to the axis of orientation of both of lens arrays 106A and 106D will be within the field of view of both lens arrays.

In the embodiment of FIG. 1D, lens/microphone array 102 is configured to capture high resolution stereoscopic video with production space 101. In the embodiment of FIG. 1D, lens/microphone array 102 comprises lens arrays 106A, 106B, 106C, 106D, 106E, 106F, 106G, 106H, 106I, 106J, and 106L, as additional lens arrays (not shown) disposed respectively below lens arrays 106B, 106D, 106I, and 106K. Additionally, lens/microphone array 102 comprises four microphones 107A, 107B, 107, and 107D. It is understood that lens arrays 106A, 106B, 106C, 106D, 106E, 106F, 106G, 106H, 106I, 106J, and 106L, and the lens array underlying lens array 106B, 106D, 106I, and 106K, are configured as described above with reference to lens arrays 106A and 106B of FIG. 1B as being coupled with respective HD video cameras. In the embodiment of FIG. 1D, the content 110 output from lens/microphone array 102 comprises sixteen video media streams and four audio media streams. As described above with reference to FIG. 1C, it is noted that the field of view of the lens arrays of FIG. 1D overlap to some degree and that multiple lens arrays (e.g., 2 or more) are able to capture an image of any portion of production space 101.

For the purpose of the following discussion, it will be assumed that the lens arrays used by lens/microphone array 102 comprise 180 degree fish-eye lenses although, as described above, various embodiments are not limited to this configuration alone. Due to their design, the lens arrays used by lens/microphone array 102 will record a time synchronized circular image that represents the entire optical input of the lens array which captured it. These circular images are sent as individual video media streams of output 110. The optical transfer function describes how big of a part of space the circular image circumscribes and how it maps to a surface.

In accordance with various embodiments, rendering component 105 creates a virtual display surface that un-maps according to the same dimensions as the transfer function of the lens array(s) used to capture images within production space 101. In at least one embodiment, the virtual display surface comprises a polygonal virtual projection surface (e.g., concave, semi-spherical, spherical, a complex polyhedron, etc.) onto which the images captured by the lens arrays of lens/microphone array 102 are mapped. For the purpose of the present discussion, it is intended that the term "mapped" also indicates that the optical transfer function is reversed in mapping the images captured by the lens arrays of lens/microphone array 102 to the virtual display surface created by rendering component 105. Thus, when the images from a selected video media stream of output 110 are mapped to virtual display surfaces 134 and 135, they represent a virtual display dome from which a portion of the content of that virtual display dome is selected and displayed on playback device 104. It is noted that embodiments are not limited to media captured by a lens/microphone array 102 disposed in a production space 101 alone and that the mapping to virtual display surfaces can also be applied to "live" media such as may be captured by playback device 104 itself, movies, television, games, enterprise software, etc. Furthermore, the media can be streamed in real-time from content provider 103 to playback device 104 (e.g., TV broadcasts or accessed via the Internet or other network), or be stored media such as on a DVD or stored on an electronic data storage device such as a USB drive. Furthermore, rendering component 105 can be disposed upon playback device 105 itself, or operated by another party, such as content provider 104, which is communicatively coupled with playback device 104.

Figure 1E:
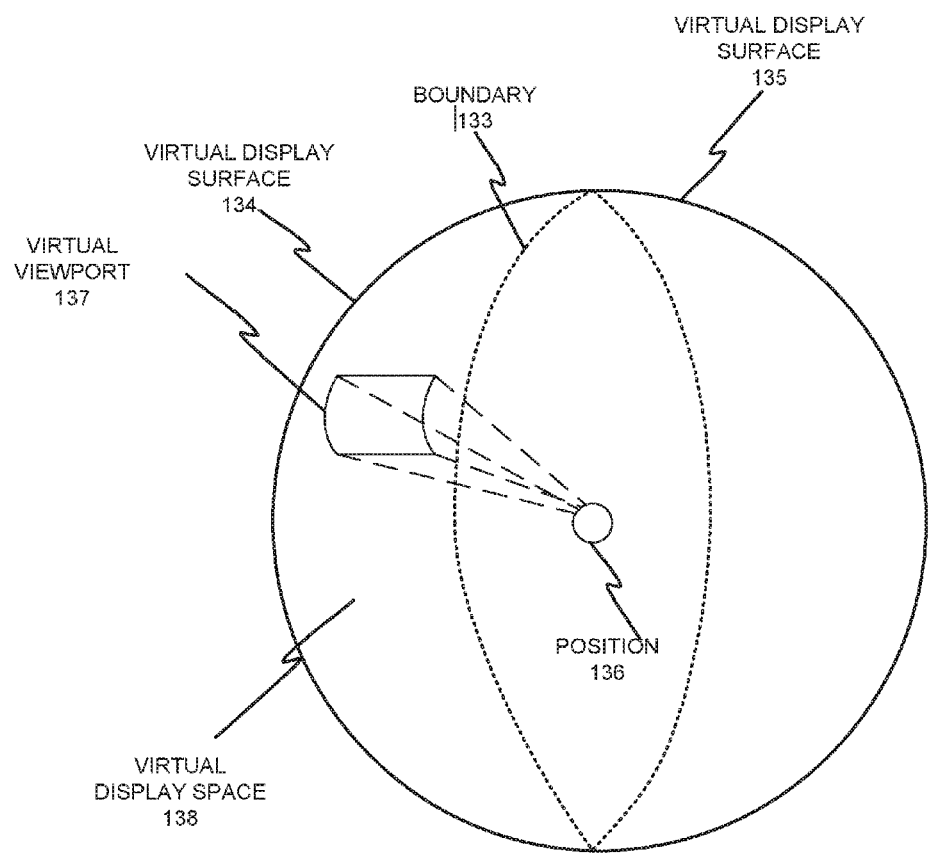
FIG. 1E shows an example virtual viewport selecting a respective portion of content in accordance with various embodiments.

As an example, FIG. 1E shows an example virtual viewport selecting a respective portion of content in accordance with various embodiments. In the embodiment of FIG. 1E, the images captured by the lens arrays shown in FIG. 1B are respectively mapped to virtual display surfaces by rendering component 105. For example, the images captured by lens array 106A are mapped to virtual display surface 134 by rendering component 105. Similarly, the images captured by lens array 106B are mapped to virtual display surface 135 by rendering component 105. It is noted that while virtual display surfaces 134 and 135 are shown as hemispherical, in various embodiments, virtual display surfaces 134 and 135 can be other polygonal shapes such as, but not limited to, ellipsoid, semi-ellipsoid, parabolic, spherical, semi-spherical, concave, etc. According to various embodiments, complex polyhedron virtual display surfaces facilitate mapping images to an apparent infinity. In one embodiment, a plurality of polygonally shaped virtual display surfaces can be joined as well. In the example of FIG. 1E, because the images captured by lens arrays 106A and 106B are being mapped to spherical virtual display surfaces, the optical transfer function is simplified. In cases in which the images captured by lens arrays 106A and 106B do not correspond as closely with the virtual display surfaces to which they are mapped, various optical transfer functions may be used such as, but not limited to, $f*theta$, or $2*f*sin(theta/2)$. It is noted that other optical transfer functions can be used in various embodiments if, for example, the images captured by lens arrays 106A and 106B are being mapped to virtual display surfaces having other shapes. In FIG. 1E, boundary 133 represents the limit of the field of view of lens arrays 106A and 106B. As stated above, lens arrays 106A and 106B are 180 degree fish-eye lenses. Thus, by mounting lens arrays 106A and 106B back-to-back, a full spherical representation of production space 101 can be mapped to virtual display surfaces 134 and 135. While the discussion above is directed to the lens/microphone array 102 shown in FIG. 1B, it is noted that the lens/microphone arrays 102 shown in FIGS. 1C and 1D, as well as other lens/microphone arrays not shown, can also be used and their content displayed in a similar manner on virtual display surfaces 134 and 135.

Currently, many playback devices 104 such as smart TVs, tablet computers, etc., are configured with Graphics Processing Units (GPUs) which are capable of generating virtual display surfaces 134 and 135 in response to instructions from rendering component 105. In various embodiments, rendering component 105 is configured to determine characteristics of playback device 104 including, but not limited to, determining the type of device used in rendering images (e.g., a GPU, CPU, multiple CPUs, etc.) as well as the characteristics of the display device used to present images to a user. Rendering component 105 will then adjust the manner in which images are mapped to the virtual display surfaces, as well as how those rendered images are then to be displayed on playback device 104. In a case in which playback device 104 comprises a GPU, rendering component 105 will generate instructions causing the GPU to generate polygonal virtual display surfaces (e.g., 134 and 135 of FIG. 1E). In an instance in which playback device 104 uses a CPU to render images, rendering component 105 will generate instructions causing the CPU to generate flat, or planar, virtual display surfaces as will be discussed in greater detail below.

Returning to FIG. 1E, because the transfer function of lens arrays 106A and 106B are roughly parabolic and the images captured are being mapped to roughly hemispheric virtual display surfaces, there is no necessity for an extensive modeling of the optical transfer function when mapping images to virtual display surfaces 134 and 135. In this instance, a UV coordinate map can be used to map the images captured by lens arrays 106A and 106B to virtual display surfaces 134 and 135 respectively. Most GPUs in use today are optimized to perform this type of operation and, as a result, can map bumpmaps and texture maps to virtual objects which are displayed on virtual display surfaces 134 and 135. In so doing, rendering component 105 maps the video media streams comprising content 110 onto virtual display surfaces 134 and 135. As a result, a user of playback device 104 will be presented with an immersive 3-D environment capable of presenting depth in a highly realistic manner.

In FIG. 1E, 136 refers to an imaginary position of playback device 104 within a virtual display space 138 defined by virtual display surfaces 134 and 135. In accordance with various embodiments, a user can direct the orientation of a virtual viewport 137 which controls which portion of the content 110 will be displayed on playback device 104. It is noted that there are a variety of methods for a user to control the position, or orientation, of virtual viewport 137 in accordance with various embodiments. For example, a keyboard, joystick, touchpad, voice control, a virtual control panel, camera-based gesture recognition, etc. In at least one embodiment, geospatial information about playback device 104 itself can be used to direct the orientation of virtual viewport 137. For example, many smart phones and tablet computers are configured with accelerometers, electronic compasses, magnetometers, and other components which facilitate determining movement of the device relative to the surface of the Earth and the local gravitational vector. Thus, as a user moves, or moves the device including rotation in the X, Y, and Z axes, the device detects these changes in its orientation. Additionally, many of these devices are configured with Global Navigation Satellite System (GNSS) receivers and are capable of determining their geographic position as well. In accordance with various embodiments, as a user moves, or moves playback device 104, in space, this is used by rendering component 105 to determine the orientation of virtual viewport 137. Additionally, a user can manually determine which method of controlling the orientation of virtual viewport will be used. For example, in a crowded environment such as in an airport or riding a bus, a user may not desire to move their phone around in order to control the orientation of virtual viewport 137. Thus, the user can instead select to have rendering component 105 use some other method for controlling the orientation of virtual viewport 1037 such as using a virtual joystick or simply by touching the display device of playback device 104. In accordance with at least one embodiment, the virtual controls can be displayed with the images shown on playback device 104. In addition to determining the orientation of the virtual viewport, apparent movement of position 136 through the space bounded by virtual display surfaces 134 and 135 can be derived by rendering component 105 using the geospatial movement information provided by playback device 104.

In accordance with one embodiment, rendering component 105 can further determine whether playback device 104 is configured with stereoscopic display capabilities and model the 3-D space stereoscopically. For example, playback device 104 can comprise a smart TV having stereoscopic capabilities, or be a set of "smart glasses". In such an instance, it may be necessary to capture the images comprising content 110 using a lens/microphone array 102 as shown in FIG. 1D. In such an instance, at least two separate video media streams will be used and mapped to respective virtual display surfaces to model two separate viewports representing a user's eyes. For example, lens array 106K can be used to capture the images representing a user's left eye while lens array 106E is used to capture the images representing a user's right eye. Each of these separate video media streams will be mapped onto respective virtual display surfaces (e.g., respective virtual display surfaces 134) and the images displayed upon the respective virtual display surfaces will in turn be displayed upon respective display devices of playback device 104 to present stereoscopic images to a user.

As discussed above, with reference to FIG. 1C, in some embodiments the field of view of the various lens arrays overlap. Thus, for an object that is at a 45 degree angle between lens arrays 106A and 106C of FIG. 1C, both cameras will have that object within their respective fields of view. In accordance with various embodiments, rendering component 105 will select the video media stream of content 110 having the lowest normal angle from the object to the camera viewpoint vector. Thus, if there is a 35 degree angle from an object to the viewpoint vector of lens array 106C and a 55 degree angle from that object to the viewpoint vector of lens array 106A, rendering component 105 will select the video media stream of content 110 conveying the video images captured by lens array 106C. As the object moves around in the field of view of lens arrays 106A and 106C, rendering component 105 will selectively map the images from these lens arrays onto virtual display surface 134. It is noted that switching can occur between virtual domes, implementing GPU texture mapping, representing the lowest normal angle to camera vector viewpoint which is internal to a virtual dome driven by a GPU. In the example of FIG. 1E, the virtual domes are mapped to virtual display surfaces 134 and 135 of FIG. 1E. In another embodiment, the images from a selected lens array having the lowest normal angle to the virtual camera viewpoint vector are mapped to a flat virtual display surface (e.g., 144 and 145 of FIG. 1F) using a GPU or a CPU. In this instance, a pixel re-map function inside the CPU is implemented rather than a built-in library of a GPU which is designed to perform 3-D shape generation.

Alternatively, a process called blending, in which the images from two or more video media streams are blended, can be implemented by rendering component 105. Blending typically results in a better image than if only one camera is used because it removes transient noise and improves resolution beyond the original standards the data was recorded in. Thus, in a six-lens system (e.g., lens/microphone array 102 of 1C), redundant data is recorded which can be used to remove seams and artifacts and push the resolution capabilities of lens/microphone array 102 beyond the resolution capabilities of the lens arrays used by the lens/microphone array. Thus, the images captured by lens arrays 106A and 106C can be blended and mapped to virtual display surface 134 by rendering component 105. In one embodiment, one or more ideal virtual display domes, including a spherical or fully contained "dome" such as are mapped to virtual display surfaces 134 and 135 of FIG. 1E) are blended from multiple video sources (e.g., lens arrays 106A and 106B of FIG. 1B) using a GPU of playback device 104. In another embodiment, video images from one of more video sources (e.g., lens arrays 106A and 106B of FIG. 1B) are mapped to a flat virtual display surface (e.g., 144 and 145 of FIG. 1F). In at least one embodiment, alpha media stream translucency management is used to allow modeling of multiple infinity maps, or virtual display domes. In this instance, any given pixel may be derived from multiple lenses array by implementing real-time translucency blending using the GPU of playback device 104.

In at least one embodiment, the images from the selected video media streams can be pre-blended and mapped to an idealized spherical virtual dome. Typically, this process is driven by the GPU of playback device 104. This process could be performed as a post-production step (e.g., by content provider 103) prior to sending content 110 to playback device 104, or can be performed on playback device 104 itself. This is advantageous in eliminating the necessity of switching or blending of the images from selected video media streams. This also reduces the number of video media streams from which to select. As an example, using a monoscopic display of playback device 104, only one video media stream needs to be sent to playback device. In an instance in which playback device 104 uses a stereoscopic display, 6 idealized virtual spheres can be pre-blended from all of the lens arrays comprising lens/microphone array 102 (e.g., sixteen lens arrays as shown in FIG. 1E, or even twenty four lens array) which significantly reduces the amount of data sent to playback device 104.

In addition to determining the portion of the virtual display surface orientation of virtual viewpoint 137 selects, the orientation of audio playback is also determined. As an example, if rendering component 105 determines that playback device 104 is configured to recreate 3-D audio, various audio media streams comprising output 110 can be selected and mixed in real-time using the various microphones of lens/microphone array 102 to judge left and right audio media streams. For monophonic audio, rendering component 105 may select the audio media stream from one microphone of lens/microphone array 102, or stream left and right audio media streams in phase to different ports and amplifiers and bridge the 2 signals. In other embodiments, a variety of audio algorithms are implemented to interpolate between two or more audio sources (e.g., the audio media streams comprising content 110). There are a variety of audio algorithms which can be implemented in embodiments including both linear and sine-wave based interpolation methods.

Figure 1F:
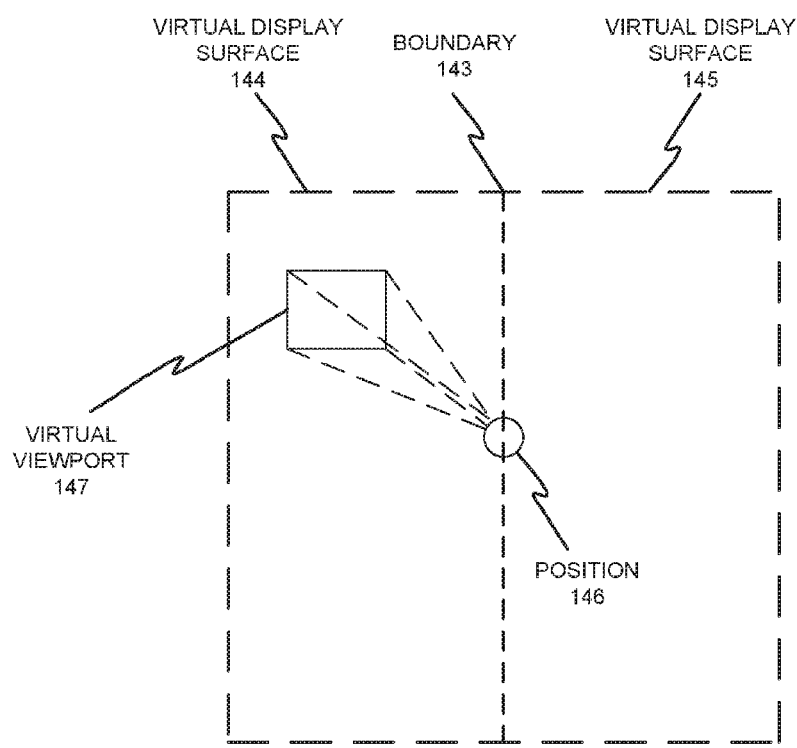
FIG. 1F shows an example virtual viewport selecting a respective portion of content in accordance with various embodiments.

FIG. 1F shows an example virtual viewport selecting a respective portion of content in accordance with various embodiments. In various embodiments, rendering component 105 maps the images from selected video media streams of content 110 to a flat, or planar, virtual display surface such as virtual display surfaces 144 and 145 of FIG. 1F. As with FIG. 1E above, boundary 143 represents the limit of the field of view of lens arrays 106A and 1068 and virtual viewport 147 controls which portion of the content 110 will be displayed on playback device 104 based upon a user's viewport control. In order to map pixels to a flat virtual surface, embodiments present the pixels as if a user sees images in full depth. For some types of lenses (e.g., multiple wide-angle lenses) used in lens arrays 106A and 106B, their optical transfer function maps orthogonally to a flat surface such as virtual display surfaces 144 and 145. In one or more embodiments, rendering component 105 re-maps images from content 110 to virtual display surfaces 144 and 145 by converting the received images from content 110 using a software algorithm. This algorithm can also modify the mapping of pixels to virtual display surfaces 144 and 145 to give a user the impression that they were projected onto a concave surface, which, when mapped according to the optics of the recording lens, give the user the further impression that the user is viewing the original recording live while immersed within the scene.

In at least one embodiment, the algorithm makes use of an available GPU by use of the following steps: modeling a polygonal approximation of a concave surface using polygons (e.g. triangles) loaded into the GPUs rendering poly buffer, adding texture-mapping data (a UV map) to the GPUs texture-map buffer, setting the mapped source image to each frame in turn in the moving image sequence, and rendering the poly buffer.

In at least one embodiment, the algorithm uses a CPU and a lookup table populated according to the transfer function of the recording lens to locate source virtual pixels corresponding to each virtual pixel of a planar virtual display surface.

In at least one embodiment, a plurality of planar virtual display surfaces are used to form a cubic virtual display space which surrounds position 146 in a manner similar to virtual display space 138 surrounds position 136 in FIG. 1E.

Interactive Augmented Reality

In accordance with various embodiments, because video images are mapped to an infinity model, or to a background virtual flat view surface, virtual reality objects can be rendered as overlays to the video stream of content 110 and/or, using alpha-media stream management, as video underlay. Because the video media is mapped to an infinity model, objects can be placed into the images that appear to a user as being closer in space than anything that was recorded and sent as an input media stream to the playback device 104. In other words, if the recording is of a "background" image, objects can be mapped in front of that background image using rendering component 105. For example, if the background image is of a bridge, a ship can be mapped to virtual display space 134 to appear to pass in between the bridge and the viewer's position in space. In accordance with various embodiments, each of media streams 108 and 109 further comprises meta-data which facilitates identifying the 3-D reality of the media streams which the meta-data describes. This can include, but is not limited to, luminance levels, chrominance, direction(s) of light source(s), atmospheric effects, etc. which can be used so that the object can be overlaid in a realistic manner in which the lighting of the background image and the overlaid object appears to come from the same source(s) and is subject to the same effects. In various embodiments, digital matting, using alpha channel management, is implemented to lay objects over other portions of the images mapped to virtual surfaces. By mapping images to an infinity model, the overlays appear to be embedded in, or part of, the original media stream. Additionally, alpha channel management can be implemented in various embodiments to facilitate underlays of embedded objects as well. Underlays make an embedded object appear to pass behind an object which is interpreted to be in the foreground of an image mapped to virtual display surface in various embodiments. In one embodiment, the birds are modeled, using rendering component 105, in 3-D space within the virtual display space. As an example, an invisible 3-D object is mapped to a bird which appears to be passing between the ship and the viewer's position. Again, using alpha channel management allows under laying the ship relative to the bird so that the bird appears to pass between the position of the ship and that of the viewer.

In accordance with various embodiments, images can be mapped to convex surfaces as well. For example, a person's face within virtual display space 138 can be modeled as a 3-D convex object within virtual display space 138. Images of a person speaking can then be mapped to that 3-D convex object to provide a realistic representation of the person speaking.

In at least one embodiment, this includes modeling movement of the person's jaw and facial features to give a more realistic impression of a person actually speaking.

In at least one embodiment this comprises a static facial model with texture mapped from moving video to model jaw and facial features movement.

In at least one embodiment this jaw movement and facial features and all movement of avatar talent is modeled by processor-directed sequencing of moving video segments onto a planar surface.

In at least one embodiment, the previous three techniques are used in combination to provide a realistic representation of the person speaking.

In other words, objects which are not part of the infinity model, and thus not part of the concave projection of images such as are created by using virtual display surfaces 134 and 135 of FIG. 1E, can be modeled as a convex projection within virtual display space 138. It is noted that other shaped objects can be embedded into virtual display space 138 such as, but not limited to, flat, planar, or polygonal objects and that media streams other than media streams 108 and 109 of FIG. 1A can be respectively mapped to those objects. In other words, while media streams 108 and 109 convey images captured by lens-microphone array 102 of production space 101, other media streams (e.g., 111 of FIG. 1A) can be mapped to objects which have been modeled into the virtual display space defined at least in part by virtual display surfaces 134 and 135. It is noted that these objects can also be mapped into a cubic virtual display space which is defined at least in part by virtual display surfaces 144 and 145 of FIG. 1F.

Figure 1G:
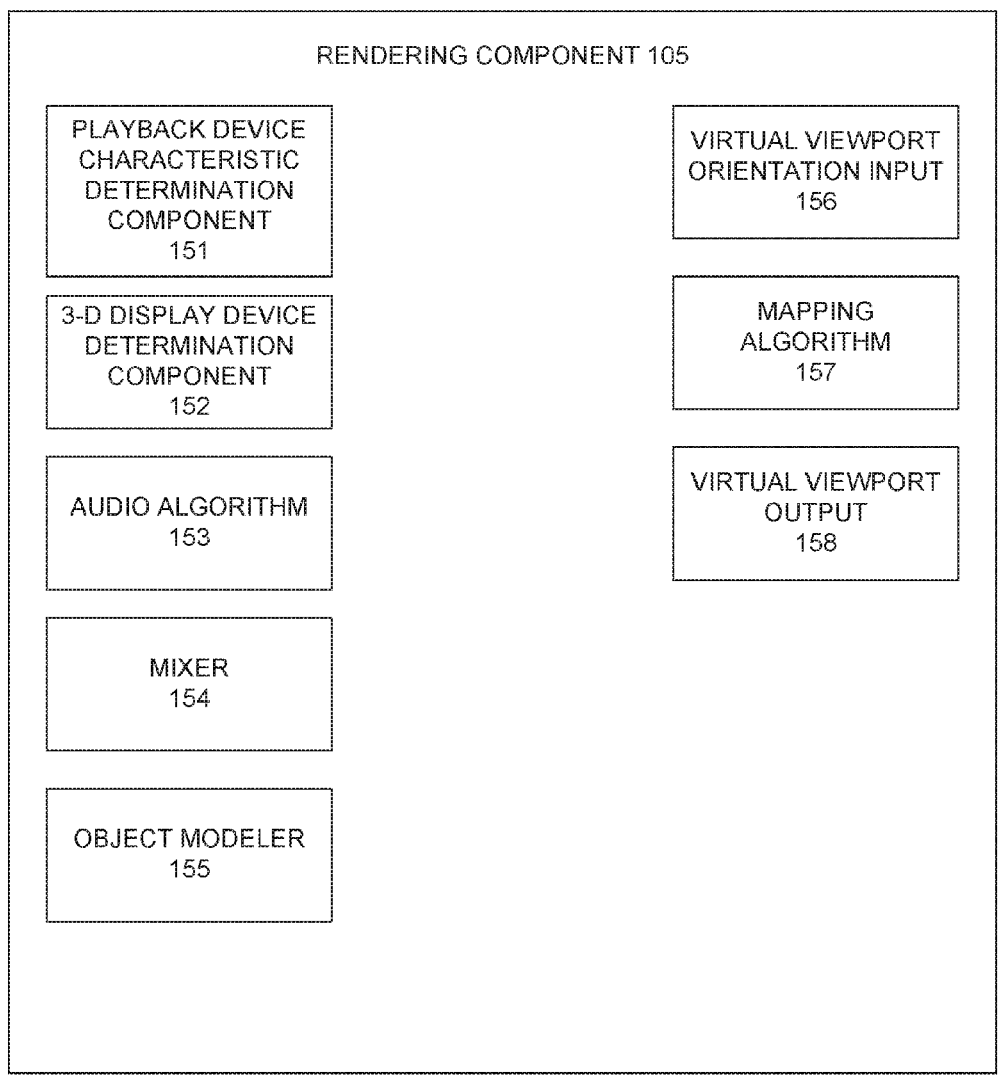
FIG. 1G is a block diagram showing components of a rendering component in accordance with at least one embodiment.

FIG. 1G is a block diagram showing components of a rendering component 105 in accordance with at least one embodiment. In the example of FIG. 1G, rendering component 105 comprises a playback device characteristic component 151 which is configured to determine characteristics of playback device 104. As an example, playback device characteristic component 151 is configured to determine the display capabilities of playback device such as, but not limited to, whether playback device 104 is capable of 1080p display modes, or of a resolution (e.g., 800×400 pixels) of the display device used by playback device 104. Playback device characteristic component 151 is also configured to determine whether playback device 104 comprises a GPU, or a CPU for mapping images from content 110 to a virtual display surface. As described above, if playback device 104 comprises a GPU, rendering component can use the OpenGL library of the GPU to create curved or polygonal virtual display surfaces such as 134 and 135 of FIG. 1E onto which is mapped the imaged from content 110. Alternatively, if playback device 104 comprises one or more CPUs, rendering component 105 can use mapping algorithm 157 to generate instructions to that CPU causing the CPU to map pixels to a flat or planar virtual display surface such 144 and 145 of FIG. 1F.

Audio algorithm 153 is used to interpolate audio media streams of content 110 to provide a user with a realistic 3-D audio representation based upon the orientation of virtual viewport 137. As discussed above, audio algorithm 153 can comprise linear, sine-wave based, and other non-linear algorithms which can be used according to pre-determined settings, or selected by a user. Mixer 154 is used to mix, for example, left and right audio streams to provide realistic 3-D stereophonic audio, or monophonic audio to a user based upon the characteristics of the playback device 104 used.

Object modeler 155 is used to model realistic 3-D objects within the virtual display space created by rendering component 105. As discussed above, this can include concave and convex objects to which images and/or respective media streams are mapped. Virtual viewport orientation input 156 if configured to determine the orientation of the virtual viewport (e.g., 137 of FIG. 1E). As described above, this indication of virtual viewport orientation may result from a user manipulating a virtual control interface, a manual control component, or be based upon geospatial information received from playback device 104 itself.

Virtual viewport output 158 is configured to output the portion of content 110 which has been selected based upon the orientation of virtual viewport 137 relative to virtual display surface 134. This output is sent to the display device of playback device 104 for presentation to a user.

FIG. 1H is a flowchart of an example method 195 for delivering immersive media in accordance with an embodiment. In operation 196, an image from at least one input media stream is mapped to a virtual display surface. As described above, in one embodiment lens/microphone array 102 is configured to output respective media streams from a plurality of lens arrays and microphones as a stream of content 110. This stream of content 110 is then conveyed to playback device 104, either as streaming content, or via data storage media such as CDs, DVDs, or removable electronic storage media such as USB drives. In one or more embodiments, rendering component 105 maps time synchronized images from video media streams to virtual display surfaces to facilitate mapping images to an apparent infinity. As a result, when images from the virtual display surface are sent to a user's display device, an immersive, 360 degree, high-definition environment is created for the user.

In operation 197, an indication of a virtual viewport orientation of a playback device is received. In various embodiments, an indication of the orientation of a virtual viewport (e.g., 137 of FIG. 1E) is received by rendering component 105. As described above, this can be via user control of virtual control interfaces, manual operation of control devices, or via geospatial information received from playback device 104 itself.

In operation 198, the indication of the virtual viewport orientation is used to select a portion of the image for displaying. In accordance with various embodiments, the orientation of the virtual viewport 137 indicates to rendering component 105 which portion of the image mapped to virtual display surface 134 will be displayed on playback device 104.

In operation 199, the portion of content which has been mapped to the virtual display surface is output. In one or more embodiments, the selected portion of content 110, as indicated by virtual viewport 137, is output by rendering component 105 to a user's display component of playback device 104. It is noted that the operations described above can be performed by a rendering component 105 which is disposed upon the user's playback device, or which is disposed at a location apart from the user's playback device such as at content provider 103 of FIG. 1A.

Embodiments for delivering immersive media for a device can be summarized as follows:

1. A method for delivering immersive media for a device, said method comprising:
    mapping an image from at least one input media stream to a virtual display surface;
    receiving an indication of a virtual viewport orientation of a playback device;
    using said indication of said virtual viewport orientation to select a portion of said image for displaying; and
    outputting said portion of said image which has been mapped to said virtual display surface.
2. The method of claim 1 further comprising:
    determining a characteristic of the playback device; and
    selecting a shape of said virtual display surface based upon said characteristic of the playback device.
3. The method of claim 2 further comprising:
    determining that the playback device comprises a Graphics Processing Unit (GPU);
    creating a polygonal virtual display surface using the GPU; and mapping said image to said polygonal virtual display surface.
4. The method of claim 2 further comprising:
    determining that the playback device does not comprise a GPU;
    using at least one Central Processing Unit (CPU) of the playback device to create a planar virtual display surface; and
    mapping said image to said planar virtual display surface.
5. The method of claim 1 further comprising:
    selecting at least two images from two respective input media streams based upon said indication of said virtual viewport orientation;
    mapping each of said at least two images to respective virtual display surfaces; and
    outputting said selected portions of said at least two images which have been mapped to said respective virtual display surfaces to a three-dimensional (3-D) display device.
6. The method of claim 1 further comprising:
    pre-blending at least two input media streams to create a blended input media stream;
    mapping said blended input stream to a spherical virtual display surface; and
    outputting said selected portion of said image which has been mapped to said spherical virtual display surface.
7. The method of claim 1 further comprising:
    using said indication of said virtual viewport orientation to determine a position of the playback device relative to a virtual display space defined at least in part by said virtual display surface.
8. A non-transitory computer-readable storage medium comprising computer executable code for directing a processor to execute a method for delivering immersive media for a device, said method comprising:
    mapping an image from at least one input media stream to a virtual display surface;
    receiving an indication of a virtual viewport orientation of a playback device;
    using said indication of said virtual viewport orientation to select a portion of said image for displaying; and
    outputting said portion of said image which has been mapped to said virtual display surface.
9. The non-transitory computer-readable storage medium of claim 8 wherein said method further comprises:
    determining a characteristic of the playback device; and
    selecting a shape of said virtual display surface based upon said characteristic of the playback device.
10. The non-transitory computer-readable storage medium of claim 9 wherein said method further comprises:
    determining that the playback device comprises a Graphics Processing Unit (GPU);
    creating a polygonal virtual display surface using the GPU; and mapping said image to said polygonal virtual display surface.
11. The non-transitory computer-readable storage medium of claim 9 wherein said method further comprises:
    determining that the playback device does not comprise a GPU;
    using at least one Central Processing Unit (CPU) of the playback device to create a planar virtual display surface; and
    mapping said image to said planar virtual display surface.
12. The non-transitory computer-readable storage medium of claim 8 wherein said method further comprises:
    selecting at least two images from two respective input media streams based upon said indication of said virtual viewport orientation;
    mapping each of said at least two images to respective virtual display surfaces; and
    outputting said selected portions of said at least two images which have been mapped to said respective virtual display surfaces to a three-dimensional (3-D) display device.
13. The non-transitory computer-readable storage medium of claim 8 wherein said method further comprises:
    pre-blending at least two input media streams to create a blended input media stream;
    mapping said blended input stream to a spherical virtual display surface; and
    outputting said selected portion of said image which has been mapped to said spherical virtual display surface.
14. The non-transitory computer-readable storage medium of claim 8 wherein said method further comprises:
    using said indication of said virtual viewport orientation to determine a position of the playback device relative to a virtual display space defined at least in part by said virtual display surface.
15. A system for delivering immersive media for a device comprising;
    a recording device configured to capture a plurality of video data streams and a plurality of audio data streams; and
    a rendering component configured to map an image from at least one input media stream to a virtual display surface, receive an indication of a virtual viewport orientation of a playback device, use said indication of said virtual viewport orientation to select a portion of said image for displaying, and to output said portion of said image which has been mapped to said virtual display surface.

16. The system of claim 15 wherein said rendering component further comprises:
a playback device characteristic determination component configured to determining a characteristic of the playback device, and wherein said rendering component selects a shape of said virtual display surface based upon said characteristic of the playback device.

17. The system of claim 16 wherein said rendering component is further configured to create a polygonal virtual display surface and to map said image to said polygonal virtual display surface in response to determining that the playback device comprises a Graphics Processing Unit (GPU) and to create a planar virtual display surface using at least one Central Processing Unit (CPU) of the playback device and to map said image to said planar virtual display surface in response to determining that the playback device does not comprise a GPU.

18. The system of claim 16 wherein said rendering component is configured to select at least two images from two respective input media streams based upon said indication of said virtual viewport orientation, map each of said at least two images to respective virtual display surfaces, and to output said selected portions of said at least two images which have been mapped to said respective virtual display surfaces to a three-dimensional (3-D) display device.

19. The system of claim 15 further comprising:
a pre-blending component configured to pre-blending at least two input media streams to create a blended input media stream, and wherein said rendering component is configured to map said blended input stream to a spherical virtual display surface and to output said selected portion of said image which has been mapped to said spherical virtual display surface.

20. The system of claim 15 wherein said rendering component is further configured to use said indication of said virtual viewport orientation to determine a position of the playback device relative to a virtual display space defined at least in part by said virtual display surface.

Section Two: Rapid Application Development Platform for Augmented Reality Based Transmedia Various embodiments are directed to a platform which is used to develop augmented reality based transmedia content and also acts an environment for running of that content. Although the following discussion is directed toward development and delivery of augmented-reality based content and applications, it is noted that stand-alone virtual reality content and applications can be created and delivered in accordance with various embodiments. As a running environment, various components can be run as an execution engine or as compiled libraries in a Just Enough Operating System (JeOS) configuration. As a development platform the availability of selected class library methods presented within progressive layers allow GUI-based programming of applications without extensive knowledge of syntax, object consumption without knowledge of object-based programming, and object-based programming without the knowledge of object-oriented programming. All of the components of the platform can be downloaded to a device to make a stand-alone mobile device. Alternatively, some of the components may be downloaded onto the device and the others can be accessed across a network. Various embodiments combine a self-adaptive self-learning network with a workflow engine which uses transactions to a database to define the workflow. The system can combine coded responses to events with learned behavior and use the learned behavior to generate code for applications. Additionally, the coded behaviors can be used as inputs to a self-adaptive network implemented by system 200. These coded behaviors can include hard-coded behaviors, dynamically alterable code, or combinations of the two (e.g. an "interface" object design pattern, where the external "wrapper" is hard-coded and the internal "wrapped" behavior can be dynamically replaced). Also, the results of the self-adaptive networks and read the outputs from the hard-coded behavior and implement hard-coded responses to the self-adaptive networks.

Figure 2A:
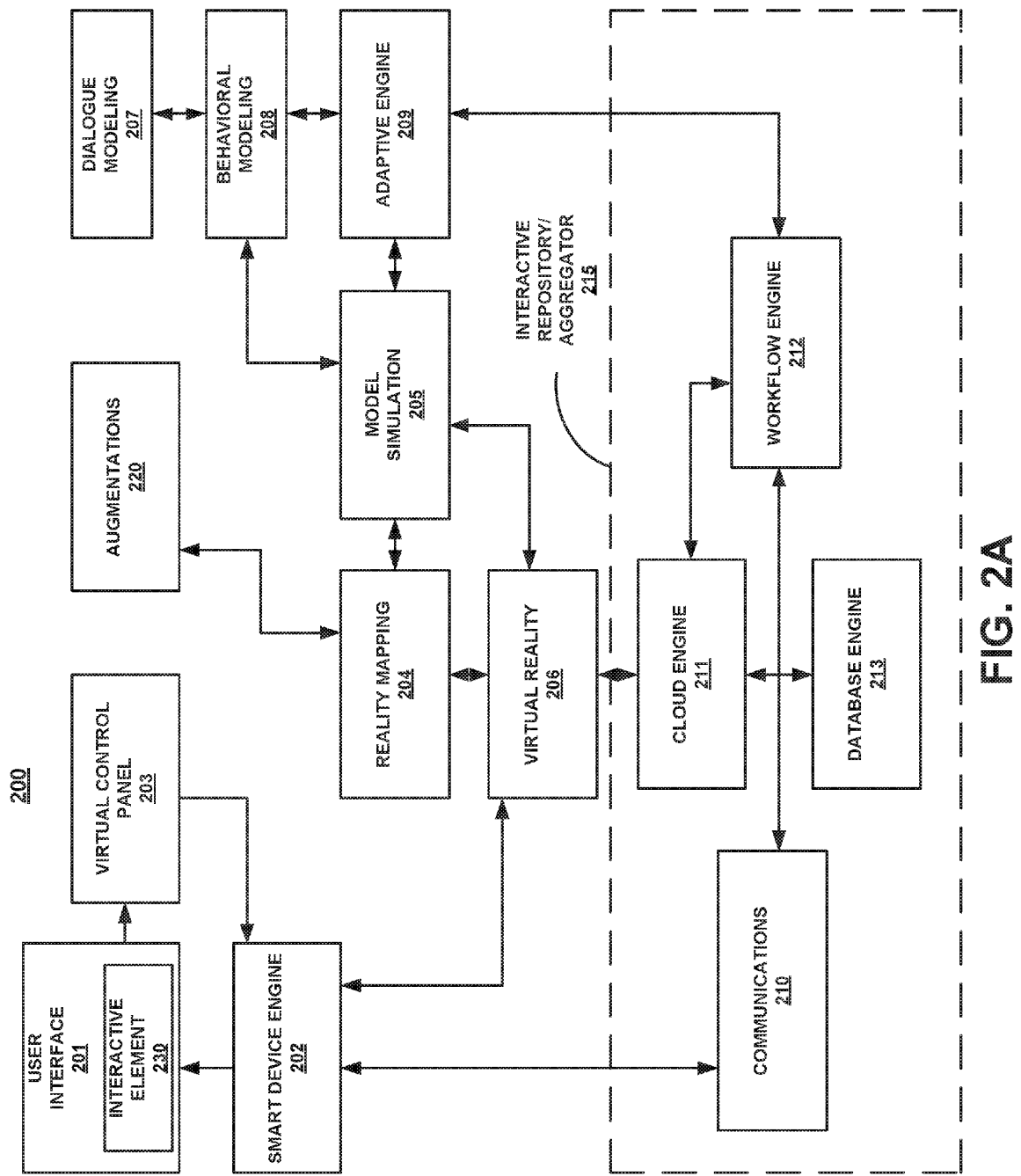
FIG. 2A is a diagram of an example system for developing and running augmented reality based transmedia content in accordance with one embodiment.

FIG. 2A is a diagram of an example system 200 for developing and running augmented reality based transmedia content in accordance with one embodiment. In FIG. 2A, system 200 comprises a user interface 201. In accordance with various embodiments, user interface 201 comprises a display(s) and inputs which facilitate control of system 200 by a user. In one example, user interface 201 may comprise a controller which is separate from the device on which the augmented-reality created by system 200 is displayed. For example, a TV controller, tablet computing device, or smart phone can be configured to control another device and used in various embodiments as a user interface 201. As will be discussed in greater detail below, the basic unit of the behavior modeling library is an interactive element (e.g., 230) also known as a "bot." In various embodiments, interactive elements 230 are imbued with characteristics and are designed to interact with virtual reality and various simulation engines. These interactive elements 230 can interact with various reality mappings such as TV content, advertising, movies, real-time video from a user's device, geospatial data, enterprise applications, etc. The interactive elements 230 are also configurable to perform pre-determined actions based upon interactions with a user. Thus, in response to user input, interactive elements 230 can retrieve information from a website, access applications running on a local computing device, or interact with the virtual reality environment presented on a user's device including other interactive elements 230. The interactive elements 230 can move around the virtual reality displayed on a user's device. The interactive elements 230 understand the reality in which they are embedded based upon the reality mapping performed by reality mapping component 204.

In various embodiments, interactive elements 230 are created in a class inheritance hierarchy which can be imagined as a hierarchical tree structure. Succeeding levels of the tree structure define additional features which are enabled or restricted to better define the behavior of the interactive elements 230 within the virtual reality environment which combines data from reality mapping component 204 and model simulation component 205. System 200 utilizes extensible inheritance which permits providing a newly created bot with a set of pre-determined characteristics which describes the class to which it belongs. Extensibility facilitates customizing the characteristics of the bot by defining additional characteristics to those inherited from a parent class. The design of system 200 also implements encapsulations to permit dynamically changing certain components of the behavior from each of the basic categories of bots in a library. As an example, an "information bot" inherits characteristics which permit it to retrieve information for a user when the user interacts with the bot. In another example, mobile bots describes a class of interactive elements 230 which are able to move around in the virtual reality environment created by system 200. A sub-category of mobile bots are "fight bots" which are used in gaming to represent a character. The fight bots are designed to interact with the virtual reality environment in which they are embedded and are subject to, for example, the set of physical laws assigned to that version of reality and the behaviors assigned to that bot. An example of encapsulation would convert a basic definition of a fight bot to a more specific implementation such as, for example, a robot firing missiles. Utilizing these features, a developer can quickly define characteristics of interactive elements 230, embed them into the reality being mapped, and create an augmented-reality based instance of content. As will be discussed in greater detail below, this can be performed by a developer without requiring extensive knowledge of programming code.

In accordance with various embodiments, interactive elements 230 can be created manually using the XML language which has the advantage of being easily read by a human. Thus a developer without an extensive programming background can easily create interactive elements 230 manually. Additionally, the use of a class inheritance hierarchy and encapsulation allows assigning behaviors and characteristics to interactive elements 230 rapidly and without the necessity of an extensive programming background. Additionally, this information can be attached using XML to a learned behavior using the self-learning described below. In at least one embodiment, the JavaScript Object Notation (JSON) data format can be used instead of XML. The JSON data format stores structured data in a package in a standard machine and human readable way.

System 200 further comprises a smart device engine 202. Smart device engine 202 is configured to receive the augmented-reality environment generated by virtual reality component 206 and to manage the user's device to provide optimal performance when presenting content to the user in a manner which is compatible with the capabilities of the user's device. Smart device engine 202 provides the transmedia capability of system 200 by customizing the presentation of the augmented-reality environment to a user's device such as, but not limited to, a smart TV, smart phone, tablet computing device, laptop computing device, desktop computer, etc. In accordance with one or more embodiments, smart device engine 202 is disposed upon the user's device itself, in addition to user interface 201 and virtual control panel 203, while some or all of the other components shown in FIG. 2A can be located at a device separate from the end user's device. Smart device engine 202 adapts the presentation of the received augmented-reality environment from virtual reality component 206 in order to provide a realistic, full immersive, 3-D content exhibiting real-time motion, frame synchronous full-speed video with full-speed complex rendered shapes with texture mapping.

System 200 further comprises a virtual control panel 203. In accordance with various embodiments, virtual control panel 203 is a set of controls embedded used to control what portion of the 3-D augmented-reality environment is presented to a user. Virtual control panel 203 may be implemented in various configurations including, but not limited to, geospatial control of a user's device (e.g., either the user's display device itself or a controller of that device), voice control, camera-based gesture recognition, virtual buttons, virtual joysticks, cursor controllers, etc. Virtual control panel 203 allow a facilitates user interaction in the augmented-reality environment to control the presentation of content and to designate objects, such as selecting an interactive element 203, and/or actions to be performed with the augmented-reality environment.

System 200 further comprises a reality mapping component 204. In each type of media (e.g., TV programming, movies, real-time media, geospatial content, etc.) there is an underlying reality which is parsed out to derive meaning. In other words, there is a reality behind the representation shown on the media which may or may not be coherent to a machine, but which is coherent for a human. For example, a movie can be considered a form of virtual reality. In a movie, time and/or geography can be compressed from real-time into an abbreviated form to make the movie more interesting. This makes it apparently possible for a person to travel from New York City to Washington D.C. in a few seconds when, in reality, this is not possible in real-time. In a movie, the time base is a frame base time and the reality of the movie that is being mapped is dynamically changing, sometimes frame to frame. This underlying reality has to be mapped and correlated with other realities, to integrate various components into a realistic augmented-reality environment. In other words, these various realities have to be mapped into a single virtual environment having a common time base, dimension, laws of physics and geography, etc. In accordance with various embodiments, reality mapping component 204 manipulates data from one reality to the others being integrated into a single virtual reality environment. Reality mapping component 204 is configured to parse data from received media streams and utilize automated techniques to interpolate/extrapolate various components of the reality being mapped. For example, camera angles, camera movements, camera positions in space, depth within space, audio sources, and the like can be determined by reality mapping component 204 and used to map one reality space into a virtual reality environment. In some cases, system 200 does not simply map these realities into a virtual reality space, but maps these back into some other reality that is the primary user interface. Thus, if a user is watching a movie, the primary reality is the movie's reality, not the reality being created by virtual reality component 206. Thus, the reality of the movie being watched may first be mapped into virtual reality in order to correlate the mappings from other realities being combined, but the combined realities are then pushed back into the reality of the movie. In one or more embodiments, the layout of parameters and the mapping(s) of reality by system 200 are performed using XML code.

System 200 further comprises a model simulation component 205. In accordance with various embodiments, model simulation component 205 ties together the physics (e.g., gravity, acceleration, turn radius, etc.) of the virtual world being created by system 200. Model simulation component 205 is also configured to control how time is modeled in virtual reality component 206. Model simulation component 205 is also configured to model how objects change over time.

System 200 further comprises a virtual reality component 206. In various embodiments, virtual reality component 206 is configured to bring together the inputs from reality mapping 204, model simulation 205, cloud engine 211, and smart device engine 202 to create an immersive, 360 degree, 3-D augmented-reality environment. Virtual reality component 206 is configured to model shapes, and to connect those shapes seamlessly when they move. Virtual reality component 206 is also configured to determine lighting such as: how light interacts with objects, the location(s) of light source(s) within the virtual reality space being created, the chrominance and luminance of those respective light sources, how shadows and reflection are created by objects due to lighting, etc. In one or more embodiments, virtual reality component 206 is also configured to model human movement. Virtual reality component 206 is configured to use the inputs from the other components listed above and to integrate them seamlessly into a single immersive 3-D environment, including embedded objects and interactive elements, which is then passed to smart device engine 202.

System 200 further comprises a dialogue modeling component 207. Dialogue modeling component 207 is directed to the modeling of individuals and groups. It is configured to map the context and meaning of what has been parsed about, for example, a conversation based on a number of different contexts such as geospace and viewpoint. For example, where people are looking when they speak often colors the meaning of what they are saying. This is an example of context mapping to the dialogue. In another example, people and groups go through different states of dialogue while they are communicating with each other where what they say, or what they mean, changes in the context of a group or individual. In other words, the same word can have different meaning in different contexts. Dialogue modeling component 207 creates a mapping of context and meaning which can be passed to behavioral modeling component 208 because dialogue can also be a behavioral response. In at least one embodiment, an interactive element 230 can respond to a user based on what the user said, based on its understanding of what is happening, what the user is looking at, and what it thinks the user meant.

System 200 further comprises a behavioral modeling component 208. Behavioral modeling component 208 is configured to model behavior of interactive elements 230, and other elements, using extensible libraries. In other words, the behavior of an interactive element 230 prescribes what action the interactive element 230 will perform in response to another event. For example, in response to a user clicking on an interactive element 230, the prescribed behavior may be to access an interactive advertisement via the Internet, or to access a website for additional information. As described above, behavioral modeling component 208 can receive context and meaning of conversation from dialogue modeling component 207 in determining a response. In accordance with various embodiments, behavior of interactive elements 230 can be laid out in XML manually, or use inherited behavior types using the class hierarchy described above. These behavior types manage interaction within the augmented-reality environment and can be encapsulated and dynamically changed according to context. In one or more embodiments, sets of behavior specifications are modeled as personalities of the interactive elements 230. In one or more embodiments, the interactive elements 230 can implement self-learning into the interactive element itself. Thus, behavioral modeling component 208 defines the environment which interactive elements 230 populate and what they can do and access within that environment. For example, a search API can be attached to an interactive element 230 and the drivers for using that search API can be attached to communications component 210 and be made available to the interactive element 203. Thus, in response to an interaction with a user, the interactive element 230 will have knowledge to use those drivers to implement using the search API for the user.

System 200 further comprises an adaptive engine 209. In accordance with various embodiments, adaptive engine 209 is configured to implement a self-adaptive network functionality into system 200. In one embodiment, adaptive engine 209 is coupled with database engine 213 via workflow engine 212. Workflow is a way to define low level functionality of system 200 on the back end of the system. Adaptive engine 209 gives a single integration point of hard coded behavior and learned behavior and can mix the two. In various embodiments, the learned behavior can manage the hard coded behavior which may in part be based upon learned behavior. Workflow engine 212 also monitors communications as well.

System 200 further comprises a level of integration represented as interactive repository/aggregator 215 comprising, in one embodiment, communications component 210, cloud engine 211, workflow engine 212, and database engine 213. Communications component 211 is configured to provide communications to elements outside of system 200 including the Internet, e-mail, content providers, and other interactive repository/aggregators 215 (not shown).

Cloud computing networks are a term well known in the art in which the computing environment is run on an abstracted, virtualized infrastructure that share resources such as CPU, memory and storage between applications. Typically, a cloud computing environment implements a distributed computing architecture of distributed data storage and other content via software and services provided over a network or the Internet. Using a cloud computing network, access to computing power, computer infrastructure, applications, and business processes can be delivered as a service to a user on demand. In various embodiments, cloud engine 211 comprises a human or machine consumable middleware transactional processor that is stateful. Cloud engine 211 provides functionality such as generating queries, retrieve data, manipulate data, etc. Cloud engine 211 also provides a Service Oriented Architecture (SOA) that is consumed as a machine readable medium and still have workflow engine 212 attached that does transactional processing on the backend. In one or more embodiments, cloud engine 211 can display web pages that are part of self-contained web applications and maintains state even though the user's web browser does not maintain state. Cloud engine 211 can manage database access, applications, forms, and workflow. In various embodiments, cloud engine 211 can access other non-database repositories and use a regular database engine to do so and can consume SOA objects.

In accordance with various embodiments, workflow engine 212 monitors interactions between cloud engine 211, database engine 213 and communications component 210. Workflow engine 212 is also configured to monitor interactions between cloud engine 211 and other non-database repositories, other interactive repository/aggregators 215 (not shown) or the like. In accordance with various embodiments, system 200 implements matrix processing and builds schemas according to how developers want forms to relate to one another (e.g., parent/child relationship, cross reference forms, etc.) and with actual tables in a database.

In accordance with various embodiments, system 200 implements a form specification in which imperative Java-based declarations are converted to declarative Java-based declarations. In one embodiment, the form of the syntax controlling workflow engine 212 is architected in such a way so that the actual usage of the workflow can be formatted in this same syntactical way. This is not standard to Java in any way, but converts Java into a declarative language. In accordance with various embodiments, objects (e.g., interactive elements 203) are declared and class hierarchy based inheritance of behavior and characteristics are used. This provides a limited set of objects that can be manipulated by a developer to put objects on a screen. However, by converting the Java-based declarations into declarative form, characteristics of interactive elements 203 that are not intrinsically inherited can be added as further specified option that are appended as dot-declarations. This is easily parsed as something that can be performed using a GUI to generate Java code. They are mere declarations, and they are repetitive in their structure, so that they can be parsed out or symbols can be mapped to these declarations to sort them, or these declarations can be stored where Java Virtual Machine (JVM) executable Java out of a GUI front end very easily. As a result, extensive programming experience is not necessary to create interactive elements 203. Instead, if the developer is given the knowledge of what kind of field is wanted, and in what order to query in, and in what order it shall be displayed on a screen, etc., these elements can be created quickly.

This process can also be applied to workflow engine 212 as well to facilitate putting regular expressions into a low-level workflow. The method described above provides a single object access point with an easy syntax and returns the same object in a form that can be recalled. In one or more embodiments, the operation of workflow engine 212 can be laid out using a GUI as well. In various embodiments, system 200 implements matrix processing and pattern recognition which is linked to a message bus (e.g., via workflow engine 212) to monitor workflow messaging.

System 200 further comprises a database engine 213. Database engine 213 comprises a database management system (DBMS) software layer for storing, processing, and securing data stored by a computing device implementing system 200. There are a variety of DBMS software drivers which can be used in accordance with various embodiments including, but not limited to, Oracle, MySQL, Sybase, MS SQL, Postgres, etc.

In various embodiments, system 200 is configured to automatically generate database schema in $4^{th}$ normal form. In at least one embodiment, a form specification is laid out which sets forth the parameters for creating a database. These form specifications include relationships (e.g., parent/child, cross references, tables, etc.) between data elements on these forms and other parameters such as dependencies used to organize fields and tables of a relational database. The DBMS will use this information from the form specification and create the table structures within a Relational Database Management System (RDMS). Another embodiment can utilize a middleware driver that stores to a database, but does not actually access the database itself.

Self-Adaptive Networks

In one or more embodiments, a self-adaptive network can be embedded into any one of interactive elements 230. This facilitates making interactive elements 230 being capable of being trained to perform an action and to implement self-learning so that the interactive element 230 can implement scoring criteria to improve the manner in which it responds to a given input or event until a desired standard is achieved. This can include learning how to interact and self-customize to a particular user, or to a set of users.

Various embodiments implement a low-level (e.g., 212) engine linked to matrix processing and pattern recognition. In various embodiments, the low-level work engine can also interact as a message bus. Thus, a workflow event can be linked to adaptive engine 209 to process and return back to the workflow. In various embodiments, any transaction that happens in data that goes to or from a data repository (e.g., XML, RTDMS, etc.) can be processed on the back end. Thus, front-end adaptive behavior can be implemented by integrating self-adaptive modeling into each of the interactive elements 230 and back end adaptive behavior as well. Additionally, in one or more embodiments, adaptive behavior that is built into interactive elements 230 can communicate with cloud engine 211 to implement custom created behaviors for the interactive element 230. In one embodiment, the adaptive behavior built into one of interactive elements 230 communicate with cloud engine 211 and have learned behavior on the back end serve out those same adaptive networks.

In various embodiments, the learned behavior by the interactive elements 230 is stored in the XML or the JSON data format although other data specifications can be used in accordance with various embodiments. By using the XML format, it is easier for a person to develop an application manually. In at least one embodiment, filters can be used to aggregate data, such as from the Internet. This filtered data can be used to automate the development of applications, behavior of interactive elements 230, developing user profiles to implement customized delivery of content (e.g., automated TV programming), etc.

The combination of components described above provides a great deal of flexibility and facilitates rapid development of immersive, 360 degree, 3-D augmented reality content. In accordance with various embodiments, the resulting programming elements, behavior, and data-driven functional responses can be streamed along with television and advertising content. As discussed above, interactive elements 230 can be embedded into the augmented-reality environment created by system 200. Although the discussion above has been directed to embedding objects within a mapped reality, embodiments can insert landscapes, backgrounds or the like behind objects which were provided as one or more of augmentations 220. As an example, utilizing overlay and apparent underlays, objects and landscapes can be embedded into the original media content which allow other objects from the original media stream appear to pass in front of, or behind, the embedded objects. Embodiments can stream the programming elements (e.g., behavior, responses, etc.) along with the TV content or advertising being sent to a user's device. Thus, the code for the interactive elements 230 will be delivered along with the pixels and audio of the original media content.

Additionally, the programming elements, behavior, and data-driven functional responses can be delivered as separate meta-data to coincide with interactive television programming. In accordance with various embodiments, meta-data is used to describe the bounds and parameters within which the interactive elements 230 operate. This describes not only what type of interactive element it is, but what types of behavior it will exhibit. In accordance with at least one embodiment, this meta-data is parsed onto the user's device in real-time. This can be synthesized in real-time using smart device engine 202 on the user's device. Thus, the programming elements, behavior, and data-driven functional responses which includes interactive elements 230, and the parameters of what the interactive elements 230 can do and how they do it, and even the appearance of the interactive elements themselves can be streamed along with TV content and/or advertising, or it can be delivered as separate metadata to coincide with interactive TV programming. The programming itself may not yet have arrived at the user's device, but the meta-data can have been downloaded with the knowledge that the TV programming will be played. In another embodiment, rather than streaming the programming elements, behavior, and data-driven functional responses in real-time, they can be accessed from, for example, a database or data storage device.

In accordance with one or more embodiments, these two methods of delivery can be combined. In one example, smart device engine 202 is executed as a media player which is implemented as a software layer operated by the user's device. In conjunction with other components of system 200 and the user's device, it becomes a media player for the user. In this case, the media being presented to the user is both the original programming content (e.g., TV programming, advertising, movies, real-time audio/video content, geospatial data, etc.) along with the meta-data describing the interactive elements 230 (e.g., the programming elements, behavior, and data-driven functional responses of interactive elements 230) which have been embedded into the original content. In one or more embodiments, the Just Enough Operating System (JeOS) is used which only compiles the portions of code needed to perform a specific task. In this instance, the components of system 200 shown in FIG. 2A can be thought of as a set of core libraries which interact and are compiled into a self-contained package and sent the user's device. In one embodiment, system 200 can also be implemented as a cloud server in which some, or all, of the components of system 200 are compiled and sent into a package and run locally on the user's device. In one embodiment, the interactive repository/aggregator 215 can be implemented as a service (e.g., a SOA) that is accessible across a network from any of the other components of system 200 which may be located on a separate device.

Alternatively, various embodiments download some, or all, of the components of system 200 onto the user's device. As an example, smart device engine 202, virtual reality component 206, and virtual control panel 203 can be compiled and loaded onto the user's device to improve performance in the rendering of the augmented-reality environment. Other components of system 200 can be paged in, or kept separate across a network. In various embodiments, system 200 can be implemented as a portal to content which can be accessed via, for example, a user's web browser.

In accordance with various embodiments, the programming elements, behavior, and data-driven functional responses can be automatically generated by conversion of aggregated data to automatically generate applications such as, but not limited to, automated television channels. As an example, interactive repository/aggregator 215 can derive data out of other programs operating on a user's device (e.g., Quicken, Quickbooks, etc.) to automatically generate a personal finance channel which is displayed as a television channel on the user's device. This can include interactive elements 203, which are modeled as 3-D objects and texture mapped, to represent newscasters who deliver customized financial reports to a user based upon data on the user's device. Additionally, data can be derived based upon websites accessed by the user via the device. Thus, if the user regularly visits websites directed toward real-estate investments, the automatically generated television channel can feature real-estate reports as part of its larger reporting of financial markets. By aggregating data, system 200 can automatically generate coding and configuration layout constructs that change based upon a user's data. In various embodiments, actual code development is performed by cloud engine 211, workflow engine 212, and smart device engine 202 which can generate JVM readable code. Other operations are implemented as configurations of XML schema.

In various embodiments, system 200 is also configured to deliver stand-alone Cloud-based enterprise applications. As an example, interactive repository/aggregator 215 provides a sophisticated integration point to other systems and applications. In other words, cloud engine 211, workflow engine 212, database engine 213 and communications component 210 can be configured to deliver enterprise applications. By adding a virtual reality presentation on the front end and adaptive workflow, system 200 provides capabilities beyond standard enterprise applications. Furthermore adaptive engine 209 in combination with workflow engine 212 can identify transactions that happen often across an enterprise that can be a huge labor chore if done by manually, especially in a network that implements automated reporting. As an example, in an inventory system of all IP equipment of a business, a great deal of effort is used to monitor the equipment, to predict when the component will fail, etc. Additionally, the monitoring has to identify what actionable item has to happen, how to categorize that action, and how to de-duplicate, sort, and correlate what these events are so as not to send out numerous superfluous alerts in response to an event. Currently, these operations are done semi-automatically, but still require human intervention. In accordance with various embodiments, this categorization is coupled with the self-adaptive network implemented by system 200 which facilitates learning how to better categorize events so that every time an event is miscategorized, system 200 can learn how to better categorize that event in the future.

In various embodiments, system 200 can be used to deliver stand-alone mobile applications as well. As an example, some components of system 200 such as smart device engine 202, virtual control panel 203, and virtual reality component 206, if virtual reality is being used, can be downloaded onto a user's mobile device. This can include, but is not limited to, smart phones, tablet computers, laptops computers, or the like. Applications can be developed which either use those components as engines, or as compiled libraries. Media content, including augmented-reality applications and content, can be downloaded or streamed to the mobile device and presented to the user. It is noted that other components of system 200 can be downloaded onto the user's mobile device as well and may improve the performance of the device when run locally. Alternatively, all of the components of system 200 can be downloaded onto the user's mobile device to create a stand-alone mobile device that isn't connected to other components of system 200 and runs all the forms, the cloud engine, database, and workflow locally on the user's mobile device.

Thus, system 200 exposes progressively more sophisticated forms of functional approaches that allow it to deliver powerful augmented-reality based transmedia enterprise system applications with a very small number of simple lines of code, while still allowing flexibility of accessing progressively deeper layers of programming through object consumption and specification. For example, at the highest layer, a developer is not required to know how to write a program. At the next layer, a developer is not required to know how to consume objects. At the next layer, the developer is not required to know how the objects work, or how to make one. Thus, this multi-layered approach progressively exposes greater flexibility for increasingly experienced developers to customize the behavior of objects.

In accordance with various embodiments, the programming interface specification for system 200 abstracts the device layers to make it more portable and simpler to code than having to deal with the complexities of each operating system which may be used by various end user devices. This allows identifying default behaviors related specifically to the functionality of system 200. In various embodiments, smart device engine 202 deals with the lower level functionality and presents some higher level intercepts which invoke a specified call in response to a defined event in order to determine how best to respond. Thus, the application developers can create asynchronous event-driven responses to events using a rich library of functions.

As discussed above, the components of system 200 is comprised of code library components which can stand alone as engines, or be compiled in a JeOS configuration. The programming interface specification includes a series of real-time event intercepts (presented as method overrides) that allow logical programmatic responses to events and modifications to, or replacement of, default system functionality.

The programming interface also includes XML configuration and layout of 2-D screen layout. As an example, a standard Android device layout can be performed in XML in various embodiments. It is noted that other screen layouts can be performed in XML as well.

The programming interface specification also provides for the XML configuration and layout of interactive form specifications. Because Java declarations are being converted to declarative form, operations performed using a GUI layout builds a Java code that is parsed by a JVM. In one embodiment, if imperative Java declarations are also used, inline Java code can be placed inside the declarative Java libraries which is an imperative piece which is inheritable. In other words, there is an imperative statement inside each form specification. When the form specification is invoked, there is a corresponding imperative form that is automatically invoked that will allow a developer to bring that form specification up. Instead of filling out the imperative form specification, or interacting with the data related to the records that are joined from a database or external repository, the developer can actually query by example because the imperative form specification has the same layout. This provides a variety of options about lists that permit relating fields in a database query. In other words, embodiments facilitate creating automatic query by example by putting using in-line code and inheriting the query by class. The programming specification also provides for XML configuration and layout of 3-D augmented-reality as discussed above including virtual reality, geospatial relationships, and media reality. The programming specification also provides for XML configuration and layout of behavior and default system functionality as discussed above.

In various embodiments, the interface specification also provides for XML configuration and layout of declarative Java declarations and of event trigger specifications in JVM. In one embodiment, event overrides implemented by smart device engine 202 deal with events on the client device that flow through interactive repository/aggregator 215. Interactive repository/aggregator 215 acts as a middleware layer between other components of system 200 and a database. In this middleware layer, event based events are defined by the programming interface. In various embodiments, workflow engine 212 comprises a library of functions which can be invoked based upon events that happen as data flows through interactive repository/aggregator 215. For example, e-mail filters can be emplaced to store, classify, and respond to e-mails as they arrive.

In various embodiments, the interface specification of system 200 also provides class library access to interactive multimedia, virtual reality, geospace, dialogue modeling, workflow engines, matrix processing, adaptive networks, and fuzzy logic scripting. As discussed above, various embodiments implement a multi-layer programming interface in which succeeding layers of increasing complexity and power can be accessed by a developer. Thus, a less experienced developer may only access the top layer or two of the programming interface while more experienced developers may access deeper layers to allow for greater customization of applications. As an example, the top layer facilitates configuration of each of the engines of system 200. The next layer down permits Java coding for components of system 200 such as the smart device engine. The design of the programming interface for system 200 is based upon the Paredo principle in which 80% of the work to be performed can be implemented using 20% of the coding. In various embodiments, this 20% of the coding can be placed in a wrapper and made immediately available. Thus, instead of having to break down and consume an object to get at the method that underlies it, the developer simply needs to know how to index the object so that a simple method call can be performed. The method call can be implemented as a simple line of coding that doesn't have to have knowledge of an object. Thus, the programming interface is exposing these library methods and the top layer of the programming interface can be made very flat with no depth to the object hierarchy. Instead, the developer is accessing the most common 80% of the methods that are related to the program being created. According to various embodiments, the availability of selected class library methods, presented with progressive layers, allow GUI based programming without the knowledge of syntax, object consumption without knowledge of object-based programming, and object-based programming without knowledge of object-oriented programming.

Figure 2B:
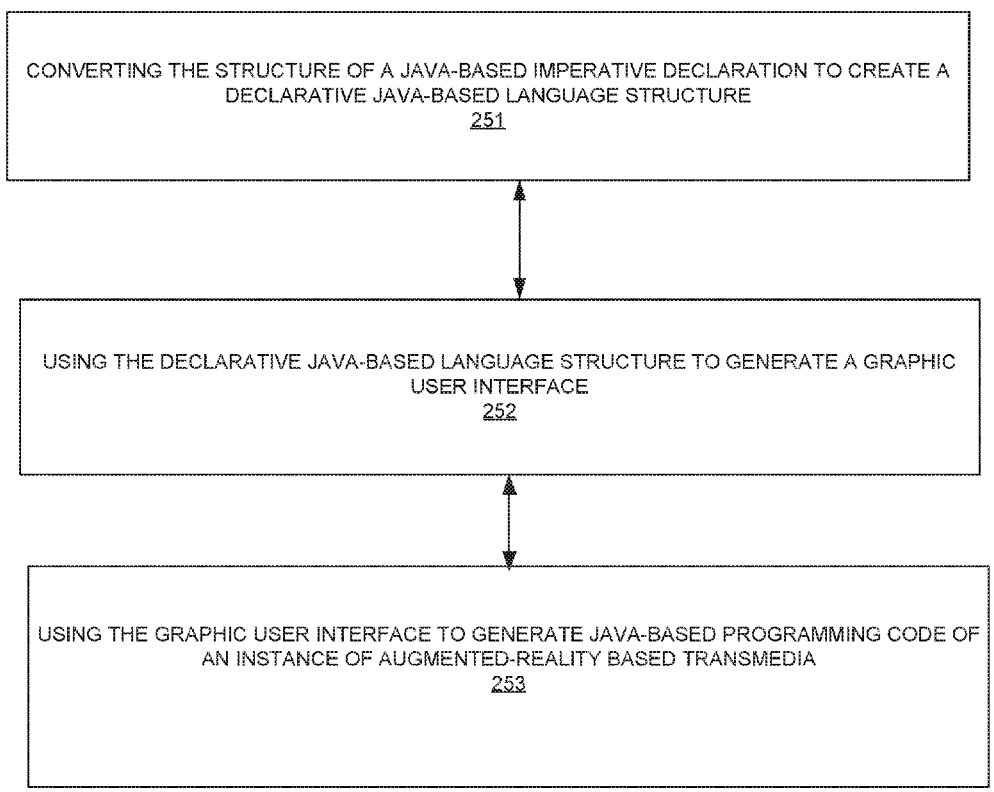
FIG. 2B is a flowchart of an example method for developing augmented reality based transmedia content in accordance with an embodiment.

FIG. 2B is a flowchart of an example method 250 for developing augmented reality based transmedia content in accordance with an embodiment. In operation 251 of FIG. 2B, the structure of a Java-based imperative declaration is converted to create a declarative Java-based language structure. As discussed above, in one embodiment, the form of the syntax controlling workflow engine 212 is architected in such a way so that the actual usage of the workflow can be formatted in this same syntactical way. This is not standard to Java in any way, but converts Java into a declarative language. In accordance with various embodiments, objects (e.g., interactive elements 203) are declared and class hierarchy based inheritance of behavior and characteristics is used. This provides a limited set of objects that can be manipulated by a developer to put objects on a screen. However, by converting the Java-based declarations into declarative form, characteristics of interactive elements 203 that are not intrinsically inherited can be added as further specified options that are appended as dot-declarations.

In operation 252 of FIG. 2B, the declarative Java-based language structure is used to generate a graphic user interface. As discussed above, the declarative Java-based language structure is easily parsed as something that can be performed using a GUI to generate Java code. They are mere declarations, and they are repetitive in their structure, so that they can be parsed out or symbols can be mapped to these declarations to sort them, or these declarations can be stored where Java Virtual Machine (JVM) executable Java out of a GUI front end very easily.

In operation 253 of FIG. 2B, the graphic user interface is used to generate Java-based programming code of an instance of augmented-reality based transmedia. In accordance with various embodiments, the GUI can be used, for example, to define additional characteristics and behaviors for interactive elements in addition to those inherited through class hierarchy. This permits quickly customizing the interactive elements according to the particular needs of a software application.

In at least one embodiment, the declaration objects generate screen elements for user interaction at run-time, generate data schema construction at create-time including creation of tables and indexes within underlying RDBMS implementations, and manage interaction with databases or repositories at run-time, mapping screen interactions to underlying data structures and workflow events.

In various embodiments, Workflow Engine 212 includes the following interface methods (or subroutines) to assist non-programming complex multi-stage matrix processing and data filter implementations: Parse (string with regular expression); pullFields (from schema source through predefined data Map to destination data set row); pushFields (from dataset source through pre-defined data Map to destination schema rows); putFields (from dataset source through pre-defined data Map to scheme destination rows); replace (one text pattern with another within source text); roles (identified roles within system for a given identity—e.g. user); split (split text into substrings as delimited by a pattern); SQL (load scheme directly from DBMS using Standard Query Language—SQL); and xferFields (transfer field data from one form or dataset to another form or dataset).

Embodiments for development of augmented-reality based transmedia content can be summarized as follows:

1. A method for development of augmented-reality based transmedia content, said method comprising:
    converting the structure of a Java-based imperative declaration to create a declarative Java-based language structure;
    using said Java-based declarative language structure to generate a Graphic User Interface (GUI); and
    using said graphic user interface to generate Java-based programming code of an instance of augmented-reality based transmedia content.

2. The method of claim 1 further comprising:
    using the Extensible Mark-up Language (XML) to create a mapping of data derived from at least one source of spatial data.

3. The method of claim 2 further comprising:
    correlating said mapping of data derived from at least one source of spatial data with a virtual reality model.

4. The method of claim 1 further comprising:
    using the Extensible Mark-up Language (XML) to define an interactive element within an instance of augmented-reality based transmedia content; and
    using the Extensible Mark-up Language (XML) to define a behavior of said interactive element in response to a defined event.

5. The method of claim 4 further comprising:
    deriving data from a self-adaptive network describing said behavior; and
    modifying said behavior based upon the derived data.

6. The method of claim 5 further comprising:
    monitoring a response of said interactive element in response to said defined event;
    categorizing said response of said interactive element; and
    in response to said categorizing, automatically modifying said behavior and wherein said monitoring, said categorizing, and said automatically modifying are performed by said interactive element.

7. The method as recited in claim 1 further comprising:
    automatically generating a database schema in fourth normal form.

8. A non-transitory computer-readable storage medium comprising computer executable code for directing a processor to execute a method for development of augmented-reality based transmedia content, said method comprising:
    converting the structure of a Java-based imperative declaration to create a declarative Java-based language structure;
    using said declarative Java-based language structure to generate a Graphic User Interface (GUI); and
    using said graphic user interface to generate Java-based programming code of an instance of augmented-reality based transmedia content.

9. The non-transitory computer-readable storage medium of claim 8 further comprising:
    using the Extensible Mark-up Language (XML) to create a mapping of data derived from at least one source of spatial data.

10. The non-transitory computer-readable storage medium of claim 9 further comprising:
    correlating said mapping of data derived from at least one source of spatial data with a virtual reality model.

11. The non-transitory computer-readable storage medium of claim 8 further comprising:
    using the Extensible Mark-up Language (XML) to define an interactive element within said instance of augmented-reality based transmedia content; and
    using the Extensible Mark-up Language (XML) to define a behavior of said interactive element in response to a defined event.

12. The non-transitory computer-readable storage medium of claim 11 further comprising:
    deriving data from a self-adaptive network describing said behavior; and
    modifying said behavior based upon the derived data.

13. The non-transitory computer-readable storage medium of claim 12 further comprising:
    monitoring a response of said interactive element in response to said defined event;
    categorizing said response of said interactive element; and
    in response to said categorizing, automatically modifying said behavior and wherein said monitoring, said categorizing, and said automatically modifying are performed by said interactive element.

14. The non-transitory computer-readable storage medium as recited in claim 8 further comprising:
    automatically generating a database schema in fourth normal form.

15. A system for implementing development of augmented-reality based transmedia content, said method comprising:
    a processor comprising a cloud engine communicatively coupled with a workflow engine and wherein said cloud engine and said workflow engine are configured to implement convert the structure of a Java-based imperative declaration to create a declarative Java-based language structure, use said declarative Java-based language structure to generate a Graphic User Interface (GUI), and to use said graphic user interface to generate Java-based programming code of an instance of augmented-reality based transmedia content.

16. The system of claim 15 wherein said processor further comprises:
    a smart device engine configured to use the Extensible Mark-up Language (XML) to create a mapping of data derived from at least one source of spatial data.

17. The system of claim 16 wherein said processor further comprises:
    a virtual reality component configured to correlate said mapping of data derived from at least one source of spatial data with a virtual reality model.

18. The system of claim 15 wherein said cloud engine and said workflow engine are further configured to use the Extensible Mark-up Language (XML) to define an interactive element within said instance of augmented-reality based transmedia content and to use the Extensible Mark-up Language (XML) to define a behavior of said interactive element in response to a defined event.

19. The system of claim 18 wherein said processor further comprises:
    an adaptive engine communicatively coupled with said workflow engine and configured to derive data describing said behavior; and
    a smart device engine configured to modify said behavior based upon data derived from said adaptive engine.

20. The system of claim 19 wherein said interactive element are configured with said adaptive engine and with said workflow engine and is configured to monitor a response of said interactive element in response to said defined event, categorize said response of said interactive element, and to automatically modify said behavior in response to said categorizing.

Section Three: Communication Using Augmented Reality

Notation and Nomenclature

Some portions of the description of embodiments which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present discussions terms such as "providing", "receiving", "generating", "embedding", "creating", "customizing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, in some embodiments, methods described herein can be carried out by a computer-usable storage medium having instructions embodied therein that when executed cause a computer system to perform the methods described herein.

Brief Description

As computing power has continued to increase, augmented reality environments have become more complex. Augmented reality has the ability to place an avatar of a second user into the augmented reality environment of a first user.

Overview of Discussion

Example techniques, devices, systems, and methods for communicating with at least one using augmented reality are described herein. Discussion begins with a high level description of augmented reality. Example devices are then discussed. Discussion continues examples projecting augmented reality into the real world. Next, an example viewport 310 is discussed. Lastly, example methods of use are described.

High Level Description of Augmented Reality

Figure 3A:
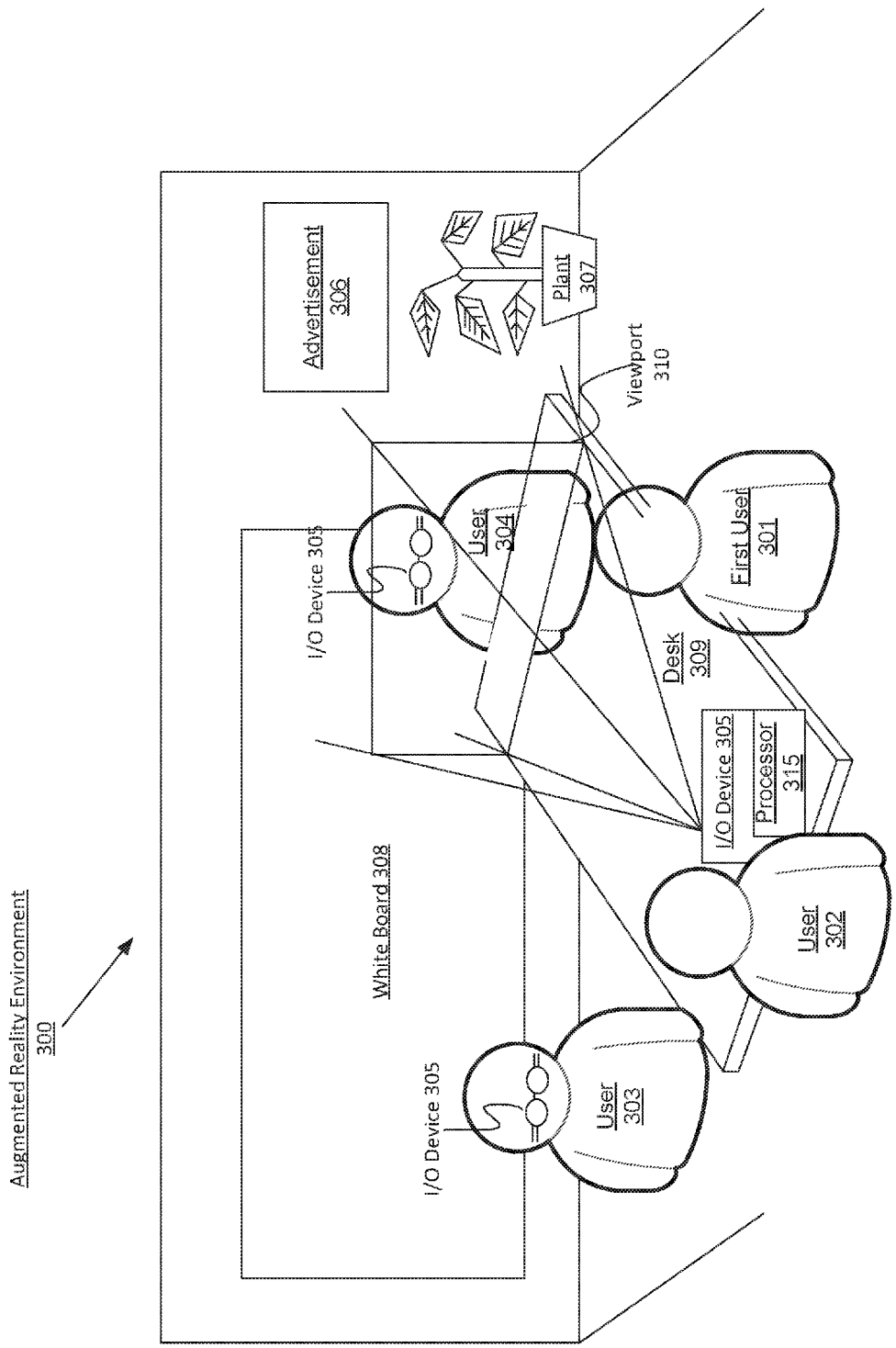
FIG. 3A is an example diagram upon which embodiments of the present invention may be implemented, according to an embodiment.

FIG. 3A shows an augmented reality environment 300. In an embodiment, a first user 301 can communicate with other users 302, 303, and 304 in various augmented reality environments 300. In one embodiment remote users 304 can be projected into the real world. In one embodiment augmented reality environment 300 comprises virtual geography. In an embodiment, virtual geography is a combination of real and non-real objects.

For the purposes of this disclosure, in various embodiments the term "real" refers to, but is not limited to: something tangible (e.g., desks, walls, mountains), something audible (e.g., speech, music, noise), etc. In an embodiment, a digital image created by a processor 315, wherein the image is not in the "real world", is not a real object 309. In an example, the desk shown in augmented reality environment is a real object 309. In other words, local users 301 can physically touch desk 309. In one example, plant 307 may exist only in the augmented reality environment 300, while in another example plant 307 may exist in the real world and the augmented reality environment 300, while in yet a third example, plant 307 may exist in the real world and not in the augmented reality environment 300. In one embodiment, a remote user 304 may write on a white board 308 that exists in the real world, where the writing is visible to local users 301, 302, and 303 when they view the white board 308 with their input/output (I/O) devices 305. Similarly, in some embodiments, local users 301, 302, and 303 can only hear a remote user 304 when using an I/O device 305.

In one example, an advertisement 306 is embedded in the augmented reality environment 300, while the advertisement 306 does not exist in the real world. In an embodiment, advertisement 306 may be targeted to users 301, 302 303, and 304. In other words, in an embodiment, advertisement 306 is not viewable in the real world (e.g., without an I/O device), but is viewable in the augmented reality environment 300, and shows different advertisements based at least in part on user 301, 302, 303 and 304. For example, remote user 304 may be in Japan while accessing augmented reality environment 300 which is based on a real world conference room in California comprising local users 301, 302 and 303. In this example, advertisement 306 may appear to be an advertisement 306 for a Japanese store to the remote user 304 in Japan, but appears to be an advertisement for a store in California to the local users 301, 302 and 303 that are located in California.

While the room in FIG. 1 exists in the real world, it also exists in an augmented reality environment 300. In an example, users 301, 302, and 303 are in the real world, in a real room, surrounding a real desk. Users 301, 302, and 303 use I/O devices 305 to access (e.g., interact with) an augmented reality environment 300. In other words, I/O devices 305 provide local users 301, 302, and 303 or remote users 304 to "enter" the augmented reality environment 300.

In one embodiment, an augmented reality environment 300 provides automated adaptive behavioral responses. For instance, a remote user 304 may be sitting in a chair at home while interacting with the augmented reality environment 300, wherein ideally a user 301, 302, 303, and 304 would be standing. In this example augmented reality environment 300 is operable to make the avatar of remote user 304 stand. In one embodiment, when a first user 301 speaks a different language than a second user 303, augmented reality environment 300 is operable to allow the first user 301 and the second user 302 to speak their respective languages and translates their speech such that the first user 301 hears speech in his designated language while the second user 302 hears speech in his designated language. In one embodiment, augmented reality environment 300 changes the clothes of a user 302.

Example Devices

I/O devices 305 may include, but are not limited to: glasses, ear phones, a microphone, an image capturing device, a tablet computer, a smartphone, a personal digital assistant, a stereoscopic display, an interactive device, a transmedia device, a receiver, a monitor, a touchscreen display, a windshield, stereophonic speakers, a keyboard, a mouse, a joystick, a button, a depth sensor, a motion sensor, a trackball, a speaker, a Microsoft™ Kinect™ type device, an image capturing device or a Microsoft™ Kinect™ type device that can capture 360° of images and/or video, a device that performs operations similar to the cameras on the roofs of "Google™ street view cars", etc. In some embodiments I/O device 305 may comprise a plurality of I/O devices 305. In some embodiments I/O device 305 comprises at least one processor 315. In one device, I/O device 305 is operable to take an image and/or video of the face of a user 301, 302, 303, or 304. In an embodiment, the face is shown on a remote user 304 within augmented reality environment 300 wherein the face is based on an image or video taken by I/O device 305.

In an embodiment, augmented reality environments 300 are stored on a remote device comprising a processor 315 (e.g., a server, a computer, a plurality of electronic devices, etc.). Remote users 304 may "travel" to (e.g., interact with) different augmented reality environments 300 which may be constructed from real objects 309 in real time or otherwise (e.g., a real location in real time). In other words, in an embodiment, a remote user 304 may "visit" (e.g., interact with) a real location in real time.

In an embodiment, an augmented reality environment 300 is created based in part on data received and/or generated from an I/O device 305. For example, an augmented reality environment 300 may be created by an I/O device 305 (e.g., a 360° stereoscopic video and depth capturing device) placed on the roof of a study room. In one embodiment augmented reality environment 300 may be created at least in part on data received by an I/O device 305 such as a camera and/or microphone comprised within a pair of glasses or a tablet computer. In some embodiments, an augmented reality environment 300 is formed based at least in part on the capabilities of I/O devices 305.

In an embodiment, augmented reality environment 300 is comprised of images captured by I/O device 305 and streamed to places including, but not limited to: I/O devices 305 belonging to other users 302 or 303, a cloud computing system, a server, a cluster of computers, etc. In some embodiments, the I/O device 305 is located in places including, but not limited to: the roof of a meeting room, office rooms, street corners, beaches, travel destinations, landmarks, class rooms, college campuses, sporting events, homes, vehicles, etc.

For example, in one embodiment a plurality of users 301, 302, 303, and 304, both remote and local, may meet at an augmented reality environment 300 that appears to be a club. In this example a first user 301, 302, 303, and 304 may interact with a second user 301, 302, 303, and 304 regardless of whether either user 301, 302, 303, and 304 is a remote user 304 or a local user 301.

In other embodiments, users 301, 302, 303, and 304 may interact at locations such as a basketball court, a race track, or a farm. In one embodiment, augmented reality environment 300 is not created by real objects 309 in the real world but is instead completely virtual. In an embodiment, real objects 309 are mapped onto at least one augmented reality environment 300. For example, real objects 309 may be digitized and mapped on an electronically created augmented reality environment 300. In one embodiment, real objects 309 are blended with an augmented reality environment 300. For example, real objects 309 may be digitized and embedded in an augmented reality environment 300. In one embodiment real objects 309 are mapped and blended with at least one augmented reality environment 300.

Projecting Augmented Reality into the Real World

While remote users 304 can view augmented reality environment 300 in real time, remote user 304 may be visible to local users 301, 302, and 303. In an embodiment, local users 301, 302, and 303 may view and hear remote users 304 by using their I/O devices 305. Remote users 304 and local users 301 may appear as avatars. In an embodiment a face is mapped to an avatar.

In one embodiment, local users 301, 302, and 303 may view remote user 304, and/or anything remote user 304 writes on white board 308 through their I/O devices 305. In some embodiments remote user 304 is projected as a three-dimensional hologram or a two-dimensional image such that users 301 not using a viewing augmented reality environment 300 through a handheld I/O device 305 (e.g., glasses, a smartphone, glasses, etc.) may view remote user 304.

In some embodiments, a plurality of remote users 304 may be in a same general "area" (e.g., augmented reality environment). For example, many remote users 304 may meet within an augmented reality environment 300 in front of the white house. Via a processor 315, remote users 304 may see each other through their I/O devices 305 and local users 301, 302, and 303 (e.g., users that are actually in front of the real white house) may see a plurality of remote users 304 walking in front of the white house by using I/O devices 305.

Example Viewport

Figure 3B:
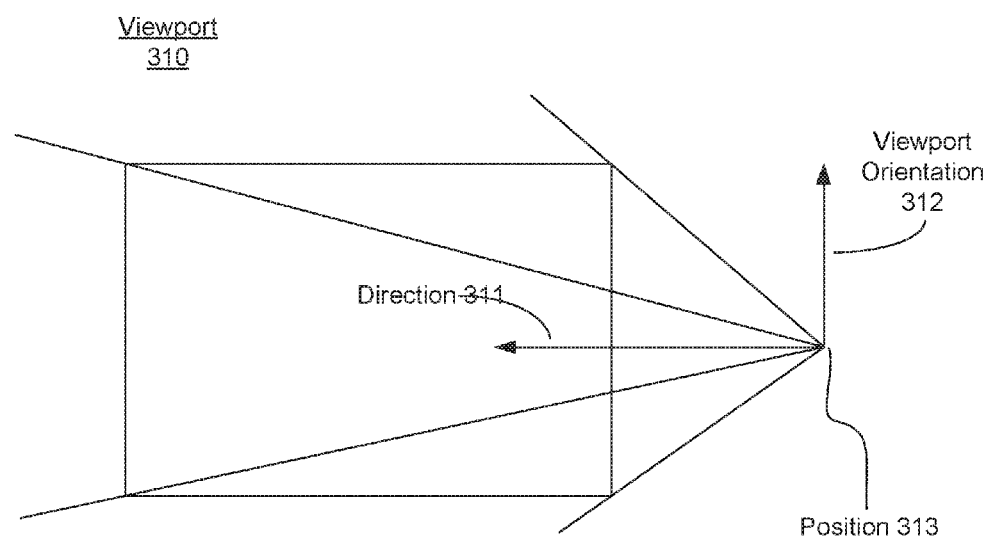
FIG. 3B is an example diagram of a viewport, according to an embodiment.

FIG. 3B shows a viewport 310 comprising a position 313 in space and time, a direction 311, and a viewpoint orientation 312. In one embodiment, a viewport 310 refers to the view that a remote and/or local user 301, 302, 303, and 304 sees. In one embodiment, a viewport 310 is a two-dimensional rectangle comprising a three dimensional scene shot provided by a virtual and/or real image capturing device. In one embodiment, a viewport 310 is based upon data received by an I/O device 305. In an embodiment, a viewport is created by a processor 315.

Figure 3C:
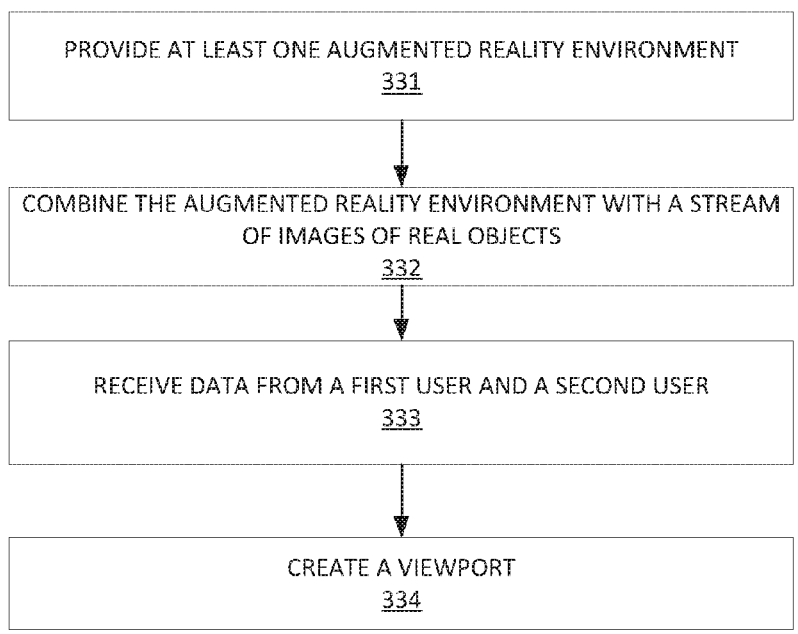
FIG. 3C is an example flowchart of a method communicating with at least one using augmented reality, according to an embodiment.

FIG. 3C is a flow diagram 330 of an example method for communicating with at least one using augmented reality in accordance with embodiments of the present invention.

Example Methods of Use

In operation 331, in one embodiment, at least one augmented reality environment 300 is provided. In an embodiment, augmented reality environment 300 comprises a virtual geography. In an embodiment a virtual geography comprises "real" objects 309 and/or "non-real" objects. In one example, real objects 309 are objects that are tangible or audible. In some embodiments real objects 309 are smellable.

In operation 332, in one embodiment, the augmented reality environment 300 is combined with a stream of images of real objects 309. For example, a stream of images captured by an I/O device 305 may be blended with an augmented reality environment 300. As an example, a "yellow line" may be combined with a video stream of a football game. In an embodiment, the augmented reality environment 300 may appear on a television. In some embodiments, an augmented reality environment 300 may appear on an I/O device 305.

In operation 333, in one embodiment, data is received from a first user 301, 302, 303, 304 and a second user 301, 302, 303, 304. In an embodiment, data is received from I/O devices 305. In some embodiments an I/O device 305 provides a user 301 with access to an augmented reality environment 300. For example, an I/O device 305 may show a user 301 and/or allow a user 301 to interact with an augmented reality environment 300 on a windshield and/or glasses.

In operation 334, in one embodiment, a viewport 310 is created. In one embodiment a viewport comprises a position 313 in space and/or time, a direction 311, and/or a viewpoint orientation 312. In one embodiment a viewport 310 is the display a user 301 sees. In an embodiment processor 315 creates a viewport 310. In another embodiment, augmented reality environment 300 creates viewport 310. In one embodiment, servers and/or I/O devices 305 create viewports 310.

FIG. 3D is a flow diagram 340 of an example method implemented by a system for creating an augmented reality environment 300 in accordance with embodiments of the present invention.

In operation 341, in one embodiment, at least one augmented reality environment 300 is provided. In an embodiment, augmented reality environment 300 comprises a virtual geography. In an embodiment a virtual geography comprises "real" objects 309 and/or "non-real" objects. In one example, real objects 309 are objects that are tangible or audible. In some embodiments real objects 309 are smellable.

In operation 342, in one embodiment, the augmented reality environment 300 is combined with real objects 309 at a processor 315. For example, a plurality of images captured by an I/O device 305 may be blended with an augmented reality environment 300. As an example, a "yellow line" may be combined with a stream of images of a football game. In an embodiment, the augmented reality environment 300 may appear on a television. In some embodiments, an augmented reality environment 300 may appear on an I/O device.

In operation 343, in one embodiment, data is received from a first user 301, 302, 303, 304 and a second user 301, 302, 303, 304. In an embodiment, data is received from I/O devices 305. In some embodiments an I/O device 305 provides a user 301 with access to an augmented reality environment 300. For example, an I/O device 305 may show a user 301 and/or allow a user 301 to interact with an augmented reality environment 300 on a windshield and/or glasses.

In operation 344, in one embodiment, a viewport 310 is created. In one embodiment a viewport comprises a position 313 in space and/or time, a direction 311, and/or a viewpoint orientation 312. In one embodiment a viewport 310 is the display a user 301 sees. In an embodiment processor 315 creates a viewport 310. In another embodiment, augmented reality environment 300 creates viewport 310. In one embodiment, servers and/or I/O devices 305 create viewports 310.

Embodiments of the present technology are thus described. While the present technology has been described in particular examples, it should be appreciated that the present technology should not be construed as limited by such examples, but rather construed according to the claims.

Embodiments for communicating with at least one using augmented reality can be summarized as follows:

1. A method for communicating with at least one using augmented reality, said method comprising:
   providing at least one augmented reality environment;
   combining said augmented reality environment with a stream of images of real objects, wherein said real objects are mapped and blended with said at least one augmented reality environment; and
   receiving data from a first user and a second user, wherein said data is generated by a plurality of input/output (I/O) devices, and wherein said I/O devices provide said first user and said second user with access to said at least one augmented reality environment.
2. The method of claim 1, further comprising:
   creating a viewport, wherein a viewport comprises a position in space and time, a direction, and a viewport orientation.
3. The method of claim 1, wherein said augmented reality environment is projected onto said real objects.
4. The method of claim 1, wherein a said augmented reality comprises at least one advertisement.
5. The method of claim 1, wherein at least one user is physically located at said real objects.
6. The method of claim 1, wherein said augmented reality environment provides automated adaptive behavioral responses.
7. The method of claim 1, wherein said first user and said second user are mapped and blended with said at least one augmented reality environment.
8. The method of claim 1, wherein said augmented reality environment is formed based at least in part on the capabilities of said I/O devices.
9. A computer usable storage medium having instructions embodied therein that when executed cause a computer system to perform a method for creating an augmented reality environment, said method comprising:
   providing at least one augmented reality environment;
   combining, at a processor, said augmented reality environment with real objects; and
   receiving data from a first user and a second user, wherein said data is generated by a plurality of I/O devices, and wherein said I/O devices provide said first user and said second user with access to said at least one augmented reality environment.
10. The method of claim 9, further comprising:
    creating a viewport, wherein a viewport comprises a position in space and time, a direction, and a viewport orientation.
11. The computer usable storage medium of claim 9, wherein said augmented reality environment is projected onto said real objects.
12. The computer usable storage medium of claim 9, wherein at least one user is physically located at said real objects.
13. The computer usable storage medium of claim 9, wherein said augmented reality environment provides automated adaptive behavioral responses.
14. The computer usable storage medium of claim 9, wherein said first user and said second user are mapped and blended with said at least one augmented reality environment.
15. The computer usable storage medium of claim 9, wherein a said augmented reality comprises at least one advertisement.
16. The computer usable storage medium of claim 9, wherein said augmented reality environment is formed based at least in part on the capabilities of said I/O devices.
17. A computer system for implementing augmented reality comprising:
    a plurality of I/O devices;
    a processor, wherein said processor is operable to provide at least one augmented reality environment, combine said augmented reality environment with real objects, and receive data from a first user and a second user, wherein said real objects are mapped and blended with said at least one augmented reality environment, and wherein said I/O devices provide said first user and said second user with access to said at least one augmented reality environment.
18. The computer system of claim 17, wherein said augmented reality environment is projected onto said real objects.
19. The computer system of claim 17, further comprising a viewport, wherein a viewport comprises a position in space and time, a direction, and a viewport orientation.
20. The computer system of claim 17, wherein a said augmented reality comprises at least one advertisement.

Section Four: Self-Architecting Adaptive Network Solution

Notation and Nomenclature

Some portions of the description of embodiments which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present discussions terms such as "accessing", "selecting", "converting, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, in some embodiments, methods described herein can be carried out by a computer-usable storage medium having instructions embodied therein that when executed cause a computer system to perform the methods described herein.

Glossary:

Parametric Transform: A processing component which converts zero or more inputs (when the number of inputs are =0, there is one or more implied or default inputs) into one or more resulting outputs under the direction of zero or more configurable dynamic parameters, one of which said parameters is a Transform Type. Transform Types can include: Digital Logic, Mathematical Formulas (including transfer functions), Digital Adaptive Networks, Analog Adaptive Networks, etc.)

Adaptive Network: a set of adaptive nodes connected by a common medium capable of communicating analog or digital information by some pattern of interconnection between nodes, including (but not limited to): ad hoc wirelessly connected processor based devices, neural networks, the internet, any selected subset of nodes on a connected network, smart sensor arrays, virtual private networks, memristor arrays, virtual or physical processors on virtual or physical networks, routers, distributed connected applications, podcast clients, smart broadcast receivers (e.g., smart TVs), etc.

Neuron: An adaptive network node

Synapse: A connection between nodes with weighting (product)

Network: Encapsulates one or more nodes and connections

Gene: An encoding of an Architectural or Adaptive characteristic

Allele: Encapsulates Genes, manages their recombination during genetic cycles

XformFunction (digital process)

Behavior (wraps either a Network or XformFunction

Organism (encapsulates Behavior): organizes interaction between other organisms, tribes, environment Tribe (encapsulates one or more Organisms)

Ecosystem (encapsulates one or more Tribes)

Environment: Training environment—manages training and design cycles, feedback, etc.

Brief Description

Embodiments enable the provision of recursive modularity, thereby assisting in self-adaptive network processing. Further novel technology found herein provides for a meaningful use and management of the anticipated quantum increase in complexity of practical self-adaptive networks due to the expected quantum increase in performance of dedicated analog neural-network processing hardware afforded by titanium dioxide substrate memristor chips (or competitively disruptive solutions). Additionally, further novel technology found herein creates a bridge from silicon-based digital implementations of embedded and enterprise software solutions to hybrid forms that take full advantage of combined digital and analog processing capabilities.

Overview of Discussion

Example techniques, devices, systems, and methods for providing recursive modularity in adaptive network processing are described herein. Discussion begins with a description of embodiments within the larger system of a self-architecting adaptive network solution. The discussion continues with description of a use case scenario. An example system architecture is then described. Discussion continues with a description of example methods of use.

Furthermore, in some embodiments, methods described herein can be carried out by a computer-usable storage medium having instructions embodied therein that when executed cause a computer system to perform the methods described herein.

Self-Architecting Adaptive Network Solution

A self-architecting adaptive network solution system includes embodiments of the present technology. This system automates the design and training of high-complexity self-adaptive networks comprised of a neural-network processing capability, an automated training environment, multilevel cooperative and competitive models, recursive integration with other networks, digital logic elements, and various parametric transforms regulating dynamic redesign, training and feedback.

Specifically, the novelty about this solution approach is at least the following: (1) self-architecting, self-adapting capability; (2) recursive modularity within the context of both architecture and adaptation; (3) the approach to the reduction of local minima/maxima traps; and (4) the optional use of an adaptive model to optimize training in resource-limited environments.

(1) Self-Architecting, Self-Adapting Capability

Regarding the self-architecting/self-adapting capability, multiple network training cycles to automate both the weighting of network connections and the redesign of the network architecture itself are introduced, including a number of nodes, specific connections between nodes, node thresholds, etc. Further, a unique approach to sexual and asexual reproduction is utilized. Additionally, the parametric redesign utilizes a trained network or parametric transform.

Regarding the asexual regeneration (cloning), there are two cycles, that adaptation cycle (new weighting) and the redesign cycle (new architecture). The adaptation cycle refers to the simple cloning with mutation (transform with mutation rate as input). For example, the xform equals a random mutation. The redesign cycle refers to the cloning with mutation, as per the adaptation cycle, plus adding or removing node(s) and/or connection(s) (additional transform with design parameters and mutation rate as inputs). For example, the xform is random within design parameters.

Regarding the sexual regeneration (recombinant), there are two different types of alleles, identically architected source alleles and differently architected source alleles.

Regarding the identically architected source alleles, there are two types of cycles, the adaptation cycle (new weighting) and the redesign cycle (new architecture). The adaptation cycle for the sexual regeneration uses conventional recombination of source alleles. The redesign cycle for the sexual regeneration uses cloning with mutation (as mentioned above), plus adds or removes node(s) and/or connection(s) (additional mutation parametric transform function with design parameters and mutation rate as inputs). For example, the xform is random within design parameters.

Regarding the differently architected source alleles, there are two types of cycles, also the adaptation cycle (new weighting) and the redesign cycle (new architecture).

There are at least three significant factors to describe regarding the adaptation cycle for the differently architected source alleles: (1) the architecture selection from one parent according to parametric transform; (2) the recombination of nodes and connections with ancestry common to both parents; and (3) the cloning with mutation only for weightings of elements not common to both parents according to values from source elements.

There are at least three significant factors to describe regarding the redesign cycle for the differently architected source alleles: (1) cloning with mutation (as mentioned above), plus adding or removing node(s) and/or connection(s) according to the following rules: (a) for each node not common to ancestry of both parents, parametric transform function determines inclusion; (b) the connections to nodes which map to common ancestry are sustained according to node-contributor-parent architecture; and (c) the initial node contributor parent architecture weightings are preset to parent values if persistent (otherwise according to weighting initialization parametric transform).

(2) Design Modularity

Innovations regarding design modularity include: (a) recursive modularity of system architecture and adaptations; (2) alternation of balance between competitive and cooperative reinforcement in scoring during different phases of a training cycle; and (3) optionally: recursive integration of digital logic with analog matrix processing.

Example Process Using Self-Architecting/Self-Adapting Capability with Designed Modularity The following list nine (A-I) steps that describe an example process for using self-architecting/self-adapting capability with designed modularity.

(A) Specify training environment (input and output training vector generator: implemented as hard-coded model, adaptive model, data map, record, or interactive real-world interactions), scoring criteria, other initial parameters: initial population, network complexity range, etc.

(B) Generate new initial system.

(C) Iterate through the following cycles (training, adaptive, design, regeneration, culling, environmental pressure) synchronously or asynchronously with similar or dissimilar frequencies until desired performance and design targets are met:

(C)(i) During training cycles, test current adaptation of each component and score according to environmental criteria (including appropriateness of outputs to inputs, network complexity targets, etc.).

(C)(ii) During adaptive cycles, create new adaptations (weighting matrices).

(C)(iii) During Design cycles, create new architecture forms. (Add and/or subtract nodes and connections.)

(C)(iv) During regeneration cycles, in conjunction with adaptive and design cycles, increase population according to transform based on targets using regeneration algorithm.

(C)(v) During culling cycles, reduce population according to transform based on targets.

(C)(vi) During environmental pressure cycles, change scoring criteria inputs to transform.

(D) Repeat steps A, B, and C for each of the desired number of low-level solutions, varying criteria as needed or until goals met or optimizations stabilize.

(E) Aggregate separate solutions into single multi-functional solution by fusing inputs and outputs of interfaces to other entities.

(F) Refine new solution (i.e. repeat steps A, C, and D as needed, or until goals met or optimizations stabilize).

(G) Recursively iterate above (i.e. repeat steps A-F as needed, or until goals met or optimizations stabilize).

(H) Above seven steps (A-G) may, by original specification, recursively embed any number of digital transforms in lieu of actual networks. If so, to run on specialized co-processing architecture (i.e. separate digital and analog processors), additional steps must be taken at some point during or after the training cycle, but before deployment to multiprocessing target:

(H)(i) Separate processing structures (e.g. queues, caches, FIFOs, etc.) for digital transforms and analog transforms (optimized networks).

(H)(ii) Deploy Cycle Synchronization Agent to production to correlate digital and analog inputs and outputs to common logical cycles between the two processing structures using load balancing, throttling, semaphores, or combined and/or other approaches.

Note: The above steps (A-H) can optionally be applied to an adaptive-model-based training environment, if used.

(I) Additional training, architecting, and refinement can commence as above once deployed to production (using real-world interactions as training vectors), but zero-downtime-tolerance and zero-defect-tolerance systems are best effected by the following steps:

(I)(i) Allocation of necessary processing resources to train independent adaptive model and primary adaptive system.

(I)(ii) Applying real-world training interaction as training vectors to adaptive model (including some hysteresis of training vectors from prior adaptation of model).

(I)(ii) Cloning production adaptive behavior system and moving clone to allocated off-line processing.

(I)(iii) Extensive generational training cycles against adaptive model, according to steps A-G.

(I)(iv) After Q/A, replacement of previous system with resultant system.

Note: overlapping the automated design and the training cycles presents special case problems for recombination of adaptive (weighting) characteristics between differently-architected networks. By definition, this does not apply to asexual regeneration (see below), as cloning involves only one architecture.

Reduction of Local Minima/Maxima Traps

The concept of the reduction of local minima/maxima traps can be divided into two ideas: (a) the intentional inconsistency in scoring, design, weighting and feedback algorithms; and (b) the automated re-architecting during or between feedback training cycles also reducing minima/maxima traps.

Regarding the Intentional inconsistency in the scoring, design, weighting and feedback algorithms, during the culling cycle, for example, rather than the simple removal of the lowest performing elements of the system, a parametric transform will inject intentional inconsistency into the selection process. A simple example transform which interjects inconsistency while reducing a population approximately by N %

(a given rate) uses pseudo-random numbers to randomly cull elements scoring in the lower 50%:

```
\ cull(float rate, Set<PopulationElement> population) {
  for each element in population below median index sorted by
  element.performance {
    if (xform(element)) { cull(element); }
  } }
  ///--------------------------------
  boolean xform(Element element) { return(random(1) <
    (element.environment.cullRate*2)) }
```

Regarding the automated re-architecting during or between feedback training cycles also reducing minima/maxima traps, the setting design cycle frequency of greater than 0 in environment initialization causes interleaving of architecture changes with the training, scoring, regeneration, and culling cycles.

The Use of an Adaptive Model to Optimize Training in Resource-Limited Environments.

The techniques (noted above and described, overall, as the adaptive model) associated with the self-architecting/self-adaptive capability, the design modularity, and the reduction of the local minima/maxima traps, are used to optimize the learning and behavior adaptation to environments that include human interaction or other resource constraints. The following list is an outline of the general steps that are taken in using the adaptive model: (A) Break problem into component parts. One example of breaking a problem into component parts is the example scenario of a combat game automaton training. The overall problem is to survive the combat simulation with multiple combatants using maneuvers and firing solutions dictated by simulation parameters. An example component problem breakdown is as follows: (i) Firing solutions optimization: (a) recognize other combatant's maneuver patterns; (b) predict competitor's position; (c) compensate ballistic firing solution for physics simulation (i.e. muzzle velocity, windage, ballistic coefficient, gravity, etc.); and (d) balance firing rate with gun barrel temperature; (b) evasive maneuvers: high-frequency component of movement pattern generation to minimize hit-rate from enemy fire; and (c) strategic positioning: low-frequency component of movement pattern generation to maximize overall success rate.

A second example of breaking a problem into component parts involves the scenario of an interactive advertising agent component training example. The overall problem is to maximize advertising engagement relative to initial content viewership 9 e.g., balancing ratings vs. click-throughs). An example component problem breakdown is as follows: (a) special effects and highlighting (how to attract attention); (b) verbalizations (when to say what); (c) movement (how to position for perceived context and availability); and (d) request recognition (e.g., vocal, verbal, pointer cues). In this example, the training environment best includes progressive feedback from any of, but not limited to, the following: marketing professionals; focus groups; beta-testers; consumers; and adaptive models. The training and architecture cycles extend through production deployment and the entire product lifecycle.

(B) Construct training environment and scoring of component performance with competitive bias.

(C) Grow ecosystem of self-architected component solutions through multiple generations.

(D) Train until element performance stabilizes within goals.

(E) Switch scoring bias from competitive to cooperative.

(F) Train until overall optimization stabilizes within goals.

(G) Convert top performing aggregates to elements (fusing I/O integration points into Nodes & Connections).

(H) Switch training environment scoring bias back to competitive.

(I) Clone a significant population of a variety of new elements.

Repeat steps A-I until solution performs according to specifications.

The following is a discussion regarding step G above, the converting of top performing aggregates to elements, and the recursive modularity of the system architecture and adaptations. The description assumes that steps A-F have been performed, in that the scoring bias from competitive to cooperative has been switches, and the objects have been trained such that their behavior falls within certain objectives for the objects.

As will be seen, the conversion process described below adds much flexibility to the overall adaptive network solution. In the following example, we use the behavior of puppies to describe the method step G. Therefore, it is assumed that a set of puppies is part of a pack of puppies and that those puppies have been trained to bark and wag in unison (or in some other acceptable pattern). There may be more than one pack of puppies, wherein the puppies in each pack have been trained to bark and wag in unison with the other puppies located within the same pack.

Of note, each pack itself is attached to the environment. In this example, there are 3 packs. The first pack of puppies has two puppies within it. The second pack of puppies has zero puppies within it. The third pack of puppies has four puppies in it. The first pack and the third pack of puppies are competing against each other. In this case, if the first pack of puppies barks and wags their tails better than the third pack of puppies, then the first pack wins. Thus, in embodiments, the third pack is eliminated. The best performing pack, the first pack, survives and is considered optimized. The first pack is considered to have been trained the best because the first pack meets expectations and stabilized results. As will be described below, this surviving pack, converted into a dog (e.g., puppies performing in unison) is the first resultant element.

Of note, during the training process (teaching the puppies to wag and bark in unison), test vectors are used to determine the training progress (how close the performance comes to meeting desired results). Test vectors are load inputs and outputs that strain to the environment to deal with stimulus and prepare a response. The inputs are paired with a predetermined set of expected outputs to define the test vector, of a set of test vectors (wherein the "set" can include one or more test vectors). In one embodiment, these test vectors are stored in a location that is accessible by embodiments.

Further, as the puppies within the pack are being trained, the behavior of the puppies is being shaped—the puppies' behavior is changing to adapt to the training.

Once the puppies are trained to perform in unison, then these puppies are converted to being a dog ("dog A") (that is attached to the environment), which is the first resultant element.

Eventually, after the dog A and other dogs that are attached to the environment are trained to behave in unison, those dogs that are attached to the environment but cannot perform acceptably are eliminated. This group of dogs (not including the dogs that were eliminated), once trained, is then converted into a single bigger dog, or a second resultant element. This process of conversion of smaller units into a single larger unit, and then taking singular larger units (that had been converted from smaller units) and converting these to a single larger unit, is repeated until an overall pre-define objective is met.

In some embodiments, in some cases, this progressive refinement does not necessarily lead to larger, more complex units, especially when the design cycle (aka self-architecting cycle) is biased to reduction-refinement in favor of lower node counts.

Regarding the first pack of puppies that had the two puppies within, puppy one is a network and has ten neurons in his head and puppy two has sixteen neurons in his head. The first pack has three connections to the environment. Once puppy one and puppy two have become a dog, according to an embodiment, the resultant element, the dog, will be one network and will have twenty six neurons in its head, with six connections to the environment.

An example reduction refinement embodiment goal-seeks in an attempt to retain the behavior while reducing neuron/node count to lowest possible value (example: perhaps 15).

This process repeats itself, thereby creating many levels of puppy and dog encapsulation. Of note, while in one embodiment, the network is an adaptive network, in another embodiment, the network is a neural network. The connection between nodes within a neural network is called a synapse, and what is the adaptive network node in an adaptive network is the neuron in a neural network. The network is the puppy brain. The genes and alleles relate to how the genetic algorithm is or is not recombined.

As will be described below, the supervisory element 410 coordinates the interaction between the packs and the dogs and their continuous learning (e.g., training and adapting).

Thus, the embodiments enable the conversion of a super structure into a substructure, the parts of which are integrated with other substructures of other superstructures, to arrive at a fully trained (optimized) structure including some or all of the now trained super structure.

Example aspects of the substructures and superstructures that are subject to re-architecting element by element, unless dictated by system parametric transform, are, but are not limited to being, the following: connection rate; connection geometry; mutation rate; trait dominance; adaptive persistence (replication of weights during adaptive response cycle); node count; connection ratio; environmental performance; and competitive vs. cooperative.

Network training cycles can be synchronous, harmonic (nested), or entirely asynchronous. An example of a harmonic network training cycle is when a training and adaptive cycle is nested within a design cycle. Network training cycles include the following: training (feed inputs to nodes and record and score outputs); adaptive (primary adaptive learning cycle-modifies weights of connections [products of sums]; design (including changes to number of nodes, specific connections between nodes, node thresholds, damping etc.); regeneration (can be modulated with culling cycle by environmental pressure cycle to introduce population expansion/contraction dynamics); culling (can be modulated with regeneration cycle by environmental pressure cycle to introduce population expansion/contraction dynamics); and environmental pressure (manage oscillations between criteria variation: collaborative vs. competitive pressures, expansion vs. contraction, etc.).

Design modularity may be implemented in at least the following ways: recursive modularity of system architecture and adaptations; solutions to problems relevant to one level of detail can be automatically combined to provide higher level solutions to multiple problems with a virtually unlimited number of recursively modular levels; alternation of balance between competitive and cooperative reinforcement in scoring during different phases of training cycle; and optionally, recursive integration of digital logic with analog matrix processing.

Example System Architecture

Figure 4A:
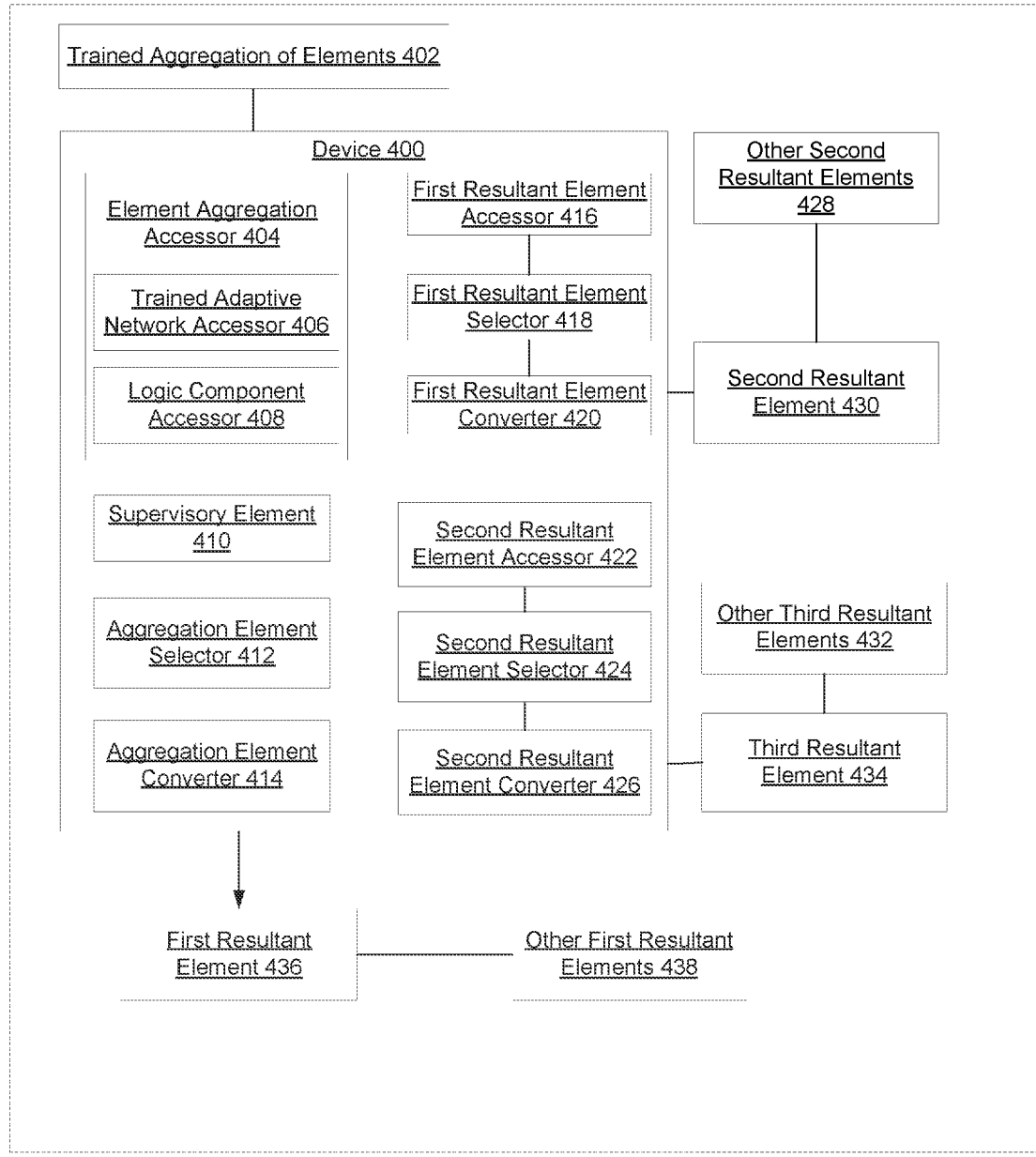
FIG. 4A is a block diagram of a system for providing recursive modularity in adaptive network processing, according to an embodiment.

FIG. 4A shows a device 400 for providing recursive modularity in adaptive network processing, in accordance with an embodiment. Device 400 includes, coupled with a processor: an element aggregation accessor 404; an aggregation element selector 412; and an aggregation element converter 414. Optionally, various embodiments include: a supervisory element 410; a first resultant element accessor 416; a first resultant element selector 418; a first resultant element converter 420; a second resultant element accessor 422; a second resultant element selector 424; and a second resultant element converter 426.

In one embodiment, the element aggregation accessor 404 accesses at least one trained aggregation of elements 402 that is coupled with an environment 439, wherein each trained aggregation of elements of the at least one trained aggregation of elements 402 includes a set of trained elements and is stabilized within a set of objectives. As described above, the set of trained elements are the result of steps A through G, within the process of using an adaptive model to optimize training in resource-limited environments. Of note, the "set" of the set of trained elements may be one or more trained elements. The set of objectives are the expectations desired to be fulfilled for a set of elements. Once the expectations for the set of elements are met, then the set of elements are considered to be trained, and thus "optimized". Of note, the "set" of the set of objectives may be one or more objectives.

Thus, in reference to the example given above regarding the puppies, the at least one trained aggregation of elements are the two puppies in the first pack. The two puppies are trained and are stabilized with a set of objectives. For example, the two trained puppies are wagging and barking in unison (the objective) and are thus stabilized after meeting the set of objectives.

In various embodiments, the element aggregation accessor 404 includes: a trained adaptive network accessor 406; and a logic component accessor 408. The trained adaptive network accessor 406 accesses at least one trained adaptive network. The logic component accessor 408 accesses at least one logic component.

The aggregation element selector 412 selects at least one of the at least one trained aggregation of elements that meets a first performance threshold. The first performance threshold is a predetermined value that is met or exceeded by the one or more of the at least one trained aggregation of elements 402. A predetermined value refers to quantified behavior. In one embodiment, the behavior of just one of the trained aggregation of elements exceeds the predetermined quantified behavior. However, in another embodiment, the quantified behavior of more than one of the trained aggregation of elements exceed the predetermined quantified behavior. Thus, the aggregation element selector 412 selects the aggregation(s) of elements that, according to a predetermined rule, statistically tends to better meet and/or exceed the predetermined quantified behavior, as per a pre-specified parametric transform (e.g. randomization agent). With reference to the puppy example scenario described above, the first performance threshold is the barking and the tail wagging in unison. Those aggregations of elements, the puppies, which back and wag their tail in unison within a certain range of error (the first performance threshold) are then selected.

The aggregation element converter 414 converts the selected at least one trained aggregation of elements to an element status to achieve a converted at least one trained aggregation of elements, such that each of the converted at least one trained aggregation of elements becomes a first resultant element 436 that competes with other first resultant elements 438. The element status is a determination of the converted trained aggregation of elements, whether it is first resultant element 436, a second resultant element, a third resultant element, and so on. Thus, and with reference to the puppy scenario described above, the element status of the at least one trained aggregation of puppies (the two puppies) is that of a resultant element. This first resultant element 436 will then compete with other first resultant elements. The other first resultant elements 436 refer to other trained aggregation of elements that have also met a first performance threshold and have been converted to being an element status equal to the first resultant element 436.

The supervisory element 410 continuously coordinates interactions associated with learning between at least one of the at least one trained aggregation of elements 402 and an external interface to the environment 439.

The first resultant element accessor 416 accesses at least one trained first resultant element 436 that is coupled with the environment 439. Each trained first resultant element of the at least one trained first resultant element 436 includes a set of trained aggregation of elements and is stabilized within a second set of objectives. In other words, the first resultant element accessor 416 is repeating much of the functioning of the element aggregation accessor 404, with a few exceptions. The first resultant element accessor 416 is accessing the combined result—the resultant element—of the functioning of the element aggregation accessor 404, the aggregation element selector 412, and the aggregation element converter 414. The second set of objectives is just a set of objectives that is separate from the first set of objectives. In one embodiment the first and the second set of objectives are the same, while in another embodiment, the first and the second set of objectives are different. With reference to the puppy scenario described herein, the first resultant element accessor 416 accesses the at least one trained first resultant element 436, the first pack with the two trained puppies (the first resultant element) or any of the other trained first resultant elements that had been selected and converted by the aggregation element selector 412 and the aggregation element converter 414. In this scenario, there are only two packs of puppies left, as the second pack was eliminated from the selection process in the first round because it did not meet the first performance threshold. Thus, the first and the third pack (having four puppies) are accessed.

The first resultant element selector 418 selects at least one of the at least one trained first resultant elements 436 that meets a second performance threshold. The second performance threshold is just a performance threshold that is separate from the first performance threshold. In one embodiment, the second performance threshold is the same as the first performance threshold. In another embodiment, the second performance threshold is different from the first performance threshold. With reference to the puppy scenario, both the first pack and the third pack (both resultant elements) meet and/or exceed the second performance threshold. For example, both packs are sitting upon command and in unison, which is required to exceed the second performance threshold.

The first resultant element converter 420 converts the selected at least one trained first resultant element to a second element status to achieve a converted one or more trained first resultant element, such that the converted at least one trained first resultant element becomes a second resultant element 430 that competes with other second resultant elements 428.

Thus, with reference to the puppy scenario, the combination of the first pack and the third pack become the second resultant element 430.

The second resultant element accessor 422 functions in a manner similar to that of the first resultant element accessor 416. The second resultant element accessor 422 accesses at least one trained second resultant element that is coupled with the environment 439, wherein each trained second resultant element of said at least one trained second resultant element includes a set of trained first resultant elements and is stabilized within a third set of objectives. Of note, the "set" of the set of trained first resultant elements may be one or more of the trained first resultant elements. Further, the third set of objectives is just objectives that are separate from the first and second set of objectives. The third set of objectives may be the same or different than the first set and/or the second set of objectives.

The second resultant element selector 424 functions in a manner similar to that of the first resultant element selector 418. The second resultant element selector 424 selects at least one of the at least one trained second resultant element 430 that meets a third performance threshold. The third performance threshold is just a performance threshold that is separate from the first and the second performance thresholds. However, in various embodiments, the third performance threshold may be the same or different from either the first and the second performance threshold.

The second resultant element converter 426 functions in a manner similar to that of the first resultant element converter 420. The second resultant element converter 426 converts the selected at least one trained second resultant element to a third element status to achieve a converted at least one trained second resultant element, such that the converted at least one trained second resultant element becomes a third resultant element 434 that competes with other third resultant elements 432.

Example Methods of Use

FIG. 4B is a flow diagram 440 of an example method for providing recursive modularity in adaptive network processing.

In operation 442, in one embodiment and as described herein, at least one trained aggregation of elements 402 that is coupled with an environment 439 is accessed, wherein each trained aggregation of elements of the at least one trained aggregation of elements 402 includes a set of trained elements and is stabilized within a set of objectives. In various embodiments, the accessing of operation 442 includes the accessing of at least one trained adaptive network and the accessing of at least one logic component. In one embodiment, the accessing of the at least one logic component includes the accessing of at least one digital logic component and/or the accessing of at least one analogue logic component.

In one embodiment, the accessing of at least one logic component includes accessing at least one logic component that is dynamically alterable.

In one embodiment, the accessing of operation 442 includes, accessing at least one trained aggregation of elements 402 that is coupled with the environment 439, wherein each trained aggregation of elements of said at least one trained aggregation of elements 402 includes a set of trained elements and is stabilized within a set of objectives, wherein the first resultant element includes a supervisory element 410 configured for continuously coordinating interactions associated with learning between at least one of the at least one trained aggregation of elements 402 and the at least one trained aggregation of elements 402 and an external interface to the environment 439.

In operation 444, in one embodiment and as described herein, at least one of the at least one trained aggregation of elements 402 that meets a first performance threshold is selected.

In operation 446, in one embodiment and as described herein, the selected at least one trained aggregation of elements is converted to an element status to achieve a converted at least one trained aggregation of elements 436, such that each of the converted at least one trained aggregation of elements 436 becomes a first resultant element that competes with other first resultant elements 438.

In operation 448, in one embodiment and as described herein, at least one trained second resultant element that is coupled with the environment 439, wherein each trained second resultant element of the at least one trained second resultant element includes a set of trained resultant elements and is stabilized within a third set of objectives. At least one of the at least one trained second resultant element that meets a third performance threshold is selected. The selected at least one trained second resultant element is converted to a third element status to achieve a converted at least one trained second resultant element, such that the converted at least one trained second resultant elements becomes a third resultant element that competes with other third resultant elements.

Embodiments for providing recursive modularity in adaptive network processing are thus described. While the present technology has been described in particular examples, it should be appreciated that the present technology should not be construed as limited by such examples, but rather construed according to the claims.

Various embodiments include the recursive use of the described aggregation conversion algorithm in problem solving in combination with some or all of the following approaches:

Multiple network refinement cycles, which can be synchronous, harmonic (aka "nested"), or asynchronous, comprised of one or more of the following: training cycles (where nodes are fed inputs and outputs scored against goal criteria); adaptive cycles (where weights of connections are modified to improve prospect of future scoring); design cycles (where different network architectures are generated to improve the prospect of more efficient adaptations as measured by adaptive cycle response, including changes to network node counts and connection counts and ratios, in addition to the map of specific connections); regeneration cycles (where elements are replicated according to one or more regeneration algorithms to provide an improved quality of diversity, as measured by scoring against cooperative or competitive goals); culling cycles (where element count is reduced according to a statistical model to restrain runaway complexity); environmental cycles (manages oscillations between criteria variation (e.g. collaborative vs. competitive scoring bias, element population expansion vs. contraction bias, relative design scoring between element node complexity vs. other scoring factors, etc.).

The regeneration and culling cycles can be modulated to introduce population expansion and contraction dynamics into the competitive and cooperative scoring approach, which can accelerate adaptation. Specific regeneration and culling activities can be governed by one or more parametric transforms, according to the algorithms used. A simple example of a useful parametric transform for culling is a random (or pseudo-random) function within a range of values to introduce population reduction based on statistical probability. The following pseudo code represents logic that introduces some variation in performing an element population reduction by a given cull rate:

```
cull(float rate, Set<PopulationElement> population) {
for each element in population below median index sorted by
element.performance {
if (xform(element)) { cull(element); }
} }
// ---------------------------------
boolean xform(Element element) { return(random(1) <
(element.environment.getCullRate( )*2)) }
```

Such an approach helps to minimize local minima/maxima traps.

Various embodiments address the issue of recombinant regeneration (aka sexual reproduction) between dissimilar architectures during the regeneration cycle by the following method: 1) Cloning with mutation (aka asexual reproduction) as indicated by statistical parametric transform (e.g. pseudo-random go/no go based on mutation rate); and 2) Mutation process adds or removes nodes and or connections according to the following rules: for each node not common to ancestry of both parents, an additional parametric transform determines inclusion of node; connections to nodes which map to common ancestry are sustained according to node-contributor-parent architecture; initial node contributor parent architecture weightings are then preset to parent values if persistent (persistence can itself be an inheritable trait); if not persistent, weightings are set according to a weighting initialization parametric transform.

Various embodiments address the issue of recombinant regeneration (aka sexual reproduction) between dissimilar architectures during the adaptation cycle by the following method: Architecture selection from one parent according to a selection parametric transform; Recombination of nodes and connections with ancestry common to both parents; Cloning with mutation only (aka asexual reproduction) for determination of weightings of elements not common to both parents according to values from source ancestor element.

Various embodiments further organize the recursively embedded logic elements and network elements into separate distributed processing structures (e.g. queue, cache, etc.) based on the target processor for each element's response processing (during some combination of the various cycles), and manage the processing structures with a synchronization agent, to ensure that like cycle's interfaces match each to the other using one or more of the following approaches: load balancing, throttling, semaphores, other methods.

At least one embodiment uses this approach to efficiently couple a dedicated titanium dioxide based analog coprocessor to a traditional digital Von Neuman silicon dioxide based processor.

At least one embodiment uses the synchronization agent management of recursively embedded logic elements and network elements to distribute processing across a wide network of connected devices (such as a smart-device sensor array, or a population of concurrent mobile device app users) to partition and concurrently solve problems across all device nodes.

Various embodiments simulate neural network analog processing on digital processor based devices.

Various embodiments include at least one of the following characteristics as part of the genetic code sequence for regeneration: connection rate (the rate at which an individual node tends to connect to other nodes); connection geometry; mutation rate; trait dominance; adaptive persistence (the reuse of connection weightings on regeneration cycles); node count (the number of nodes); connection ratio (aka synaptic ratio, the overall ratio of connections to nodes); environmental performance; node thresholds; and competitive vs. cooperative bias (used in conjunction with similar bias from environment).

Various embodiments use one or more of the following approaches: managing environmental feedback and dynamic parameters supplied to parametric transforms with trained adaptive networks; Replacing the parametric transforms with direct output from trained adaptive networks. The result of combinations of these approaches is to train adaptive networks to train adaptive networks.

Various embodiments use adaptive models (instead of static test vectors or real-world interactions) for continuation training. Such an approach is particularly useful when considerable adaptation is desired based on relatively little real-world data interaction (e.g. training against a single consumer's response to a limited set of stimuli, vs. against an entire audience with multiple instantiations).

Various embodiments iterate through one or more of the following problem-solving steps (sometimes recursively), using fully-automated or semi-automated interactive tools: Problem Decomposition; Training Environment Specification; System Initialization; Cycle Iteration; Training Goal(s) Stabilization Analysis; Scoring Bias Adjustment; Element Aggregation; Refinement; Processing Structure Separation; Deployment; Real-World Training (production); Off-line Training Cycles ("sleep cycles", once deployed).

Embodiments for providing recursive modularity in adaptive network processing can be summarized as follows:

1. A computer usable storage medium having instructions embodied therein that when executed cause a computer system to perform a method for providing recursive modularity in adaptive network processing, said method comprising:
    accessing, by a processor, at least one trained aggregation of elements that is coupled with an environment, wherein each trained aggregation of elements of said at least one trained aggregation of elements comprises a set of trained elements and is stabilized within a set of objectives;
    selecting, by said processor, at least one of said at least one trained aggregation of elements that meets a first performance threshold;
    converting, by said processor, selected at least one trained aggregation of elements to an element status to achieve a converted at least one trained aggregation of elements, such that each of said converted at least one trained aggregation of elements becomes a first resultant element that competes with other first resultant elements.
2. The computer usable storage medium of claim 1, wherein said accessing at least one trained aggregation of elements comprises:
    accessing at least one trained adaptive network.
3. The computer usable storage medium of claim 1, wherein said accessing at least one trained aggregation of elements comprises:
    accessing at least one logic component.
4. The computer usable storage medium of claim 3, wherein said accessing at least one trained aggregation of elements comprises:
    accessing at least one digital logic component.
5. The computer usable storage medium of claim 3, wherein said accessing at least one trained aggregation of elements comprises:
    accessing at least one analogue logic component.
6. The computer usable storage medium of claim 1, wherein said accessing at least one trained aggregation of elements comprises:
    accessing at least one logic component, wherein said at least one logic component is dynamically alterable.
7. The computer usable storage medium of claim 1, wherein said accessing at least one trained aggregation of elements that is coupled with an environment comprises:
    accessing at least one trained aggregation of elements that is coupled with an environment, wherein each trained aggregation of elements of said at least one trained aggregation of elements comprises a set of trained elements and is stabilized within a set of objectives, wherein said first resultant element comprises a supervisory element configured for continuously coordinating interactions associated with learning between at least one of said at least one trained aggregation of elements and said at least one trained aggregation of elements and an external interface to said environment.
8. The computer usable storage medium of claim 1, further comprising:
    accessing, by said processor, at least one trained first resultant element that is coupled with said environment, wherein each trained first resultant element of said at least one trained first resultant element comprises a set of trained aggregation of elements and is stabilized within a second set of objectives;
    selecting, by said processor, at least one of said at least one trained first resultant elements that meet a second performance threshold;
    converting, by said processor, selected at least one trained first resultant elements to a second element status to achieve a converted one or more trained first resultant element, such that said converted at least one trained first resultant element becomes a second resultant element that competes with other second resultant elements.
9. The method of claim 8, further comprising:
    accessing, by said processor, at least one trained second resultant element that is coupled with said environment, wherein each trained second resultant element of said at least one trained second resultant element comprises a set of trained resultant elements and is stabilized within a third set of objectives;
    selecting, by said processor, at least one of said at least one trained second resultant element that meets a third performance threshold;
    converting, by said processor, selected at least one trained second resultant element to a third element status to achieve a converted at least one trained second resultant element, such that said converted at least one trained second resultant elements becomes a third resultant element that competes with other third resultant elements.
10. A device for providing recursive modularity in adaptive network processing, said device comprising:
    an element aggregation accessor coupled with a processor, said element aggregation accessor configured for accessing at least one trained aggregation of elements that is coupled with an environment, wherein each trained aggregation of elements of said at least one trained aggregation of elements comprises a set of trained elements and is stabilized within a set of objectives;
    an aggregation element selector coupled with said processor, said aggregation element selector configured for selecting at least one of said at least one trained aggregation of elements that meets a first performance threshold;
    an aggregation element converter coupled with said processor, said aggregation element converter configured for converting selected at least one trained aggregation of elements to an element status to achieve a converted at least one trained aggregation of elements, such that each of said converted at least one trained aggregation of elements becomes a first resultant element that competes with other first resultant elements.

11. The device of claim 10, wherein said element aggregation accessor comprises:
a trained adaptive network accessor configured for accessing at least one trained adaptive network.

12. The device of claim 10, wherein said element aggregation accessor comprises:
a logic component accessor configured for accessing at least one logic component.

13. The device of claim 10, further comprising:
a supervisory element coupled with said processor, said supervisory element configured for continuously coordinating interactions associated with learning between at least one of said at least one trained aggregation of elements and at said at least one trained aggregation of elements and an external interface to said environment.

14. The device of claim 10, further comprising:
a first resultant element accessor coupled with said processor, said first resultant element accessor configured for accessing at least one trained first resultant element that is coupled with said environment, wherein each trained first resultant element of said at least one trained first resultant element comprises a set of trained aggregation of elements and is stabilized within a second set of objectives;
a first resultant element selector coupled with said processor, said first resultant element selector configured for selecting at least one of said at least one trained first resultant elements that meets a second performance threshold;
a first resultant element converter coupled with said processor, said first resultant element converter configured for converting selected at least one trained first resultant elements to a second element status to achieve a converted one or more trained first resultant element, such that said converted at least one trained first resultant element becomes a second resultant element that competes with other second resultant elements.

15. The device of claim 14, further comprising:
a second resultant element accessor coupled with said processor, said second resultant element accessor configured for accessing at least one trained second resultant element that is coupled with said environment, wherein each trained second resultant element of said at least one trained second resultant element comprises a set of trained first resultant elements and is stabilized within a third set of objectives;
a second resultant element selector coupled with said processor, said second resultant element selector configured for selecting at least one of said at least one trained second resultant element that meets a third performance threshold;
a second resultant element converter coupled with said processor, said second resultant element converter configured for converting selected at least one trained second resultant element to a third element status to achieve a converted at least one trained second resultant element, such that said converted at least one trained second resultant element becomes a third resultant element that competes with other third resultant elements.

16. A method for providing recursive modularity in adaptive network processing, said method comprising:
accessing at least one trained aggregation of elements that is coupled with an environment, wherein each trained aggregation of elements of said at least one trained aggregation of elements comprises a set of trained elements and is stabilized within a set of objectives;
selecting at least one of said at least one trained aggregation of elements that meets a first performance threshold;
converting selected at least one trained aggregation of elements to an element status to achieve a converted at least one trained aggregation of elements, such that each of said converted at least one trained aggregation of elements becomes a first resultant element that competes with other first resultant elements.

17. The method of claim 16, wherein said accessing at least one trained aggregation of elements comprises:
accessing at least one logic component, wherein said at least one logic component is dynamically alterable.

18. The method of claim 16, wherein said accessing at least one trained aggregation of elements that is coupled with an environment comprises:
accessing at least one trained aggregation of elements that is coupled with an environment, wherein each trained aggregation of elements of said at least one trained aggregation of elements comprises a set of trained elements and is stabilized within a set of objectives, wherein said first resultant element comprises a supervisory element configured for continuously coordinating interactions associated with learning between at least one of said at least one trained aggregation of elements and said at least one trained aggregation of elements and an external interface to said environment.

19. The method of claim 16, further comprising:
accessing at least one trained first resultant element that is coupled with said environment, wherein each trained first resultant element of said at least one trained first resultant element comprises a set of trained aggregation of elements and is stabilized within a second set of objectives;
selecting at least one of said at least one trained first resultant elements that meet a second performance threshold;
converting selected at least one trained first resultant elements to a second element status to achieve a converted one or more trained first resultant element, such that said converted at least one trained first resultant element becomes a second resultant element that competes with other second resultant elements.

20. The method of claim 19, further comprising:
accessing at least one trained second resultant element that is coupled with said environment, wherein each trained second resultant element of said at least one trained second resultant element comprises a set of trained resultant elements and is stabilized within a third set of objectives;
selecting at least one of said at least one trained second resultant element that meets a third performance threshold;
converting selected at least one trained second resultant element to a third element status to achieve a converted at least one trained second resultant element, such that said converted at least one trained second resultant elements becomes a third resultant element that competes with other third resultant elements.

Section Five: Navigation Through Augmented Reality
Notation and Nomenclature

Some portions of the description of embodiments which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present discussions terms such as "generating", "receiving", "comparing", "advancing", "using", "enabling", "providing", "locating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, in some embodiments, methods described herein can be carried out by a computer-usable storage medium having instructions embodied therein that when executed cause a computer system to perform the methods described herein.

Brief Description

Embodiments enable the navigation through concurrent models of reality, in conjunction with viewpoint, orientation through space and time, and other factors, in order to represent the meaning and context of user interaction with others and presentations.

Overview of Discussion

Example techniques, devices, systems, and methods for navigating concurrently and from point-to-point through multiple reality models are described herein. Discussion begins with example use case scenarios. An example system architecture is then described. Discussion continues with a description of example methods of use.

Use Case Scenarios

Figure 5A:
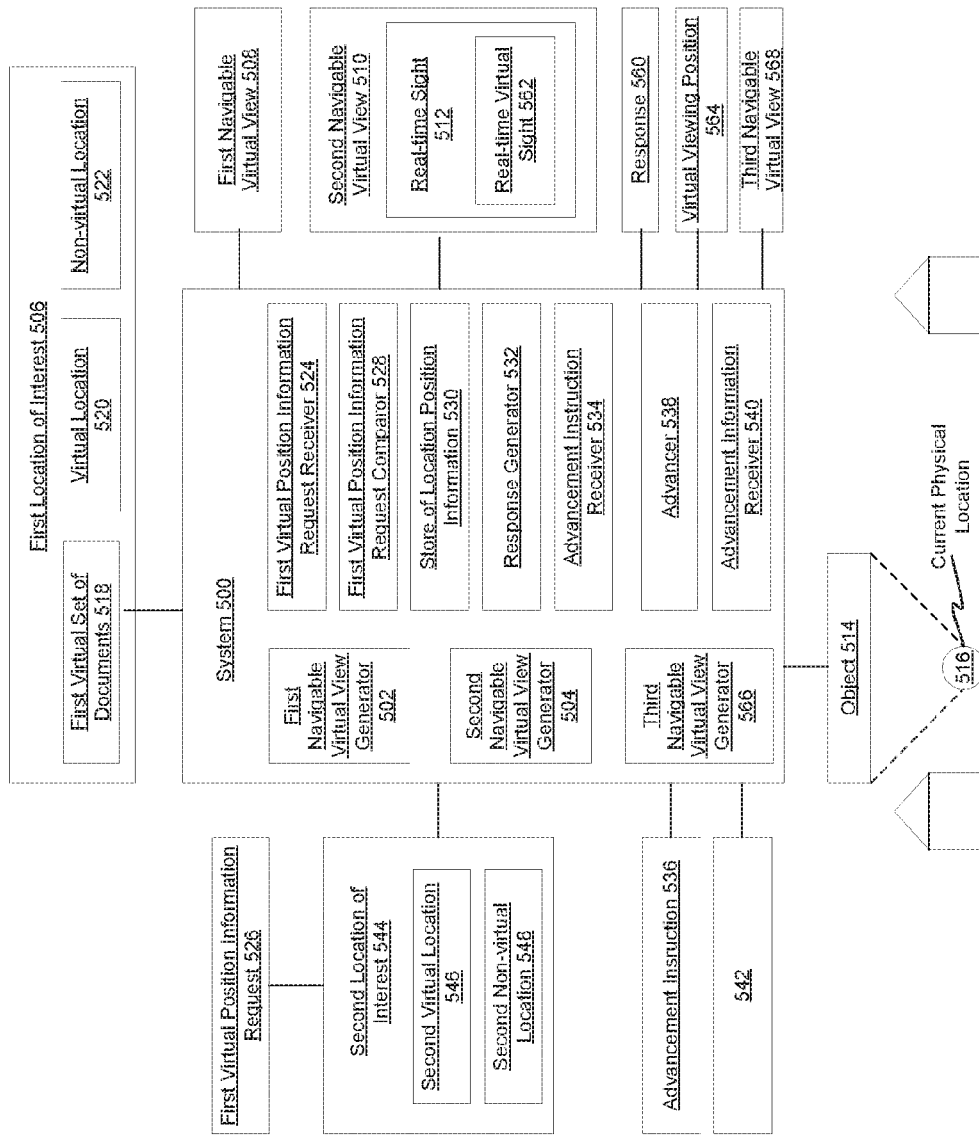
FIG. 5A is an example system for navigating concurrently and from point-to-point through multiple reality models, according to an embodiment.

FIG. 5A shows an example system 500 for navigating concurrently and from point-to-point through multiple reality models, in accordance with an embodiment. In various embodiments, models of reality are, but are not limited to being, based upon any of the following items: geospatial sensors; real-time image capture; produced video, television, movies, and advertisements; real-time audio capture; perceived reality through lens or heads-up display; geospatial database (e.g., geodetic models); GPS signals; mathematically derived ideal models (e.g., ellipsoidal earth model); virtual reality (any internally consistent model of space and time (can include intentionally distorted, unnatural, and non-historical models of reality); recorded audio; and recorded video.

In an example first use case scenario, person A is holding a smart-phone and is sitting on a sidewalk bench in a busy and unfamiliar shopping district. The smart-phone is equipped with various components, an image capture device, a GPS, a processor, a magnetometer, an accelerometer, etc. Person A has arranged to meet his friends at a restaurant down the street. Person A wonders what establishments are located further down the block and then to the right (out of person A's line of sight). Person A points the smart-phone in the direction of interest (down the block and to the right) and either zooms (e.g., by magnifying the screen image) the smart-phone in towards the direction of interest or physically moves in this direction of interest until the virtual location shown on the display screen of the smart-phone matches person A's location of interest.

Once the virtual location shown on the display screen matches the location of interest, a virtual viewing point is created, from which person A may look around and virtually view on the display screen what is within a short walking distance from that virtual viewing point. In this scenario, person A spots a familiar neighborhood coffee shop that is located two blocks to the left of the virtual viewing point.

While still viewing the coffee shop (which is out of person A's line of sight in the physical world) in the display screen, person A contacts his friends and suggests meeting at this coffee shop instead of the original meeting destination. Of note, in this example scenario, person A has not moved from his original physical location, sitting on the side-walk bench. After making this new meeting arrangement, person A directs his smart-phone (which includes system 500) to virtually return to person A's physical location (the sidewalk bench). In response to this request to return home, person A's virtual position is reconciled with his physical position, such that person A's new virtual viewing point is the bench upon which he is sitting. Person A is now able to look at the screen of his smart-phone and virtually view his surroundings. Additionally, person A is also able to virtually view the new meeting destination, the coffee shop (which is out of person A's line of sight), which concurrently virtually viewing his surroundings in the smart-phone's display screen.

Person A decides that he wants to scan the horizon, from the virtual viewing point of the sidewalk bench, through buildings, trees, earth and other obstructions. This virtual viewing may be in normal sight in real-time, or through non-real-time stored images. For example, person A may see the park on the other side of the building situated in front of him and see children playing in the park playground. In another embodiment, person A may see the park, but also see a stored image of the park that was captured twenty years ago; thus, person A would be viewing the park in non-real-time.

Person A then directs system 500 to show the physical positions of the avatars of his friends, as well as the shops in the area of the avatars, in order to make sure that his friends are all converging at the correct destination point, the coffee shop. Since person A sees that his friends are still about ten minutes away from the coffee shop, person A decides that he is hungry and would like to eat some donuts while walking to the coffee shop. Person A directs his smart phone to find the donut shop, which is several blocks away. Also, several buildings exist between person A and the donut shop. System 500 then causes the augmented donut shop to be virtually displayed in the smart-phone's display screen. Looking at the augmented donut shop, person A then requests route guidance and an estimated time of arrival at the donut shop. Further, person A asks his friends for donut orders.

Thus, as can be seen, the system 500 enables person A to concurrently navigate from a first point (his sidewalk bench) to a second point (the coffee shop, the donut shop, etc.) within multiple reality models, such as a virtual reality models in real time and non-real time.

While the smart-phone in the example scenario above was used as a pointing device to instruct a direction of interest, in various embodiments other pointing devices may, but are not limited to including any of the following: a mouse; eyeballs;

a digitizing Tablet; a trackball; a touchscreen; a lightpen; a motion in real-world space; an orientation of a display frame; and virtual controls.

In three dimensional reality models, the virtual views shown on the display screen, or other device, that are navigatable by a user, are, but are not limited to being, defined by viewports including any of the following: a visual; a positional (three dimensional vector relative to a frame of reference which resolves to a coordinate position point); a view direction (a three dimensional vector or normal vector indicating direction of view from the position point); a view frame orientation (a three dimensional vector or normal vector indicating orientation of a view frame); a time (a scalar value relative to a timeframe reference); an audio; a left direction; a right direction; a sensitivity; and an audio subsection.

In embodiments, there are two types of viewports, a virtual viewport and a physical viewport. The virtual viewport is derived virtually or from physical sensors. A stateful model of a virtual viewport is derived from, but is not limited to be derived from, any of the following: a physical orientation relative to the Earth; a physical orientation relative to other objects; and a virtual orientation from a user's voice, pointing device, etc.

The physical viewport (e.g., a heads-up display) includes, but is not limited to including, any of the following: a mapping of other reality models to perceived reality from a direct vision (and hearing) (e.g., heads-up displays); a viewpoint of a display (e.g., car, helmet, glasses, etc.); a viewpoint of user eyeballs; and characteristics of a user's eyeballs such as a focal length, resolution, optical transfer, etc.

In a second use case scenario, person B is driving his family while on vacation in San Francisco in a car that is fitted with system 500. System 500 is fitted within a heads-up-display, through which person B is able to look while driving. While person B is driving along the Embarcadero, he notices a building that interests him. Person B looks at the building of interest (a non-virtual location), which is the location of interest, and asks the system 500 about the building. The system 500 replies with the name and the address of the building.

Person B then requests information about the history of the building of interest, but person B is no longer looking at the building. Person B is looking at another object. The system 500, in response to the history question, responds that in 1851 the vigilance committee used the building as a fortress while fighting mobsters and the police. Further, system 500 informs person B that the fortress had previously been located at a less defensible Portsmouth square, which is the site of earlier hangings (and currently within Chinatown).

Hungry now for Chinese food, person B requests directions of system 500 to a Chinese restaurant in Portsmouth square. In response to the request, the system 500 generates a virtual vehicle that appears on the road ahead of person B. This virtual vehicle guides person B to available parking that is closest to the Chinese restaurant (the second location of interest).

Next, person B observes a location (Union Square) en route to the Chinese restaurant. Person B asks if this location is Portsmouth Square. The system 500 responds by stating, "No, it is Union Square". The virtual vehicle continues to drive ahead of person B's vehicle, until person B is parked in a parking spot.

In a third use case scenario, person C is working at a desk and wearing glasses with system 500 attached thereto. Also coupled with the glasses and the system 500 is an image capture device and a digital storage medium. Person C looks through, the glasses and a pile of virtual papers. The virtual papers are mapped positionally to the real desk. Person C is able to look at a specific pile of virtual papers (a first location of interest) that represent a set of documents. Person C requests that the system 500 search through the set of documents and find a particular document based on a keyword and/or subject matter and instructs system 500 what to do once locating the requested the requested document.

The system 500 performs such a search, locates the appropriate virtual paper, picks it up from the physical desk, places it on a virtual bulletin board, and reads it, all according to person C's requests and instructions.

Next, person C looks at a pile of physical business cards (a second location of interest), and requests that system 500 search the virtual business cards for a name. The system 500 then accesses OCR and a geospatially indexed digital storage of the business cards' placement. The system 500 is then able to locate the appropriate virtual card based on its placement and the search results. Person C is also able to file the virtual business card in an electronic file system by looking at the virtual file cabinet (third location of interest) and giving the system 500 the instruction, "save". In response to this instruction, the system 500 files the virtual business card within the virtual file cabinet.

In a fourth use case scenario, Person D is watching on a smart-TV a training video about an assembly line. Person D begins to wonder about the function of a specific station device (location of interest) within the training video. System 500 enables Person D to virtually enter the training video, via various methods (e.g., pointing, looking in the direction of interest [point within the training video], etc.]. Once virtually within the training video, Person D walks over to the other side of the station device in question to gain a perspective (e.g., get a clearer view of the station device, lets the system 500 know that the station device is the location of interest).

Person D then asks the system 500 how the station device works. In response to Person D's question, the system 500 shows Person D a working model animation and explains the functionality and the specification regarding the station device.

Example System Architecture

According to embodiments and with reference still to FIG. 5A, the system 500 includes: a first navigatable virtual view generator 502 coupled with a processor (e.g., processor 1700); and a second navigatable virtual view generator 504 coupled with the first navigatable virtual view generator 502 and the processor.

Optionally, the system 500 includes any of the following coupled with the processor: a third navigatable virtual view generator 566; a first virtual position information request receiver 524; a first virtual position information request comparor 528; a response generator 532; an advancement instruction receiver 534; an advancer 548; an advancement information receiver 540.

The first navigatable virtual view generator 502 generates a first navigatable virtual view 508 of a first location of interest 506, wherein the first location of interest 506 is a virtual location 520 and/or a non-virtual location. The term navigatable refers to, at least, the capability for moving around in the subject area (e.g., virtual view 508, virtual view 510). The second navigatable virtual view generator 504, concurrently with the generating of the first navigatable virtual view generator 502, generates a second navigatable virtual view 510 corresponding to a current physical location 516 of an object 514 that is coupled with the system 500. Real-time sight at the current physical position 516 is enabled within the second navigatable virtual view 510. In one embodiment, the second navigatable virtual view includes a virtual vehicle, as that described above in the use case scenario two. The virtual vehicle remains within a predetermined distance from the object 514 as the object 514 moves.

The first location of interest 506 is that location to which the system 500 is instructed to address and to which the user of the system 500 is interested. The first location of interest 506 is a virtual location 520 or a non-virtual location 522. The virtual location 520 may be, for example, the first virtual set of documents 518, as described above in use case scenario three. The non-virtual location 522 may be, for example, a real physical location such as the coffee shop described above in use case scenario one.

The virtual view of the first navigatable virtual view 508 and the second navigatable virtual view 510 refers to a view that is displayed on a screen. The term navigatable, in the context of the virtual view, refers to the ability of the virtual view shown in the display screen to be explored (moving from one point to another within the virtual scene shown by the virtual view) by a user. For example, the virtual view may be that of a street three blocks away and that is out of user's line of sight. The user may navigate within that virtual scene, starting at the street that is three blocks away, and continue to a street that is six blocks away and still out of the user's line of site. In some embodiments, the new virtual view may be that of the street that is six blocks away. In other embodiments, the new virtual view may show both the street that is three blocks away and the street that is six blocks away. Various virtual scenes may be shown in the virtual view at the display screen, and these virtual scenes may change to other virtual scenes, depending upon the user's given navigation directions.

The system 500 is coupled with an object 514. The object 514 may be anything to which the system 500 may be coupled. For example, the object 514 may be a human, a pair of glasses, a watch, a phone, a T.V., etc. The current physical location 516 of the object 514 refers to the real-time location of the object 514 as it finds itself on Earth.

Real-time sight 512 at the current physical location 516 refers to being able to view what is happening at the current physical location 516 as it is occurring. In one embodiment, the real-time sight 512 includes real-time virtual sight 562. In one embodiment, non-real-time stored imaging associated with the current physical location 516 is further enabled. Non-real-time stored imaging may be, in one embodiment, images stored of the current physical location 516 and its surrounding area of a time period different from the real-time period.

Thus, as described above, for example, in use case scenario one, the first location of interest 506 is the position that is down the block and to the right. The first navigatable virtual view generator 502 generates the first navigatable virtual view 508 of the area that is down the block and to the right of the object 514 (e.g., the user in this case, to whom the system 500 is attached). In this use case scenario, the first location of interest 506 (down the block and to the right) is a non-virtual location 522. Additionally, and as applied to the use case scenario one, the second navigatable virtual view generator 504 also generates the virtual view from person A's home position, that is the position that person A is while coupled with the device 500. Thus, person A is able to also virtually view his surroundings as seen from his current physical location 516. Person A is also able to navigate in real time within the second navigatable virtual view 510 (via scanning the horizon through buildings, trees, earth, etc.) to determine his surroundings.

The third navigatable virtual view generator 566, concurrently with the generating the first navigatable virtual view 508 of the first location of interest 506, generates a third navigatable virtual view 568 of a second location of interest 544, wherein the second location of interest 544 is one of a second virtual location 546 and a second non-virtual location 548. For example, in use case scenario one, the second location of interest 544 is the donut shop. Of note, in one embodiment, the first virtual location 520 and the second virtual location 546 are the same. In another embodiment, the first virtual location 520 and the second virtual location 546 are different. Likewise, in one embodiment, the first non-virtual location 522 and the second non-virtual location 548 are the same, whereas in another embodiment, the first non-virtual location 522 and the second non-virtual location 548 are different.

The first virtual position information request receiver 524 receives a first virtual position information request 526 associated with the first location of interest 506. For example, the first virtual position information request 526 may be, in one instance, a request from a user of the system 500 to provide a virtual view of a specific physical location (first location of interest 506), such as the position down the block and to the right, yet out of the user's line of sight, as is described above in use case scenario one. In another instance, the first virtual position information request 526 may be a request from a user of the system 500 to provide a virtual view of a specific virtual location (first location of interest 506), such as the first virtual set of documents 518 described above in use case scenario three. In another embodiment, the first virtual position information request 526 may be a request for information about something that is within the virtual view and/or about the first location of interest 506 and/or the second location of interest 544. For example, the first virtual position information request 526 may be question about the history of an interesting looking building (first location of interest 506), as is described above in the use case scenario two.

The first virtual position information request comparor 528 compares the first virtual position information request 526 with a store of location position information 530. The store of location position information 530, in one embodiment, is internal to the system 500. In another embodiment, the store of location position information 530 is located external to the system 500. Further, it should be appreciated that the store of location position information 530 may be any place in which information is kept (e.g., database, WEB, etc.) and that is accessible by the system 500, via wire or wirelessly. By comparing, it is meant that a determination is made if the subject of the first virtual position information request 526 is addressed and/or answered at the store of location position information 530.

The response generator 532, based on the comparing, generates a response 560 to the first virtual position information request 526. The information residing at the store of location position information 530 that is able to satisfy the first virtual position information request 526 is, via the response 560: 1) provided via the system 500, either via audio and/or visual techniques well known in the art; and/or 2) used to accommodate the first virtual position information request 526 (e.g., displaying a virtual view of the first location of interest 506).

The advancement instruction receiver 534 receives an advancement instruction 536 to virtually advance towards the first location of interest 506 until virtual position information of the first virtual position information request 526 matches the first location of interest 506. For example and as described above in use case scenario one, person A requests of the system 500 to move closer to the position virtually shown in the display screen, the position down the block and to the right (first location of interest 506). This is an advancement instruction 536. The advancer 538, in response to receiving the advancement instruction 536, then virtually advances towards the position down the block and to the right. The point at which the virtual advancement reaches in response to the advancement instruction 536, is referred to herein as the virtual viewing position 564.

In another embodiment, the system 500 includes the advancement information receiver 540 that receives advancement information that signifies that a physical advancement towards the first location of interest 506 has occurred, wherein the virtual position information matches the first location of interest 506 and the advancement information includes the virtual viewing position 564 of the first location of interest 506. In other words, in one embodiment, the system 500 is informed that the object 514 with which it is coupled, has been physically moved towards the first location of interest such that the virtual position information matches the first location of interest (e.g., the object 514 has arrived at the first location of interest 506) and the virtual viewing position 564 has been established.

Example Methods of Use

Figure 5B:
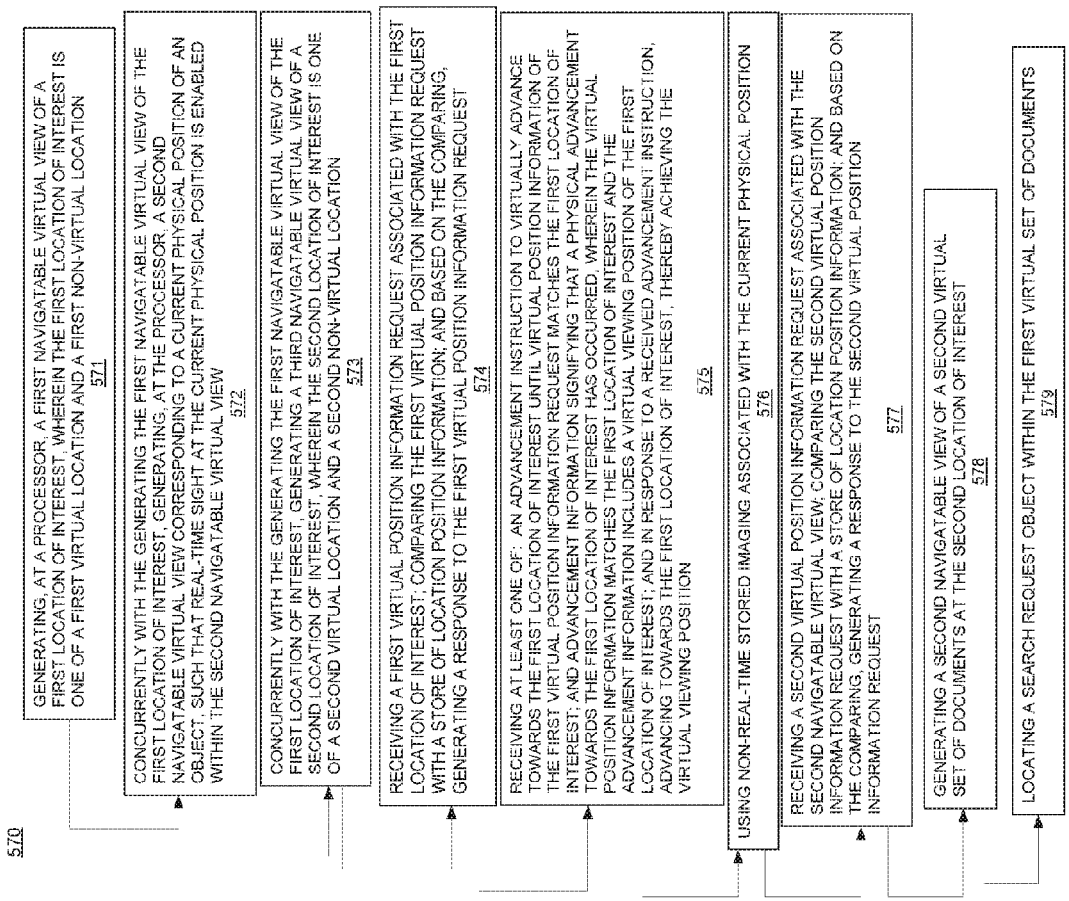
FIG. 5B is an example flowchart of a method for navigating concurrently and from point-to-point through multiple reality models, according to an embodiment.

FIG. 5B is a flow diagram 570 of an example method for navigating concurrently and from point-to-point through multiple reality models. In operation 571, in one embodiment and as described herein, a first navigatable virtual view of a first location of interest is generated, wherein the first location of interest is one of a virtual location and a non-virtual location. In operation 572, in one embodiment and as described herein, concurrently with the generating the first navigatable virtual view of the first location of interest in operation 571, a second navigatable virtual view corresponding to a current physical position of an object is generated, such that real-time sight at the current physical position is enabled within the second navigatable virtual view.

In operation 573, in one embodiment and as described herein, concurrently with the generating the first navigatable virtual view of the first location of interest, generating a third navigatable virtual view of a second location of interest, wherein the second location of interest is one of the virtual location and the non-virtual location.

In operation 574, in one embodiment and as described herein, a first virtual position information request associated with the first location of interest is received. The first virtual position information request is compared with a store of location position information. Then, based on the comparing, a response to the first virtual position information request is generated.

In operation 575, in one embodiment and as described herein, at least one of the following is received: an advancement instruction to virtually advance towards the first location of interest until virtual position information of the first virtual position information request matches the first location of interest; and advancement information signifying that a physical advancement towards the first location of interest has occurred, wherein the virtual position information matches the first location of interest and the advancement information includes a virtual viewing position of the first location of interest. In response to a received advancement instruction, an advancement towards the first location of interest occurs, thereby achieving the virtual viewing position.

In operation 576, in one embodiment and as described herein, non-real-time stored imaging associated with the current physical position is used.

In operation 577, in one embodiment and as described herein, a second virtual position information request associated with the second navigatable virtual view is received. The second virtual position information request is compared with a store of location position information. Based on the comparing, a response to the second virtual position information request is generated.

In operation 578, in one embodiment and as described herein, a second navigatable view of a second virtual set of documents at the second location of interest is generated.

In operation 579, in one embodiment and as described herein, a search request object is located within the first virtual set of documents.

Various embodiments include multi-stage clipping (aka culling) algorithms (e.g. monoscopic/stereoscopic/monophonic/stereophonic) for managing lists of potentially significant data for "visualization". Some of these embodiments include hysterisis, neuromorphic, geospatial and other optimizations. One such embodiment includes weighting relative significance of interest-mapping, relative distance to idealized viewpoint, relative distance to idealized focal point, and relative distance from each location vector to the idealized viewpoint line of sight.

Lexicon: Clipping=clipping or culling of data outside of area of interest—normal art distinguishes between clipping (removal of elements of an object—e.g. individual polygons from a displayed object) vs. culling (removal of the entire object). For the purposes of discussing multi-staging clipping (culling), the two terms are considered synonymous.

Embodiments for navigating concurrently and from point-to-point through multiple reality models are thus described. While the present technology has been described in particular examples, it should be appreciated that the present technology should not be construed as limited by such examples, but rather construed according to the claims.

Embodiments for navigating concurrently and from point-to-point through multiple reality models can be summarized as follows:

1. A computer usable storage medium having instructions embodied therein that when executed cause a computer system to perform a method for navigating concurrently and from point-to-point through multiple reality models, said method comprising:
   generating, at a processor, a first navigatable virtual view of a first location of interest, wherein said first location of interest is one of a first virtual location and a first non-virtual location; and
   concurrently with said generating said first navigatable virtual view of said first location of interest, generating, at said processor, a second navigatable virtual view corresponding to a current physical position of an object, such that real-time sight at said current physical position is enabled within said second navigatable virtual view.

2. The non-transitory computer-readable storage medium of claim 1, wherein the method further comprises:
   concurrently with said generating said first navigatable virtual view of said first location of interest, generating a third navigatable virtual view of a second location of interest, wherein said second location of interest is one of a second virtual location and a second non-virtual location.

3. The non-transitory computer-readable storage medium of claim 1, wherein the method further comprises:
   receiving a first virtual position information request associated with said first location of interest;
   comparing said first virtual position information request with a store of location position information; and
   based on said comparing, generating a response to said first virtual position information request.

4. The non-transitory computer-readable storage medium of claim 3, wherein the method further comprises:

receiving at least one of:
- an advancement instruction to virtually advance towards said first location of interest until virtual position information of said first virtual position information request matches said first location of interest; and
- advancement information signifying that a physical advancement towards said first location of interest has occurred, wherein said virtual position information matches said first location of interest and said advancement information includes a virtual viewing position of said first location of interest; and
- in response to a received advancement instruction, advancing towards said first location of interest, thereby achieving said virtual viewing position.

5. The non-transitory computer-readable storage medium of claim 1, wherein the method further comprises:
using non-real-time stored imaging associated with said current physical position.

6. The non-transitory computer-readable storage medium of claim 1, wherein the method further comprises, wherein enabling said real-time sight at said current physical position comprises:
enabling real-time virtual sight.

7. The non-transitory computer-readable storage medium of claim 1, wherein the method further comprises:
receiving a second virtual position information request associated with said second navigatable virtual view;
comparing said second virtual position information request with a store of location position information; and
based on said comparing, generating a response to said second virtual position information request.

8. The non-transitory computer-readable storage medium of claim 1, wherein the method further comprises, wherein said providing a second navigatable virtual view comprises:
providing a virtual vehicle within said second navigatable virtual view, wherein said virtual vehicle remains within a predetermined distance from said object as said object moves.

9. The non-transitory computer-readable storage medium of claim 1, wherein the method further comprises, wherein said generating a first navigatable virtual view of a first location of interest comprises:
generating said first navigatable view of a first virtual set of documents as said first location of interest.

10. The non-transitory computer-readable storage medium of claim 9, wherein the method further comprises, further comprising:
generating a second navigatable view of a second virtual set of documents at said second location of interest.

11. The non-transitory computer-readable storage medium of claim 9, wherein the method further comprises, further comprising:
locating a search request object within said first virtual set of documents.

12. The non-transitory computer-readable storage medium of claim 9, wherein the method further comprises, wherein said generating a first navigatable virtual view of a first location of interest comprises:
generating said first navigatable virtual view of a video.

13. A system for navigating concurrently and from point-to-point through multiple reality models, said system comprising:
a first navigatable virtual view generator coupled with a processor, said first navigatable virtual view generator for generating a first navigatable virtual view of a first location of interest, wherein said first location of interest is one of a first virtual location and a first non-virtual location; and
a second navigatable virtual view generator coupled with said processor, said second navigatable virtual view generator for, concurrently with said generating said first navigatable virtual view, generating a second navigatable virtual view corresponding to a current physical position of an object coupled with said system, such that real-time sight at said current physical position is enabled within said second navigatable virtual view.

14. The system of claim 13, further comprising:
a third navigatable virtual view generator coupled with said processor, said third navigatable virtual view generator for, concurrently with said generating said first navigatable virtual view of said first location of interest, generating a third navigatable virtual view of a second location of interest, wherein said second location of interest is one of a second virtual location and a second non-virtual location.

15. The system of claim 13, further comprising:
a first virtual position information request receiver coupled with said processor, said first virtual position information request receiver configured for receiving a first virtual position information request associated with said first location of interest;
a first virtual position information request comparor coupled with said processor, said first virtual position information request comparor configured for comparing said first virtual position information request with a store of location position information; and
a response generator coupled with said processor, said response generator configured for, based on said comparing, generating a response to said first virtual position information request.

16. The method of claim 15, further comprising:
an advancement instruction receiver coupled with said processor, said advancement instruction receiver configured for receiving an advancement instruction to virtually advance towards said first location of interest until virtual position information of said first virtual position information request matches said first location of interest;
an advancer coupled with said processor, said advancer configured for virtually advancing towards said first location of interest, thereby achieving a virtual viewing position; and
an advancement information receiver coupled with said processor, said advancement information receiver configured for receiving advancement information signifying that a physical advancement towards said first location of interest has occurred, wherein said virtual position information matches said first location of interest and said advancement information includes said virtual viewing position of said first location of interest.

17. The system of claim 13, wherein non-real-time stored imaging associated with said current physical location is further enabled.

18. The system of claim 13, wherein said real-time sight comprises:
real-time virtual sight.

19. The system of claim 13, wherein said second navigatable virtual view comprises:
a virtual vehicle that remains within a predetermined distance from said object as said object moves.

20. The system of claim 13, wherein said first location of interest comprises:

a first virtual set of documents.

Section Six: Enhanced Sensory Perception

Notation and Nomenclature

Some portions of the description of embodiments which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present discussions terms such as "receiving", "rendering", "generating", "utilizing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, in some embodiments, methods described herein can be carried out by a computer-usable storage medium having instructions embodied therein that when executed cause a computer system to perform the methods described herein.

Brief Description

Embodiments improve a user's sensory and extra-sensory perception of the world through augmented reality. Embodiments enable the user to see real-time composite visible, radar, infrared, ultraviolet, or sonar still images or video, or locally cached or remote database stored images from a similar variety of sources blended in virtually any combination with the real-time sources to add understanding of the world around the user. Embodiments may be used within, among other devices, heads-up-display devices, including wearable devices and vehicular (windshield), and windows, along with geospatial sensors coupled therewith.

Overview of Discussion

Example techniques, devices, systems, and methods for enhancing a sensory perception in a field of view of a real-time source within a display screen through augmented reality are described herein. Discussion begins with example use case scenarios. An example system architecture is then described. Discussion continues with a description of example methods of use.

Use Case Scenarios

FIG. 5D shows an example device 580 for enhancing a sensory perception in a field of view of a real-time source within a display screen through augmented reality, in accordance with an embodiment. The field of view is the view displayed within the display screen.

In an example first use case scenario, after a red-eye flight to San Francisco for a business convention, Person A wakes up in a hotel room in a city he has never before visited. Person A puts on his wearable supervision smart-glasses that contain the device 580. While still dressing in his hotel room, Person A uses his smart-glasses to look through the hotel walls to the hotel restaurant. Person A is able to look at the breakfast menu with the smart-glasses having device 580. Person A decides that the hotel's breakfast menu is too high priced and does not find the food appealing.

While leaving the hotel room, Person A looks around the nearby city streets (through hotel walls and other buildings) for a local diner. Person A finds a diner nearby and then looks at the diner's menu while riding down the hotel's elevator to the street level. Person A then requests of the device 580 for the quickest route. The device 580 is guided out the front door of the hotel, at which point the user notices a floral garden in the hotel's front lawn. Person A remembers a documentary about flower patterns being adaptive for ultraviolet light. Person A then states, "ultraviolet". In response to hearing the request, "ultraviolet" regarding the floral garden (the first location of interest 506), the device 580 generates an augmented floral garden, in which the flowers are down converted to visible color/saturation coded visible augmented translucent image overlay to actual flowers. In other words, the floral garden was made to look more spectacular by creating eye popping colors for Person A to see. Objects are placed in front and behind the field of view within the display screen of the glasses such that flowers appear to Person A in a three dimensional format, and appear to be brighter, more colorful, and more real.

On route to the diner, Person A recognizes business competitors standing across the street, engaging in a heated debate. Curious as to what the animated discussion is about, Person A requests of device 580 to listen more closely to the debate (the first location of interest 506), and the device 580 illuminates the conversation (with the assistance of directional microphones and/or amplifiers) such that Person A can hear. Person A finds the conversation boring, as they are arguing about where to eat breakfast.

Next, Person A calls an old college friend who lives in San Francisco. The friend convinces Person A to skip the first day of the business convention and go fishing instead. Person A checks the convention schedule, decides that he can skip one day, and calls a taxi to get to the marina. While in the taxi, Person A tours the virtual convention with his glasses that are equipped with device 580 to assuage his guilt.

Person A arrives at the marina before his friend and looks at the sky, wondering about his decision to skip his business convention. Person A then says, "weather". Through the glasses coupled with device 580, Person A looks around and sees color-coded imaging with satellite cloud image overlays with sighted clouds through lenses. Person A zooms in via the advancement instruction 536, and flies through the weather pattern, which looks like a small squall. Person A then says, "from space", from which he receives a stereoscopic GOES west/GOES east satellite image from 10 minutes ago with composite radar overlay. Person A zooms in to his physical location, and sees clear skies behind the squall line. Person A smiles because his fishing trip does not have to worry about the weather during his fishing excursion.

Person A then goes fishing with his friend. On the water, Person A says, "Hydra". Person A, through his smart-glasses, can see the topography of the lake bottom as they boat to their destination. Person A says to the friend, "Is that the latest fish-finder 5000 mounted on your transom?" The friend responds with, "Why yes it is! Why do you ask?" Person A then states, "Do me a favor and hit the 'find blue tooth device' button on your fish-finder." The boat slows as they arrive near the fishing spot. Person A sees a large school of fish swim under the boat. The friend gets excited, but the user says, "It's only a school of Iowa-walleye." Then person A remembers that he is now in Iowa, and says, "Er, uh, Carp, I mean."

Thus, the system 580 enables the user to enjoy heightened perceptions of reality, based on various interactions between the device 580 and the user/wearer of the device 580, between different perceptions or combinations of perceptions of reality, based on a number of sources.

Example System Architecture

Figure 5C:
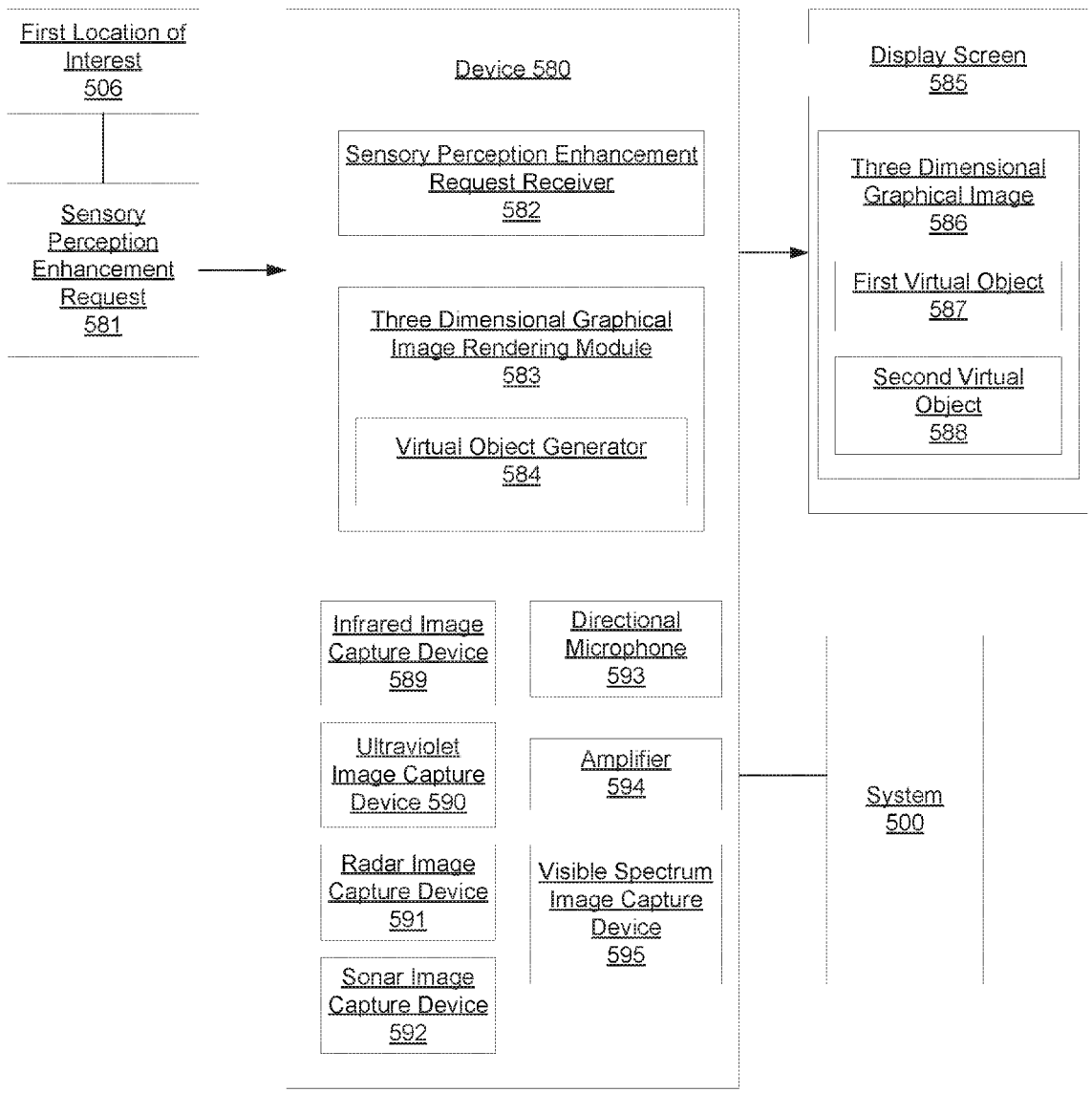
FIG. 5C is an example device for enhancing a sensory perception in a field of view of a real-time source within a display screen through augmented reality, according to an embodiment.

According to embodiments and with reference still to FIG. 5C, the system 580 includes: a sensory perception enhancement request receiver 582; and a three dimensional graphical image rendering module 583 that includes a virtual object generator 584.

In one embodiment, the sensor perception enhancement request receiver receives a sensory perception enhancement request 581 associated with the first location of interest 506. The three dimensional graphical image rendering module 583 renders a three dimensional graphical image 586 and includes the virtual object generator 584. The virtual object generator 584 generates a first virtual object 587 in the forefront of the field of view and a second virtual object 588 behind the field of view. The first virtual object 584 and the second virtual object 588 are displayed within the user's perceived depth of normal vision. The first virtual object 584 and second virtual object 588 may be anything that is visible to the human eye. In some embodiments, these objects are a simulation of real objects, whereas in other embodiments, these objects are created to represent ideas and/or real objects. Thus, three dimensional virtual-reality modeled alpha-channel management and real-time object recognition and other video metadata mining allows three dimensional graphical image rendering to effectively overlay and underlay human sight on such displays, as well as all of the above imaging sources in any combination. In other words, the user sees virtual reality modeled objects navigating in front of and behind objects near and far in their field of view, and imaging from a variety of sources are displayed within the perceived depth of normal vision.

In one embodiment, the device 580 optionally includes the system 500 coupled therewith, and incorporates the features/functions of the system 500 as already described above and herein. Thus, device 580, in some embodiments includes: a first navigatable virtual view generator 502 that generates a first navigatable virtual view 508 of the first location of interest 506, wherein the first location of interest 506 is one of a first virtual location 520 and a first non-virtual location 522; and a second navigatable virtual view generator 504 that, concurrently with said generating said first navigatable virtual view 508, generates a second navigatable virtual view 510 corresponding to a current physical position 516 of an object 514 coupled with the system 500, such that real-time sight at the current physical position 516 is enabled within the second navigatable virtual view 510.

Various embodiments optionally include the following components that are well known in the art: an infrared image capture device 589; an ultraviolet image capture device 590; a radar image capture device 591; a sonar image capture device 592; at least one of a direction microphone 593 and an amplifier 594; and a visible spectrum image capture device 595.

Example Methods of Use

FIG. 5D is a flow diagram 596 of an example method for enhancing a sensory perception in a field of view of a real-time source within a display screen 585 through augmented reality. In operation 597, in one embodiment and as described herein, a sensory perception enhancement request associated with a location of interest is received.

In operation 598, in one embodiment and as described herein, in response to the receiving in operation 597, a three dimensional graphical image is rendered. The rendering includes generating at least one of a first virtual object in a forefront of the field of view and a second virtual object behind the field of view, wherein the first virtual object and the second virtual object are displayed within a perceived depth of normal vision.

In operation 599, in one embodiment and as described herein, a first navigatable virtual view of the first location of interest is generated, wherein the first location of interest is one of a virtual location and a non-virtual location. Further, and concurrently with the generating of the first navigatable virtual view of the first location of interest, a second navigatable virtual view corresponding to a current physical position of an object is generated, such that real-time sight at the current physical position is enabled within the second navigatable virtual view. In various embodiments and as described herein, the generating in operation 599 includes utilizing any of the following to assist in the rendering: an infrared image capture device; an ultraviolet image capture device; a radar image capture device; a sonar image capture device; at least one of directional microphones and amplifiers; a visible spectrum image capture device; a stereophonic audio capability; and an eyeball direction detector.

Various embodiments use translucency management to assist the user in differentiating between simultaneously displayed sensor input. Frequency shifts for audio sources, and chrominance shifts, saturation and luminance blending ratios, individual color-space component blending (e.g. RGB, CLS, etc.) and other filters are used to allow differentiable simultaneous displays (visual and audio, etc.) from differently-abled sensors and sensor arrays.

Embodiments for enhancing a sensory perception in a field of view of a real-time source within a display screen 585 through augmented reality are thus described. While the present technology has been described in particular examples, it should be appreciated that the present technology should not be construed as limited by such examples, but rather construed according to the claims.

Embodiments for enhancing a sensory perception in a field of view of a real-time source within a display screen 585 through augmented reality can be summarized as follows:

1. A computer usable storage medium having instructions embodied therein that when executed cause a computer system to perform a method for enhancing a sensory perception in a field of view of a real-time source within a display screen through augmented reality, said method comprising:
   receiving, at a processor, a sensory perception enhancement request associated with a location of interest;
   in response to said receiving, rendering, by said processor, a three dimensional graphical image, wherein said rendering comprises:
     generating at least one of a first virtual object in a forefront of said field of view and a second virtual object behind said field of view, wherein said first virtual object and said second virtual object are displayed within a perceived depth of normal vision.

2. The computer usable storage medium of claim 1, wherein said method further comprises:
   generating, at said processor, a first navigatable virtual view of said first location of interest, wherein said first location of interest is one of a virtual location and a non-virtual location; and
   concurrently with said generating said first navigatable virtual view of said first location of interest, generating, at said processor, a second navigatable virtual view corresponding to a current physical position of an object, such that real-time sight at said current physical position is enabled within said second navigatable virtual view.

3. The computer usable storage medium of claim 1, wherein said generating comprises:
   utilizing an infrared image capture device to assist in said rendering.

4. The computer usable storage medium of claim 1, wherein said generating comprises:
   utilizing an ultraviolet image capture device to assist in said rendering.

5. The computer usable storage medium of claim 1, wherein said generating comprises:
   utilizing a radar image capture device to assist in said rendering.

6. The computer usable storage medium of claim 1, wherein said generating comprises:
   utilizing a sonar image capture device to assist in said rendering.

7. The computer usable storage medium of claim 1, wherein said generating comprises:
   utilizing at least one of directional microphones and amplifiers to assist in said rendering.

8. The computer usable storage medium of claim 1, wherein said generating comprises:
   utilizing a visible spectrum image capture device to assist in said rendering.

9. The computer usable storage medium of claim 1, wherein said generating comprises:
   utilizing a stereophonic audio capability to assist in said rendering.

10. The computer usable storage medium of claim 1, wherein said generating comprises:
    utilizing an eyeball direction detector to assist in said rendering.

11. A device for enhancing a sensory perception in a field of view of a real-time source within a display screen through augmented reality, said device comprising:
    a sensory perception enhancement request receiver coupled with a processor, said sensory perception enhancement request receiver configured for receiving a sensory perception enhancement request associated with a location of interest; and
    a three dimensional graphical image rendering module coupled with said processor, said three dimensional graphical image rendering module configured for rendering a three dimensional graphical image and comprises:
       a virtual object generator configured for generating at least one of a first virtual object in a forefront of said field of view and a second virtual object behind said field of view, wherein said first virtual object and said second virtual object are displayed within a perceived depth of normal vision.

12. The device of claim 11, further comprising:
    a first navigatable virtual view generator coupled with said processor, said first navigatable virtual view generator for generating a first navigatable virtual view of said first location of interest, wherein said first location of interest is one of a first virtual location and a first non-virtual location; and
    a second navigatable virtual view generator coupled with said processor, said second navigatable virtual view generator for, concurrently with said generating said first navigatable virtual view, generating a second navigatable virtual view corresponding to a current physical position of an object coupled with said system, such that real-time sight at said current physical position is enabled within said second navigatable virtual view.

13. The device of claim 11, further comprising:
    an infrared image capture device coupled with said processor and configured for assisting in said rendering.

14. The device of claim 11, further comprising:
    an ultraviolet image capture device coupled with said processor and configured for assisting in said rendering.

15. The device of claim 11, further comprising:
    a radar image capture device coupled with said processor and configured for assisting in said rendering.

16. The device of claim 11, further comprising:
    a sonar image capture device coupled with said processor and configured for assisting in said rendering.

17. The device of claim 11, further comprising:
    at least one of directional microphones and amplifiers coupled with said processor and configured for assisting in said rendering.

18. The device of claim 11, further comprising:
    a visible spectrum image capture device coupled with said process and configured for assisting in said rendering.

19. A method for enhancing a sensory perception in a field of view of a real-time source within a display screen through augmented reality, said method comprising:
    receiving, at a processor, a sensory perception enhancement request associated with a location of interest;
    in response to said receiving, rendering, by said processor, a three dimensional graphical image, wherein said rendering comprises:
       generating at least one of a first virtual object in a forefront of said field of view and a second virtual object behind said field of view, wherein said first virtual object and said second virtual object are displayed within a perceived depth of normal vision.

20. The method of claim 19, further comprising:
    generating, at said processor, a first navigatable virtual view of said first location of interest, wherein said first location of interest is one of a virtual location and a non-virtual location; and
    concurrently with said generating said first navigatable virtual view of said first location of interest, generating, at said processor, a second navigatable virtual view corresponding to a current physical position of an object, such that real-time sight at said current physical position is enabled within said second navigatable virtual view.

Section Seven: Dialogue and Behavior Modeling

Notation and Nomenclature

Some portions of the description of embodiments which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present discussions terms such as "accessing", "comparing", "determining", "generating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, in some embodiments, methods described herein can be carried out by a computer-usable storage medium having instructions embodied therein that when executed cause a computer system to perform the methods described herein.

Immediately below is provided a definition for the following terms used herein:

An automaton is a virtual autonomous agent and a bot.

Scripting is a structured behavioral metadata that drives interpretation and response.

Fixed scripting is a direct 1:1 relationship specification between an input set (including context) and outputs.

Fuzzy scripting is an associative array (or complex relational structure or transfer function reduced to an associative array [e.g., multiple sqi join]) that determines a scored set of potential outputs from an input set, and a behavioral transfer function that can introduce randomization from other sources, including pseudo-random number generation.

Parametric scripting is when parameters dictate the boundaries that indicate the successful output selection from a behavioral transfer function.

A behavioral transfer function is a combination of one or more of the following processes to resolve outputs from inputs: Boolean algebra; a logical algorithm; a matrix processing; an adaptive network response; a database query; an external API; an Internet search; and other mathematical, logical or data forms.

Brief Description

Embodiments interpret the meaning of a dialogue between a plurality of agents, wherein the plurality of agents includes one or more automatons and/or one or more humans (e.g., one or more users). Thus, multilayer state-machine modeling of individual and group interactions (including dialogue) between automatons and users are combined to interpret a meaning of a dialogue.

Various embodiments parse meaning according to several categories: What (based on Regular Expression extraction, Event Trigger, Search Results, Interaction, etc.); Who (Person, User, Personality, Self); When (time of day, time of year, time of month, State Machine State, Conversation Thread, etc.); Where (viewpoint, geospatial position, navigation, virtual reference, screen location, etc.).

Various embodiments organize the relationship between components of parsed meaning of dialogue and observed behaviors by mapping relationships between the following aspects of context and meaning: Personality; Dialogue; Vocabulary (aka lexicon); Association; Trigger; Dialogue Personality (cross-reference between Dialogue and Personality entries); Association (cross-reference between Dialogue and Vocabulary entries); Speech; Listener; Scripts; Response; Command; Action; Choice; Criteria; Voice and Sequence.

Overview of Discussion

Example techniques, devices, systems, and methods for interpret the meaning of a dialogue between a plurality of agents are described herein. Discussion begins with example use case scenarios. An example system architecture is then described. Discussion continues with a description of example methods of use.

Use Case Scenarios

Figure 6A:
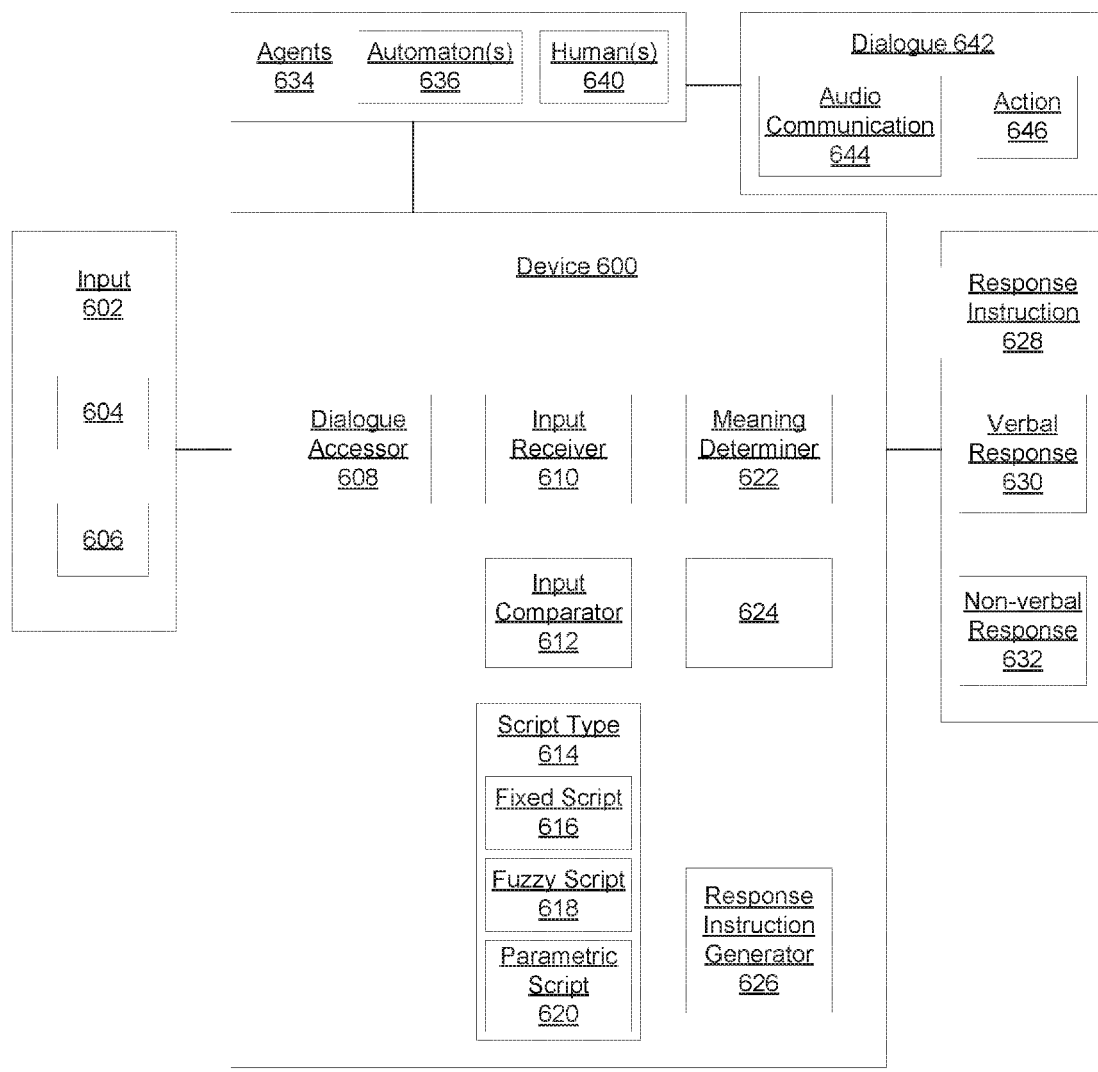
FIG. 6A is an example system for interpreting a meaning of a dialogue between a plurality of agents, wherein the plurality of agents includes at least one of one or more automatons and one or more humans, according to an embodiment.

FIG. 6A shows an example device 600 for interpreting the meaning of a dialogue 642 between a plurality of agents 634, in accordance with an embodiment. In various embodiments, the plurality of agents 634 is one or more automatons 636 and/or one or more humans 640. In various embodiments, the dialogue 642 is, optionally one or more of the following: an audio communication 644 between the plurality of agents 634; and an action 646 communicated between the plurality of agents 634.

In an example use case scenario, the device 600 is coupled with a global positioning system (GPS) that is itself coupled with a vehicle. The device 600 observes the behavior of a driver while the driver is driving his vehicle and interacting with the GPS. Without the device 600, the GPS would inform the driver to make a U-turn, repeatedly, which may cause irritation to the driver. However, with the implementation of the device 600 coupled with the GPS, the device 600 observes the driver's behavior and response to its guidance, and interacts/adapts its behavior with/to the driver to be more user friendly and interactive. For example, if the driver does not make a U-turn in response to the GPS instruction to, "make a U-turn", instead of the GPS repeatedly stating, "make a U-turn", the GPS will instead pose a more user friendly interactive question to the user/driver, such as, "Why did you turn left?" The driver may then respond to the GPS by stating, "I'm taking the scenic route". Then, the GPS follows up with the driver by asking, "OK, should I guide you along the river?" Thus, in comparison to current technology, the GPS and the attached device 600 take a more interactive, social, and intelligent approach to instructing the driver, thus creating a friendlier environment for the driver. The device 600 observes the audio communication between the driver (a human) and the GPS system (an automaton). The audio communication includes details such as the tone and type of statement (imperative vs. declarative vs. interrogative vs. exclamatory and/or a command and/or conversational) which the driver displays to the GPS system. Further, the driver may make gestures to other vehicles, other drivers, or display gestures representing emotion, such as despair and/or confusion. Recognition of audio and visual aspects of a human is performed by systems and devices known to those in the art and are therefore not described herein.

Further, multilayer state machines of the device 600 may indicate a conversational exclamatory tone and type of statement as a response to the environment, but the combined context of a detected sharper tone of voice and an indication through viewpoint data vector thresholds that the user is "looking directly at" a subject can change the states of the machines to recognize a command imperative statement (instead of a conversational exclamatory statement). Similarly, a key-phrase (such as "Command Mode") made by the user/driver can change the state machines according to a transition logic or scripting stored either at the device 600 and/or external to the device 600. Of note, the above example context modifiers (e.g., "Command Mode") can also be fed directly into adaptive networks coupled with device 600 for more sophisticated learned behavior. The above techniques can also be used in conjunction with a more standardized voice-recognition approach to score weighted permutations of potential word-recognitions to form candidate sentences against a lexical parsing score.

In a second use case scenario, a smart T.V. with the system 600 coupled therewith enables voice interactivity via the T.V.

user interface between one or more viewers of the T.V. and characters within the program being viewed on the T.V. A viewer of the T.V. program may speak with a character(s) within the T.V. program, while the context and meaning of the viewer's words and actions to the character(s) are interpreted via system 600.

In a third use case scenario, system 600 provides for a more highly interactive, realistic and entertaining application interface structure for games by interpreting the context and meaning of the users words and actions. For example, a user may wave his arms frantically while fairly calmly stating "Get away." While the system 600 is hearing the words, "Get away." Spoken in a fairly calm manner, the user's gestures provide more meaning to the user's words. The combination of the user's words and user's gestures lead the system 600 to interpret the user's words to be strong command made in desperation, and responds to these words accordingly within the game structure (e.g., providing an interpretation that is used in causing instructions to an agent within the game to withdraw immediately and quickly from the viewer's agent represented in the game).

In a fourth use case scenario, a smart vehicle coupled with the system 600 may be managed to provide meaning to the words spoken and actions performed by one or more users of the vehicle, using the vehicle/device 600 at separate times or concurrently. For example, a driver and two passengers set out on the car trip to visit a local sightseeing attraction, a quant amusement park. One of the passengers gets into an argument with the driver over the best route to take to the amusement park. Both the driver and the passenger are using obscene language and making violent gestures. The system 600 interprets the meaning of this language and gesturing to be that of a fight, and provides this interpretation such that the following request is caused to be posed in firmly stated manner to the car's inhabitants, "Pull over to the side of the road until this issue is resolved".

Thus, the device 600 is able to interpret the context and meaning of the user's wording and/or gestures and cause a response to the user to occur. This response can either be in the form of words given to the user and/or actions presented to the user's agents by other agents with whom the user's agent is interacting, such as is shown in the car management scenario and the application interface scenario presented above.

Example System Architecture

As is illustrated herein, embodiments provide a device for modeling the behavior and interaction of automatons and users as they interact spatially, temporally, and through dialogue and other stimuli. The other stimuli includes: a fixed class hierarchy of behavior types; dynamically encapsulated behavior modules; context mapped to multiple reality environments; multilayer state machines modeling multiple aspects of individual and group interaction states; context mapped to multiple state-machines; Ack/Nack as feedback to dynamic behavior (including adaptive networks); integration with adaptive networks; and fixe, fuzzy, and parametric scripting.

Embodiments combine multilayer state-machine modeling of individual and group interactions (including dialogue) between users and automatons. Further, embodiments dynamically map behaviors with behavior capabilities with reality models through independent agents coordinated by structured behavioral metadata (scripting). Additionally, embodiments dynamically map augmented reality to meaning as a context for interpretation. Embodiments also enable: an integrated adaptive behavior with hard-coded and fuzzy logic that allows for hybrid behavioral forms; a coherent many to many interaction between multiple automatons and users; the utilization of a meaning bus; and the modeling of context as a set of characteristics to be filtered to assist in selecting an interpretation of a behavior.

According to embodiments and with reference still to FIG. 6A, the device 600 includes, coupled with a processor: a dialogue accessor 608; an input receiver 610; an input comparor 612; and a meaning determiner 622. In various embodiments, the device 600 further and optionally includes a response instruction generator 626.

The dialogue accessor 608 accesses a dialogue 642 between the plurality of agents 634. In various embodiments, the dialogue 642 is at least one of the following: an audio communication 644 between the plurality of agents 634; and an action 646 communicated between the plurality of agents 634.

The input accessor 610 accesses input associated with the behavior of the plurality of agents 634 and an interaction between the plurality of agents 634. As described above, in one example, the gestures of the plurality of agents 634 are observed (accessed), while in another example, language and gestures between the plurality of agents 634 is observed.

The input comparor 612 compares the accessed input 602 to a script type 614. In various embodiments, this script type 614 optionally includes the following: a fixed script 616; a fuzzy scripting 618; a parametric scripting 620; and a hybrid scripting including portions of scripting from at least two of a fixed script 616, a fuzzy scripting 618, and a parametric scripting 620. Of note, the script type 616 may be located internally and/or externally to the device 600. The script type 616 may be accessed via wire and/or wirelessly.

The meaning determiner 622 determines a meaning of the dialogue 642 based on the comparing at the input comparor 612. As described above, the determined meaning may be stateful, in that previous input may be taken into account in determining the context of behavior. Taking into account the previous input (stored internal and/or external to the device 600), as well as the real-time input, the interpretation of the meaning of the language and gestures of a user may cause a change in state of the state machine coupled with the device 600 (e.g. the input 602 is accessed as a conversational exclamatory, but changed to a command imperative meaning based on the comparing that is performed by the input comparor as well, in this case, previously stored input).

The response instruction generator 626 generates a response instruction 628 based on the determining of the meaning performed by the meaning determiner 622. In various embodiments, the response instruction 628 may optionally be any of the following: an instruction for a verbal response 630; and an instruction for a non-verbal response 632. By instruction for, it is meant that the response instruction generator 626 generates a response instruction that is used by either another component within the device 600 or a component coupled with the device 600, which causes the instructed response to occur. For example, coupled with the device 600 is an audio component having audio capabilities. The device generates a response instruction for the following words to be spoken, "Turn right." In this example, the audio component receives the response instruction, via wire and/or wirelessly, from the response instruction generator of device 600, and proceeds to cause the words, "Turn right." to be heard. Similarly, other components having the capabilities to cause a plurality of agents to make specific gestures are coupled with the system 600. These other components enable the gestures that are the subject of the response instruction to be performed by the plurality of agents (e.g., within an interactive AI of a game).

Example Methods of Use

FIG. 6B is a flow diagram 650 of an example method for interpreting meaning of a dialogue between a plurality of agents, wherein the plurality of agents comprises at least one of one or more automatons and one or more humans. In operation 652, in one embodiment and as described herein, a dialogue between said plurality of agents is accessed. As described herein, this dialogue may optionally include one or more of: an audio communication between the plurality of agents; and an action communicated between the plurality of agents.

In operation 654, in one embodiment and as described herein, input associated with the behavior of the plurality of agents and an interaction between the plurality of agents is accessed. As stated herein, this input may be stateful.

In operation 656, in one embodiment and as described herein, the received input of operation 654 is compared to a script type. As described herein, in various embodiments, the received input is optionally compared to any of the following: a fixed script; a fuzzy scripting; a parametric scripting; and a hybrid scripting.

In operation 658, in one embodiment and as described herein, the meaning of the dialogue is determined. In operation 660, in one embodiment and as described herein, a response instruction is generated based on the meaning determined in operation 658. In various embodiments and as described herein, the response instruction that is generated instructs any of the following: a verbal response; and a non-verbal response.

At least one embodiment includes a specific state machine design comprising the following states: COMMAND; ACK; and NACK.

At least one embodiment includes a specific state machine design comprising the following states: WAIT; LISTEN; and REPLY.

At least one embodiment includes a specific state machine design comprising the following states: IMPERATIVE; DECLARATIVE; INTERROGATIVE; and EXCLAMATORY.

Various embodiments include specific state machine designs comprising the following states: STANDBY; HAIL; ACK; NACK; NACK-ACK; CANCEL; EXECUTE, wherein next-state transitions are governed by state transition logic based on contextual parsing of dialogue and behavior such that the states represent meaning assigned to individual and/or group expression providing context to parsing of dialogue and other interactions. An example transition goes as follows: STANDBY/Silence; HAIL/"Car"; ACK/"Yes"; NACK-ACK/"Not You"; CANCEL/"OK. Sorry"; and STANDBY/Silence.

Various embodiments include specific state machine designs comprising the following states: STANDBY; HAIL; ACK; NACK; REQUEST; COMPLETED; ROGER; and EXECUTE, wherein next-state transitions are governed by state transition logic based on contextual parsing of dialogue and behavior such that the states represent meaning assigned to individual and/or group expression providing context to parsing of dialogue and other interactions. At least one such embodiment maps next-state transitions from: STANDBY to HAIL; ACK to NACK; NACK to STANDBY; ACK to REQUEST; REQUEST to ROGER; ROGER to EXECUTE; EXECUTE to COMPLETED; EXECUTE to DONE;

Various embodiments include specific state machine designs comprising the following states: IDLE, SLEEP, HAIL, ACK, NACK, NON-NACK, STANDBY, ROGER, OVER, EXECUTE wherein next-state transitions are governed by state transition logic based on contextual parsing of dialogue and behavior such that the states represent meaning assigned to individual and/or group expression providing context to parsing of dialogue and other interactions. At least one such embodiment maps next-state transitions from: IDLE to HAIL; HAIL to ACK; ACK to NACK; ACK to NON-NACK; NON-NACK to STANDBY; STANDBY to ROGER; ROGER to EXECUTE; EXECUTE to STANDBY (via !Singleton & clone); and EXECUTE to IDLE.

Various embodiments include specific state machine designs comprising the following states: COMMAND, TEACH, CONVERSE, OBEY, SNIPE, MODERATE wherein next-state transitions are governed by state transition logic based on contextual parsing of dialogue and behavior such that the states represent meaning assigned to individual and/or group expression providing context to parsing of dialogue and other interactions.

Various embodiments include specific state machine designs comprising the following states: PSEUDO-COMMUNITY, CHAOS, EMPTINESS, COMMUNITY wherein next-state transitions are governed by state transition logic based on contextual parsing of dialogue and behavior such that the states represent meaning assigned to individual and/or group expression providing context to parsing of dialogue and other interactions. At least one such embodiment maps next-state transitions from PSEUDO-COMMUNITY to CHAOS, CHAOS to EMPTINESS, EMPTINESS to COMMUNITY, CHAOS to PSEUDO-COMMUNITY, EMPTINESS to PSEUDO-COMMUNITY, COMMUNITY to PSEUDO-COMMUNITY.

Various embodiments include specific state machine designs comprising the following states: FORMING, STORMING, NORMING and PERFORMING, wherein next-state transitions are governed by state transition logic based on contextual parsing of dialogue and behavior such that the states represent meaning assigned to individual and/or group expression providing context to parsing of dialogue and other interactions. At least one such embodiment maps next-state transitions from FORMING to STORMING, STORMING to NORMING, NORMING to PERFORMING, and PERFORMING to FORMING.

Various embodiments include specific state machine designs comprising the following states: FALSE ACTUALIZATION, CHAOS, MOB, BUREAUCRACY, LEADERSHIP, ACTUALIZATION wherein next-state transitions are governed by state transition logic based on contextual parsing of dialogue and behavior such that the states represent meaning assigned to individual and/or group expression providing context to parsing of dialogue and other interactions. At least one such embodiment maps next-state transitions from: FALSE ACTUALIZATION to CHAOS; CHAOS to FALSE ACTUALIZATION; CHAOS to MOB; MOB to CHAOS; CHAOS to BUREAUCRACY; BUREAUCRACY to CHAOS; CHAOS to LEADERSHIP; LEADERSHIP to ACTUALIZATION; LEADERSHIP to FALSE ACTUALIZATION; and ACTUALIZATION to FALSE ACTUALIZATION.

Various embodiments include specific state machine designs comprising the following states: DENIAL, ANGER, BARGAINING, DEPRESSION, ACCEPTANCE wherein next-state transitions are governed by state transition logic based on contextual parsing of dialogue and behavior such that the states represent meaning assigned to individual and/or group expression providing context to parsing of dialogue and other interactions. At least one such embodiment maps next-state transitions from DENIAL to ANGER, DENIAL to BARGAINING, ANGER to DENIAL, BARGAINING to DENIAL, ANGER to DEPRESSION, BARGAINING to DEPRESSION, DEPRESSION to ACCEPTANCE, and ACCEPTANCE to DENIAL.

One or more embodiments combine synchronous and asynchronous state machines, using the following Boolean formulas to determine next-state transitions: COMPLETED= ((ASYNCHRONOUS AND STARTED) OR (SYNCHRONOUS AND FINISHED)); DONE=COMPLETED OR CANCELLED;

Embodiments of the present technology are thus described. While the present technology has been described in particular examples, it should be appreciated that the present technology should not be construed as limited by such examples, but rather construed according to the claims.

Embodiments for interpreting meaning of a dialogue between a plurality of agents, wherein said plurality of agents comprises at least one of one or more automatons and one or more humans can be summarized as follows:

1. A computer usable storage medium having instructions embodied therein that when executed cause a computer system to perform a method for interpreting meaning of a dialogue between a plurality of agents, wherein said plurality of agents comprises at least one of one or more automatons and one or more humans, said method comprising:
   accessing, by a processor, a dialogue between said plurality of agents;
   accessing, by said processor, input associated with a behavior of said plurality of agents and an interaction between said plurality of agents;
   comparing, by said processor, received input to a script type; and
   based on said comparing, determining, by said processor, a meaning of said dialogue.

2. The computer usable storage medium of claim 1, wherein said method further comprises:
   based on said determining said meaning, generating, at said processor, a response instruction.

3. The computer usable storage medium of claim 2, wherein said generating a response instruction comprises:
   generating a response instruction that instructs a verbal response.

4. The computer usable storage medium of claim 2, wherein said generating a response comprises:
   generating a response instruction that instructs a non-verbal response.

5. The computer usable storage medium of claim 1, wherein said accessing a dialogue between said plurality of agents comprises:
   accessing an audio communication between said plurality of agents.

6. The computer usable storage medium of claim 1, wherein said accessing a dialogue between said plurality of agents comprises:
   accessing an action communicated between said plurality of agents.

7. The computer usable storage medium of claim 1, wherein said comparing received input to a script type comprises:
   comparing received input to a fixed script.

8. The computer usable storage medium of claim 1, wherein said comparing received input to a script type comprises:
   comparing received input to a fuzzy scripting.

9. The computer usable storage medium of claim 1 wherein said comparing received input to a script type comprises:
   comparing received input to a parametric scripting.

10. The computer usable storage medium of claim 1, wherein said comparing received input to a script type comprises:
    comparing received input to a hybrid scripting comprising scripting aspects from at least one of a fixed script, a fuzzy scripting, and a parametric scripting.

11. A device for interpreting meaning of a dialogue between a plurality of agents, wherein said plurality of agents comprises at least one of one or more automatons and one or more humans, said device comprising:
    a dialogue accessor coupled with a processor, said dialogue accessor configured for accessing a dialogue between said plurality of agents;
    an input accessor coupled with said processor, said input accessor configured for accessing input associated with a behavior of said plurality of agents and an interaction between said plurality of agents;
    an input comparor coupled with said processor, said input comparor configured for comparing accessed input to a script type; and
    a meaning determiner coupled with said processor, said meaning determiner configured for determining a meaning of said dialogue based on said comparing.

12. The device of claim 11, further comprising:
    a response instruction generator coupled with said processor, said response generator configured for, based on said determining said meaning, generating a response instruction.

13. The device of claim 12, wherein said response instruction comprises:
    an instruction for a verbal response.

14. The device of claim 12, wherein said response instruction comprises:
    an instruction for a non-verbal response.

15. The device of claim 11, wherein said dialogue comprises:
    an audio communication between said plurality of agents.

16. The device of claim 11, wherein said dialogue comprises:
    an action communicated between said plurality of agents.

17. The device of claim 11, wherein said script type comprises:
    a fixed script.

18. The device of claim 11, wherein said script type comprises:
    a fuzzy scripting.

19. The device of claim 11, wherein said script type comprises:
    a parametric scripting.

20. The device of claim 11, wherein said script type comprises:
    a hybrid scripting comprising portions of scripting from at least two of a fixed script, a fuzzy scripting, and a parametric scripting.

Section Eight: Customizable Group—Centric Transmedia Communications; and Customizable Augmented Reality Based Social Transmedia Combat Simulator Notation and Nomenclature Some portions of the description of embodiments which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present discussions terms such as "generating", "accessing", "comparing", "determining", "receiving", "advancing", "using", "enabling", "receiving", "comparing", "generating", "providing", "locating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Glossary:

Customization: variation of application or game that requires minimal code change within structures that were designed for managing such change.

Skin: sets of simulation, visualizations, behavior and other configuration parameters that allow an apparently different application or game to be presented to the end-user without code changes.

Furthermore, in some embodiments, methods described herein can be carried out by a computer-usable storage medium having instructions embodied therein that when executed cause a computer system to perform the methods described herein.

Customizable Group—Centric Transmedia Communications

Brief Description

Embodiments provide models of group interaction and simulations of group activities to coordinate presentations to and interaction with users. Embodiments can be customized to fit the needs of different types of groups according to the communication and service delivery needs of each type of group. Individual groups can further change the functionality of the system through configuring group and personal preferences. Thus, embodiments provide a method for facilitating multimedia communications and service to a distributed group of users using augmented reality simulation and modeling of group dynamics.

Overview of Discussion

Example techniques, devices, systems, and methods modeling group dynamics using augmented reality simulation to facilitate multimedia communications and service to a distributed group of users are described herein. Discussion begins with example use case scenarios. An example system architecture is then described. Discussion continues with a description of example methods of use.

Use Case Scenarios

Figure 7A:
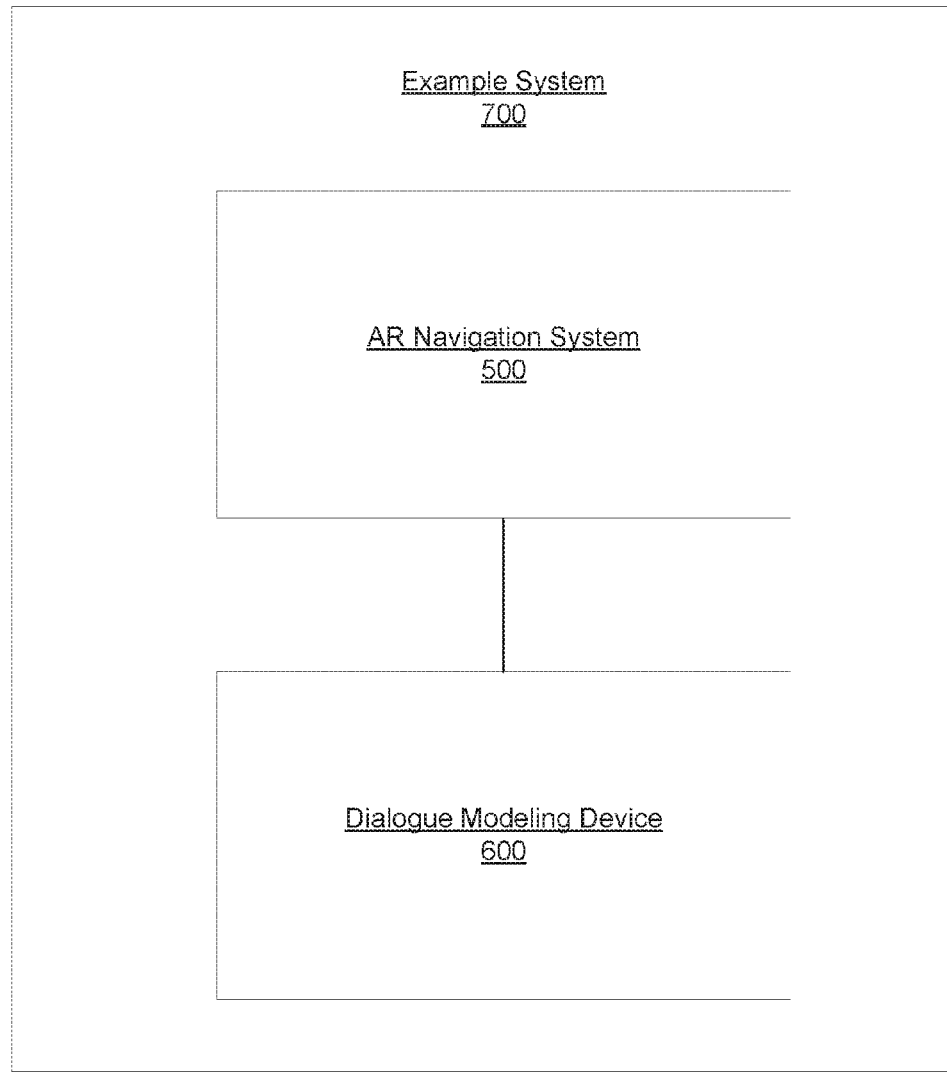
FIG. 7A is an example system for modeling group dynamics using augmented reality simulation to facilitate multimedia communications and service to a distributed group of users, according to an embodiment.

FIG. 7A shows an example system 700, in one embodiment, for modeling group dynamics using augmented reality simulation to facilitate multimedia communications and service to a distributed group of users, in accordance with an embodiment. In embodiments, the system 700 includes the system 500 of FIG. 5A coupled with the device 600 of FIG. 6A. The system 700 is configurable such that customized applications may be built according to preferences, such as the club rules.

In an example first use case scenario, the system 700 enables the behavior of yachts in the water to be modeled in a simulation. This simulation includes the optimization of performance within weather and water conditions. The simulation further includes the significance of movement and position of yachts in the water relative to each other and to a defined course, including calculating the handicap adjustments and determining a winner in real time.

For example, using embodiments, a particular yacht configures the system 700 according to the yacht club's preferences or club rules, including what handicap method to use, and even whether or not to handicap the race at all.

Also configurable are what actions (verbal and nonverbal responses, 630 and 632, respectively) will be taken upon the occurrence of a type(s) of events and the significance of the events. For example, boats crossing a finish line can trigger automatic content-capture events (can be both verbal and nonverbal responses, 630 and 632, respectively), which are then woven into automated content generation. These configurations described above, in some cases, need only be done once per year per yacht club, or as the rules and/or preferences change.

Real-time automated multimedia content generation, in the form of (automated content generation) interactive automated augmented reality transmedia breaking news/live event coverage, is streamed back to the yacht club and/or remotely to participants and/or to other users. The event coverage that is shown as a breaking news/live event coverage, in this instance, is the first navigatable virtual view of a first location of interest (the yacht race). Within this event coverage, a dialogue and input have already been accessed, compared with a script type, and a meaning of the dialogue determined.

Of note, this streaming occurs according to model simulation or race and configuration parameters set by the yacht club and by individual members and their device capabilities.

If a given configuration option is enabled, users can enter virtual boats in the race and operate them remotely (including from the yacht club). Another configuration option governs whether or not a right-of-way is granted to virtual boats. Virtual boats become visible to on-the-water sailors through augmented reality viewport devices (a navigatable virtual view). Of note, this capability is particularly useful for training youth prior to giving them a chance to crash the family yacht.

A user may also initiate a content capture (a third navigatable virtual view of a second location of interest), which can then assist race rules governance (greatly streamlining protest committee activities). Further, this content capture adds an entertaining on-the-water feel to content being streamed back to people ashore who have volunteered for shore-based service or are gathering for the after party.

At the end of the event, an automated interactive augmented reality transmedia news documentary television program is created (in response to a first virtual position information request associated with the first location of interest) and distributed to all club members. The documentary includes the stories of the overall event, and the individual stories of all of the participants to the event.

The following second use case scenario example is similar to the first use case scenario, except that the application in this use case scenario is tailored for groups of people taking a cruise vacation together. For example the simulation and group dynamic mapping significance to events and content capture center around, but not limited to, the following aspects: the ship itinerary, a group itinerary, individual itineraries and movement of individuals through the ship and movement of the ship to ports of call (as opposed to the on-the-water yacht performance models discussed above).

Additional customization uses near-field-communications (NFC) (either as embedded NFC component, or as component added to 802.11, blue tooth, or other wireless communication capability) to establish a point-to-point alternate communications network between passenger devices. Used in combination with successive approximation, numerical methods, or trained adaptive network, this network also models location of individuals below decks (and out of reach of GPS signals).

Passengers are able to view automated news and entertainment television programming content generated, similarly to the above example, on the ship's smart-TV based CATV or other device. Passengers are given reminders and navigation assistance to events for which they are signed up, as well as automated RSVP, ETA, and other communications assists.

At the end of the cruise, the cruise line delivers customized interactive augmented reality transmedia automated television programming that summarizes the passenger's experience, and the highlights associated with friends, family, etc.

The following third use case scenario is similar to the first and second use case scenario except that the modeling revolves around a prognosis, a stage of disease, roles of friends and family relative to the patient and the illness, and individual and group transition through Kubler-Ross and other models (best practice Kubler-Ross model is a non-linear state machine).

If the prognosis is for recovery (e.g. broken leg), then the social hub becomes analogous to a high-tech remote multimedia get-well card/recovery party that can be participated in remotely. If the prognosis leads to hospice care and death, meaningful communications connect people in direct contact and remotely and capture content and expressions that are communicated back to other members of the patient support group, but are also retained for inclusion in persistent virtual transmedia memorial.

The following fourth use case scenario involves the operations management of a restaurant. Using a combination of heads-up-display devices (or other viewport-oriented mobile devices) for roving server help and management staff, with stationary monitors/television devices for kitchen and other non-mobile staff, with cloud-based workflow and augmented reality based transmedia presentation, different roles within the organization can have virtual presentations of necessary service-related info presented as overlay to perceived reality of environment. For example, a waitress can see color-coded virtual plates overlaying actual customer plates and/or service stations to see how long individual customers have been waiting for their meal; A maitre d can see what areas new customers should be seated in next (by color, luminance, or other code). A manager can see, at a glance, visualizations of wait times for each area covered by service staff. Chefs and other kitchen staff can see order times, back-orders, priorities, etc. A whole delivery service sector can integrate with mobile devices to coordinate kitchen readiness and food delivery with customer demand and navigation route optimization.

Customizable Augmented Reality Based Social Transmedia Combat Simulator

FIG. 7A shows an example system 700, in one embodiment, for enabling at least one user to interact with each other and/or with at least one non-user characters (automatons, or Bots) within an immersed 360 degree augmented reality simulation of combat. As stated herein, the system 700 includes the system 500 of FIG. 5A and the device 600 of FIG. 6A. The system 700 is configurable such that customized applications may be built according to preferences to allow variation in interaction and capability.

Embodiments provide a simulation of "combat" (including hunting, spear-fishing, etc.) using augmented reality immersion that combines information from geospatial sensors, geospatial models and virtual reality models to achieve simulated movement, aiming, viewing, directional cues (e.g., sounds) and other interactions. Additionally, embodiments utilize network capability to model multiple users real-time interaction across complex networks. Embodiments are capable of being utilized by many different device types (e.g., smart phones, tablets, stereoscopic and monoscopic, stereophonic an monophonic, smart-televisions, laptops, etc.).

Embodiments also provide for different selectable modes, such as different roles and interactions based in part on media capabilities of the device, as well as circumstances. For example, when the user finds himself constricted in a public space, he may choose the mode setting, mobile geospatially-aware for non-geospatial input.

While the system is customizable to allow for variation in interaction and capability, each customization is configurable to have different "skins" that determine appearance, simulation parameters and artwork. Each skin can have one or more historical or non-historical "battles" which is a simple specification of assets, domains, and conditions (e.g., how many ships were placed where, with, what weather conditions in the battle of Trafalgar).

In an example third use case scenario, a land battle (e.g., paintball), the system 700 is designed to be a multiplayer augmented reality game to be played out of doors by people using heads-up-display glasses/helmets/goggles, and optionally, using specialized electronic smart-device weapons (e.g., smart gun). The electronic smart-device weapons have processors, geosensors, NFC/Bluetooth/802.11 or other communications capability. The virtual field of battle for the multiplayer augmented reality game is mapped to actual fields and woods where teams can attempt to achieve strategic objectives. Other devices, besides the heads-up-display glasses/helmets/goggles can support user interaction with the multiplayer augmented reality game, including any smart device capable of viewport display and virtual reality modeling in real-time.

A nearly endless list of virtual weapons can be simulated and brought into real world skirmish simulations/games such as paintball and laser tag guns (obsoleting weapons), historical and non-historical weapons (science fiction and fantasy) such as rifles, shotguns, pistols, swords, chainsaws, darts, cannonry, artillery, catapults, bazookas (rpgs), missiles, mortar, bows and arrows, spears, bomb, landmines, etc.

Virtual tanks, aircraft, and other vehicles and combatants can engage remotely from users/players not in the field (e.g. airstrikes can be called in with a WWII version, to be carried out by automatons or by other combatants (e.g, who are playing on a computer or smart-TV at home).

Different skins or sets of simulation and visualization parameters allow for many different historical and non-historical contexts. The following is a non-exhaustive list of land battle skins: (1) WWII skin: includes rifles, machine guns, tanks, propeller warplanes, landmines, grenades, RPGs, etc.; (2) WWI skin: including machine guns, rifles, artillery, crude aircraft, and chemical weapons; (3) Civil War skin: includes muskets and rifles, pistols, artillery, horse arty, cavalry; (4) 1812 skin: includes smooth bore cannonry, cavalry, muskets; and (5) stone age skin: includes slings, spears, axes, bows, and arrows.

In an example fourth use case scenario, a naval battle, the system 700 is designed to be a multiplayer augmented reality game. The following is a non-exhaustive list of naval battle skins: (1) Golden Age of Sail skin: a) wooden ships with cannons are mounted primarily broadside and sailing characteristics matching relative sailing characteristics of involved real vessels, and b) automated derivation of wind vectors on water from observed boat behavior (sideslip, performance against polars from low-pass filter applied to VMG, etc.) coupled with external wind indicators or models can help accuracy of artillery simulation and virtual reality boats; (2) Trireme skin: ideal for use with real canoes, kayaks, rowboats, and slower motor boats, virtual dimensions extending well beyond real boat dimensions allows safe AR naval combat simulation based on ancient ramming warships; (3) WWII skin: a) motor boats or rowboats/canoes; and b) remote virtual mode players can work virtual submarines that attack real boats; and 4) monitor vs. Virginia: slow motor boat vs. sailboat (or canoe vs. dinghy) plus simulation of historical weapon effectiveness provide entertaining experiential education.

In an example fifth use case scenario, a hunting game, the system 700 is designed to be a multiplayer augmented reality game. Hunting simulators based on previous technology have been able to provide an analog experience to "swing shooting" and "lead a shooting" techniques, but a true "snap shooting" hunting simulation requires immersive augmented reality to capture the subtle interplay between stereophonic audio cues to initial target direct, identification, and movement and the transition to three dimensional visual cues for a firing solution (and potential additional transition to "lead shooting" or "swing shooting" modes).

Adaptive network behavior simulated upland birds learn behaviors to avoid getting shot, similar to real-world populations in areas of hunting pressure (raising skill level with statistical distribution of learned behavior models), providing for more realistic behaviors.

In an example sixth use case scenario, in an immersed augmented reality transmedia game, the system 700 is designed to be a multiplay augmented reality game. The following is a non-exhaustive list of skins utilized for this type of game: (1) snowballs skin: animated snowmen throwing snowballs (iceballs, etc.) at each other while users and automatons are manifested as snowmen/snowwomen avatars; (2) Clash of the Titans skin: based loose on Greek mythology (variants based on other mythologies), giant avatars (relative to the size of earth as modeled within the game); (3) Mars skin: similar to the Clash of the Titans skin and using public-domain Martian landscape topography; (4) Moon skin: similar to the Mars skin, and using public-domain Moonscape topography and images; (5) space skin: a) immersed 360 degree space ship-to-ship combat simulation; and b) accurate view from solar system for navigation/orientation within the game; and 6) tanks skin: a) topographic AR tank battle simulation; and b) historical and non-historical contexts.

Example System Architecture

According to embodiments and with reference still to FIG. 7A, the system 700 includes the system 500 coupled with the device 600, as are described above.

Example Methods of Use

FIGS. 7B and 7C are a flow diagram of method 702 for modeling group dynamics using augmented reality simulation to facilitate multimedia communications and service to a distributed group of users, in accordance with an embodiment.

In operation 704, in one embodiment and as described herein, a first navigatable virtual view of a first location of interest (e.g., yachting area described above) is generated, wherein the first location of interest is one of a first virtual location (e.g., a virtual yachting race at a virtual ocean) and a first non-virtual location (e.g., the actual area in which the yachting race is to be held). In one embodiment, the first location of interest is a first set of documents. While in another embodiment, the first location of interest is of a video.

In operation 706, in one embodiment and as described herein, concurrently with the generating the first navigatable virtual view of the first location of interest, a second navigatable virtual view corresponding to a current physical position of an object is generated, such that real-time sight at the current physical position is enabled within the second navigatable virtual view. In one embodiment, the real-time sight is virtual. In one embodiment, the second navigatable virtual view includes a virtual vehicle that remains within a predetermined distance from the object as the object moves.

In operation 708, in one embodiment and as described herein, a dialogue between the plurality of agents is accessed. In various embodiments, the dialogue that is accessed is an action communicated between the plurality of agents and/or an audio communication between the plurality of agents.

In operation 710, in one embodiment and as described herein, concurrently with the generating the first navigatable virtual view of the first location of interest, a second navigatable virtual view corresponding to a current physical position of an object is generated, such that real-time sight at the current physical position is enabled within the second navigatable virtual view.

In operation 712, input associated with a behavior of a plurality of agents and an interaction between said plurality of agents is accessed, wherein the plurality of agents comprises at least one of one or more automatons and one or more humans.

In operation 714, in one embodiment and as described herein, received input is compared to a script type. In various embodiments, the received input is compared to a fixed script, fuzzy scripting, a parametric scripting, and a hybrid scripting. In operation 716, in one embodiment and as described herein, based on the comparing, determining, a meaning of the dialogue. In operation 718, in one embodiment and as described herein, concurrently with the generating of operation 704 of the first navigatable virtual view of said first location of interest, generating a third navigatable virtual view of a second location of interest, wherein the second location of interest is one of a second virtual location and a second non-virtual location.

In operation 720, in one embodiment and as described herein, a first virtual position information request associated with said first location of interest is received, the first virtual position information request is compared with a store of location position information, and based on the comparing, a response to the first virtual position information request is generated.

In operation 722, in one embodiment and as described herein, at least one of following is received: an advancement instruction to virtually advance towards the first location of interest until virtual position information of the first virtual position information request matches the first location of interest; and advancement information signifying that a physical advancement towards the first location of interest has occurred, wherein the virtual position information matches the first location of interest and the advancement information includes a virtual viewing position of the first location of interest; and in response to a received advancement instruction, an advancement is made towards the first location of interest, thereby achieving the virtual viewing position.

In operation 724, in one embodiment and as described herein, a non-real-time stored imaging associated with the current physical position is used. In operation 726, in one embodiment and as described herein, a second virtual position information request associated with the second navigatable virtual view is received, the second virtual position information request is compared with a store of location position information, and based on the comparing, a response to the second virtual position information request is generated.

In operation 728, in one embodiment and as described herein, a second navigatable view of a second virtual set of documents at the second location of interest is generated. In operation 730, in one embodiment and as described herein, a search request object within the first virtual set of documents is located. In operation 731, in one embodiment and as described herein, the first navigatable virtual view of a video is generated. In operation 732, in one embodiment and as described herein, based on the determining the meaning, a response instruction is generated. In various embodiments, the response instruction is a verbal response and/or a non-verbal response.

Embodiments of the present technology are thus described. While the present technology has been described in particular examples, it should be appreciated that the present technology should not be construed as limited by such examples, but rather construed according to the claims.

Embodiments for modeling group dynamics using augmented reality simulation to facilitate multimedia communications and service to a distributed group of users can be summarized as follows:

1. A computer usable storage medium having instructions embodied therein that when executed cause a computer system to perform a method for modeling group dynamics using augmented reality simulation to facilitate multimedia communications and service to a distributed group of users, said method comprising:
   generating, at a processor, a first navigatable virtual view of a first location of interest, wherein said first location of interest is one of a first virtual location and a first non-virtual location;
   concurrently with said generating said first navigatable virtual view of said first location of interest, generating, at said processor, a second navigatable virtual view corresponding to a current physical position of an object, such that real-time sight at said current physical position is enabled within said second navigatable virtual view;
   accessing, by said processor, a dialogue between said plurality of agents;
   accessing, by said processor, input associated with a behavior of a plurality of agents and an interaction between said plurality of agents, wherein said plurality of agents comprises at least one of one or more automatons and one or more humans;
   comparing, by said processor, received input to a script type; and
   based on said comparing, determining, by said processor, a meaning of said dialogue.

2. The computer usable storage medium of claim 1, further comprising:
   concurrently with said generating, by said processor, said first navigatable virtual view of said first location of interest, generating, by said processor, a third navigatable virtual view of a second location of interest, wherein said second location of interest is one of a second virtual location and a second non-virtual location.

3. The computer usable storage medium of claim 1, further comprising:
   receiving, at said processor, a first virtual position information request associated with said first location of interest; comparing said first virtual position information request with a store of location position information; and based on said comparing, generating a response to said first virtual position information request.

4. The computer usable storage medium of claim 3, further comprising:
   receiving, at said processor, at least one of:
     an advancement instruction to virtually advance towards said first location of interest until virtual position information of said first virtual position information request matches said first location of interest; and
     advancement information signifying that a physical advancement towards said first location of interest has occurred, wherein said virtual position information matches said first location of interest and said advancement information includes a virtual viewing position of said first location of interest; and
   in response to a received advancement instruction, advancing towards said first location of interest, thereby achieving said virtual viewing position.

5. The computer usable storage medium of claim 1, further comprising:
   using, by said processor, non-real-time stored imaging associated with said current physical position.

6. The computer usable storage medium of claim 1, wherein enabling said real-time sight at said current physical position comprises:
   enabling real-time virtual sight.

7. The computer usable storage medium of claim 1, further comprising:
   receiving, at said processor, a second virtual position information request associated with said second navigatable virtual view;
   comparing, by said processor, said second virtual position information request with a store of location position information; and
   based on said comparing, generating, by said processor, a response to said second virtual position information request.

8. The computer usable storage medium of claim 1, wherein said providing a second navigatable virtual view comprises:
   providing a virtual vehicle within said second navigatable virtual view, wherein said virtual vehicle remains within a predetermined distance from said object as said object moves.

9. The computer usable storage medium of claim 1, wherein said generating a first navigatable virtual view of a first location of interest comprises:
   generating said first navigatable view of a first virtual set of documents as said first location of interest.

10. The computer usable storage medium of claim 1, further comprising:
    generating, at said processor, a second navigatable view of a second virtual set of documents at said second location of interest.

11. The computer usable storage medium of claim 1, further comprising:
    locating, by said processor, a search request object within said first virtual set of documents.

12. The computer usable storage medium of claim 1, wherein said generating a first navigatable virtual view of a first location of interest comprises:
    generating said first navigatable virtual view of a video.

13. The computer usable storage medium of claim 1, wherein said method further comprises:
    based on said determining said meaning, generating, at said processor, a response instruction.

14. The computer usable storage medium of claim 13, wherein said generating a response instruction comprises:
generating a response instruction that instructs a verbal response.
15. The computer usable storage medium of claim 13, wherein said generating a response comprises:
generating a response instruction that instructs a non-verbal response.
16. The computer usable storage medium of claim 1, wherein said accessing a dialogue between said plurality of agents comprises:
accessing an audio communication between said plurality of agents.
17. The computer usable storage medium of claim 1, wherein said accessing a dialogue between said plurality of agents comprises:
accessing an action.
18. The computer usable storage medium of claim 1, wherein said comparing received input to a script type comprises:
comparing received input to a fixed script.
19. The computer usable storage medium of claim 1, wherein said comparing received input to a script type comprises:
comparing received input to a fuzzy scripting.
20. The computer usable storage medium of claim 1, wherein said comparing received input to a script type comprises:
comparing received input to a parametric scripting.
21. The computer usable storage medium of claim 1, wherein said comparing received input to a script type comprises:
comparing received input to a hybrid scripting comprising scripting aspects from at least one of a fixed script, a fuzzy scripting, and a parametric scripting.
22. A system for modeling group dynamics using augmented reality simulation to facilitate multimedia communications and service to a distributed group of users, said system comprising:
a first navigatable virtual view generator coupled with a processor, said first navigatable virtual view generator for generating a first navigatable virtual view of a first location of interest, wherein said first location of interest is one of a first virtual location and a first non-virtual location;
a second navigatable virtual view generator coupled with said processor, said second navigatable virtual view generator for, concurrently with said generating said first navigatable virtual view, generating a second navigatable virtual view corresponding to a current physical position of an object coupled with said system, such that real-time sight at said current physical position is enabled within said second navigatable virtual view;
a dialogue accessor coupled with said processor, said dialogue accessor configured for accessing a dialogue between a plurality of agents, wherein said plurality of agents comprises at least one of one or more automatons and one or more humans;
an input accessor coupled with said processor, said input accessor configured for accessing input associated with a behavior of said plurality of agents and an interaction between said plurality of agents;
an input comparor coupled with said processor, said input comparor configured for comparing accessed input to a script type; and
a meaning determiner coupled with said processor, said meaning determiner configured for determining a meaning of said dialogue based on said comparing.
23. The system of claim 22, further comprising:
a third navigatable virtual view generator coupled with said processor, said third navigatable virtual view generator for, concurrently with said generating said first navigatable virtual view of said first location of interest, generating a third navigatable virtual view of a second location of interest, wherein said second location of interest is one of a second virtual location and a second non-virtual location.
24. The system of claim 22, further comprising:
a first virtual position information request receiver coupled with said processor, said first virtual position information request receiver configured for receiving a first virtual position information request associated with said first location of interest;
a first virtual position information request comparor coupled with said processor, said first virtual position information request comparor configured for comparing said first virtual position information request with a store of location position information; and
a response generator coupled with said processor, said response generator configured for, based on said comparing, generating a response to said first virtual position information request.
25. The method of claim 24, further comprising:
an advancement instruction receiver coupled with said processor, said advancement instruction receiver configured for receiving an advancement instruction to virtually advance towards said first location of interest until virtual position information of said first virtual position information request matches said first location of interest;
an advancer coupled with said processor, said advancer configured for virtually advancing towards said first location of interest, thereby achieving a virtual viewing position; and
an advancement information receiver coupled with said processor, said advancement information receiver configured for receiving advancement information signifying that a physical advancement towards said first location of interest has occurred, wherein said virtual position information matches said first location of interest and said advancement information includes said virtual viewing position of said first location of interest.
26. The system of claim 22, wherein non-real-time stored imaging associated with said current physical location is further enabled.
27. The system of claim 22, wherein said real-time sight comprises:
real-time virtual sight.
28. The system of claim 22, wherein said second navigatable virtual view comprises:
a virtual vehicle that remains within a predetermined distance from said object as said object moves.
29. The system of claim 22, wherein said first location of interest comprises:
a first virtual set of documents.
30. The device of claim 22, further comprising:
a response instruction generator coupled with said processor, said response generator configured for, based on said determining said meaning, generating a response instruction.
31. The device of claim 30, wherein said response instruction comprises:
an instruction for a verbal response.
32. The device of claim 30, wherein said response instruction comprises:
an instruction for a non-verbal response.
33. The device of claim 22, wherein said dialogue comprises:
an audio communication between said plurality of agents.

34. The device of claim 22, wherein said dialogue comprises:
   an action communicated between said plurality of agents.
35. The device of claim 22, wherein said script type comprises:
   a fixed script.
36. The device of claim 22, wherein said script type comprises:
   a fuzzy scripting.
37. The device of claim 22, wherein said script type comprises:
   a parametric scripting.
38. The device of claim 22, wherein said script type comprises:
   a hybrid scripting comprising portions of scripting from at least two of a fixed script, a fuzzy scripting, and a parametric scripting.

Computer System Description

Figure 8:
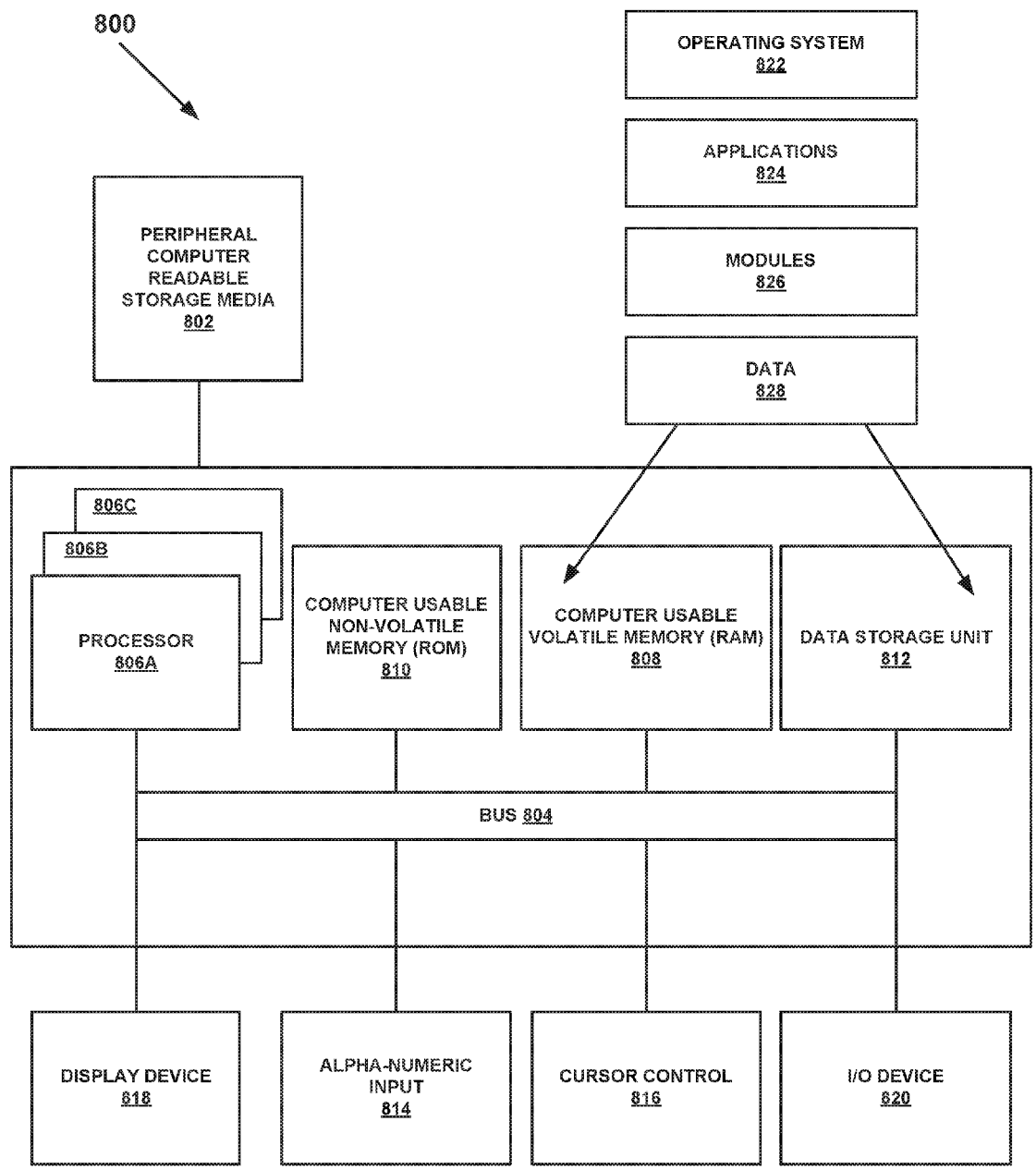
FIG. 8 is a diagram of an example computer system used for performing a method for various embodiments disclosed herein.

FIG. 8 is a block diagram of an example of a computer system 800, in accordance with an embodiment. With reference now to FIG. 8, portions of the technology for the coherent presentation of multiple reality and interaction models are composed of computer-readable and computer-executable instructions that reside, for example, in computer-readable storage media of a computer system. That is, FIG. 8 illustrates one example of a type of computer that can be used to implement embodiments, which are discussed below, of the present technology.

It is appreciated that system 800 of FIG. 8 is an example only and that the present technology can operate on or within a number of different computer systems including general purpose networked computer systems, embedded computer systems, routers, switches, server devices, user devices, various intermediate devices/artifacts, standalone computer systems, and the like. As shown in FIG. 8, computer system 800 of FIG. 8 is well adapted to having peripheral computer readable media 802 such as, for example, a floppy disk, a compact disc, and the like coupled thereto.

System 800 of FIG. 8 includes an address/data bus 804 for communicating information, and a processor 806A coupled to bus 804 for processing information and instructions. As depicted in FIG. 8, system 800 is also well suited to a multi-processor environment in which a plurality of processors 806A, 806B, and 806C are present. Conversely, system 800 is also well suited to having a single processor such as, for example, processor 806A. Processors 806A, 806B, and 806C may be any of various types of microprocessors. System 800 also includes data storage features such as a computer usable volatile memory 808, e.g. random access memory (RAM), coupled to bus 804 for storing information and instructions for processors 806A, 806B, and 806C.

System 800 also includes computer usable non-volatile memory 810, e.g. read only memory (ROM), coupled to bus 804 for storing static information and instructions for processors 806A, 806B, and 806C. Also present in system 800 is a data storage unit 812 (e.g., a magnetic or optical disk and disk drive) coupled to bus 804 for storing information and instructions. System 800 also includes an optional alphanumeric input device 814 including alphanumeric and function keys coupled to bus 804 for communicating information and command selections to processor 806A or processors 806A, 806B, and 806C. System 080 also includes an optional cursor control device 816 coupled to bus 804 for communicating user input information and command selections to processor 806A or processors 806A, 806B, and 806C. System 800 of the present embodiment also includes an optional display device 818 coupled to bus 804 for displaying information.

Referring still to FIG. 8, optional display device 818 of FIG. 8 may be a liquid crystal device, cathode ray tube, plasma display device or other display device suitable for creating graphic images and alphanumeric characters recognizable to a user. Optional cursor control device 816 allows the computer user to dynamically signal the movement of a visible symbol (cursor) on a display screen of display device 818. Many implementations of cursor control device 816 are known in the art including a trackball, mouse, touch pad, joystick or special keys on alpha-numeric input device 814 capable of signaling movement of a given direction or manner of displacement. Alternatively, it will be appreciated that a cursor can be directed and/or activated via input from alpha-numeric input device 814 using special keys and key sequence commands.

System 800 is also well suited to having a cursor directed by other means such as, for example, voice commands. System 800 also includes an I/O device 820 for coupling system 800 with external entities. For example, in one embodiment, I/O device 820 is a modem for enabling wired or wireless communications between system 800 and an external network such as, but not limited to, the Internet. A more detailed discussion of the present technology is found below.

Referring still to FIG. 8, various other components are depicted for system 800. Specifically, when present, an operating system 822, applications 824, modules 826, and data 828 are shown as typically residing in one or some combination of computer usable volatile memory 808, e.g. random access memory (RAM), and data storage unit 812. However, it is appreciated that in some embodiments, operating system 822 may be stored in other locations such as on a network or on a flash drive; and that further, operating system 822 may be accessed from a remote location via, for example, a coupling to the internet. In one embodiment, the present technology, for example, is stored as an application 824 or module 826 in memory locations within RAM 808 and memory areas within data storage unit 812. The present technology may be applied to one or more elements of described system 800. For example, a method for identifying a device associated with a transfer of content may be applied to operating system 822, applications 824, modules 826, and/or data 828.

The computing system 800 is only one example of a suitable computing environment and is not intended to suggest any limitation as to the scope of use or functionality of the present technology. Neither should the computing environment 800 be interpreted as having any dependency or requirement relating to any one or combination of components illustrated in the example computing system 800.

Section Nine: Delivering Aggregated Social Media

Overview

Embodiments described herein provide aggregated media programming from a plurality of media types including real-time and non-real-time video and audio elements. Example media types may include, but are not limited to, social media information such as text information, photographs, and videos that are posted to the Internet, information selected to be followed by a user, sent to a user's mobile device, emailed to a user, generated by a user, broadcast for radio or television, and the like. The media types are aggregated into a customized media content that can be delivered in a single coherent broadcast. The broadcast may be viewed on a television, a computer, a mobile device, listened to over the radio, provided in the form of a podcast, and the like.

In other words, instead of requiring interaction with a computer program to access social media or other specific user interests, each user or group of users is able to initially select the type of media that they would like to access and the media will be presented as a passive information broadcast that allows the viewer to "opt-in" to interaction at any time.

In one embodiment, the content can be created from scratch for each viewer or group of viewers. However, in another embodiment, the broadcast may combine elements common to broad viewership interests with elements of personalized viewership interests. For example, the social media data stream broadcast may include portions of national and international evening news shows interspersed with a personal news channel incorporating information from friends, family, work, industry, colleagues, and the like; social media friend updates; emailed information; and the like.

In other words, by using, pre-produced elements and layout and behavior modeling, in conjunction with data received from a variety of unstructured or differently structured sources, a passively viewable optionally interactive cohesive social media data stream can be dynamically generated. In so doing, the present technology goes beyond simple combined displays of information by relating structure between various social media portals, and restructuring the data sources of each resulting in a cohesive social media data stream.

Figure 9A:
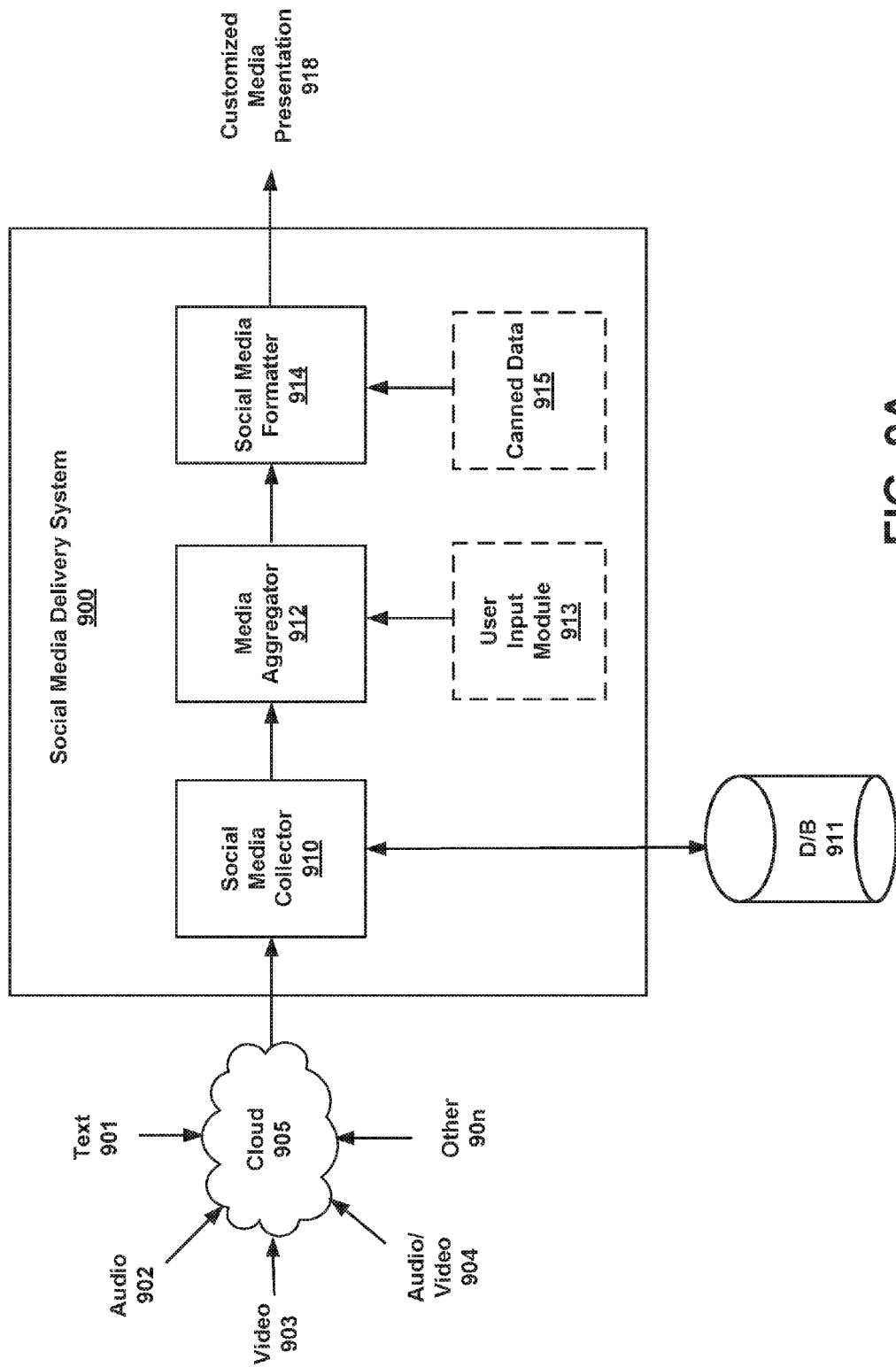
FIG. 9A is a block diagram of an aggregated social media delivery system, according to an embodiment.

With reference now to FIG. 9A a block diagram of an aggregated social media delivery system 900 is shown in accordance with one embodiment of the present technology. In general, social media delivery system 900 receives social media data snippets from cloud 905 and combines the data snippets into a coherent customized media presentation 918.

In general, the social media data snippets may be collected from across a network cloud including, but not limited to, the Internet. The media presentation 918 may be a broadcast such as a radio or television broadcast. That is, the media presentation 918 may be an audio presentation, an audio visual presentation, or the like.

In one embodiment, the social media data snippets include text 901, audio 902, video 903, audio/video 904 and other 90n. For example, the social media data stream broadcast may include portions of national and international evening news shows; information from friends, family, work, industry, colleagues, and the like; social media friend updates; emailed information; and the like.

In one embodiment, social media delivery system 900 includes a social media collector 910, a media aggregator 912 and a social media formatter 914. In one embodiment, social media collector 910 includes a user customizable configuration allowing a user to personalize the type of media data snippets received from cloud 905. In addition, in one embodiment social media collector 910 may store the data snippets in a repository such as database 911.

Media aggregator 912 merges at least two social media data snippets from the repository into a coherent social media data stream. In one embodiment, a user input module 913 may be optionally coupled with media aggregator 912. User input module 913 allows a user to optionally add additional content and direction to the media presentation 918. In general, user direction may include source provider information as well as viewer side information.

Social media formatter 914 provides the coherent media data stream in a user accessible format. In a further embodiment, social media formatter 914 may access optional canned data 915 to supplement and/or provide formatting information to the media presentation 918. For example, canned data 915 may include canned scripts and metadata structures developed to provide flexible structures to guide generation of media presentation 918 in formats specific to social media sources.

In one embodiment, media presentation 918 may be provided upon user access. For example, if media presentation 918 is a television broadcast, media presentation 918 may begin when a user turns on a television and selects the appropriate channel. Upon selecting the channel, the social media delivery system 900 will begin media presentation 918.

In another embodiment, media presentation 918 may be a continuously provided data stream. In other words, media presentation 918 would be available even if the media playing device was not activated, similar to any broadcast that occurs regardless of whether the broadcast is actually being watched. As such, a user would be able to activate the presentation device and tune into the in-progress media presentation 918. In one embodiment, media presentation 918 may be a loop that is updated at a pre-defined interval, updated when a threshold of new or modified information is achieved, updated when a user defined change occurs, or the like. For example, if a user were following the football season, media presentation 918 may be updated after a game has ended, whenever a score changes, if news is provided about a favorite team, etc.

Figure 9B:
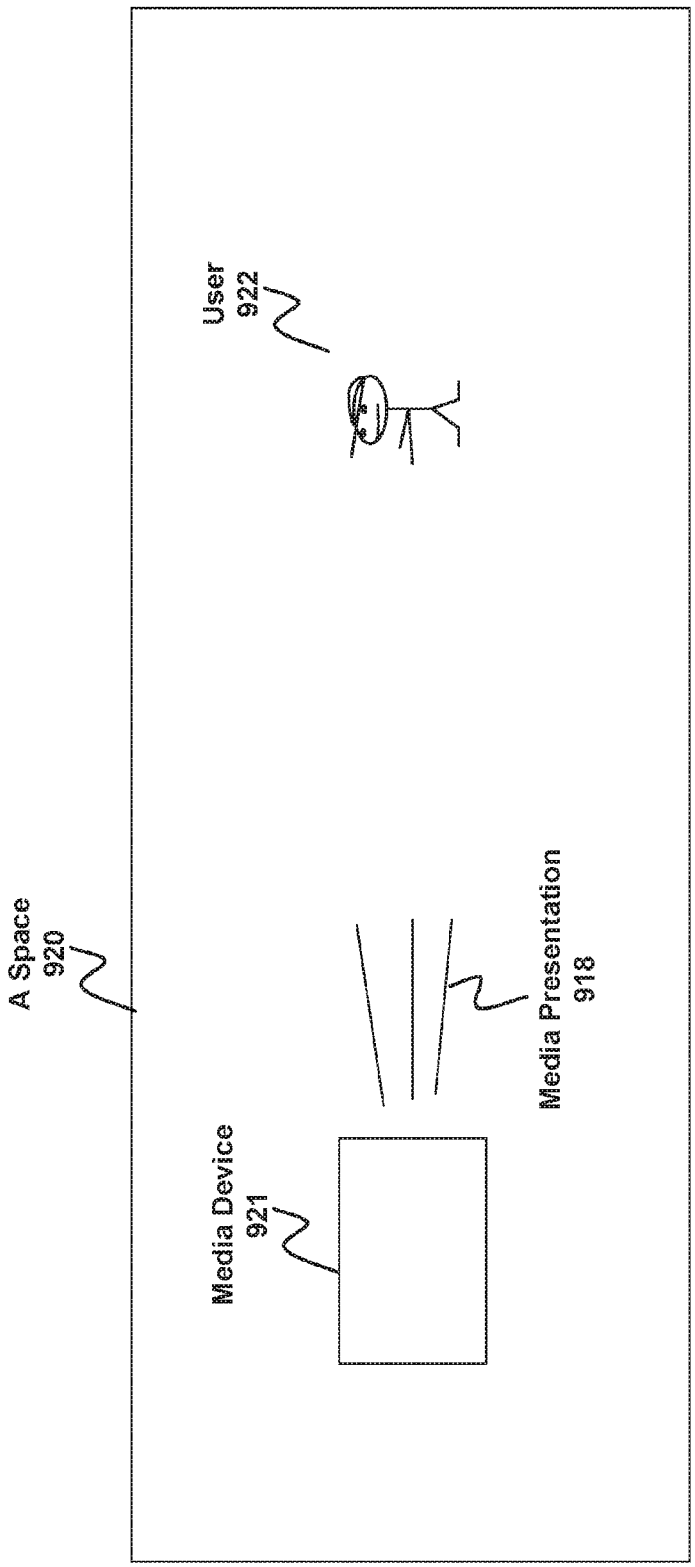
FIG. 9B is an illustration of the delivery of aggregated social media, according to one embodiment.

Referring now to FIG. 9B, an illustration of the delivery of aggregated social media is shown in accordance with one embodiment of the present technology. In one embodiment, FIG. 9B includes a space 920, a media device 921, media presentation 918 and a user 922. In general, space 920 may be a room, a hall, a public square, or the like, wherein a media presentation 918 may be presented.

Media device 921 is any device capable of presenting media presentation 918. For example, media device 921 may be, but is not limited to, a radio, a television, a computer, a portable device, a mobile phone, a laptop computer, and the like. User 922 may represent a person or a group of people to whom the media presentation 918 has been customized.

With reference now to FIG. 9C, a flowchart 925 of a method for delivering aggregated social media in a user accessible format is shown in accordance with one embodiment of the present technology.

Referring now to 930 of FIG. 9C and FIG. 9A, one embodiment collects a plurality of social media data snippets. As shown in FIG. 9A, the plurality of social media data snippets are selected from the group of videos, audio files, images, and text. In addition, the social media data snippets may be one or more of real-time, near-real-time and evergreen media data snippets. In general, evergreen refers to data that is not time specific.

For example, if a friend had been climbing Mt. Everest, the days of climbing to the peak may be near-real time information, while it would be important to have the actual achieving of the summit in real-time. In contrast, evergreen media data may be background information such as information about Mt. Everest, the friend's previous successful climbs, backstory about the friend, backstory about other climbers in the friend's group, historical weather information, and the like.

With reference now to 932 of FIG. 9C and FIG. 9A, one embodiment stores the plurality of social media data snippets in a media data repository.

Referring now to 934 of FIG. 9C and FIG. 9A, one embodiment aggregates at least two of the plurality of social media data snippets into a cohesive social media data stream. In other words, media aggregator 912 organizes the plurality of social media data snippets into a pre-defined order. For example, the order may be based on a timeline. Similarly, the pre-defined order may include a metric to adjust the order of social media data snippets based on the level of intensity of the information, e.g., information about a birth or death may be placed ahead of information about a friends outfit.

The pre-defined order metric may also adjust the order of social media data snippets based on relevancy of the information. For example, location data that includes information about a traffic accident on the route the user is presently traveling would be placed ahead of a social media data snippet about a friend's night out. In another embodiment, the pre-defined order metric may be user driven such that the social media data snippets are organized by media aggregator 912 based on user defined criteria.

With reference now to 936 of FIG. 9C and FIG. 9A, one embodiment formats the cohesive social media data stream into a coherent social media data stream. In one embodiment, user input may be used to selectively modify the media presentation 918.

For example, in one embodiment, social media formatter 914 metadata may utilize metadata such as scripting and logic filters to guide a structured content programming format based on real-time synthesis of the cohesive social media data stream. In general, the metadata may include pre-produced video and audio captured sequences from photographic/video/multimedia recordings. In one embodiment, the video and audio may be edited for use similarly to wave-table synthesis with random-access to frame and subframe samples.

For example, social media formatter 914 metadata may include customized segments such as, but not limited to: upcoming social events, synthesized on-air talent announcing birthdays, graduations, parties, trips, visitors, and other events in the coming month. Audio and talking-head video sequences related to announcing dates, duration, and basic event types are structured enough to be highly realistic in their real-time synthesis by "kerning" together audio and video segments (reducing bad edit-spots and unnatural speech gaps). Common given names (and some surnames) are also limited enough in scope to allow for natural pre-produced pronunciation "wave-table-synthesis" of video and audio segments to be stitched together to provide content.

In one embodiment, social media formatter 914 metadata may utilize Avatars (e.g., texture maps to shape models including recognizable faces) to simulate or illustrate social interaction. In addition, the avatars may be combined with speech synthesis to deliver less structured data (including less common names for the above example).

Social media formatter 914 metadata may additionally utilize phoneme-based speech synthesis and/or interactive simulations depicting model representations of events that can be augmented by voice-over or simulation audio. For example: social media formatter 914 may utilize a time-accelerated augmented reality fly-through sequence of day trip through Paris, bump-shots from walk-through of virtual model of trade convention, surfing simulation with real-time conditions at Waikiki (forecast, current, or at date of past event), or the like.

Social media formatter 914 metadata may additionally utilize calendar graphics, charts, and the like to depict statistical and time-based information; For example, a month in review calendar graphic, a workload, networking group results, and the like.

In another embodiment, social media formatter 914 metadata may include traditional multimedia segments (video, audio, photos, slideshows, etc.) uploaded into portals. For example: videos of niece waterskiing, photos of friends at the Coliseum, etc.

Social media formatter 914 metadata may include pre-produced augmented reality based interactive transmedia segments. In other words, segments that can cross-link to presented content and allow greater interactivity between passively viewed programming content and more interaction with in-depth content, or full interactivity with underlying posts.

In another embodiment, social media formatter 914 metadata may include highlighted text filtered from raw social media data snippets presented as summaries of longer messages or information. For example, Business-slide-like text presentations of business connection tweet highlights, news-font-graphic-like presentations of personal events or wall posts, and the like.

Referring now to 938 of FIG. 9C and FIGS. 9A and 9B, one embodiment provides the coherent social media data stream in a user accessible format. In one embodiment, a user 922 may select additional social media data snippets to be added to the media presentation 918. Similarly, a user 922 may select social media data snippets to be removed from the media presentation 918.

A summary of embodiments for directing a processor to execute a method for delivering aggregated social media is as follows:

1. An aggregated social media delivery system comprising:
    a social media collector to collect a plurality of social media data snippets in a social media data repository;
    a media aggregator for merging at least two social media data snippets from the repository into a coherent social media data stream; and
    a media formatter to provide the coherent media data stream in a user accessible format.
2. The user configurable social media delivery system of claim 1 wherein the plurality of social media data snippets are selected from the group of videos, audio files, images, and text.
3. The user configurable social media delivery system of claim 1 wherein the coherent media data stream is an audio visual format.
4. The user configurable social media delivery system of claim 1 wherein the coherent media data stream is an audio format.
5. The user configurable social media delivery system of claim 1 wherein the media aggregator combines real-time, near-real-time and evergreen media data snippets.
6. The user configurable social media delivery system of claim 1 further comprising:
    a user selectable module which modifies the coherent media data stream based on user provided input.
7. The user configurable social media delivery system of claim 6 wherein the user provided input is selected from the group comprising: adding additional social media data content and selecting social media data content to be removed.
8. The user configurable social media delivery system of claim 1 further comprising:
    a canned data module to provide canned data to the media formatter to modify the coherent media data stream.
9. The user configurable social media delivery system of claim 1 wherein the coherent media data stream is provided upon access.
10. The user configurable social media delivery system of claim 1 wherein the coherent media data stream is a continuously provided data stream.
11. The user configurable social media delivery system of claim 1 wherein the coherent media data stream is updated at a pre-defined interval.
12. A non-transitory computer-readable storage medium comprising computer executable code for directing a processor to execute a method for delivering aggregated social media, said method comprising:
    collecting a plurality of social media data snippets;
    storing the plurality of social media data snippets in a media data repository;

aggregating at least two of the plurality of social media data snippets into a cohesive social media data stream; and
formatting the social media data stream into a coherent social media data stream; and
providing the coherent social media data stream in a user accessible format.

13. The non-transitory computer-readable storage medium recited of claim 12 wherein the plurality of social media data snippets are selected from the group of videos, audio files, images, and text.

14. The non-transitory computer-readable storage medium recited of claim 12 wherein the social media data snippets are selected from the group consisting of: real-time, near-real-time and evergreen media data snippets.

15. The non-transitory computer-readable storage medium recited of claim 12 further comprising:
receiving user input to selectively modify the coherent social media data stream.

16. The non-transitory computer-readable storage medium recited of claim 15 further comprising:
selecting additional social media data snippets to be added; and
selecting social media data snippets to be removed.

17. The non-transitory computer-readable storage medium recited of claim 12 further comprising:
utilizing at least one canned data snippet to adjust the formatting of the cohesive social media data stream into the coherent social media data stream.

18. The non-transitory computer-readable storage medium recited of claim 12 wherein the coherent social media data stream is provided from the group consisting of: upon an access; in a continuous format and at a pre-defined time interval.

19. A social media delivery system comprising:
a social media collector to collect a plurality of social media data snippets in a social media data repository, wherein the plurality of social media data snippets are selected from the group of videos, audio files, images, and text;
a media aggregator for combining at least two social media data snippets from the repository into a social media data stream, wherein the media aggregator combines real-time, near-real-time and evergreen media data snippets;
a canned data module to provide canned data; and
a media formatter to modify the social media data stream in conjunction with the canned data to generate a coherent social media data stream in a user accessible format.

20. The social media delivery system of claim 19 further comprising:
a user selectable module which modifies the coherent media data stream based on user provided input, wherein the user provided input is selected from the group comprising: adding additional social media data content and selecting social media data content to be removed.

Section Ten: Aggregated Social Media Formatter
Overview

Embodiments described herein provide aggregated media programming from a plurality of media types including real-time and non-real-time video and audio elements. Example media types may include, but are not limited to, social media information such as text information, photographs, and videos that are posted to the Internet, information selected to be followed by a user, sent to a user's mobile device, emailed to a user, generated by a user, broadcast for radio or television, and the like.

In one embodiment, the content can be created from scratch for each viewer or group of viewers. However, in another embodiment, the broadcast may combine elements common to broad viewership interests with elements of personalized viewership interests. For example, the social media data stream broadcast may include portions of national and international evening news shows interspersed with a personal news channel incorporating information from friends, family, work, industry, colleagues, and the like; social media friend updates; emailed information; and the like.

In other words, by using, pre-produced elements and lay-out and behavior modeling, in conjunction with data received from a variety of unstructured or differently structured sources, a passively viewable optionally interactive cohesive social media data stream can be dynamically generated. In so doing, the present technology goes beyond simple combined displays of information by relating structure between various social media portals, and restructuring the data sources of each resulting in a cohesive social media data stream.

Figure 9D:
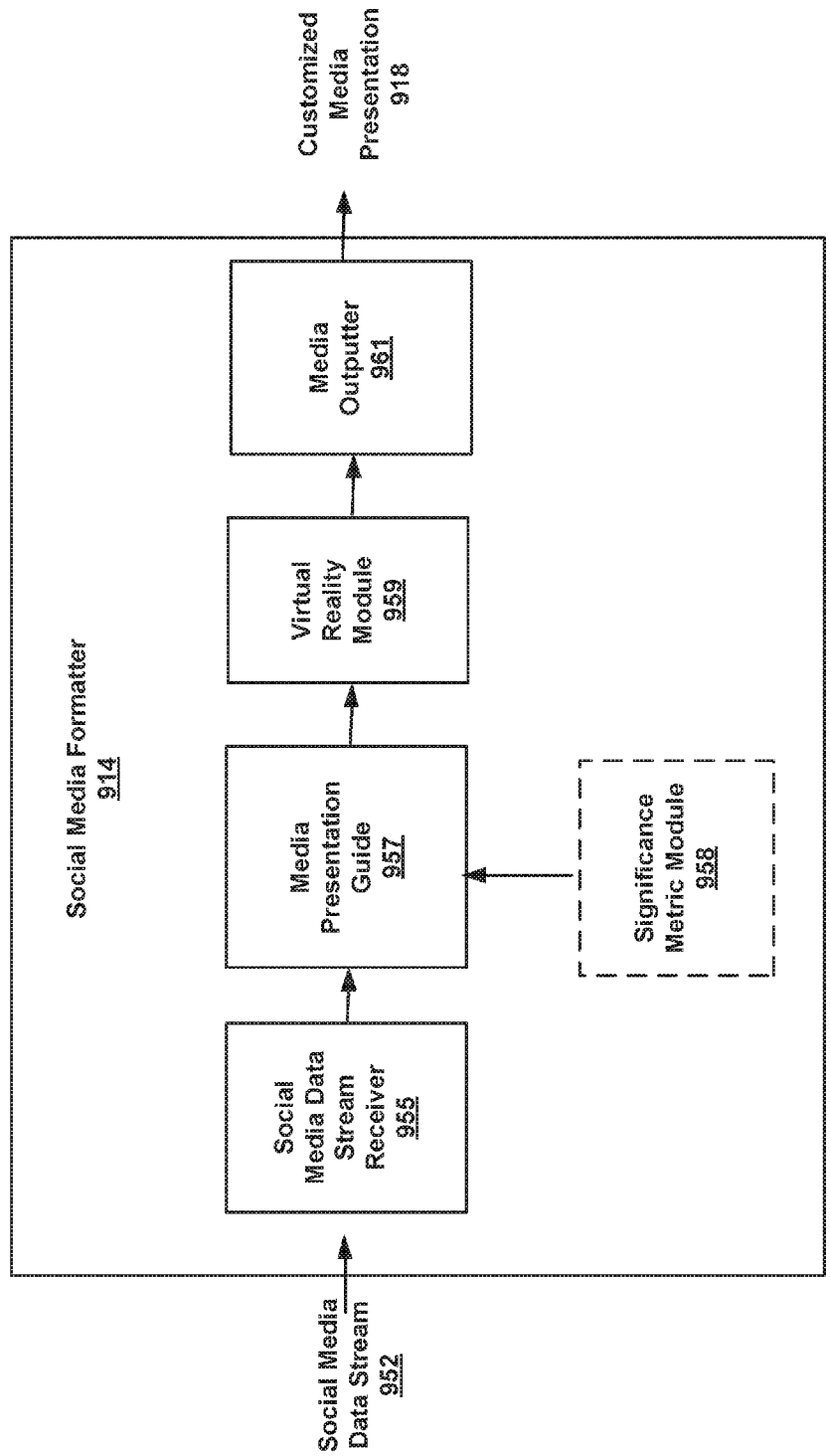
FIG. 9D is a block diagram of an aggregated social media formatter, according to one embodiment.

With reference now to FIG. 9D a block diagram of a social media formatter 914 is shown in accordance with one embodiment of the present technology. In general, social media formatter 914 receives a social media data stream 952 and transforms the social media data stream 952 into a formatted customized media presentation 918.

In general, social media data stream 952 consists of social media data snippets that may be collected from across a network cloud, such as, but not limited to, the Internet. The media presentation 918 may be a broadcast such as a radio or television broadcast. That is, the media presentation 918 may be an audio presentation, an audio visual presentation, or the like.

In one embodiment, the social media data stream 952 includes text, audio, video, audio/video and the like. For example, the social media data stream 952 may include portions of national and international evening news shows; information from friends, family, work, industry, colleagues, and the like; social media friend updates; emailed information; and the like.

Social media formatter 914 includes a social media data stream receiver 955, media presentation guide 957, virtual reality module 959 and media outputter 961. In addition, social media formatter 914 may include significance metric module 958.

Social media data stream receiver 955 receives a plurality of social media data snippets organized into a coherent social media data stream. In one embodiment, the plurality of social media data snippets is selected from the group of videos, audio files, images, and text.

Media presentation guide 957 formats the coherent social media data stream into a structured media presentation. For example, media presentation guide 957 may utilize a pre-produced video captured sequencer, a pre-produced audio captured sequencer, a natural pre-produced pronunciation wave-table-synthesizer of video and audio segments, and the like. In addition, in one embodiment, media presentation guide 957 may also utilize a text filter to provide a summary of a text based social media data snippet.

In one embodiment, media presentation guide 957 utilizes a significance metric to format the coherent social media data stream into a structured media presentation. For example, significance metric module 958 may include metrics based on one or more of: a timeline, an intensity level, a relevancy, a user selectable criterion and the like.

Virtual reality module 959 adds virtual reality aspects into the structured media presentation. In one embodiment, virtual reality module 959 includes an Avatar generator to simulate social interaction and a phoneme-based speech synthesizer to provide voice-over or simulation audio for the Avatar. In another embodiment, virtual reality module 959 includes a virtual reality augmenter to provide augmented reality visualizations of real-world models.

Media outputter 961 provides the structured media data stream in a user accessible format. In one embodiment, media presentation 918 may be provided upon user access. For example, if media presentation 918 is a television broadcast, media presentation 918 may begin when a user turns on a television and selects the appropriate channel. Upon selecting the channel, the social media delivery system 900 will begin media presentation 918.

In another embodiment, media presentation 918 may be a continuously provided data stream. In other words, media presentation 918 would be available even if the media playing device was not activated, similar to any broadcast that occurs regardless of whether the broadcast is actually being watched. As such, a user would be able to activate the presentation device and tune into the in-progress media presentation 918. In one embodiment, media presentation 918 may be a loop that is updated at a pre-defined interval, updated when a threshold of new or modified information is achieved, updated when a user defined change occurs, or the like. For example, if a user were following the football season, media presentation 918 may be updated after a game has ended, whenever a score changes, if news is provided about a favorite team, etc.

In general, media presentation 918 may be formatted for any device capable of presenting media. For example, but not limited to, a radio, a television, a computer, a portable device, a mobile phone, a laptop computer, and the like.

Figure 9E:
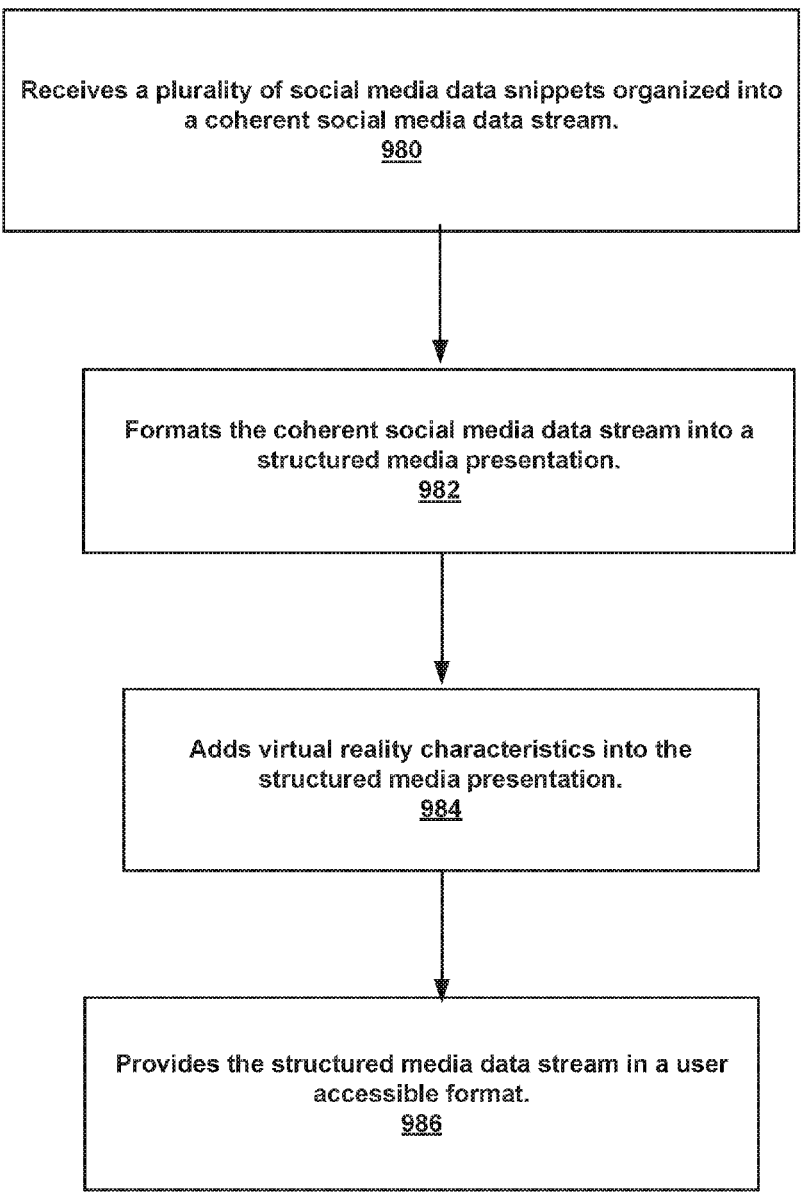
FIG. 9E is a flowchart of a method for formatting random social media data snippets into a structured media presentation, according to one embodiment.

With reference now to FIG. 9E, a flowchart 975 of a method for formatting random social media data snippets into a structured media presentation is shown in accordance with one embodiment of the present technology.

Referring now to 980 of FIG. 9E and FIG. 9D, one embodiment receives a plurality of social media data snippets organized into a coherent social media data stream. As shown in FIG. 9A, the plurality of social media data snippets are selected from the group of videos, audio files, images, and text. In addition, the social media data snippets may be one or more of real-time, near-real-time and evergreen media data snippets. In general, evergreen refers to data that is not time specific.

For example, if a friend had been climbing Mt. Everest, the days of climbing to the peak may be near-real time information, while it would be important to have the actual achieving of the summit in real-time. In contrast, evergreen media data may be background information such as information about Mt. Everest, the friend's previous successful climbs, backstory about the friend, backstory about other climbers in the friend's group, historical weather information, and the like.

With reference now to 982 of FIG. 9E and FIG. 9D, one embodiment formats the coherent social media data stream into a structured media presentation. In one embodiment, the formatting includes utilizing a significance metric module 958 to organize the social media data stream 952 into a pre-defined order. For example, the order may be based on a timeline or the level of intensity of the information, e.g., information about a birth or death may be placed ahead of information about a friends outfit.

Additionally, significance metric module 958 may also adjust the order of social media data stream 952 based on relevancy of the information. For example, location data that includes information about a traffic accident on the route the user is presently traveling would be placed ahead of a social media data about a friend's night out. In another embodiment, significance metric module 958 may be user driven such that the social media data is organized based on user defined criteria.

With reference still to 982 of FIG. 9E and FIG. 9D, in one embodiment, social media formatter 914 may utilize metadata such as scripting and logic filters to guide a structured content programming format based on real-time synthesis of the cohesive social media data stream. In general, the metadata may include pre-produced video and audio captured sequences from photographic/video/multimedia recordings. In one embodiment, the video and audio may be edited for use similarly to wave-table synthesis with random-access to frame and subframe samples.

For example, social media formatter 914 metadata may include customized segments such as, but not limited to: upcoming social events, synthesized on-air talent announcing birthdays, graduations, parties, trips, visitors, and other events in the coming month. Audio and talking-head video sequences related to announcing dates, duration, and basic event types are structured enough to be highly realistic in their real-time synthesis by "kerning" together audio and video segments (reducing bad edit-spots and unnatural speech gaps). Common given names (and some surnames) are also limited enough in scope to allow for natural pre-produced pronunciation "wave-table-synthesis" of video and audio segments to be stitched together to provide content.

With reference now to 984 of FIG. 9E and FIG. 9D, one embodiment adds virtual reality characteristics into the structured media presentation. For example, social media formatter 914 metadata may utilize Avatars (e.g., texture maps to shape models including recognizable faces) to simulate or illustrate social interaction. In addition, the avatars may be combined with speech synthesis to deliver less structured data (including less common names for the above example).

Social media formatter 914 metadata may additionally utilize phoneme-based speech synthesis and/or interactive simulations depicting model representations of events that can be augmented by voice-over or simulation audio.

Additionally, social media formatter 914 metadata may include augmented reality visualizations of real-world models. For example: social media formatter 914 may utilize a time-accelerated augmented reality fly-through sequence of day trip through Paris, bump-shots from walk-through of virtual model of trade convention, surfing simulation with real-time conditions at Waikiki (forecast, current, or at date of past event), or the like.

Social media formatter 914 metadata may additionally utilize calendar graphics, charts, and the like to depict statistical and time-based information; For example, a month in review calendar graphic, a workload, networking group results, and the like.

In another embodiment, social media formatter 914 metadata may include traditional multimedia segments (video, audio, photos, slideshows, etc.) uploaded into portals. For example: videos of niece waterskiing, photos of friends at the Coliseum, etc.

Social media formatter 914 metadata may include pre-produced augmented reality based interactive transmedia segments. In other words, segments that can cross-link to presented content and allow greater interactivity between passively viewed programming content and more interaction with in-depth content, or full interactivity with underlying posts.

In another embodiment, social media formatter 914 metadata may include highlighted text filtered from raw social media data snippets presented as summaries of longer messages or information. For example, Business-slide-like text presentations of business connection tweet highlights, news-font-graphic-like presentations of personal events or wall posts, and the like.

Referring now to 986 of FIG. 9E and FIGS. 9D, one embodiment provides the structured media data stream in a user accessible format. The media presentation 918 may be a broadcast such as a radio or television broadcast. That is, the media presentation 918 may be an audio presentation, an audio visual presentation, or the like.

In one embodiment, the social media data stream 952 includes text, audio, video, audio/video and the like. For example, the social media data stream 952 may include portions of national and international evening news shows; information from friends, family, work, industry, colleagues, and the like; social media friend updates; emailed information; and the like.

Embodiments for formatting random social media data snippets into a structured media presentation can be summarized as follows:

1. A media formatter comprising:
    a social media data stream receiver to receive a plurality of social media data snippets organized into a coherent social media data stream;
    a media presentation guide to format the coherent social media data stream into a structured media presentation;
    a virtual reality module to add virtual reality aspects into the structured media presentation; and
    a media outputter to provide the structured media data stream in a user accessible format.
2. The user configurable social media delivery system of claim 1 wherein the plurality of social media data snippets are selected from the group of videos, audio files, images, and text.
3. The user configurable social media delivery system of claim 1 wherein the media presentation guide utilizes a significance metric to format the coherent social media data stream into a structured media presentation.
4. The user configurable social media delivery system of claim 3 wherein the significance metric is based on a timeline.
5. The user configurable social media delivery system of claim 3 wherein the significance metric organizes is based on an intensity level of the social media data snippets.
6. The user configurable social media delivery system of claim 3 wherein the significance metric is based on a relevancy of the social media data snippets.
7. The user configurable social media delivery system of claim 3 wherein the significance metric is based on a user selectable criterion.
8. The user configurable social media delivery system of claim 1 wherein the media presentation guide comprises:
    at least one pre-produced video captured sequencer;
    at least one pre-produced audio captured sequencer; and
    a natural pre-produced pronunciation wave-table-synthesizer of video and audio segments.
9. The user configurable social media delivery system of claim 1 wherein the media presentation guide comprises:
    a text filter to provide a summary of a text based social media data snippet.
10. The user configurable social media delivery system of claim 1 wherein the virtual reality module comprises:
    an Avatar generator to simulate social interaction; and
    a phoneme-based speech synthesizer to provide voice-over or simulation audio for the Avatar.
11. The user configurable social media delivery system of claim 1 wherein the virtual reality module comprises:
    a virtual reality augmenter to provide augmented reality visualizations of real-world models.
12. A non-transitory computer-readable storage medium comprising computer executable code for directing a processor to execute a method for formatting random social media data snippets into a structured media presentation, said method comprising:
    receiving a plurality of social media data snippets organized into a coherent social media data stream;
    formatting the coherent social media data stream into a structured media presentation;
    adding virtual reality characteristics into the structured media presentation; and
    providing the structured media data stream in a user accessible format.
13. The non-transitory computer-readable storage medium recited of claim 12 wherein the plurality of social media data snippets are selected from the group of videos, audio files, images, and text.
14. The non-transitory computer-readable storage medium recited of claim 12 further comprising:
    utilizing a significance metric to format the coherent social media data stream into a structured media presentation.
15. The non-transitory computer-readable storage medium recited of claim 14 wherein the significance metric is selected from the group consisting of: a timeline, an intensity level, a relevancy and a user selectable criterion.
16. The non-transitory computer-readable storage medium recited of claim 12 wherein formatting the coherent social media data stream into a structured media presentation comprises:
    utilizing at least one pre-produced video captured sequencer;
    utilizing at least one pre-produced audio captured sequencer; and
    utilizing a natural pre-produced pronunciation wave-table-synthesizer of video and audio segments to format the coherent social media data stream into a structured media presentation.
17. The non-transitory computer-readable storage medium recited of claim 12 wherein adding virtual reality characteristics into the structured media presentation comprises:
    generating an Avatar to simulate social interaction; and
    utilizing a phoneme-based speech synthesizer to provide simulation audio for the Avatar.
18. The non-transitory computer-readable storage medium recited of claim 12 wherein adding virtual reality characteristics into the structured media presentation comprises:
    providing augmented reality visualizations of real-world models.
19. A social media formatter comprising:
    a social media data stream receiver to receive a plurality of social media data snippets organized into a coherent social media data stream;
    a media presentation guide comprising:
    a significance metric to format the coherent social media data stream into a structured media presentation;
    a virtual reality module to add virtual reality aspects into the structured media presentation; and
    a media transmitter to provide the structured media data stream in a user accessible format.
20. The user configurable social media delivery system of claim 19 wherein the significance metric is selected from the group consisting of: a timeline, an intensity level, a relevancy and a user selectable criterion.
21. The user configurable social media delivery system of claim 19 wherein the virtual reality module comprises:

an Avatar generator to simulate social interaction;
a phoneme-based speech synthesizer to provide voice-over or simulation audio for the Avatar; and
a virtual reality augmenter to provide augmented reality visualizations of real-world models.

Section Eleven: a Multiple Reality Mapping Correlator

Overview

Embodiments described herein provide multiple reality mapping correlation. In other words, embodiments described herein reconcile different models of realities into an apparently seamless augmented reality model.

For example, a given location may have a number of different reality models associated therewith. In general, reality models include live television, canned television, movies, chat, texting, personal directional camera video and stills, photographs, through-lens heads up viewing, geospace sensor data, database time-shifted real-world model data, virtual models, and the like. In addition, each reality model includes underlying characteristics or metadata information such as visual space, audio space and time domains.

Thus, if a person wanted to view a city block of San Francisco, the user may choose to access one or more reality models to obtain the view. However, each different reality model that a user viewed would have different underlying metadata information. These underlying differences may range from minute differences to significant deviation depending upon which reality models are selected.

For example, a web cam mounted within the city block would provide a reality model that included fixed location and normal time domain metadata information. In contrast, a television show filmed within the same city block may include a plurality of different locations as well as non-linear time domain metadata information.

In one embodiment, by defining a single reality model as the base reality model and then adjusting the underlying metadata structures of any other reality model to correlate with the underlying metadata structures of the base reality model, a plurality of reality models can be combined into a seamless augmented reality model.

Further, in at least one embodiment, multiple viewports from multiple devices super-impose multiple sets of blended multiple realities, one upon the other. For example: a viewer is wearing heads-up display eyeglasses and is watching augmented reality based transmedia content on a Smart TV monitor with additional augmentation from his heads-up glasses, such that not only is the viewed interactive automated television programming content unique to the Smart TV device among primary transmedia display devices, but the content being viewed (and optionally interacted with) is unique to the said viewer among all viewers of the same primary display device (in this case, a Smart TV monitor).

Metadata Information

Metadata information can additionally include: frame time, camera position, camera orientation vector, camera frame orientation vector (up indicator), camera frustum (camera lens: zoom/perspective), camera aperture, camera focus, light source positions, light source intensity, light source chrominance, flying mobility boundaries, floating mobility boundaries, hard surface mobility boundaries, video object positions, ghost bot positions ("invisible" functional interactive potential video reality objects), video object depth (used for matting approach to hidden object removal and stereoscopy), video object shape models (used for 3D model approach to hidden object removal and stereoscopy), ghost bot identity (action) mapping, video clarity (visibility), video resolution, video luminance, video chrominance, audio source positions, audio range, dialogue, dialogue to audio source mapping, infinity mapping, effective distance, interpolation, extrapolation, behavioral cues, proximity, periodicity, dialogue, value of user interaction, significance (relative weighting of value), and the like.

Figure 10A:
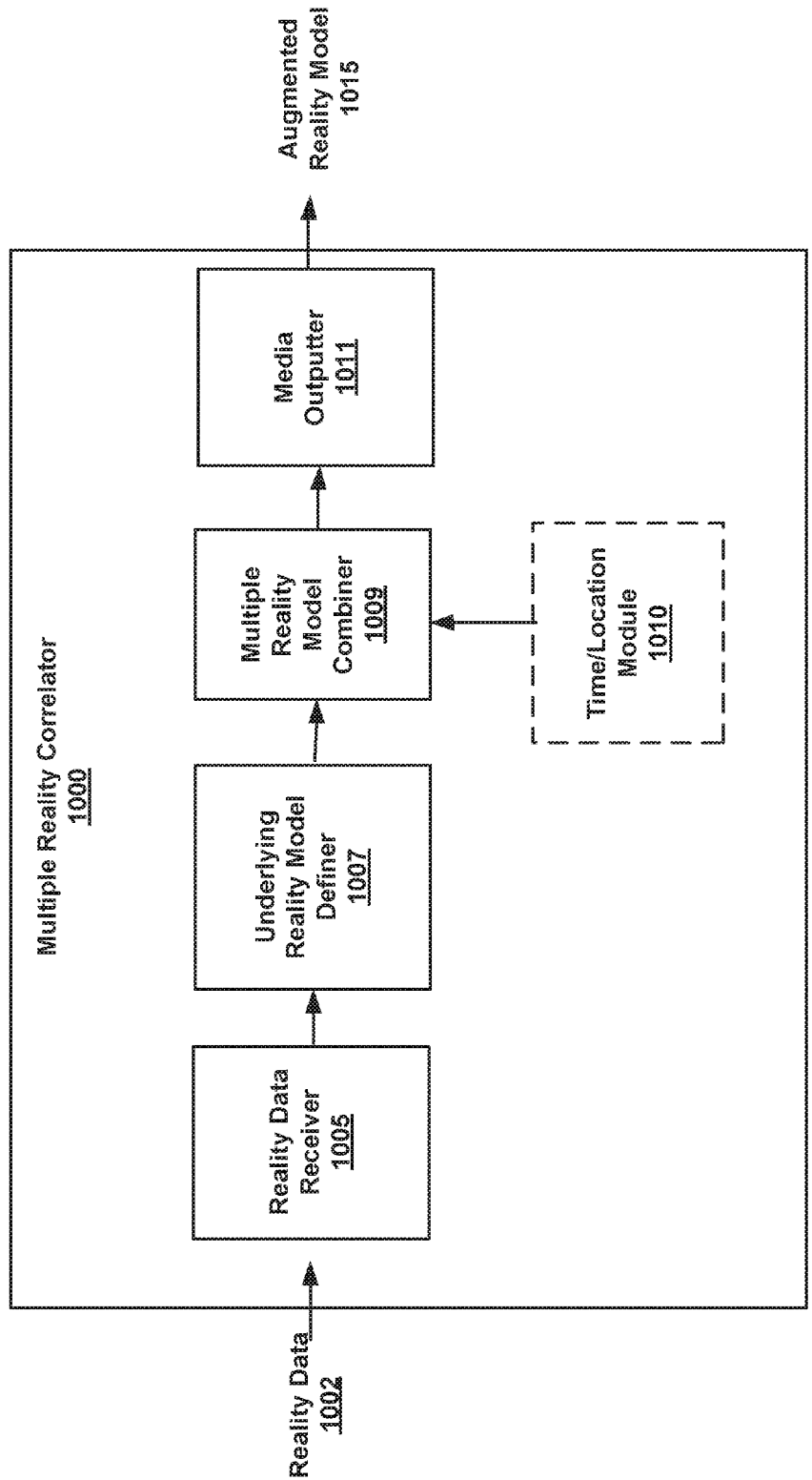
FIG. 10A is a block diagram of a multiple reality mapping correlator, according to one embodiment.

With reference now to FIG. 10A a block diagram of a multiple reality correlator 1000 is shown in accordance with one embodiment of the present technology. In general, multiple reality correlator 1000 includes a reality data receiver 1005, an underlying reality model definer 1007, a multiple reality model combiner 1009 and a media outputter 1011.

Reality data receiver 1005 receives a plurality of different reality models 1002. Different reality model examples include: live television, canned television, movies, chat, texting, personal directional camera video and stills, photographs, through-lens heads up viewing, geospace sensor data, database time-shifted real-world model data, and the like. In one embodiment, reality data receiver 1005 identifies metadata structures for each of the plurality of different reality models.

Underlying reality model definer 1007 defines a base reality model. In one embodiment, the underlying reality model definer 1007 selects the base reality model from one of the plurality of different reality models. However, in another embodiment, the base reality model is a virtual reality model that is distinct from the plurality of different reality models.

Multiple reality model combiner 1009 maps each of the plurality of different reality models to the base reality model to form an augmented reality model 1015. In one embodiment, multiple reality model combiner 1009 utilizes a time indices of the base reality model as the time indices for the augmented reality model; and the time indices of each of the plurality of different reality models is adjusted to correlate to the time indices of the augmented reality model.

In one embodiment, multiple reality model combiner 1009 utilizes a geospatial indices of the base reality model to define a geospatial layout for the augmented reality model; and the geospatial indices of each of the plurality of different reality models is adjusted to correlate with the geospatial layout of the augmented reality model. In one embodiment, multiple reality model combiner 1009 also asynchronously renders a virtual reality object; and maps the virtual reality object to the augmented reality model.

Figure 10B:
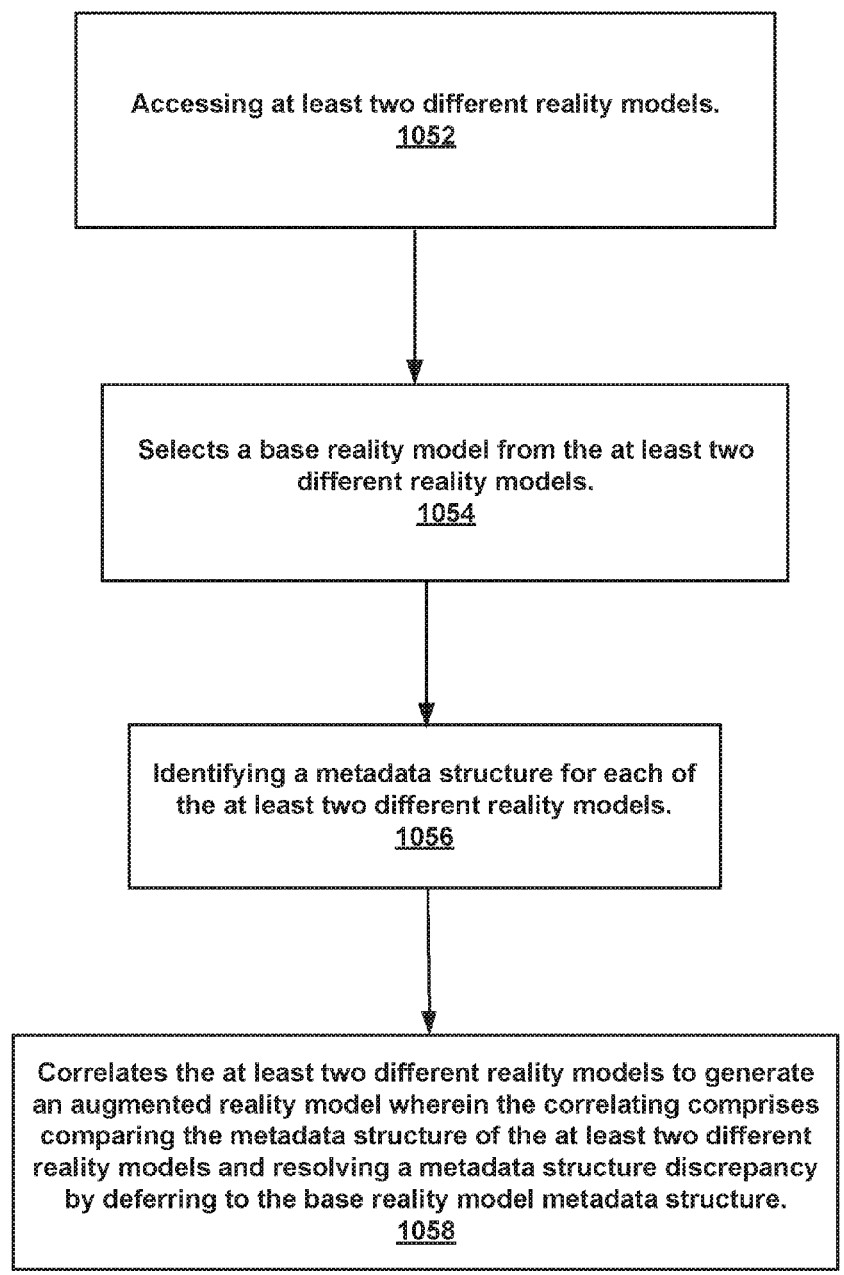
FIG. 10B is a flowchart of a method for mapping correlation between multiple realities, according to one embodiment.

Referring now to FIG. 10B is a flowchart 1050 of a method for mapping correlation between multiple realities is shown in accordance with one embodiment of the present technology.

With reference now to 1052 of FIG. 10B, one embodiment accesses at least two different reality models. In one embodiment, the different reality models are accessed in the stream of reality data 1002. In general, different reality models include real world reality models, virtual reality models, movie reality models, television reality models, real-time video reality models, audio reality models, heads up reality models, geospatial sensor reality models and the like.

Referring now to 1054 of FIG. 10B, one embodiment selects a base reality model from the at least two different actual reality models. In one embodiment, the base reality model is a computer generated virtual reality model.

With reference now to 1056 of FIG. 10B, one embodiment identifying a metadata structure for each of the at least two different reality models. For example, if a reality model is a movie reality model, cinema type metadata structures may be identified. In general, the cinema type metadata structures may include, but are not limited to, information for indicating camera position and movement, object positions, locations of walls and furniture and the like. For purposes of clarity, a description of metadata structures for reality models is provided herein.

In general, conventional video sources such as television and movies blend metadata structures derived from real world reality with other information intended to alter the user's perception of the real world reality. Examples of the metadata structures include the framing of the subject, the choice of which scenes to shoot and when, the lighting chosen or created, camera focus (soft, hard, focal length, etc.).

Additionally, metadata information found in highly realistic formats such as documentaries, news, and the like, usually define a reality model that includes some subtle variations. However, metadata information from formats such as "realistic" movies and TV shows may include reality models that have significant distortions, such as, but not limited to, geographical "adjustments", non-linear timelines, and even modifications of the laws of physics. Science fiction and fantasy genres may include reality models with distortions taken to even further levels of the abstract.

With reference now to 1058 of FIG. 10B and FIG. 10A, one embodiment correlates the at least two different reality models to generate an augmented reality model 1015. In one embodiment, the correlating includes comparing the metadata structure of the at least two different reality models, and resolving a metadata structure discrepancy by deferring to the base reality model metadata structure.

In other words, to form the augmented reality model 1015 from two or more different virtual realities, metadata for each different reality model is compared to the metadata of the base reality model.

If the metadata from each different reality model is congruous with the metadata of the base reality model; then the different reality model can be mapped directly into the base reality model to generate the augmented reality model 1015.

However, if the metadata from the different reality model is incongruous with the metadata of the base reality model; then the incongruous different reality model metadata structure is modified to correlate with the base reality model metadata structure. Then, the different reality model can be mapped directly into the base reality model to generate the augmented reality model 1015.

For example, assume a virtual representation of the city block is used as the base reality model and a movie scene reality model that included the city block were to be combined to form the augmented reality model 1015. The metadata structures of both the virtual representation of the city block and movie reality model would be identified along the data stream. While combining the two reality models, the underlying metadata structures of the movie scene reality model would be compared to the metadata structures of the base reality model. In one embodiment any divergence in metadata structure would be resolved by modifying the movie scene reality model metadata structure. In another embodiment, any divergence in metadata structure would be resolved by overriding the movie scene reality model metadata structure with the base reality model metadata structure.

In so doing, the augmented reality model will have a depth that is greater than any one of the original reality models. Moreover, additional reality models may be added throughout the life of the augmented reality model. For example, additional reality models such as, web cams, traffic cams, Internet advertisements, news footage and the like may also be mapped and correlated with the virtual representation of the city block to further define the augmented reality model.

In one embodiment, the additional reality models may be added via user interaction with the augmented reality model.

For example, a user may modify the augmented reality model by either adding or removing different reality models. In another embodiment, different reality models may be added or removed automatically.

In one embodiment, only specified metadata structures are compared. For example, in one embodiment, only one or more of time domain, audio space, visual space and geospatial metadata structures are compared.

In general, time domain metadata refers to the flow of time for the reality model. For example, a streaming video would present time in real-time. In contrast, a television show may include time domains of increased rate (e.g., a week is covered in a few minutes), normal rate (e.g., a conversation between actors at a café) and slowed rate (e.g., a slow-motion sequence, two concurring events shown at different times in the show, etc.)

Audio space metadata refers to audio characteristics of the reality model such as actual or virtual locations of the recording device, the audio generator, the shape of the space or area at which the audio is being generated, recorded or heard and the like. Similarly, visual space metadata refers visual characteristics of the reality model such as actual or virtual locations of the recording device, the shape of the space or area at which the video is being generated, recorded or watched and the like.

For example, metadata indicating source, positions and movement of individual instruments from marching band parade are mapped to virtual reality objects which, on render, remix stereo audio tracks in real-time based on listener's virtual head position and actual head orientation to achieve the effect of actually being at an event.

Geospatial metadata refers to the location, orientation, frame orientation and the like. For example, sensors embedded in mobile smart-devices allow indirect derivation of location, orientation, and frame orientation. In non-mobile smart devices actual location is also modeled, while orientation and frame orientation can be virtualized. In any smart-device, location, orientation and frame orientation can also be virtualized.

In one embodiment, geospatial metadata may include mobility boundaries which identify the range of potential motion for virtual objects. For instance, geospatial metadata embedded into video allows automated behavior so that embedded objects can respond to data streams, including user interface data to provide a user-interactive and situational-interactive experience.

In another embodiment, geospatial sensors attached to the frame of heads-up-display devices (e.g. glasses, cars, helmets, etc.) can provide information including camera position, camera orientation, camera frame orientation and the like. In addition, the geospatial metadata can include camera orientation information such as forward and back facing.

Embodiments for directing a processor to execute a method for mapping correlation between multiple realities can be summarized as follows:

1. A multiple reality mapping correlator comprising:
    a reality data receiver to receive a plurality of different reality models;
    an underlying reality model definer to select a base reality model from the plurality of different reality models;
    a multiple reality model combiner to map each of the plurality of different reality models to the base reality model to form an augmented reality model; and
    a media outputter to provide the augmented reality model in a user accessible format.

2. The multiple reality mapping correlator of claim 1 wherein the reality data receiver identifies metadata structures for each of the plurality of different reality models.

3. The multiple reality mapping correlator of claim 1 wherein the multiple reality model combiner correlates a time indices of each of the plurality of different reality models to a time indices of the base reality model to form the augmented reality model.

4. The multiple reality mapping correlator of claim 1 wherein the multiple reality model combiner correlates a geospatial indices of each of the plurality of different reality models to a geospatial indices of the base reality model to form the augmented reality model.

5. The multiple reality mapping correlator of claim 1 wherein the multiple reality model combiner correlates an audio space indices of each of the plurality of different reality models to an audio space indices of the base reality model to form the augmented reality model.

6. The multiple reality mapping correlator of claim 1 wherein the multiple reality model combiner correlates a visual space indices of each of the plurality of different reality models to a visual space indices of the base reality model to form the augmented reality model.

7. The multiple reality mapping correlator of claim 1 wherein the plurality of different reality models are selected from the group consisting of:
a real world reality, a virtual reality, a movie reality, a television reality, a real-time video reality, an audio reality, a heads up reality, a geospatial sensor.

8. The multiple reality mapping correlator of claim 1 wherein the underlying reality model definer asynchronously renders a virtual reality object; and maps the virtual reality object to the augmented reality model.

9. A non-transitory computer-readable storage medium comprising computer executable code for directing a processor to execute a method for mapping correlation between multiple realities, the method comprising:
accessing at least two different reality models;
selecting a base reality model from the at least two different reality models;
identifying a metadata structure for each of the at least two different reality models; and
correlating the at least two different reality models to generate an augmented reality model, wherein the correlating comprises:
comparing the metadata structure of the at least two different reality models; and
resolving a metadata structure discrepancy by deferring to the base reality model metadata structure.

10. The non-transitory computer-readable storage medium recited of claim 9 further comprising:
comparing a time indices metadata structure of the at least two different reality models.

11. The non-transitory computer-readable storage medium recited of claim 9 further comprising:
comparing a geospatial indices metadata structure of the at least two different reality models.

12. The non-transitory computer-readable storage medium recited of claim 9 further comprising:
comparing an audio space indices metadata structure of the at least two different reality models.

13. The non-transitory computer-readable storage medium recited of claim 9 further comprising:
comparing a visual space indices metadata structure of the at least two different reality models.

14. The non-transitory computer-readable storage medium recited of claim 9 further comprising:
displaying the augmented reality model in a user accessible format.

15. The non-transitory computer-readable storage medium recited of claim 9 wherein the at least two different reality models are selected from the realities consisting of: a real world reality, a virtual reality, a movie reality, a television reality, a real-time video reality, an audio reality, a heads up reality, a geospatial sensor.

16. The non-transitory computer-readable storage medium recited of claim 9 further comprising:
asynchronously rendering virtual reality objects; and
mapping the virtual reality objects to the augmented reality model.

17. A multiple reality mapping correlator comprising:
a reality data receiver to receive a plurality of different reality models and identify metadata structures for each of the plurality of different reality models;
an underlying reality model definer to define a base reality model;
a multiple reality model combiner to map each of the plurality of different reality models to the base reality model to form an augmented reality model; and
a media outputter to provide the augmented reality model in a user accessible format.

18. The multiple reality mapping correlator of claim 17 wherein the underlying reality model definer selects the base reality model from one of the plurality of different reality models.

19. The multiple reality mapping correlator of claim 17 wherein the metadata structure comprises a time indices and the multiple reality model combiner synchronizes a time indices for each of the plurality of different reality models with a time indices of the base reality model to form the augmented reality model.

20. The multiple reality mapping correlator of claim 17 wherein the metadata structure comprises a geospatial indices and the multiple reality model combiner synchronizes a geospatial indices for each of the plurality of different reality models with a geospatial indices of the base reality model to form the augmented reality model.

Section Twelve: Interactive User Interface

Notation and Nomenclature

Some portions of the description of embodiments which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present discussions terms such as "providing", "receiving", "generating", "embedding", "creating", "customizing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, in some embodiments, methods described herein can be carried out by a computer-usable storage medium having instructions embodied therein that when executed cause a computer system to perform the methods described herein.

Brief Description

Customized internet news feeds that aggregate information have become popular as social media has grown. Further, today's customers often request interactivity and customization in numerous electronic devices. The novel embodiments below describe an interactive device comprising a user interface in which content, and the way in which that content is presented, is customized for at least one user.

Overview of Discussion

Example techniques, devices, systems, and methods for providing content to a user at an interactive device is described herein. Discussion begins with a high level description of interactive devices. Example presentation layers are then described. Discussion continues examples of data-driven interactive content. Next, an example avatar is discussed. Lastly, example methods of use are described.

High Level Description of Interactive Devices

Figure 11A:
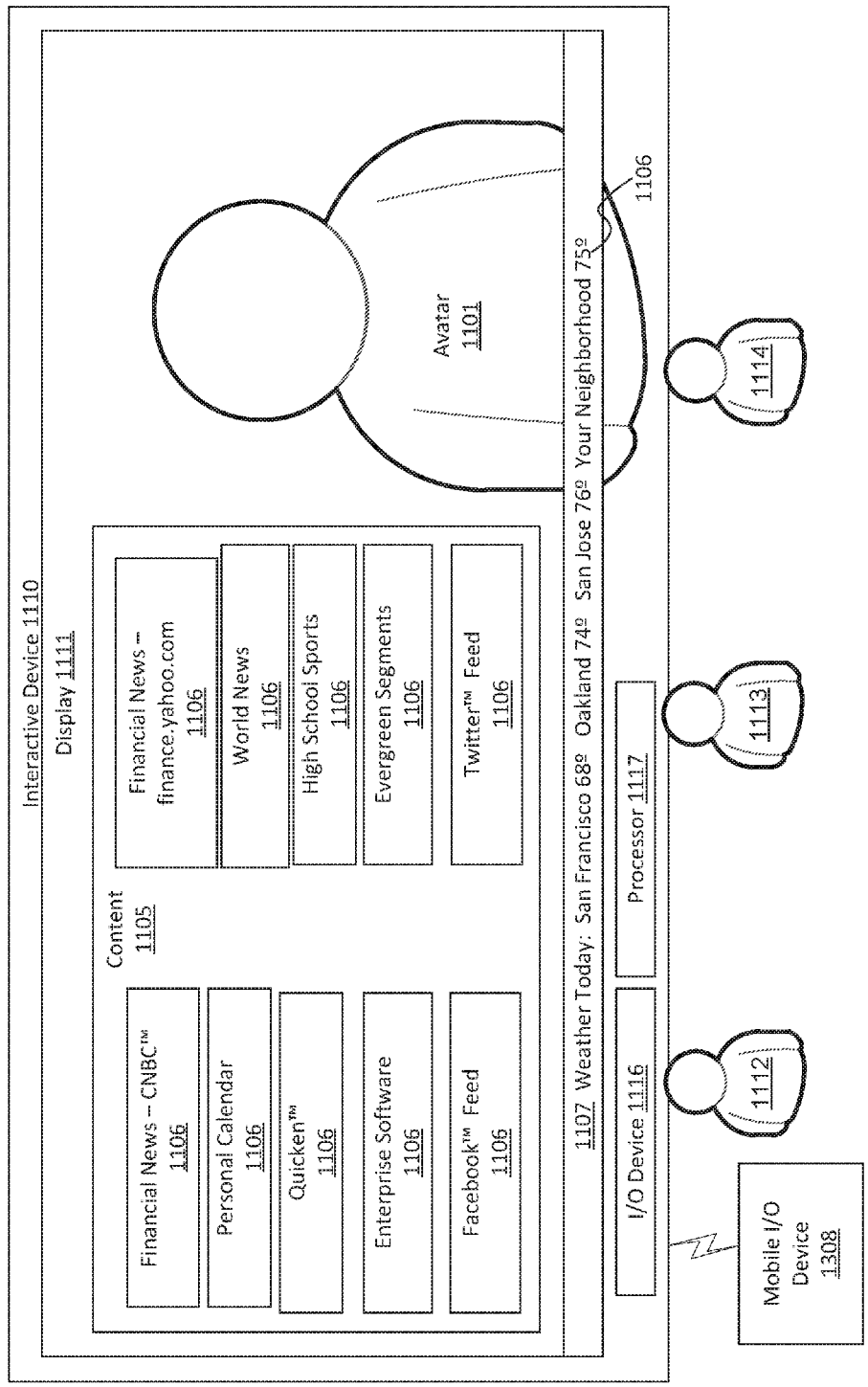
FIG. 11A is an example diagram upon which embodiments of the present invention may be implemented, according to an embodiment.

FIG. 11A shows an example interactive device 1110. Users 1112, 1113 and 1114 are shown watching the display 1111 of interactive device 1110. The display 1111 shows an example presentation layer (e.g., a layer displaying content 1105, interactive elements 1106, scroll bar 1107, and avatar 1101). Note that the term "presentation layer" as used herein does not refer to layer six of the open systems interconnection (OSI) model. Presentation layers come in various formats, as will be discussed in more detail below. Interactive device may include, but is not limited to: computers, televisions, radios, interactive televisions, video game consoles, mobile devices, smart phones, smart televisions, automobile consoles, windshields, laptops, personal digital assistants, tablet computers, etc.

In various embodiments, users 1112, 1113, and 1114 interact with interactive device 1110 via input/output (I/O) device 1116. I/O device 1116 comprises, but is not limited to: a receiver, a touchscreen display 1111, a keyboard, a mouse, a joystick, a button, a depth sensor, a motion sensor, a microphone, a trackball, a speaker, a Microsoft™ Kinect™ type device, etc. In some embodiments interactive device 1110 comprises a plurality of I/O devices 1116. In one embodiment, an I/O device 1116 may receive signals from a mobile I/O device 1108. Mobile I/O device 1108 may include, but is not limited to: a remote control, a tablet computer, a smart phone, a microphone, a personal digital assistant, etc. In an embodiment Mobile I/O device 1108 may be coupled to interactive device 1110. In one embodiment Mobile I/O device 1108 may be communicatively coupled to interactive device 1110.

In an embodiment, interactive device 1110 comprises a processor 1117 operable to perform various operations. In one embodiment, processor 1117 may comprise a graphics processing unit or a central processing unit. Further, interactive device 1110 may comprise a plurality of processors 1117 that may perform all, some, or none of the operations discussed herein.

In one embodiment processor 1117 is not located in device 1110. In an embodiment the processing described herein is performed at a location remote from interactive device 1110.

For example, content 1105 may be placed within a presentation layer prior to the content 1105 reaching interactive device 1110.

In various embodiments interactive device 1110 comprises a display 1111. Displays are known in the art so a detailed discussion is not necessary. While in some embodiments display 1111 is flat, in various embodiments display 1111 is concave or convex. In one embodiment interactive device 1110 comprises a stereoscopic display 1111.

Presentation Layers

For the purposes of this discussion, in an embodiment, presentation layers dictate the way in which a user 1112 views and/or interacts with content 1105 interactive elements 1106, avatar 1101, and other items shown on display 1111. In an embodiment presentation layers are written in a scripting language, although it should be understood that presentation layers may be written in any programming language. In an embodiment a presentation layer is customizable.

In an embodiment, a presentation layer may be customized to at least one interest of a user 1112. In an embodiment, the presentation layer creates a custom "show" comprising content 1105 for a user 1112 to passively, or interactively, watch. Note that the term "show", as discussed herein is meant to refer to an interactive device 1110 providing at least one piece of content 1105 to a user with or without an avatar 1101. In various embodiments, shows comprise various tempos. In an embodiment a show may comprise a news-television-show-type format where pieces of content 1105 are shown sequentially and quickly (e.g., relative to a documentary). In an embodiment a show may comprise dynamic content 1105 that changes on a display in real time or close to real time (e.g., news videos, sports scores, etc.), or evergreen content 1105 which does not change (e.g., movies or shows stored within or remote from interactive device 1110). In one embodiment, a highlight reel of the news or sports is shown. In an embodiment a show may be shown in a documentary type format, wherein pieces of content 1105 are longer than in a news type format. In one embodiment, a show may be shown in a breaking news type format. In some embodiments, a presentation layer interrupts what a user 1112 is watching to show breaking news. In one embodiment, a presentation layer prompts a user 1112 to watch breaking news. In one embodiment, the background of a news type program is mapped and/or rendered based on data associated with a presentation layer or content 1105.

In various embodiments, presentation layers perform functions including, but not limited to: determining where to retrieve content 1105 from, determining the amount of time a particular piece of content 1105 is shown on the display 1111, determining the type of "show", providing a user with access to a computer program, determining the sequence of pieces of content 1105 to be shown, determining the size of the content 1105 to be shown relative to the display 1111, determining whether an avatar 1101 is shown, determining whether to use a computer program, creating visualizations out of content 1105, determining what elements 1106 shown on a display 1111 are interactive, creating segues between pieces of content 1105, providing more information about the subject matter of a piece of content 1105, piecing together content 1105 and other images and/or avatars 1101 if necessary to create the impression of a live newscast, determining and updating the preferences of a particular user 1112, determining whether multiple items of content 1105 should be shown simultaneously, determining whether a scroll bar 1107 should be shown, providing a user 1112 with the ability to interact with content 1105, providing a user 1112 with the ability to call or video conference with at least a second user 1113, create visualizations based on data, etc.

Data-Driven Content

The content 1105 provided to a user 1112 during a "show" may include, but is not limited to: audio, video, a web-page, a computer program, a cable television signal, a broadcast signal, a radio signal, a satellite signal, a satellite radio signal, a television show, a web service, a Resource description framework Site Summary (RSS) feed, a Twitter™ feed, a Facebook™ feed, enterprise software, world news, news about a particular high school soccer game taken from a web page or local news broadcast, a calendar, email, local news, flight schedules, evergreen segments, data taken via xml, service oriented architecture services, meta-data sources, etc. In an embodiment interactive device 1110 receives external data in the form of content 1105 or external data to create content 1105. In an embodiment content 1105 is located on memory within interactive device 1110. In some embodiments content 1105 can be manipulated, restructured, reformatted and/or modified by a user. In an embodiment content 1105 comprises a computer program that provides a user 1112 with the ability to modify and/or manipulate data.

In an embodiment a presentation layer formats content 1105 as a visualization. In other words, in an embodiment, a presentation layer is operable to create a visual representation of data received from content 1105. This visual representation may include video and/or audio. For example, a presentation layer may create a three dimensional (3D) graph for a user 1112 given data received from Quicken™, a finance television program, or a webpage. As another example, a presentation layer may create a user interface to show an information technologist user 1112 whether her servers at work are operating correctly. In some embodiments, these visualizations are combined with other content 1105 (including interactive content 1106) such as a video of national news, local news, and the local weather. In one embodiment a presentation layer provides an avatar 1101 that "reads" an RSS feed (or any content 1105) by blending and/or synthesizing audio and video (e.g., using wave table synthesis). In an embodiment, a wave table is created. In an embodiment sub-syllable audio and/or fragments are processed for efficiency.

As an example, the presentation layer may provide a user 1112 with a customized interactive show comprising content 1105, wherein the customized interactive show: (1) plays ten minutes of video of world news; (2) plays five minutes of video of local high school sports; (3) streams video from a financial news station; (4) allows a user 1112 to interact with (e.g., click or make a gesture) on a stock symbol shown on the financial news station that user 1112 is interested in; (5) display a Yahoo™ Finance web page in response to the gesture made by user 1112; (6) open Quicken™ in response to another gesture by user 1112 such that user 1112 may see how the financial news affected her 401(k) account; (7) return a user 1112 to a main screen; (8) allow a user 1112 to read a Facebook™ news feed; (9) allow a user 1112 to activate an avatar 1101 to "read" a Twitter™ feed; (10) allow a user to virtually control a remote machine; and (11) show the Late Show™. In various embodiments a user 1112 may skip a segment, add a segment, or stop currently playing content 1105.

In some embodiments, the customized show is shown without user 1112 interaction. In other words, in an embodiment, a user 1112 may passively watch a show created by a presentation layer. In various embodiments user 1112 may interact with interactive elements 1106 via I/O device 1116. For example, an interactive element 1106 may include, but is not limited to: a stock symbol on the screen during a television show, the weather in a the local neighborhood of a user 1112, a hyper-link, buttons and scroll bars in a program, a text box, a highlighted object (e.g., clothes or an athlete), etc.

Avatars

In some embodiments, the presentation layer provides an avatar 1101. In an embodiment a user 1112 may interact with an avatar 1101. Avatar 1101 may appear in various forms. For example, avatar 1101 may appear to be a celebrity including, but not limited to: Walter Cronkite, Brian Williams, Johnny Carson, James Earl Jones, etc. In an embodiment, an avatar 1101 is chosen based at least in part upon which user 1112, 1113, and 1114 is using the interactive device 1110. For example, a microphone may determine that a child is using the interactive device 1110 by the voice of the child and cause an avatar 1101 to appear wherein the avatar is a cartoon character. In an embodiment a microphone (e.g., by the number of voices) or a camera (e.g., by the number of bodies) may determine that a plurality of users 1112, 1113 and 1114 are using the interactive device 1110 and play content 1105 or choose an avatar 1101 in response to the particular users 1112, 1113, and 1114 that are present. In one embodiment, a plurality of avatars 1101 is shown concurrently.

In various embodiments, avatars 1101 are capable of appearing as though they are a news anchor providing the news after receiving data from content 1105. For example, content 1105 may include the website of a local newspaper that comprises local events occurring on a holiday weekend from a website, then avatar 1101 may appear as a news anchor (e.g., a visualization) and tell a viewer about the local events based on the data from the local newspaper website.

In an embodiment, an avatar 1101 is created by blending audio and/or video. In one embodiment this is done in real time, while in other embodiments it is produced prior to being shown. In one embodiment, a skin of a person or character is mapped onto a generic avatar 1101. In one embodiment, an avatar 1101 is created by combining a plurality of video clips. Similarly, in an embodiment, an avatar 1101 may appear as though it is speaking by combining a plurality of audio clips. By combining clips avatars 1101 appear very realistic to viewers such that avatars 1101 appear to be real people, computer generated people, animals, or cartoon characters, etc.

Example Methods of Use

Figure 11B:
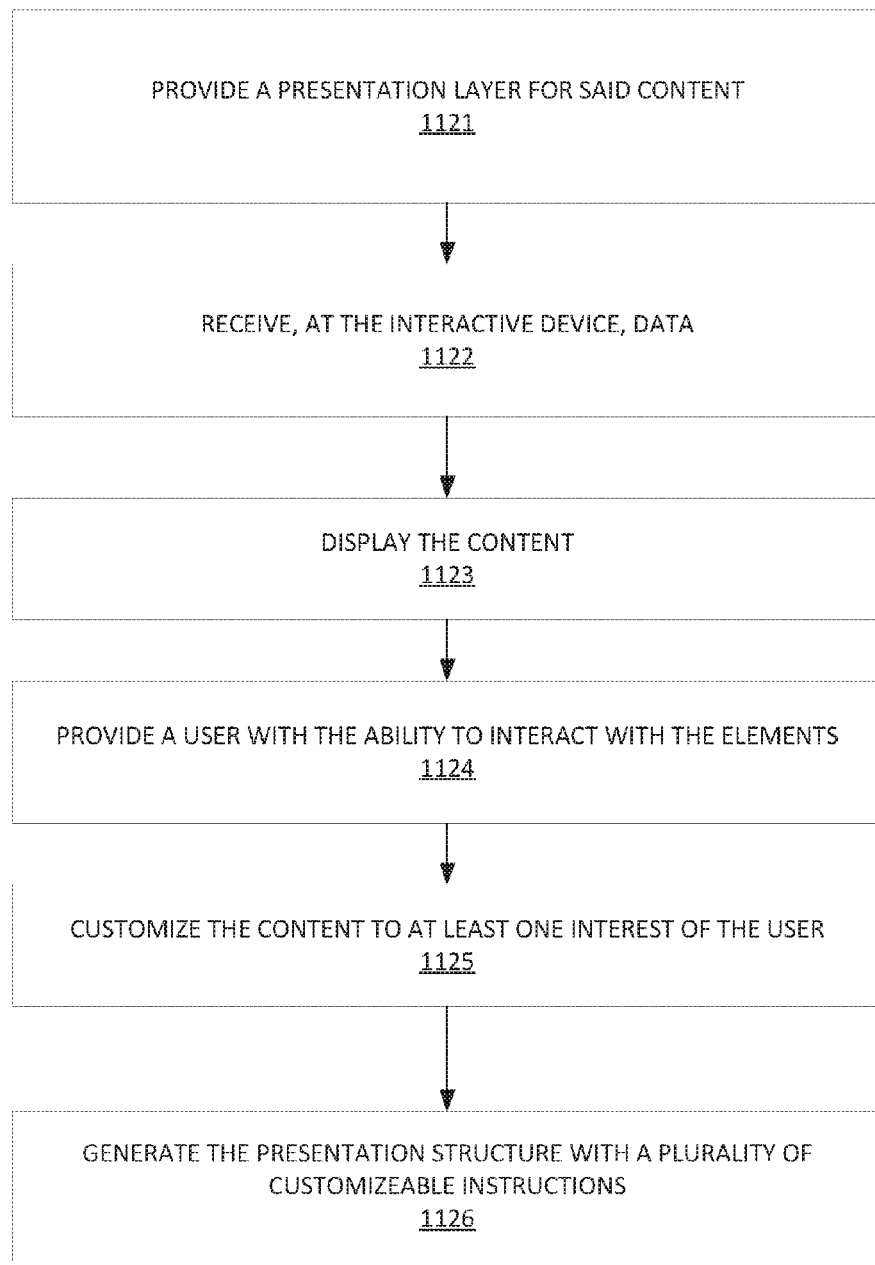
FIG. 11B is an example flowchart of a method for providing content to a user at an interactive device with a display, in accordance with an embodiment.

FIG. 11B is a flow diagram 1120 of an example method for providing content 1105 to a user 1112 at an interactive device 1110 with a display 1111 in accordance with embodiments of the present invention.

In operation 1121, in one embodiment, a presentation layer is provided for the content 1105. A presentation layer receives content 1105 in a variety of formats and presents that content 1105 in an interactive format based at least in part on the type of content 1105 shown. For example, a presentation layer may receive a Facebook™ feed and provide an avatar 1101 that appears to read the Facebook™ feed.

In operation 1122, in one embodiment, data is received at the interactive device 1110. Data may include, but is not limited to: content 1105, updates for interactive device 1110, etc. For example, interactive device 1110 may receive data associated with an interactive calendar belonging to a user 1112.

In operation 1123, in one embodiment, content is displayed. In an embodiment, content 1105 is formatted by a presentation layer and shown to a user 1112. The content 1105 is based at least in part on the data received by interactive device 1110.

In operation 1124, in one embodiment, a user is provided with the ability to interact with the elements 1106. In an embodiment, interactive elements 1106 may be embedded in content 1105. In an embodiment, a presentation layer places interactive elements 1106 on the display 1111. In an embodiment, interactive elements 1106 are operable to cause interactive device 1110 to perform an operation (e.g., open a web page, play a video, change from one television station to another, etc.).

In operation 1125, in one embodiment, the content 1105 is customized to at least one interest of the user 1112. In various embodiments content 1105 is shown based at least in part upon the user 1112 using interactive device 1110. For example, the microphone may determine which user 1112 is watching a smart television, and based on which viewer is watching the smart television play a particular "show" or piece of content 1105.

In operation 1126, in one embodiment, a presentation layer is generated with a plurality of customizable instructions. In an embodiment, a presentation layer is code that when executed causes a processor to perform functions including, but not limited to: facilitate user interaction with elements 1106, format content 1105, create at least one avatar 1101, recognize a user 1112, etc.

Figure 11C:
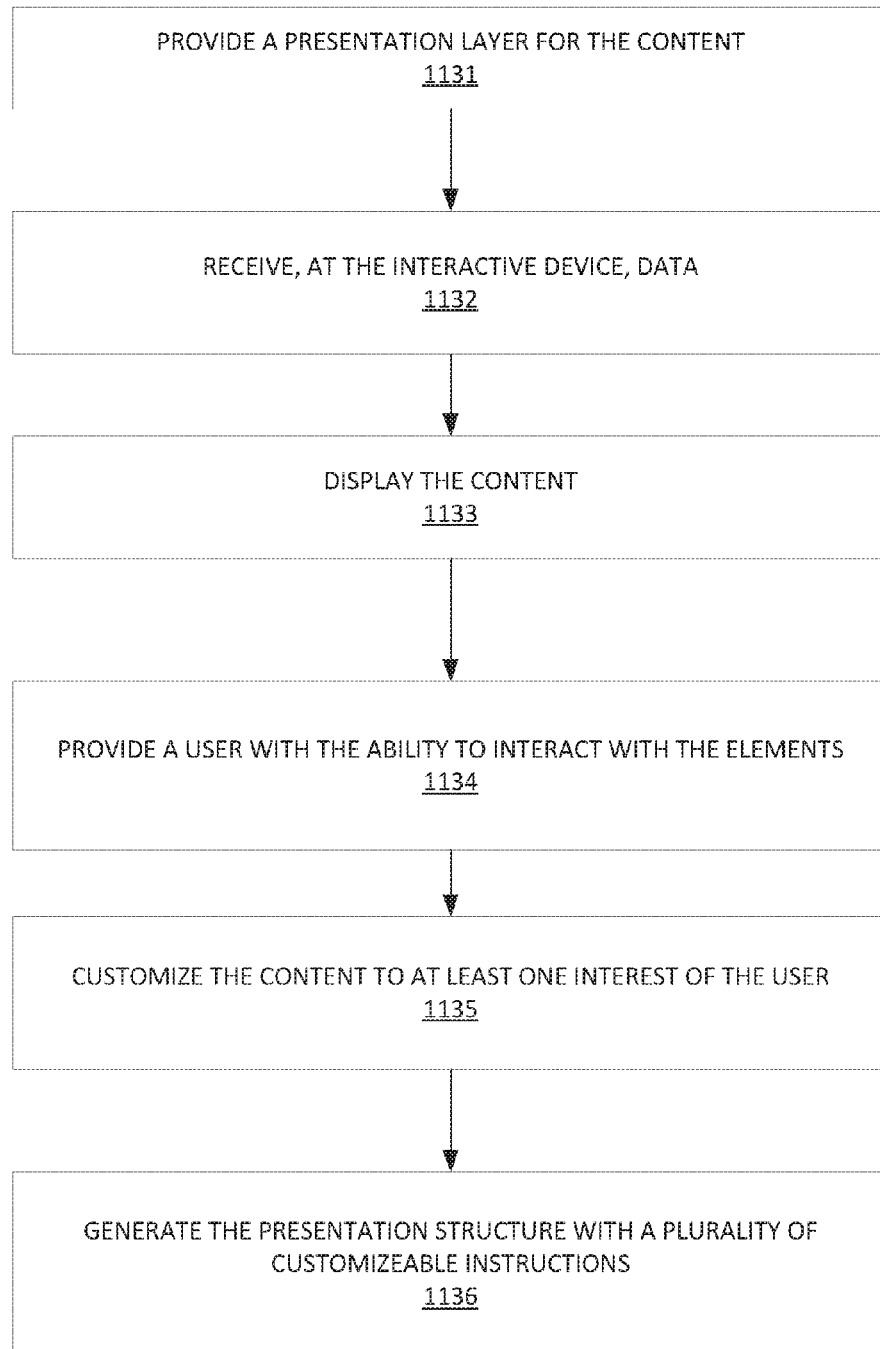
FIG. 11C is an example flowchart of a method implemented by a system for performing a method for providing content to a user at an interactive device with a display, in accordance with an embodiment.

FIG. 11C is a flow diagram 1130 of an example method implemented by a system for performing a method for virtually placing an object in a piece of original content in accordance with embodiments of the present invention.

In operation 1131, in one embodiment, presentation layer is provided for the content 1105. A presentation layer receives content 1105 in a variety of formats and presents that content 1105 in an interactive format based at least in part on the type of content 1105 shown. For example, a presentation layer may receive a Facebook™ feed and provide an avatar 1101 that appears to read the Facebook™ feed.

In operation 1132, in one embodiment, data is received at the interactive device. Data may include, but is not limited to: content 1105, updates for interactive device 1110, etc. For example, interactive device 1110 may receive information associated with a calendar belonging to a user 1112.

In operation 1133, in one embodiment, content is displayed. In an embodiment, content 1105 is formatted by a presentation layer and shown to a user 1112. The content 1105 is based at least in part on the data received by interactive device 1110.

In operation 1134, in one embodiment, a user is provided with the ability to interact with the elements. In an embodiment, interactive elements 1106 may be embedded in content 1105. In an embodiment, a presentation layer places interactive elements 1106 on the display 1111. In an embodiment, interactive elements 1106 are operable to cause interactive device 1110 to perform an operation (e.g., open a web page, play a video, change from one television station to another, etc.).

In operation 1135, in one embodiment, the content 1105 is customized to at least one interest of the user. In various embodiments content 1105 is shown based at least in part upon the viewer 1112 using interactive device 1110. For example, the microphone may determine which user 1112 is watching a smart television, and based on which viewer is watching the smart television play a particular "show" or piece of content 1105.

In operation 1136, in one embodiment, a presentation layer is generated with a plurality of customizable instructions. In an embodiment, a presentation layer is code that when executed causes a processor to perform functions including, but not limited to: facilitate user interaction with elements 1106, format content 1105, create an avatar 1101, recognize a user 1112, etc.

Embodiments of the present technology are thus described. While the present technology has been described in particular examples, it should be appreciated that the present technology should not be construed as limited by such examples, but rather construed according to the claims.

Embodiments for providing content to a user at an interactive device with a display can be summarized as follows:

1. A method for providing content to a user at an interactive device with a display, said method comprising:
   providing a presentation layer for said content, wherein said presentation layer is operable to embed interactive elements that appear on said display;
   receiving, at said interactive device, data;
   displaying said content, wherein said content is based at least in part on said data; and
   providing said user with the ability to interact with said elements.

2. The method of claim 1, wherein said presentation layer creates audio content based at least in part by blending a plurality of audio content.

3. The method of claim 1, wherein said presentation layer creates video content based at least in part by blending a plurality of video content.

4. The method of claim 3, wherein said presentation layer is operable to execute a program.

5. The method of claim 1, further comprising:
   customizing said content to at least one interest of said user.

6. The method of claim 1, further comprising:
   generating said presentation layer with a plurality of customizable instructions.

7. The method of claim 1, wherein said presentation layer and said content is generated at said interactive device.

8. The method of claim 1, wherein said presentation layer provides an avatar, wherein said user is able to interact with said avatar.

9. The method of claim 1, wherein said interactive device is operable to differentiate between a plurality of voices, wherein said interactive device is operable to associate said plurality of voices with a plurality of users, and wherein said interactive device is operable to change content that is currently playing based at least in part on said plurality of users.

10. A computer usable storage medium having instructions embodied therein that when executed cause a computer system to perform a method for providing content to a user at an interactive device with a display, said method comprising:
    providing a presentation layer for said content, wherein said presentation layer is operable to embed interactive elements that appear on said display;
    receiving, at said interactive device, data;
    displaying said content, wherein said content is based at least in part on said data; and
    providing said user with an ability to interact with said elements.

11. The computer usable storage medium of claim 10, wherein said presentation layer creates video content based at least in part by blending a plurality of video content.

12. The computer usable storage medium of claim 10, wherein said presentation layer creates video content based at least in part by blending a plurality of video content.

13. The computer usable storage medium of claim 10, further comprising:

customizing said content to at least one interest of said user.

14. The computer usable storage medium of claim 10, further comprising:
generating said presentation layer with a plurality of customizable instructions.

15. The computer usable storage medium of claim 10, wherein said layer and said content is generated at said interactive device.

16. The computer usable storage medium of claim 10, wherein said content comprises an avatar, and wherein said user is able to interact with said avatar.

17. The computer usable storage medium of claim 10, wherein said computer is operable to differentiate between a plurality of voices, wherein said computer is operable to associate said plurality of voices with a plurality of users, and wherein said interactive device is operable to change content that is currently playing based at least in part on said plurality of users.

18. An interactive device comprising:
a display;
a processor, wherein said processor is operable to receive data, display said content to a user, provide said user with access to a computer program, embed interactive elements into said content, and provide a user with an ability to interact with said elements, and wherein said content is based at least in part on said data;
an input device to capture user input, wherein said user input is operable to interact with said interactive elements; and
wherein said computer program provides said user with the ability to modify data.

19. The processor of claim 18, wherein said processor is operable to customize said content to at least one interest of said user.

20. The processor of claim 18, wherein said interactive device is operable to differentiate between a plurality of voices, and wherein said interactive device is operable to associate said plurality of voices with a plurality of users.

Section Thirteen: Media Metadata Extractor

Overview

Embodiments described herein utilize varying combinations of Pre-production technologies, real-time devices and techniques used during production, and post-production automated processing steps to extract, interpolate, and extrapolate metadata from media with adequate accuracy to facilitate the integration of alternate and richer machine-readable models of reality (e.g. virtual reality).

In general, the media may be audio, video, text or a combination thereof. Moreover, the media may be live or canned. Live media refers to media that is being recorded real-time or near real time. For example, a concert, a sporting event, a news broadcast, live television, live radio, and the like.

In contrast, canned media refers to media that was previously recorded.

For example, a television show, a rerun, a movie and the like.

One embodiment of post processing includes utilizing an augmented reality transmedia (ART) Editor to coordinate the application of semi-automated post-processing and interactive data entry. In another embodiment, an ART-Director is used to coordinate the integration of real-time augmenting additions to video for live events.

Metadata Information

Metadata information can include: frame time, camera position, camera orientation vector, camera frame orientation vector (up indicator), camera frustum (camera lens: zoom/perspective), camera aperture, camera focus, light source positions, light source intensity, light source chrominance, flying mobility boundaries, floating mobility boundaries, hard surface mobility boundaries, video object positions, ghost bot positions ("invisible" functional interactive potential video reality objects), video object depth (used for matting approach to hidden object removal and stereoscopy), video object shape models (used for 3D model approach to hidden object removal and stereoscopy), ghost bot identity (action) mapping, video clarity (visibility), video resolution, video luminance, video chrominance, audio source positions, audio range, dialogue, dialogue to audio source mapping, infinity mapping, effective distance, interpolation, extrapolation, behavioral cues, proximity, periodicity, dialogue, value of user interaction, significance (relative weighting of value), and the like.

Figure 12A:
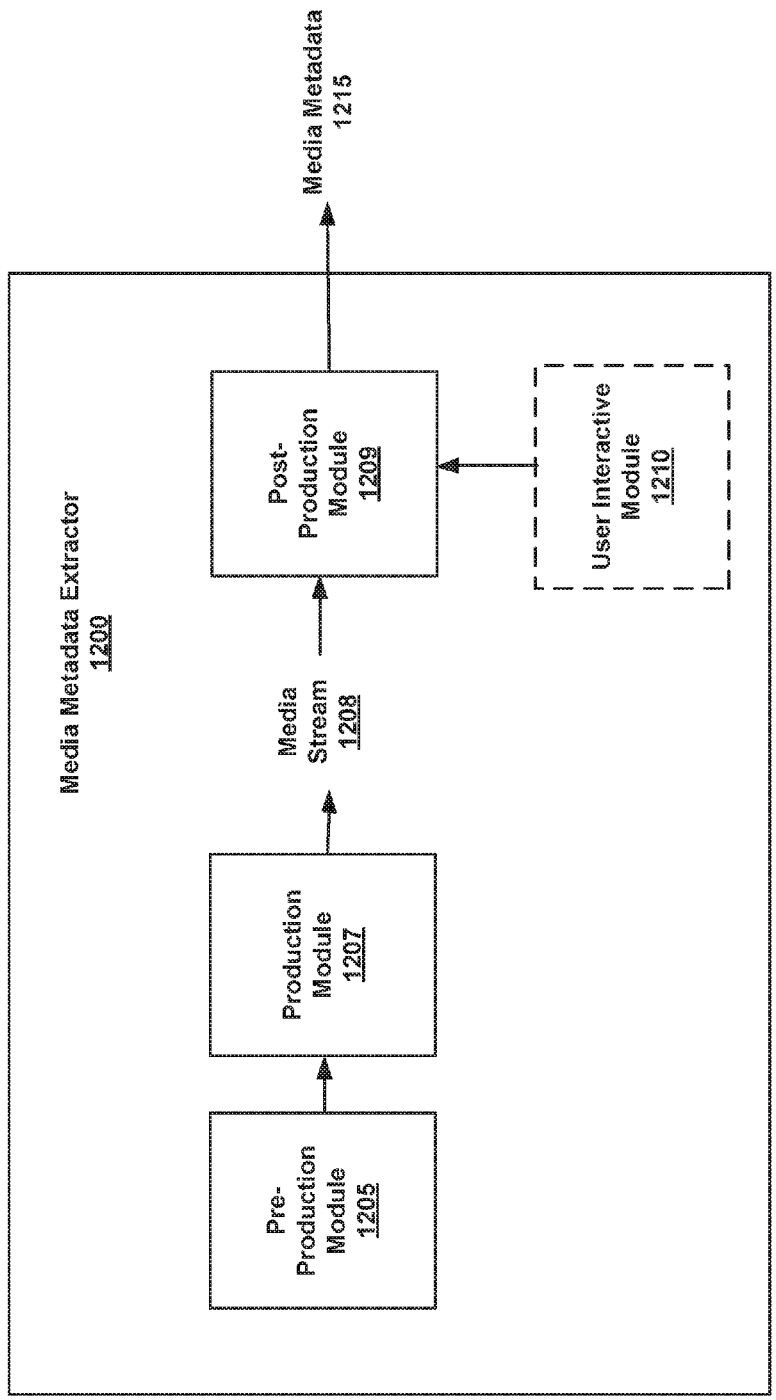
FIG. 12A is a block diagram of a media metadata extractor, in accordance with an embodiment.

With reference now to FIG. 12A a block diagram of a media metadata extractor 1200 is shown in accordance with one embodiment of the present technology. In general, media metadata extractor 1200 generates a media stream 1208 and determines media metadata 1215 therefrom. In one embodiment, media metadata extractor 1200 includes a pre-production module 1205, a production module 1207, and a post-production module 1209. In one embodiment, media metadata extractor 1200 also includes an optional user interactive module 1210.

In one embodiment, pre-production module 1205 determines a geospatial location of a media recording device. In one embodiment, pre-production module 1205 also determines a geospatial location of an immobile object. For example, the immobile object may be a landmark, a geographical feature, a structure, and the like.

In another embodiment, pre-production module 1205 additionally establishes a geospatial location tag (or sensor) on a mobile object. For example, the geospatial sensor may be a global positioning system, a distance sensor, a proximity beacon, a directional beacon, a magnetometer, an accelerometer, a gyroscope, a machine readable visual marker, a radio frequency identifier tag and the like.

In general, production module 1207 collects time-stamped geospatial location information from the media data produced by the media recording device. In one embodiment, the production module 1207 keys the media data with a timestamp. In one embodiment, the production module 1207 also collects time-stamped geospatial location information from the tagged mobile object.

In one embodiment, post-production module 1209 extracts the time-stamped geospatial location information from the media data. In addition, post-production module 1209 is able to map the extracted time-stamped geospatial location information to a reality model.

Optional user interactive module 1210 provides coordinated integration of an augmentation addition to the media data. In the present discussion, an augmentation addition is an object or action that is added to the media data. For example, if the media data is a live concert, when the media data is collaboratively combined with other similar media data, enough information will be available to develop an accurate reality model of the concert. The integration of the augmentation addition, would allow a user to add an alien ship landing to the reality model of the concert.

Geospatial information refers to the location, orientation, frame orientation and the like. For example, sensors embedded in mobile smart-devices allow indirect derivation of location, orientation, and frame orientation. In non-mobile smart devices actual location is also modeled, while orientation and frame orientation can be virtualized. In any smart-device, location, orientation and frame orientation can also be virtualized.

In one embodiment, geospatial metadata may include mobility boundaries which identify the range of potential motion for virtual objects. For instance, geospatial metadata embedded into video allows automated behavior so that embedded objects can respond to data streams, including user interface data to provide a user-interactive and situational-interactive experience.

In another embodiment, geospatial sensors attached to the frame of heads-up-display devices (e.g. glasses, cars, helmets, etc.) can provide information including camera position, camera orientation, camera frame orientation and the like. In addition, the geospatial metadata can include camera orientation information such as forward and back facing.

Figure 12B:
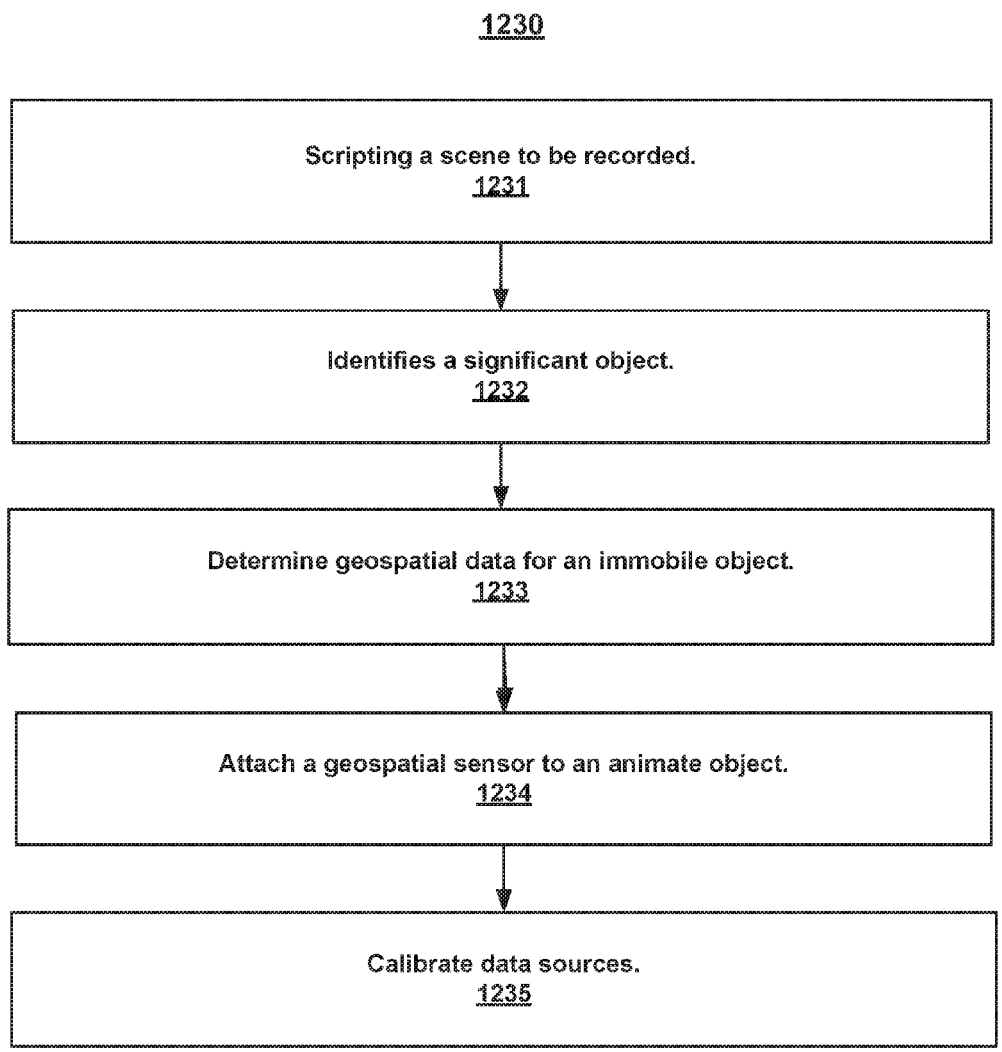
FIG. 12B is a flowchart of a method for pre-producing media having extractable metadata, in accordance with an embodiment.

Referring now to FIG. 12B a flowchart 1230 of a method for pre-producing media having extractable metadata is shown, according to one embodiment of the present technology.

With reference now to 1231 of FIG. 12B, one embodiment scripts a scene to be recorded. For example, scripting of significant characteristics of the scene(s) to be shot. Significant characteristics may include mobility zones, such as traversable land, navigable water, etc.

Referring now to 1232 of FIG. 12B, one embodiment identifies a significant object. Significant objects are selected from the group consisting of: landmarks, vehicles, persons, and geographical features.

With reference now to 1233 of FIG. 12B, one embodiment determines geospatial data of immobile objects within a set, a landscape, a false background and the like.

Referring now to 1234 of FIG. 12B, one embodiment attaches geospatial sensors to animate subjects. In general, geospatial sensors include, but are not limited to, global positioning systems, distance sensors, proximity and directional beacons, magnetometers, accelerometers, gyroscopes, machine readable visual markers, radio frequency identifier tags and the like. Animate subjects refer to mobile objects, people, animals and the like.

With reference now to 1235 of FIG. 12B, one embodiment calibrates the data sources using data redundancy.

Referring now to FIG. 12C, a flowchart 1240 of a method for producing media having extractable metadata is shown, according to one embodiment of the present technology.

With reference now to 1241 of FIG. 12C, one embodiment collects real-time geospatial data from the image capture devices. At 1242, one embodiment collects real-time geospatial data from the previously tagged subjects.

Referring now to 1243 of FIG. 12C, one embodiment captures precise time information for frames shot and all geospatial data. At 1244, one embodiment keys the data by timestamp. At 1245, similar to 1235 of FIG. 12B, one embodiment periodic benchmarks or recalibrates the geospatial devices. For example, offline cameras on a multi-cam shoot.

With reference now to 1246 of FIG. 12C, one embodiment utilizes one or more user-operated Director-assist systems for coordination of real-time integration of augmenting additions to the media data.

Referring now to FIG. 12D, a flowchart 1250 of a method for post-production extraction of media metadata is shown, according to one embodiment of the present technology. In the following discussion 1251-1254 are utilized for canned media while only 1251-1252 are utilized for live media.

With reference now to 1251 of FIG. 12D, one embodiment extracts the characteristics of previously recorded media stream. For example, a scene, location, landscape and the like. At 1252 of FIG. 12D, one embodiment maps the extracted characteristics to a reality model. In the case of live media, post processing is a small window due to the processing occurring in real-time or near real-time. In other words, a viewer watching a live program would not want anything more than a few seconds delay in the broadcast or presentation. As such, the post-processing time window is small.

Some foundational processing techniques that may be used on live or canned media includes edge detection (such as convolve image filters); object detection which includes edge detection plus logic plus luminance and chrominance thresholding as well as recognized frequency domain patterns; near-horizontal line detection and near-vertical line detection which use edge detection plus logic.

Automated derivation of characteristics examples include:
1. Camera Frustum & Camera Location deltas based on apparent change in image scale Four camera maneuvers generally affect apparent image scale:
   i. Zoom-in (a narrowing of field of view characterized by diminished perspective approaching orthographic projection as Zoom increases)
   ii. Zoom-out (a widening field of view characterized by increased perspective which exaggerates convergence of objects near the center of field relative to)
   iii. Dolly-in (camera location change toward the direction of view characterized by static perspective)
   iv. Dolly-out By monitoring changes in scale (objects moving onto frame or off frame roughly radially from center field), and comparing the relative movement of near-center-field and far-afield recognized objects we can derive camera location deltas parallel to the orientation of the camera, as well as changes to the camera frustum.

2. Light source position(s), chrominance and intensity
   a. By comparing relative luminance and chrominance on all visible portions of recognized objects which have been located in 3 space within the field of view, a model for light source position(s), chrominance and intensity can be derived.

3. Chrominance of film video or scene in its entirety or subframe, can be derived by a transfer function from chrominance information of a plurality of pixels and or frames.

Luminance bias of film, video or scene can be derived by a transfer function from chrominance information of a plurality of pixels and or frames.

Referring now to 1253 of FIG. 12D, one embodiment edits the characteristics interactively. For example the characteristics may be edited using ART Editor.

In general, ART editor is a user interactive system capable of changing time scale of video from greater than normal speed down to frame accurate; allowing a user to switch between video source, real-world model, and virtual reality model views; pointing devices and other controls to allow specification of objects; functions that relate user interaction and input to automated extraction; allowing a user to determine highest productivity frame rate of data entry (e.g., sub full-motion); data entry capability for estimates; database access to assist common items (e.g., known landmarks, etc.); defining mobility boundaries for embedded mobile objects and the like.

In one embodiment defining mobility boundaries for embedded mobile objects is specified by: relative positional vectors &/or abstract polyhedron, nurb or formula pinned to any of: infinity (skydomes, skycubes, etc.); placed objects (stationary or mobile); identified objects; points, including origin and the like.

With reference now to 1254 of FIG. 12D, one embodiment coordinates real-time integration of an augmenting addition to the media stream. For example, in one embodiment, one or more user-operated ART Director-assist systems may be used. In general, ART director assist is a user interactive system capable of controlling movements and behavior of augmented reality objects.

A summary of embodiments for directing a processor to execute a method for pre-producing media having extractable metadata is the following:

1. A live media metadata extractor comprising:
    a pre-production module to determine a geospatial location of a media recording device;
    a production module to collect a time-stamped geospatial location information from a media data produced by the media recording device; and
    a post-production module to extract the time-stamped geospatial location information from the media data.
2. The live video metadata extractor of claim 1 further comprising:
    a user interactive module to provide coordinated integration of an augmentation addition to the media data.
3. The live video metadata extractor of claim 1 wherein the pre-production module determines a geospatial location of an immobile object.
4. The live video metadata extractor of claim 1 wherein the pre-production module establishes a geospatial location tag on a mobile object.
5. The live video metadata extractor of claim 4 wherein the production module collects a time-stamped geospatial location information from the mobile object.
6. The live video metadata extractor of claim 1 wherein the production module keys the media data with a timestamp.
7. The live video metadata extractor of claim 1 wherein the post-production module maps the extracted time-stamped geospatial location information to a reality model.
8. The live video metadata extractor of claim 7 wherein the post-production module integrates an augmentation addition to the reality model.
9. A non-transitory computer-readable storage medium comprising computer executable code for directing a processor to execute a method for pre-producing media having extractable metadata, the method comprising:
    scripting a scene to be recorded;
    identifying significant objects within the scene;
    determining geospatial data for at least one immobile object within the scene; and
    attaching a geospatial sensor to an animate subject in the scene.
10. The non-transitory computer-readable storage medium recited of claim 9 wherein the significant objects are selected from the group consisting of:
    landmarks, vehicles, persons, and geographical features.
11. The non-transitory computer-readable storage medium recited of claim 9 wherein the geospatial sensor is selected from the group consisting of: a global positioning system, a distance sensor, a proximity beacon, a directional beacon, a magnetometer, an accelerometer, a gyroscope, a machine readable visual marker, and a radio frequency identifier tag.
12. The non-transitory computer-readable storage medium recited of claim 9 wherein the animate subject is selected from the group consisting of: a mobile object, a person and an animal.
13. The non-transitory computer-readable storage medium recited of claim 9 further comprising:
    calibrating the geospatial sensor using data redundancy.
14. A non-transitory computer-readable storage medium comprising computer executable code for directing a processor to execute a method for producing media having extractable metadata, the method comprising:
    collecting real-time media data from a media recording device;
    collecting real-time geospatial data from the media recording device;
    collecting real-time geospatial data from an animate subject having a geospatial sensor attached thereto;
    capturing precise time information for frames shot and all geospatial data; and
    keying all media data with a timestamp.
15. The non-transitory computer-readable storage medium recited of claim 14 wherein the geospatial sensor is selected from the group consisting of: a global positioning system, a distance sensor, a proximity beacon, a directional beacon, a magnetometer, an accelerometer, a gyroscope, a machine readable visual marker, and a radio frequency identifier tag.
16. The non-transitory computer-readable storage medium recited of claim 14 wherein the animate subject is selected from the group consisting of: a mobile object, a person and an animal.
17. The non-transitory computer-readable storage medium recited of claim 14 further comprising:
    periodically calibrating the geospatial sensor using data redundancy.
18. The non-transitory computer-readable storage medium recited of claim 14 further comprising:
    utilizing a user-operated Director-assist system to coordinate real-time integration of augmenting additions to the media data.
19. A non-transitory computer-readable storage medium comprising computer executable code for directing a processor to execute a method for post-producing media having extractable metadata, the method comprising:
    extracting a characteristic of a previously recorded media stream; and
    mapping the characteristics to a reality model.
20. The non-transitory computer-readable storage medium recited of claim 19 further comprising:
    editing the characteristics interactively with an augmented reality transmedia editor.
21. The non-transitory computer-readable storage medium recited of claim 19 further comprising:
    coordinating real-time integration of an augmenting addition to the media stream.

Section Fourteen: Product Placement Paired with Interactive Advertising

Notation and Nomenclature

Some portions of the description of embodiments which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present discussions terms such as "determining", "placing", "receiving", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, in some embodiments, methods described herein can be carried out by a computer-usable storage medium having instructions embodied therein that when executed cause a computer system to perform the methods described herein.

Brief Description

Product placement in television shows, films, and video games has become increasingly popular over the years. In addition, as display devices become increasingly interactive, advertisements are interactive as well.

Overview of Discussion

Example techniques, devices, systems, and methods for placing an object in a piece of content are described herein. Discussion begins with a description of product placement. Example interactive devices and their capabilities are then described. Discussion continues with a description of interactive advertising. Next, example product placement paired with interactive advertising is discussed. Lastly, example methods of use are described.

High Level Description of Product Placement

Figure 13A:
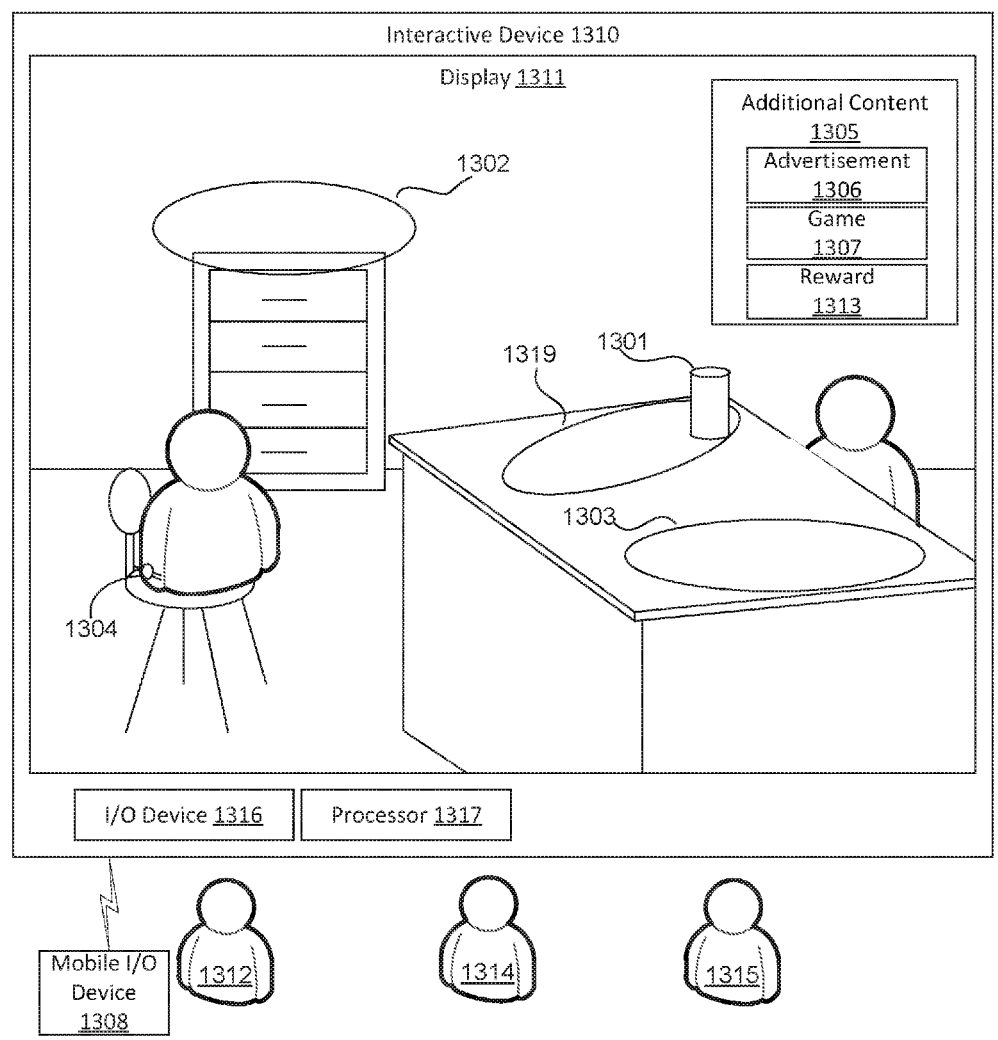
FIG. 13A is an example diagram upon which embodiments of the present invention may be implemented, in accordance with an embodiment.

FIG. 13A shows an example interactive device 1310. Viewers 1312, 1314 and 1315 are able to watch content on the display 1311 of interactive device 1310. In various embodiments, content includes still video, still images, and/or audio. The content in FIG. 13A shows an office where one person is sitting at a desk and another person is sitting in a chair.

Since the advent of digital video recorders, such as TiVo™, people have been able to fast-forward through commercials with ease. This, along with other factors, has increased the amount of product placement in television shows, movies, etc. For example, object 1301 in FIG. 13A is a soda can. When a viewer 1312 sees the soda can he may be more likely to buy that type of soda the next time he buys soda. Object 1301 may be any type of object (or portion thereof). For example, object 1301 may include, but is not limited: food, drinks, furniture, clothing, a logo, a sign, a vehicle, a billboard, a building, athletic equipment, an electronic device, a painting, a person, an animal, scenery, etc. In various embodiments object 1301 is three dimensional (3D). In some embodiments object 1301 is two dimensional (2D). Also, an object 1301 may be opaque, transparent, or translucent.

In some systems, objects 1301 are placed into pieces of content during production. For example, when preparing to film a show, the object 1301 may be placed on the desk before filming starts.

In one embodiment, computers and virtual reality allows advertisers to place objects 1301 into content (e.g., movies, slide shows, television programs, and video games) after the content is created with a high degree of realism. This is also known as retro-active product placement. For example, a system can place objects 1301 into a scene after it has been filmed. In some embodiments, a processor 1317 is operable to place objects 1301 into content that was recorded years ago.

Example Interactive Devices and Their Capabilities

As discussed above, FIG. 13A shows an example interactive device 1310. While a television is shown as an example, in various embodiments interactive device 1310 may include, but is not limited to: a mobile device with a display 1311, a smart phone, a tablet computer, a laptop, a personal digital assistant, a smart television, a radio, a computer, a server, etc.

In some embodiments, interactive device 1310 comprises I/O device 1316, processor 1317, and display 1311.

In one embodiment, I/O device 1316 comprises, but is not limited to: a receiver, a touchscreen, a keyboard, a mouse, a joystick, a button, a depth sensor, a motion sensor, a microphone, a speaker, a Microsoft™ Kinect™ type device, etc. In some embodiments interactive device 1310 comprises a plurality of I/O devices 1316. In one embodiment, an I/O device 1316 may receive signals from a mobile I/O device 1308. Mobile I/O device 1308 may include, but is not limited to: a remote control, a tablet computer, a smart phone, a microphone, a personal digital assistant, etc. In an embodiment Mobile I/O device 1308 may be coupled to interactive device 1310. In one embodiment Mobile I/O device 1308 may be communicatively coupled to interactive device 1310.

In an embodiment, interactive device 1310 comprises a processor 1317 operable to perform various operations. Processor 1317 is operable to determine available locations 1302, 1303 and 1319 and times within a piece of content to place an object 1301. For example, processor 1317 may determine that the scene shown in FIG. 13A has available locations 1302, 1303, and 1319 to place an object 1301. Processor 1317 may also determine that this particular scene is shown for a particular amount of time (e.g., the conversation in the scene lasts two minutes, and begins at a particular time in the show). Processor 1317 may determine to place an object 1301 at location 1319. Once a determination to place an object 1301 has been made, a processor 1317 may place object 1301 at location 1302, 1303, and/or 1319. In an embodiment object 1301 is rendered and positioned to appear as if it is part of original content (e.g., previously produced content). In some embodiments, rendering can adjust the focal length, position, and/or orientation of an object 1301. In some embodiments rendering is performed automatically, while in other embodiments rendering is performed at least in part by a person. In some embodiments a transmedia editor is operable to perform the rendering of objects 1301 within content (e.g., original or other). It should be noted that FIG. 13A is not drawing to scale, including locations 1302, 1303 and 1319 and object 1301. In some embodiments operations performed by processor 1317 occur in real time or near-real time.

In one embodiment, processor 1317 may be a graphics processing unit or a central processing unit. Further, interactive device 1310 may comprise a plurality of processors 1317 that may perform all, some, or none of the operations discussed herein.

In one embodiment processor 1317 is not located in device 1310. In an embodiment the processing described herein is performed at a location remote from interactive device 1310. For example, objects 1301 may be placed in content prior to the content reaching interactive device 1310. In some embodiments placing an object 1301 in a piece of content occurs at a computer remote from the device on which a viewer 1312 receives the piece of content.

In various embodiments interactive device 1310 comprises a display 1311. Displays are known in the art so a detailed discussion is not necessary. While in some embodiments display 1311 is flat, in various embodiments display 1311 is concave or convex.

Interactive Advertising

In an embodiment interactive device 1310 is operable to provide a viewer 1312 with additional content 1305 comprising interactive advertising. In an embodiment additional content 1305 comprises at least one advertisement 1306 and/or at least one game 1307 and/or at least one reward. In some embodiments additional content 1305 covers a portion of display 1311, while in other embodiments additional content 1305 covers all of display 1311 (e.g., the additional content 1305 uses the entire display 1311).

As an example, interactive advertising may allow viewer 1312 to interact with an advertisement via I/O device 1316. In an embodiment viewer 1312 can control a cursor to click on various portions/buttons of an advertisement 1306. In an embodiment interactive advertising is prepared and sent to interactive device 1310. In one embodiment an advertisement 1306 is a commercial. In one embodiment additional content 1305 is a webpage.

In addition to being additional content 1305, in an embodiment, an interactive advertisement 1306 may be a game 1307. For example, game 1307 may be a shooting game where a viewer/user 1312 shoots flying soda cans. Game 1307 may be any type of game including, but not limited to: a word game, an adventure game, a trivia game, a card game, a casino game, etc.

In an embodiment, additional content is a reward. For example, a reward may include, but is not limited to: a coupon, a discount, additional content associated with the show or movie, etc.

In one embodiment, targeted advertising is utilized. For example, candidate objects may be selected as object 1301. In an embodiment, a processor 1317 may choose a candidate object from a database of objects (e.g., soda, iced tea, potato chips, yogurt, etc.). A candidate object may be selected in part on a plurality of viewer 1312 information including, but not limited to: demographic information, age, race, gender, socio-economic status, previous preferences, previous preferences within interactive device 1310, past purchases, food preference, furniture preference, vehicle preference, whether a user typically selects one object 1301 over another object 1301, etc. This information may be based at least in part on previous interactions with objects 1301 or from another source (e.g., information extracted from the email or a web browser belonging to viewer 1312). In an example, beer is chosen over soda, out of the group of candidate objects, when viewer 1312 is over 21 years of age. In one embodiment, if a type of object 1301 has not been shown as much as desired in a particular geographic area, for example, processor 1317 may determine the location of interactive device 1310 and whether it should insert more objects 1301 of that type. In an embodiment, selection of a candidate object may be selected based at least in part on a clickthrough rate (CTR). In an embodiment, a company (e.g., Proctor and Gamble™) may place various objects 1301 associated with its products (e.g., toothpaste, detergent, etc.) throughout a piece of content.

In one embodiment an interactive advertisement 1306 may provide a viewer 1312 with a menu. This menu may provide options to a viewer 1312 including, but not limited to: watching a commercial, playing a game 1307, listening to a song, downloading/showing a web page, etc. In an embodiment interacting with an advertisement 1306 may cause interactive device 1310 to display a webpage that sells a product.

Example Product Placement Paired with Interactive Advertising

In one embodiment, a viewer 1312 can interact with the object 1301 wherein the interaction causes a processor 1317 to send additional content 1305 to a viewer 1312. In some embodiments, the viewer 1312 can move and/or manipulate an object 1301 using I/O device 1316. For example, viewer 1312 may click on an object 1301 by making gestures (e.g., pointing at an object and pretending to shoot it) recognized by a motion sensor. As another example a viewer 1312 may use a mouse to click on object 1301. Other examples of interacting with object 1301 include, but are not limited to: making a throwing or kicking motion, speaking in a microphone, talking with other viewers 1314 and 1315, clicking on a mobile I/O device 1308, having a dialogue with other users 1314 and 1315, clapping, etc. In one embodiment, clicking on an object 1301 will provide a viewer 1312 with additional content 1305. In an embodiment a processor 1317 is operable to capture voices of a plurality of viewers 1312, 1314, and 1315.

As discussed above, in an embodiment, an object 1301 is rendered such that it appears to be part of the original content (e.g., the object 1301 looks like it belongs in the scene). In some embodiments, an object 1301 or content is rendered such that an indication is made to viewer 1312 that viewer 1312 can interact with object 1301. For example, in some embodiments object 1301 is highlighted (e.g., made prominent or emphasized). Highlighting may include, but is not limited to: making an object 1301 shake or move, adding a shimmer or other special effect to an object 1301, adding a glow to an object 1301, producing a sound, making an object 1301 change color, etc. This list is not meant to be exhaustive. Rather, it is meant to illustrate example ways to indicate to a viewer 1312 that an object 1301, or a portion thereof, is interactive.

In one embodiment, object 1301 is transparent. In other words, in one embodiment, an object 1301 is mapped to an area of a screen that corresponds to an element within content. For example, an advertiser may want to advertise the watch (i.e., element) that the person in the chair in FIG. 13A is wearing. An invisible object 1304 may be placed over the watch (i.e., mapped) since the watch was in the original content (e.g., the actor was wearing the watch during the filming of a show). In an embodiment the transparent object 1304 (in this case a watch) is highlighted as discussed above. As with other objects 1301, a transparent object 1304 may be an object including, but not limited to: a painting, a dress, shoes, food, furniture, a vehicle, etc.

In an embodiment, an object 1301 is an interactive gateway to advertisements 1306. In other words, in some embodiments, viewer 1312 receives additional content 1305 by interacting with object 1301. For example, in some embodiments, when viewer 1312 interacts with object 1301 a commercial will play, a game 1307 associated with the object 1301 will appear, a website will open, a menu will appear, etc.

In one embodiment, I/O device 1316 may receive dialogue from a plurality of users 1312, 1314, and 1315. Dialogue may comprise any speech, for example a discussion about a piece of clothing a woman is wearing. In an embodiment, when a discussion about an object 1301 is received from viewers 1312, 1314 and 1315 a processor 1317 may perform an operation (e.g., provide viewers 1312, 1314, and 1315 with additional content 1305). In an embodiment, a processor 1317 performs an operation based at least in part on the dialogue. For example, a processor 1317 may be operable to distinguish between different viewers 1312, 1314, and 1315. In an embodiment, a processor 1317 may only be responsive to one of the plurality of viewers 1312, 1314, and 1315.

Example Methods of Use

FIG. 13B is a flow diagram 1320 of an example method for virtually placing an object 1301 in a piece of content in accordance with embodiments of the present invention.

In operation 1321, in one embodiment, a processor 1317 determines available locations 1302, 1303, and 1319 and times within a piece of content to place an object 1301. In an embodiment processor 1317 determines when and/or where to place an object 1301 based at least in part on an available location 1302, 1303 and 1319 and/or time within a piece of content.

In operation 1322, in one embodiment, a processor 1317 determines whether to place an object at at least one of the available locations 1302, 1303, and 1319. In some embodiments, an object 1301 is not placed in an available location 1302, 1303, and 1319. In an embodiment, the amount of objects 1301 placed in content is based in part upon an agreement between a content provider and a service provider, and/or another type of provider.

In operation 1323, in one embodiment, an object 1301 is placed in a piece of content provided that a determination has been made to place the object 1301 into the content. In an embodiment, the object 1301 may be rendered to appear as if it were a part of the original content. In another embodiment, the object 1301 is placed into the scene prior to the scene being filmed, recorded, assembled, etc.

In operation 1324, in one embodiment, a processor or provider determines a candidate object to use as an object 1301. For example, object 1301 may be selected from a database of candidate objects. As discussed herein, in an embodiment, object 1301 may be chosen based in part on information including, but not limited to: demographic information, age, race, gender, sexual orientation, previous purchases, geography, a sponsor of the object 1301, preferences scraped from a computer belonging to a viewer 1312, etc. In various embodiments, these operations may be performed in real time or near real time.

In operation 1325, in one embodiment, the interactive device 1310 receives user interaction with an object 1301. As discussed herein, user interaction may include, but it not limited to: initiating interaction with an I/O device 1316, speaking, gesturing, waving a hand, pointing, using a mouse, using a key board, using a mobile I/O device 1318, clapping, having a dialogue with another viewer 1314, 1315, clicking a button (e.g., on a remote control), etc.

FIG. 13C is a flow diagram 1330 of an example method implemented by a system for performing a method for virtually placing an object in a piece of original content in accordance with embodiments of the present invention.

In operation 1331, in one embodiment, available locations 1302, 1303, and 1319 are determined within a piece of original content (e.g., content that has already been produced) to place an object 1301. In an embodiment processor 1317 determines when and/or where to place an object 1301 based at least in part on an available location 1302, 1303 and 1319 and/or time within a piece of content.

In operation 1332, in one embodiment, interactive device 1310/processor 1317 determines whether to place the object at least one of the available locations 1302, 1303, and 1319. In an embodiment the processing is performed remote from the interactive device 1310. In some embodiments, an object 1301 is not placed in an available location 1302, 1303, and 1319. In an embodiment, the amount of objects 1301 placed in content is based in part upon an agreement between a content provider and a service provider, and/or another type of provider.

In operation 1333, in one embodiment, an object 1301 is placed in a piece of original content provided a determination has been made to place the object 1301 into the original content. In an embodiment, the object 1301 may be rendered to appear as if it were a part of the original content. In an embodiment object 1301 is made prominent such that a viewer 1312 knows that object 1301 is interactive. As discussed above, object 1301 may be highlighted such that a viewer 1312 knows that object 1301 is interactive.

Embodiments of the present technology are thus described. While the present technology has been described in particular examples, it should be appreciated that the present technology should not be construed as limited by such examples, but rather construed according to the claims.

Embodiments for virtually placing an object in a piece of content can be summarized as follows:

1. A method for virtually placing an object in a piece of content, said method comprising:
   determining, at a processor, available locations and times within said piece of content to place said object;
   determining, at said processor, whether to place said object at least one of said available locations; and
   provided a determination has been made to place said object, placing said object in said piece of content.
2. The method of claim 1, wherein said object is placed in said piece of content after said piece of content has been created.
3. The method of claim 1, wherein said object is an interactive gateway to advertisements.
4. The method of claim 1, further comprising:
   determining a candidate object to use as said object.
5. The method of claim 1, further comprising:
   receiving user interaction with said object, wherein said interaction causes said processor to send additional content to said user.
6. The additional content of claim 5, wherein said additional content is a reward.
7. The additional content of claim 5, wherein said additional content is a game.
8. The object of claim 1, wherein said object is transparent such it may be mapped to an area of a screen that corresponds to an element within said content.
9. The object of claim 1, wherein said object is highlighted.
10. The method of claim 1, wherein said processor is operable to capture voices of a plurality of users.
11. The method of claim 1, wherein said processor is operable to receive dialogue between viewers, and wherein said processor performs an operation on an object based at least in part on said dialogue.
12. A computer usable storage medium having instructions embodied therein that when executed cause a computer system to perform a method for virtually placing an object in a piece of original content, said method comprising:
    determining available locations within said piece of original content to place said object, wherein said object is placed in said piece of original content after said piece of original content has been created;
    determining whether to place said object at least one of said available locations; and
    provided a determination has been made to place said object, placing said object in said piece of original content.
13. The computer usable storage medium of claim 12, wherein said determining available locations occurs in real time.

14. The computer usable storage medium of claim 12, wherein said object is an interactive advertisement.

15. The computer usable storage medium of claim 12, wherein said method further comprises:
receiving user interaction with said object, wherein said interaction causes a processor to send additional content to said user.

16. The computer usable storage medium of claim 12, wherein said object is transparent such that it may be mapped to an area of a screen that corresponds to an element within said piece of original content.

17. An interactive device comprising:
a display;
a processor, wherein said processor is operable to virtually place an object in a piece of original content to be displayed on said display, wherein said object is placed in said piece of original content after said piece of original content has been created, and wherein said object is an advertisement; and
an input device to capture user input, wherein said user input is operable to interact with said object.

18. The object of claim 17, wherein said object is transparent such that said object may be mapped to an area of said display that corresponds to an element of content, including objects previously placed in said piece of original content.

19. The device of claim 17, wherein said input device is operable to capture and distinguish a plurality of voices.

20. The object of claim 17, wherein said object is highlighted.

What is claimed is:

1. A non-transitory computer-readable storage medium having instructions embodied therein that when executed cause a computer system to perform a method for navigating concurrently and from point-to-point through multiple reality models, said method comprising:
receiving, at a processor of a device, a first virtual position information request associated with a first location of interest, wherein said first location of interest is one of a first virtual location and a first non-virtual location and is out of a line of sight of a user of said device;
comparing, at said processor, said first virtual position information request with a store of location position information;
based on said comparing, generating, at said processor, a response to said first virtual position information request, wherein said generating a response comprises:
generating, at said processor and for display at said device, a first navigable virtual view from a first virtual viewing position of a first location of interest, wherein said generating said first navigable virtual view comprises:
creating a first virtual viewing position from within said first navigable virtual view and from which said first location of interest may be viewed, wherein said creating comprises:
receiving at least one of:
an advancement instruction to virtually advance towards said first location of interest until virtual position information of said first virtual position information request matches said first location of interest; and
advancement information signifying that a physical advancement towards said first location of interest has occurred, wherein said virtual position information matches said first location of interest and said advancement information includes a first virtual viewing position of said first location of interest; and
in response to a received advancement instruction advancing towards said first location of interest, thereby achieving said first virtual viewing position;
concurrently with said generating said first navigable virtual view of said first location of interest, generating said first navigable view of a first virtual set of documents as said first location of interest, at said processor and for display at said device, a second navigable virtual view corresponding to a current physical position of an object, wherein said object comprises an item to which said processor is attached such that real-time sight at said current physical position, from a second virtual viewing position is enabled within said second navigable virtual view, wherein said current physical position comprises a real-time location of said object as it finds itself on Earth, and wherein said real-time sight comprises an ability to view what is happening at said current physical position as it is occurring, wherein said first location of interest and said current physical position are different; and
wherein said providing a second navigable virtual view comprises:
providing a virtual vehicle within said second navigable virtual view, wherein said virtual vehicle remains separate from and within a predetermined distance from said object as said object moves;
concurrently with said generating said first navigable virtual view of said first location of interest, generating, at said processor and for display at said device, a third navigable virtual view of a second location of interest, wherein said second location of interest is one of a second virtual location and a second non-virtual location, wherein said generating said third navigable virtual view comprises:
after one of said second virtual location and said second non-virtual location shown on said display screen of said device matches said second location of interest, creating a second virtual viewing position from within said third navigable view and from which said second location of interest may be viewed wherein said first location of interest and said second location of interest are different.

2. The non-transitory computer-readable storage medium of claim 1, further comprising:
using non-real-time stored imaging associated with said current physical position.

3. The non-transitory computer-readable storage medium of claim 1, wherein enabling said real-time sight at said current physical position comprises:
enabling real-time virtual sight.

4. The non-transitory computer-readable storage medium of claim 1, further comprising:
receiving a second virtual position information request associated with said second navigable virtual view;
comparing said second virtual position information request with a store of location position information; and
based on said comparing, generating a response to said second virtual position information request.

5. The non-transitory computer-readable storage medium of claim 1, further comprising: generating a second navigable view of a second virtual set of documents at said second location of interest.

6. The non-transitory computer-readable storage medium of claim 1, further comprising: locating a search request object within said first virtual set of documents.

7. The non-transitory computer-readable storage medium of claim 1, wherein said generating a first navigable virtual view of a first location of interest comprises:
generating said first navigable virtual view of a video.

8. A system for navigating concurrently and from point-to-point through multiple reality models, said system comprising:
a first virtual position information request receiver coupled with a processor of a device, said first virtual position information request receiver configured for receiving a first virtual position information request associated with a first location of interest, wherein said first location of interest is one of a first virtual location and a first non-virtual location and is out of a line of sight of a user of said device and wherein said first location of interest comprise a first virtual set of documents;
a first virtual position information request comparor coupled with said processor, said first virtual position information request comparor configured for comparing said first virtual position information request with a store of location position information;
a response generator coupled with said processor, said response generator configured for, based on said comparing, generating, at said processor, a response to said first virtual position information request;
a first navigable virtual view generator coupled with said processor, said first navigable virtual view generator for generating for display at said device a first navigable virtual view of a first location of interest, wherein said first location of interest is one of a first virtual location and a first non-virtual location, wherein said first navigable virtual view generator further, creates a first virtual viewing position from within said first navigable virtual view and from which said first location of interest may be viewed, wherein said first navigable virtual view generator comprises:
an advancement instruction receiver configured for receiving an advancement instruction to virtually advance towards said first location of interest until virtual position information of said first virtual position information request matches said first location of interest;
an advancer configured for virtually advancing towards said first location of interest, thereby achieving a first virtual viewing position; and
an advancement information receiver configured for receiving advancement information signifying that a physical advancement towards said first location of interest has occurred wherein said virtual position information matches said first location of interest and said advancement information includes said first virtual viewing position of said first location of interest;
a second navigable virtual view generator coupled with said processor, said second navigable virtual view generator for, concurrently with said generating said first navigable virtual view, generating for display at said device a second navigable virtual view corresponding to a current physical position of an object coupled with said system wherein said object comprises an item to which said system is attached, such that real-time sight at said current physical position, from a second virtual viewing position, is enabled within said second navigable virtual view, wherein said current physical position comprises a real-time location of said object as it finds itself on Earth, and wherein said real-time sight comprises an ability to view what is happening at said current physical position as it is occurring, wherein said first location of interest and said current physical position are different; and wherein said second navigable virtual view comprises: a virtual vehicle that remains separate from and within a predetermined distance from said object as said object moves;
a third navigable virtual view generator coupled with said processor said third navigable virtual view generator for, concurrently with said generating said first navigable virtual view of said first location of interest, generating for display at said device a third navigable virtual view of a second location of interest, wherein said second location of interest is one of a second virtual location and a second non-virtual location, wherein said first location of interest and said second location of interest are different.

9. The system of claim 8, wherein non-real-time stored imaging associated with said current physical position is further enabled.

10. The system of claim 8, wherein said real-time sight comprises: real-time virtual sight.

* * * * *